United States Patent
Ledet

(10) Patent No.: US 11,556,201 B2
(45) Date of Patent: Jan. 17, 2023

(54) DEVICE, METHOD, AND USER INTERFACE FOR PROCESSING INTENSITY OF TOUCH CONTACTS

(71) Applicant: Apple Inc., Cupertino, CA (US)

(72) Inventor: Raleigh J. Ledet, Lafayette, LA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/381,123

(22) Filed: Jul. 20, 2021

(65) Prior Publication Data

US 2021/0349566 A1 Nov. 11, 2021

Related U.S. Application Data

(63) Continuation of application No. 16/784,192, filed on Feb. 6, 2020, now Pat. No. 11,099,679, which is a
(Continued)

(51) Int. Cl.
*G06F 3/041* (2006.01)
*G06F 3/0488* (2022.01)
(Continued)

(52) U.S. Cl.
CPC ............ *G06F 3/0414* (2013.01); *G06F 3/016* (2013.01); *G06F 3/0416* (2013.01);
(Continued)

(58) Field of Classification Search
CPC ...... G06F 3/016; G06F 3/0414; G06F 3/0416; G06F 3/0488; G06F 3/04817;
(Continued)

(56) References Cited

U.S. PATENT DOCUMENTS 6,590,568 B1 * 7/2003 Astala ................. G06F 3/04883
345/157
8,209,628 B1 6/2012 Davidson
(Continued)

FOREIGN PATENT DOCUMENTS

CN 201043536 A 5/2011
CN 102279664 A 12/2011
(Continued)

OTHER PUBLICATIONS

Office Action, dated Apr. 5, 2016, received in U.S. Appl. No. 14/868,285, 8 pages.
(Continued)

*Primary Examiner* — Tom V Sheng
(74) *Attorney, Agent, or Firm* — Morgan, Lewis & Bockius LLP

(57) ABSTRACT

An electronic device, in response to detecting a touch input on a touch-sensitive surface, determines an intensity of the touch input. In accordance with the intensity of the touch input on the touch-sensitive surface and one or more preselected intensity thresholds, the device determines an intensity stage of the touch input and one or more intensity-based progress values of the touch input, based on an intensity range associated with the determined intensity stage. The device sends touch information to a first software application stored by the electronic device, including the one or more intensity-based progress values of the touch input and information identifying the intensity stage of the touch input, and processes the touch input based on the one or more intensity-based progress values of the touch input and the intensity stage of the touch input.

36 Claims, 98 Drawing Sheets

Related U.S. Application Data continuation of application No. 16/031,974, filed on Jul. 10, 2018, now Pat. No. 10,558,268, which is a continuation of application No. 15/488,096, filed on Apr. 14, 2017, now Pat. No. 10,019,065, which is a continuation of application No. 14/869,225, filed on Sep. 29, 2015, now Pat. No. 9,645,669, which is a continuation of application No. 14/868,285, filed on Sep. 28, 2015, now Pat. No. 9,542,037.

(60) Provisional application No. 62/129,937, filed on Mar. 8, 2015.

(51) Int. Cl.
*G06F 3/01* (2006.01)
*G06F 3/04817* (2022.01)

(52) U.S. Cl.
CPC ........ *G06F 3/0488* (2013.01); *G06F 3/04817* (2013.01); *G06F 2203/04105* (2013.01)

(58) Field of Classification Search
CPC .......... G06F 3/044; G06F 3/045; G06F 3/046; G06F 2203/04105; G06F 2203/04103
USPC ........................................................ 345/173
See application file for complete search history.

(56) References Cited

U.S. PATENT DOCUMENTS

| | | | |
|---|---|---|---|
| 8,884,895 B2 | 11/2014 | Sasaki | |
| 9,030,436 B2 | 5/2015 | Ikeda | |
| 9,046,999 B1* | 6/2015 | Teller | G06F 3/0488 |
| 9,052,804 B1 | 6/2015 | Starner et al. | |
| 9,213,449 B2 | 12/2015 | Bong | |
| 9,239,677 B2 | 1/2016 | Ording | |
| 9,244,562 B1* | 1/2016 | Rosenberg | G06F 3/04883 |
| 9,262,040 B2 | 2/2016 | Rekimoto | |
| 9,507,459 B2 | 11/2016 | Ledet et al. | |
| 9,542,037 B2* | 1/2017 | Ledet | G06F 3/016 |
| 9,645,669 B2* | 5/2017 | Ledet | G06F 3/016 |
| 9,857,872 B2 | 1/2018 | Terlizzi et al. | |
| 2003/0122779 A1* | 7/2003 | Martin | G06F 1/1662 345/156 |
| 2003/0151589 A1 | 8/2003 | Bensen et al. | |
| 2008/0150905 A1 | 6/2008 | Grivna et al. | |
| 2008/0271933 A1 | 11/2008 | Morimoto | |
| 2008/0303797 A1 | 12/2008 | Grothe | |
| 2009/0085881 A1 | 4/2009 | Keam | |
| 2009/0109183 A1 | 4/2009 | Carvajal et al. | |
| 2009/0237374 A1 | 9/2009 | Li et al. | |
| 2010/0001967 A1 | 1/2010 | Yoo | |
| 2010/0201643 A1 | 8/2010 | Tho et al. | |
| 2010/0277432 A1 | 11/2010 | Tsai | |
| 2010/0328229 A1 | 12/2010 | Weber et al. | |
| 2011/0138284 A1 | 6/2011 | Wigdor et al. | |
| 2011/0175844 A1 | 7/2011 | Berggren et al. | |
| 2011/0310058 A1 | 12/2011 | Yamada et al. | |
| 2012/0019448 A1 | 1/2012 | Pitkanen et al. | |
| 2012/0056839 A1 | 3/2012 | Rosenberg et al. | |
| 2012/0086666 A1 | 4/2012 | Badaye et al. | |
| 2012/0113061 A1 | 5/2012 | Ikeda | |
| 2012/0147052 A1 | 6/2012 | Homma et al. | |
| 2012/0262416 A1 | 10/2012 | Kitamura | |
| 2012/0275086 A1* | 11/2012 | Pasquero | H04M 1/026 361/679.01 |
| 2012/0293450 A1 | 11/2012 | Dietz et al. | |
| 2012/0293551 A1 | 11/2012 | Momeyer et al. | |
| 2013/0016042 A1 | 1/2013 | Makinen et al. | |
| 2013/0063372 A1 | 3/2013 | Hong et al. | |
| 2013/0141365 A1* | 6/2013 | Lynn | G06F 3/0488 345/173 |
| 2013/0314364 A1 | 11/2013 | Nicholson et al. | |
| 2014/0009413 A1 | 1/2014 | Su et al. | |
| 2014/0049483 A1 | 2/2014 | Kim | |
| 2014/0055374 A1 | 2/2014 | Bart et al. | |
| 2014/0104197 A1 | 4/2014 | Khosravy et al. | |
| 2014/0118291 A1 | 5/2014 | Fujii | |
| 2014/0132568 A1 | 5/2014 | Hirose et al. | |
| 2014/0210770 A1 | 7/2014 | Chen et al. | |
| 2014/0253305 A1 | 9/2014 | Rosenberg et al. | |
| 2014/0267135 A1 | 9/2014 | Chhabra | |
| 2015/0042573 A1* | 2/2015 | Grant | G06F 3/016 345/173 |
| 2015/0058723 A1 | 2/2015 | Cieplinski et al. | |
| 2015/0067513 A1 | 3/2015 | Zambetti et al. | |
| 2015/0067559 A1 | 3/2015 | Missig et al. | |
| 2015/0135108 A1 | 5/2015 | Pope et al. | |
| 2016/0021168 A1 | 1/2016 | Chaudhri et al. | |
| 2016/0259470 A1 | 9/2016 | Ledet et al. | |
| 2016/0259471 A1 | 9/2016 | Ledet et al. | |
| 2016/0259472 A1 | 9/2016 | Ledet et al. | |
| 2017/0357358 A1* | 12/2017 | Teutschler | G06F 3/0484 |
| 2020/0225753 A1 | 7/2020 | Ledet et al. | |

FOREIGN PATENT DOCUMENTS

| | | |
|---|---|---|
| CN | 102713822 A | 10/2012 |
| EP | 2 375 307 A1 | 10/2011 |
| EP | 2 375 314 A1 | 10/2011 |
| EP | 2 437 145 A1 | 4/2012 |
| EP | 2 458 487 A1 | 5/2012 |
| WO | WO 2013/169854 A2 | 11/2013 |
| WO | WO 2013/169877 A2 | 11/2013 |
| WO | WO 2014/200676 A2 | 12/2014 |

OTHER PUBLICATIONS

Notice of Allowance, dated Aug. 31, 2016, received in U.S. Appl. No. 14/868,285, 10 pages.
Office Action, dated May 16, 2016, received in Australian Patent Application No. 2016100246, which corresponds with U.S. Appl. No. 14/868,285, 6 pages.
Office Action, dated Aug. 26, 2016, received in Australian Appliation No. 2016100246, which corresponds with U.S. Appl. No. 14/868,285, 4 pages.
Office Action, dated May 24, 2018, received in Australian Patent Application No. 2016230872, which corresponds with U.S. Appl. No. 14/868,285, 3 pages.
Notice of Acceptance, dated Jan. 30, 2019, received in Australian Patent Application No. 2016230872, which corresponds with U.S. Appl. No. 14/868,285, 3 pages.
Certificate of Grant, dated May 30, 2019, received in Australian Patent Application No. 2016230872, which corresponds with U.S. Appl. No. 14/868,285, 1 page.
Office Action, dated Nov. 5, 2018, received in Chinese Patent Application No. 201610131665.5), which corresponds with U.S. Appl. No. 14/868,285, 5 pages.
Office Action, dated Aug. 14, 2019, received in Chinese Patent Application No. 201610131665.5, which corresponds with U.S. Appl. No. 14/868,285, 3 pages.
Office Action, dated May 15, 2020, received in Chinese Patent Application No. 201610131665.5, which corresponds with U.S. Appl. No. 14/868,285, 4 pages.
Office Action, dated Feb. 5, 2021, received in Chinese Patent Application No. 201610131665.5, which corresponds with U.S. Appl. No. 14/868,285, 4 pages.
Notice of Allowance, dated Oct. 25, 2016, received in Chinese Patent Application No. 201620177809.6, which corresponds with U.S. Appl. No. 14/868,285, 3 pages.
Office Action, dated Sep. 10, 2018, received in Chinese Patent Application No. 201680010325.5, which corresponds with U.S. Appl. No. 14/868,285, 5 pages.
Office Action, dated Mar. 22, 2019, received in Chinese Patent Application No. 201680010325.5, which corresponds with U.S. Appl. No. 14/868,285, 3 pages.
Office Action, dated Nov. 5, 2019, received in Chinese Patent Application No. 201680010325.5, which corresponds with U.S. Appl. No. 14/868,285, 3 pages.

(56) References Cited

OTHER PUBLICATIONS

Certificate of Registration, dated Jun. 20, 2016, received in German Patent Application no. 202016001513.4, which corresponds with U.S. Appl. No. 14/686,285, 3 pages.

Office Action, dated Mar. 18, 2016, received in Danish Patent Application No. 201500578, which corresponds with U.S. Appl. No. 14/868,285, 9 pages.

Office Action and Additional Search Report, dated Sep. 27, 2016, received in Danish Patent Application No. 201500578, which corresponds with U.S. Appl. No. 14/868,285, 6 pages.

Office Action, dated Apr. 27, 2017. received in Danish Patent Application No. 201500578, which corresponds with U.S. Appl. No. 14/868,285, 5 pages.

Office Action, dated Dec. 5, 2017. received in Danish Patent Application No. 201500578, which corresponds with U.S. Appl. No. 14/868,285, 5 pages.

Patent, dated Aug. 16, 2018, received in Dutch Patent Application No. 2016378, which corresponds with U.S. Appl. No. 14/868,285, 2 pages.

Office Action, dated Jul. 15, 2016, received in U.S. Appl. No. 14/869,225, 15 pages.

Notice of Allowance, dated Jan. 18, 2017, received in U.S. Appl. No. 14/869,225, 8 pages.

Notice of Allowance, dated Jul. 21, 2016, received in U.S. Appl. No. 14/869,292, 9 pages.

Office Action, dated Oct. 30, 2017, received in U.S. Appl. No. 15/488,096, 7 pages.

Notice of Allowance, dated Apr. 18, 2018, received in U.S. Appl. No. 15/488,096, 9 pages.

Office Action, dated Apr. 29, 2019, received in U.S. Appl. No. 16/031,974, 8 pages.

Notice of Allowance, dated Sep. 30, 2019, received in U.S. Appl. No. 16/031,974, 9 pages.

Office Action, dated Oct. 30, 2020, received in U.S. Appl. No. 16/784,192, 12 pages.

Notice of Allowance, dated Apr. 21, 2021, received in U.S. Appl. No. 16/784,192, 11 pages.

Search Report, dated Apr. 5, 2018, received in Dutch Patent Application No. 2016378, which corresponds with U.S. Appl. No. 14/868,285, 7 pages.

International Search Report and Written Opinion, dated Jul. 20, 2016, received in International Patent Application No. PCT/IB2016/000293, which corresponds with U.S. Appl. No. 14/868,285, 14 pages.

Notice of Allowance, dated Jun. 30, 2021, received in Chinese Patent Application No. 201610131665.5, which correspods with U.S. Appl. No. 14/868,285, 1 page.

Patent, dated Sep. 7, 2021, received in Chinese Patent Application No. 201610131665.5, which corresponds with U.S. Appl. No. 14/868,285, 6 pages.

Notice of Allowance, dated Dec. 9, 2021, received in Chinese Patent Application No. 201680010325.5, which corresponds with U.S. Appl. No. 14/868,285, 1 page.

Patent, dated Jan. 25, 2022, received in Chinese Patent Application No. 201680010325.5, which corresponds with U.S. Appl. No. 14/868,285, 6 pages.

Office Action, dated Oct. 25, 2021, received in European Patent Application No. 16717695.7, which corresponds with U.S. Appl. No. 14/868,285, 9 pages.

\* cited by examiner

610 Send to the first software application from the contact intensity module touch information that identifies the intensity stage of the touch input 612 Send information from the contact intensity module, the information indicating that the intensity of the touch input is available to the first software application 614 Repeat the operations of determining an intensity of the touch input, determining an intensity stage of the touch input, and sending touch information while the touch input is detected on the touch-sensitive surface 616 Determine one or more intensity-based progress values of the touch input based on an intensity range associated with the determined intensity stage. Send touch information to the first software application. The touch information includes the one or more intensity-based progress values of the touch input and information identifying the intensity stage of the touch input.

618 The one or more intensity-based progress values of the touch input include a transition progress value of the touch input 620 The one or more intensity-based progress values of the touch input include a stage progress value of the touch input 622 In response to detecting the touch input, determine a first intensity applied by the touch input on the touch-sensitive surface. In accordance with a determination that the first intensity applied by the touch input on the touch-sensitive surface does not satisfy a stage activation intensity threshold for a second intensity stage, determine that the touch input is in a first intensity stage that is distinct from the second intensity stage. Subsequent to determining that the touch input is in the first intensity stage, determine a second intensity applied by the touch input on the touch-sensitive surface. The second intensity is distinct from the first intensity. In accordance with a determination that the second intensity applied by the touch input on the touch-sensitive surface satisfies the stage activation intensity threshold for the second intensity stage, determine that the touch input is in the second intensity stage.

(See Figure 6C)

Figure 6B

622 In response to detecting the touch input, determine a first intensity applied by the touch input on the touch-sensitive surface. In accordance with a determination that the first intensity applied by the touch input on the touch-sensitive surface does not satisfy a stage activation intensity threshold for a second intensity stage, determine that the touch input is in a first intensity stage that is distinct from the second intensity stage. Subsequent to determining that the touch input is in the first intensity stage, determine a second intensity applied by the touch input on the touch-sensitive surface. The second intensity is distinct from the first intensity. In accordance with a determination that the second intensity applied by the touch input on the touch-sensitive surface satisfies the stage activation intensity threshold for the second intensity stage, determine that the touch input is in the second intensity stage.

624 Subsequent to determining that the touch input is in the second intensity stage, determine a third intensity applied by the touch input on the touch-sensitive surface. The third intensity is distinct from the second intensity. In accordance with a determination that the third intensity does not satisfy a stage release intensity threshold for the second intensity stage, distinct from the stage activation intensity threshold for the second intensity stage, determine that the touch input remains in the second intensity stage. Subsequent to determining that the touch input remains in the second intensity stage, determine a fourth intensity applied by the touch input on the touch-sensitive surface. The fourth intensity is distinct from the third intensity. In accordance with a determination that the fourth intensity satisfies the stage release intensity threshold for the second intensity stage, determine that the touch input is in the first intensity stage.

626 Subsequent to determining that the touch input remains in the second intensity stage, determine a third intensity applied by the touch input on the touch-sensitive surface. The third intensity is distinct from the second intensity. In accordance with a determination that the third intensity satisfies a stage activation threshold for the third intensity stage, distinct from the stage activation intensity threshold for the second intensity stage, determine that the touch input is in the third intensity stage.

628 Subsequent to determining that the touch input is in the third intensity stage, determine a fourth intensity applied by the touch input on the touch-sensitive surface. The fourth intensity is distinct from the third intensity. In accordance with a determination that the fourth intensity satisfies a stage release intensity threshold for the third intensity stage, distinct from the stage activation threshold for the third intensity stage, determine that the touch input is in the second intensity stage.

Figure 6C

718 Subsequent to determining the first touch characterization parameter, send first touch information to the first software application. The first touch information includes the first intensity model identifier and the first touch characterization parameter.

720 Send a stream of intensity events to the first software application, each intensity event corresponding to an intensity applied by the touch input at a corresponding time

722 Receive one or more instructions from the first software application to generate a tactile output. In response to receiving the one or more instructions from the software application, generate the tactile output in accordance with the one or more instructions from the software application.

724 While continuing to detect the first touch input on the touch-sensitive surface, receive one or more instructions to use an intensity model that corresponds to a second intensity model identifier that is distinct from the first intensity model identifier. Subsequent to receiving the one or more instructions to use the intensity model that corresponds to the second intensity model identifier: determine a second intensity applied by the first touch input on the touch-sensitive surface; and process the first touch input based on the second intensity model identifier.

(See Figure 7C)

734 Subsequent to detecting the first touch input, receive one or more instructions to use an intensity model that corresponds to a second intensity model identifier that is distinct from the first intensity model identifier. Subsequent to receiving the one or more instructions to use the intensity model that corresponds to the second intensity model identifier, detect a second touch input on the touch-sensitive surface. In response to detecting the second touch input on the touch-sensitive surface, determine a second intensity applied by the second touch input on the touch-sensitive surface. Process the second touch input based on the second intensity model identifier.

Figure 7B

724 While continuing to detect the first touch input on the touch-sensitive surface, receive one or more instructions to use an intensity model that corresponds to a second intensity model identifier that is distinct from the first intensity model identifier. Subsequent to receiving the one or more instructions to use the intensity model that corresponds to the second intensity model identifier: determine a second intensity applied by the first touch input on the touch-sensitive surface; and process the first touch input based on the second intensity model identifier.

726 While continuing to detect the first touch input on the touch-sensitive surface, subsequent to processing the first touch input based on the second intensity model identifier, receive one or more instructions to use an intensity model that corresponds to a third intensity model identifier that is distinct from the first intensity model identifier and the second intensity model identifier. Subsequent to receiving the one or more instructions to use the intensity model that corresponds to the third intensity model identifier, determine a third intensity applied by the first touch input on the touch-sensitive surface, and process the first touch input based on the third intensity model identifier.

728 Determine that the first touch input has ceased to be detected on the touch-sensitive surface. Subsequent to determining that the first touch input has ceased to be detected on the touch-sensitive surface, detect a second touch input on the touch-sensitive surface that is separate from the first touch input; and process the second touch input based on the first intensity model identifier.

730 Processing the touch input based on the second intensity model identifier includes, in accordance with the second intensity applied by the touch input on the touch-sensitive surface and one or more thresholds associated with the second intensity model identifier, determining a second touch characterization parameter; and, subsequent to determining the second touch characterization parameter, sending second touch information to the first software application. The second touch characterization parameter is distinct from the first touch characterization parameter. The second touch information includes the second intensity model identifier and the second touch characterization parameter.

732 Processing the touch input based on the second intensity model identifier includes foregoing generation of a tactile output in accordance with the second intensity failing to satisfying the one or more thresholds associated with the second intensity model identifier. The electronic device is configured to generate a tactile output in accordance with the second intensity satisfying at least one of the one or more thresholds associated with the first intensity model identifier.

Figure 7C

828 At least a portion of the first touch region overlaps with at least a portion of the second touch region 830 Detect a third touch input on an overlapping touch region, of the touch-sensitive surface, that corresponds to an overlap of the first touch region and the second touch region. Select an intensity model identifier between the first intensity model identifier and the second intensity model identifier for the overlapping touch region. In response to detecting the third touch input on the overlapping touch region, determine a third intensity applied by the third touch input on the overlapping touch region of the touch-sensitive surface. In accordance with the third intensity applied by the third touch input on the overlapping touch region of the touch-sensitive surface and one or more thresholds associated with the selected intensity model identifier, determine a third touch characterization parameter. Subsequent to determining the third touch characterization parameter, send third touch information to the first software application. The third touch information includes the third touch characterization parameter.

832 Both the first intensity model identifier and the second intensity model identifier are associated with priorities applicable to the overlapping touch region, and the intensity model identifier is selected based on the priorities of the first intensity model identifier and the second intensity model identifier for the overlapping touch region 834 Forego determination of a touch characterization parameter in accordance with the third intensity and one or more thresholds associated with an intensity model identifier that has not been selected between the first intensity model identifier and the second intensity model identifier 836 The first intensity model identifier has been selected for the overlapping region. Subsequent to detecting the third touch input, detect a fourth touch input on the overlapping region of the touch-sensitive surface. Select the second intensity model identifier for the overlapping touch region. In response to detecting the fourth touch input on the overlapping touch region, determine a fourth intensity applied by the fourth touch input on the overlapping touch region of the touch-sensitive surface. In accordance with the fourth intensity applied by the fourth touch input on the overlapping touch region of the touch-sensitive surface and the one or more thresholds associated with the second intensity model identifier, determine a fourth touch characterization parameter. Subsequent to determining the touch characterization parameter, send fourth touch information to the first software application. The fourth touch information includes the fourth touch characterization parameter.

Figure 8C

910 During the touch input, an electronic device detects application of a respective intensity on the touch-sensitive surface that is attributed to the touch input. Processing the touch input in accordance with an intensity applied by the touch input on the touch-sensitive surface and the first intensity model includes providing, to a user interface application, first touch input state information that indicates that the touch input has applied the respective intensity on the touch-sensitive surface without generating a tactile output for the touch input. Processing the touch input in accordance with an intensity applied by the touch input on the touch-sensitive surface and the second intensity model includes providing, to a user interface application, second touch input state information that indicates that the touch input has applied the respective intensity on the touch-sensitive surface and generating a tactile output for the touch input.

912 The first touch input state information includes a continuously variable representation of intensity of the touch input. The second touch input state information includes an indication that the intensity of the touch input is within a range of values that correspond to activation of a user interface element that corresponds to the location on the touch-sensitive surface that is associated with the second intensity model.

914 Detect a first touch input on a first touch region of the touch-sensitive surface. Identify a first intensity model identifier, associated with the first touch region of the touch-sensitive surface, from a plurality of predefined intensity model identifiers. In response to detecting the first touch input on the first touch region of the touch-sensitive surface, determine a first intensity applied by the first touch input on the first touch region of the touch-sensitive surface. In accordance with the first intensity applied by the first touch input on the touch-sensitive surface and the first intensity model identifier, process the first touch input; and forego generation of a tactile output for the first touch input. Detect a second touch input on a second touch region of the touch-sensitive surface. The second touch region of the touch-sensitive surface is distinct from the first touch region of the touch-sensitive surface. Identify a second intensity model identifier, associated with the second touch region of the touch-sensitive surface, from the plurality of predefined intensity model identifiers. In response to detecting the second touch input on the second touch region of the touch-sensitive surface, determine a second intensity applied by the second touch input on the second touch region of the touch-sensitive surface. In accordance with the second intensity applied by the second touch input on the touch-sensitive surface and the second intensity model identifier, process the second touch input; and conditionally generate a tactile output for the second touch input in accordance with the second touch input and one or more model parameters associated with the second intensity model identifier.

(See Figures 9C and 9D)

Figure 9B

914 Detect a first touch input ...

916 Conditionally generating the tactile output for the second touch input includes foregoing generation of the tactile output for the second touch input in accordance with a determination that the second touch input fails to satisfy one or more criteria corresponding to the one or more model parameters associated with the second intensity model identifier

918 The first intensity model identifier indicates that no tactile output is to be generated for a touch input on the first touch region of the touch-sensitive surface

920 The electronic device stores a first software application, and the first user input and the second user input are detected while the electronic device displays a user interface of the first software application

922 The user interface of the first software application includes a handwriting input tool region

924 The handwriting input tool region includes a plurality of selection regions, and at least a respective selection region of the one or more selection regions corresponds to the second touch region of the touch-sensitive surface

926 The handwriting input tool region includes a handwriting input region, and the handwriting input region corresponds to the first touch region of the touch-sensitive surface

928 In response to detecting the first touch input on the first touch region of the touch-sensitive surface, display one or more graphical elements in the handwriting input region in accordance with the first touch input (See Figure 9D)

Figure 9C

928 In response to detecting the first touch input on the first touch region of the touch-sensitive surface, display one or more graphical elements in the handwriting input region in accordance with the first touch input 930 In response to detecting the first touch input on the first touch region of the touch-sensitive surface, display a plurality of groups of characters in the plurality of selection regions. A respective group of characters is selected based on the one or more displayed graphical elements in the handwriting input region, and the respective group of characters is displayed in a respective selection region. In response to detecting the second user input on the second touch region of the touch-sensitive surface at a location that corresponds to the respective selection region, select the respective group of characters.

932 Processing the first touch input detected on the first touch region of the touch-sensitive surface includes determining that the first touch input has satisfied a drawing intensity threshold; and, in accordance with a determination that the first touch input has exceeded the drawing intensity threshold, displaying the one or more graphical elements in the handwriting input region in accordance with the first touch input. A first terminal region of a respective graphical element of the one or more graphical elements corresponds to a location where the first touch input has been determined to satisfy the drawing intensity threshold.

934 Processing the first touch input detected on the first touch region of the touch-sensitive surface includes, while continuing to detect the first touch input on the touch-sensitive surface, continuing to update the one or more graphical elements in the handwriting input region in accordance with the first touch input regardless of whether the first touch input has ceased to satisfy the drawing intensity threshold.

936 Processing the first touch input detected on the first touch region of the touch-sensitive surface includes detecting that the first touch input has ceased to be detected on the touch-sensitive surface and detecting that the first touch input has resumed contact with the touch-sensitive surface within a predefined time interval subsequent to the first touch input ceasing to be detected on the touch-sensitive surface; and, in response to the first touch input resuming contact with the touch-sensitive surface within the predefined time interval subsequent to the first touch input ceasing to be detected on the touch-sensitive surface, updating the one or more graphical elements in the handwriting input region in accordance with the first touch input.

Figure 9D

In response to detecting the second intensity applied by the touch input at the second location on the touch-sensitive surface:

1016 In accordance with a determination that the first intensity does not satisfy a first intensity threshold, process the second intensity in accordance with one or more intensity thresholds associated with the second display region 1018 The first intensity threshold is distinct from an activation intensity threshold 1020 Processing the second intensity in accordance with the one or more intensity thresholds associated with the second display region includes displaying an animation that corresponds to a change in intensity applied by the touch input on the touch-sensitive surface 1022 Processing the second intensity in accordance with one or more intensity thresholds associated with the second display region includes activating a second control associated with the second display region 1024 In accordance with a determination that the first intensity satisfies the first intensity threshold, process the second intensity in accordance with one or more intensity thresholds associated with the first display region (See Figure 10C)

1034 Send first touch information to the first software application in accordance with a determination that the first intensity satisfies a reporting intensity threshold that is distinct from the first intensity threshold, the first touch information including one or more touch parameters that correspond to the first intensity. Send second touch information to the first software application in accordance with a determination that the second intensity satisfies the reporting intensity threshold, the second touch information including one or more touch parameters that correspond to the second intensity.

(See Figure 10D)

1044 In response to detecting the touch input, update the user interface in accordance with the first touch information using the first software application prior to the first intensity satisfying the first intensity threshold

Figure 10B

1024 In accordance with a determination that the first intensity satisfies the first intensity threshold, process the second intensity in accordance with one or more intensity thresholds associated with the first display region > 1026 The one or more intensity thresholds associated with the first display region are different from the one or more intensity thresholds associated with the second display region > 1028 The one or more intensity thresholds associated with the first display region are the same as the one or more intensity thresholds associated with the second display region > 1030 Processing the second intensity in accordance with the one or more intensity thresholds associated with the first display region includes displaying an animation that corresponds to a change in intensity applied by the touch input on the touch-sensitive surface > 1032 Processing the second intensity in accordance with one or more intensity thresholds associated with the first display region includes activating a first control associated with the first display region

Figure 10C

1034 Send first touch information to the first software application in accordance with a determination that the first intensity satisfies a reporting intensity threshold that is distinct from the first intensity threshold, the first touch information including one or more touch parameters that correspond to the first intensity. Send second touch information to the first software application in accordance with a determination that the second intensity satisfies the reporting intensity threshold, the second touch information including one or more touch parameters that correspond to the second intensity.

1036 A first display region of the two or more display regions is associated with a first software element of the first software application and a second display region of the two or more display regions is associated with a second software element of the second software application 1038 In accordance with the determination that the first intensity does not satisfy the first intensity threshold, the second touch information is sent to the second software element without sending the second touch information to the first software element 1040 In accordance with the determination that the first intensity satisfies the first intensity threshold, the second touch information is sent to the first software element without sending the second touch information to the second software element 1042 In accordance with the determination that the first intensity satisfies the reporting intensity threshold, the first touch information is sent to the first software element

DEVICE, METHOD, AND USER INTERFACE FOR PROCESSING INTENSITY OF TOUCH CONTACTS

RELATED APPLICATIONS

This application is a continuation of U.S. application Ser. No. 16/784,192, filed Feb. 6, 2020, which is a continuation of U.S. application Ser. No. 16/031,974, filed Jul. 10, 2018, now U.S. Pat. No. 10,558,268, which is a continuation of U.S. application Ser. No. 15/488,096, filed Apr. 14, 2017, now U.S. Pat. No. 10,019,065, which is a continuation of U.S. application Ser. No. 14/869,225, filed Sep. 29, 2015, now U.S. Pat. No. 9,645,669, which is a continuation of U.S. patent application Ser. No. 14/868,285, filed Sep. 28, 2015, now U.S. Pat. No. 9,542,037, which claims priority to U.S. Provisional Patent Application Ser. No. 62/129,937, filed Mar. 8, 2015, all of which are incorporated by reference herein in their entireties.

TECHNICAL FIELD

This relates generally to electronic devices with touch-sensitive surfaces, including but not limited to electronic devices with touch-sensitive surfaces and sensors to detect intensity of contacts on the touch-sensitive surfaces.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interface objects on a display.

In addition to the presence or absence of a contacts (or touches) on the touchpads and touch-screen displays, intensity of contacts can be used to manipulate user interface objects on a display.

However, processing intensity of contacts can be cumbersome and inefficient. For example, processing intensity of contacts require complex instructions, which can lead to increased computational load, increased size of software applications, and increased power consumption. These create a significant burden on the use of intensity of contacts in electronic devices.

SUMMARY

Accordingly, there is a need for electronic devices with faster, more efficient methods and interfaces for processing touch inputs. Such methods and interfaces optionally complement or replace conventional methods for processing touch inputs. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a touch-sensitive surface and one or more sensors to detect intensity of contacts with the touch-sensitive surface. The method includes: detecting a touch input on the touch-sensitive surface; in response to detecting the touch input on the touch-sensitive surface, determining an intensity of the touch input on the touch-sensitive surface; and, in accordance with the intensity of the touch input on the touch-sensitive surface and one or more preselected intensity thresholds, determining an intensity stage of the touch input. The intensity stage of the touch input is selected from a plurality of predefined intensity stages. The method also includes processing the touch input based on the intensity stage of the touch input.

In accordance with some embodiments, a method is performed at an electronic device with a touch-sensitive surface and one or more sensors to detect intensity of contacts with the touch-sensitive surface. The electronic device stores a first software application. The method includes: detecting a first touch input on the touch-sensitive surface; in response to detecting the first touch input on the touch-sensitive surface, determining a first intensity applied by the first touch input on the touch-sensitive surface; identifying a first intensity model identifier from a plurality of predefined intensity model identifiers; in accordance with the first intensity applied by the first touch input on the touch-sensitive surface and one or more thresholds associated with the first intensity model identifier, determining a first touch characterization parameter; and, subsequent to determining the first touch characterization parameter, sending first touch information to the first software application. The first touch information includes the first intensity model identifier and the first touch characterization parameter.

In accordance with some embodiments, a method is performed at an electronic device with a touch-sensitive surface and one or more sensors to detect intensity of contacts with the touch-sensitive surface. The electronic device stores a first software application. The method includes: detecting a first touch input on a first touch region of the touch-sensitive surface; identifying a first intensity model identifier, associated with the first touch region of the touch-sensitive surface, from a plurality of predefined intensity model identifiers; in response to detecting the first touch input on the first touch region of the touch-sensitive surface: determining a first intensity applied by the first touch input on the first touch region of the touch-sensitive surface; in accordance with the first intensity applied by the first touch input on the touch-sensitive surface and one or more thresholds associated with the first intensity model identifier, determining a first touch characterization parameter; and, subsequent to determining the first touch characterization parameter, sending first touch information to the first software application. The first touch information includes the first touch characterization parameter. The method also includes detecting a second touch input on a second touch region of the touch-sensitive surface. The second touch region of the touch-sensitive surface is distinct from the first touch region of the touch-sensitive surface. The method further includes identifying a second intensity model identifier, associated with the second touch region of the touch-sensitive surface, from the plurality of predefined intensity model identifiers; and, in response to detecting the second touch input on the second touch region of the touch-sensitive surface: determining a second intensity applied by the second touch input on the second touch region of the touch-sensitive surface; in accordance with the second intensity applied by the second touch input on the touch-sensitive surface and one or more thresholds associated with the second intensity model identifier, determining a second touch characterization parameter; and, subsequent to determining the second touch characterization parameter, sending second touch information to the first software application. The second touch information includes the second touch characterization parameter.

In accordance with some embodiments, a method is performed at an electronic device with a touch-sensitive surface and one or more sensors to detect intensity of contacts with the touch-sensitive surface. The method includes: detecting a touch input on the touch-sensitive surface; and, in response to detecting the touch input: in accordance with a determination that the touch input is at a location on the touch-sensitive surface that is associated with a first intensity model of a plurality of different intensity models, processing the touch input in accordance with an intensity applied by the touch input on the touch-sensitive surface and the first intensity model; and, in accordance with a determination that the touch input is at a location on the touch-sensitive surface that is associated with a second intensity model different from the first intensity model, processing the touch input in accordance with an intensity applied by the touch input on the touch-sensitive surface and the second intensity model.

In accordance with some embodiments, a method is performed at an electronic device with a display, a touch-sensitive surface, and one or more sensors to detect intensity of contacts with the touch-sensitive surface. The electronic device stores a first software application. The method includes: displaying a user interface that includes two or more display regions, including a first display region and a second display region; and, while displaying the user interface: detecting a first intensity applied by a touch input at a first location on the touch-sensitive surface that corresponds to the first display region; detecting a movement of the touch input across the touch-sensitive surface from the first location on the touch-sensitive surface to a second location on the touch-sensitive surface that corresponds to the second display region; after detecting the movement of the touch input from the first location on the touch-sensitive surface to the second location on the touch-sensitive surface, detecting a second intensity applied by the touch input at the second location on the touch-sensitive surface; and, in response to detecting the second intensity applied by the touch input at the second location on the touch-sensitive surface: in accordance with a determination that the first intensity does not satisfy a first intensity threshold, processing the second intensity in accordance with one or more intensity thresholds associated with the second display region; and, in accordance with a determination that the first intensity satisfies the first intensity threshold, processing the second intensity in accordance with one or more intensity thresholds associated with the first display region.

In accordance with some embodiments, a method is performed at an electronic device in communication with a plurality of input devices including a first input device that is configured to generate tactile outputs in response to inputs and a second input device that is configured to generate tactile outputs. The method includes receiving an indication of an input detected by a respective input device of the plurality of input devices, and in response to receiving the indication of the input, providing information describing the input to an application running on the device that enables the application to react to the input. The method further includes receiving a reaction to the input from the application that indicates that a tactile output is to be generated in response to the input, and in response to receiving the reaction to the input from the application, causing the generation of a respective tactile output. In accordance with a determination that the reaction was triggered by the first input device, the respective tactile output is generated at the first input device based on the reaction to the input from the application, and in accordance with a determination that the reaction was triggered by the second input device, the respective tactile output is generated at the second input device based on the reaction to the input from the application.

In accordance with some embodiments, an electronic device includes a display, a first input device that is configured to generate tactile outputs in response to inputs, a second input device that is configured to generate tactile outputs, one or more processors, memory, and one or more programs, wherein the one or more programs are stored in the memory and configured to be executed by the one or more processors. The one or more programs including instructions for receiving an indication of an input detected by a respective input device of the plurality of input devices, and in response to receiving the indication of the input, providing information describing the input to an application running on the device that enables the application to react to the input. The one or more programs further include instructions for receiving a reaction to the input from the application that indicates that a tactile output is to be generated in response to the input, and in response to receiving the reaction to the input from the application, causing the generation of a respective tactile output. In accordance with a determination that the reaction was triggered by the first input device, the respective tactile output is generated at the first input device based on the reaction to the input from the application, and in accordance with a determination that the reaction was triggered by the second input device, the respective tactile output is generated at the second input device based on the reaction to the input from the application.

In accordance with some embodiments, a non-transitory computer readable storage medium stores one or more programs, the one or more programs comprising instructions, which when executed by an electronic device having a display, a first input device that is configured to generate tactile outputs in response to inputs, and a second input device that is configured to generate tactile outputs, cause the device to perform the aforementioned method, or any of the other methods described herein.

In accordance with some embodiments, a method is performed at an electronic device in communication with one or more input devices that are configured to generate tactile outputs in response to inputs. The method includes receiving an indication of an input detected by a respective input device of the one or more input devices, and in response to receiving the indication of the input, providing information describing the input to an application running on the device that enables the application to react to the input. The method further includes receiving a reaction to the input from the application that indicates that a tactile output is to be generated in response to the input. In response to receiving the reaction to the input from the application, the electronic device performs a set of operations, including comparing an input time for the reaction to an output time for the reaction. With respect to the comparing, the input time for the reaction corresponds to a time at which the input was detected by the respective input device, and the output time for the reaction corresponds to a time at which a tactile output corresponding to the reaction is configured to be generated at the respective input device. The set of operations performed in response to receiving the reaction to the input from the application further includes determining whether tactile output criteria have been met, wherein the tactile output criteria include a criterion that is met when an input time is less than a predetermined amount of time before the output time, and in accordance with a determination that the tactile output criteria have been met, causing generation, at the respective input device, of a tactile output corresponding to the reaction from the application. On the other hand, the set of operations performed in response to receiving the reaction to the input from the application includes, in accordance with a determination that the tactile output criteria have not been met, forgoing generation, at the respective input device, of the tactile output corresponding to the reaction from the application.

In accordance with some embodiments, an electronic device includes a display, one or more input devices that are configured to generate tactile outputs in response to inputs, one or more processors, memory, and one or more programs, wherein the one or more programs are stored in the memory and configured to be executed by the one or more processors. The one or more programs including instructions for receiving an indication of an input detected by a respective input device of the one or more input devices, and in response to receiving the indication of the input, providing information describing the input to an application running on the device that enables the application to react to the input. The one or more programs further include instructions for receiving a reaction to the input from the application that indicates that a tactile output is to be generated in response to the input, and in response to receiving the reaction to the input from the application, performing a set of operations, including comparing an input time for the reaction to an output time for the reaction. With respect to the comparing, the input time for the reaction corresponds to a time at which the input was detected by the respective input device, and the output time for the reaction corresponds to a time at which a tactile output corresponding to the reaction is configured to be generated at the respective input device. The set of operations performed in response to receiving the reaction to the input from the application further includes determining whether tactile output criteria have been met, wherein the tactile output criteria include a criterion that is met when an input time is less than a predetermined amount of time before the output time, and in accordance with a determination that the tactile output criteria have been met, causing generation, at the respective input device, of a tactile output corresponding to the reaction from the application.

On the other hand, the set of operations performed in response to receiving the reaction to the input from the application includes, in accordance with a determination that the tactile output criteria have not been met, forgoing generation, at the respective input device, of the tactile output corresponding to the reaction from the application.

In accordance with some embodiments, a non-transitory computer readable storage medium stores one or more programs, the one or more programs comprising instructions, which when executed by an electronic device having a display, one or more input devices that are configured to generate tactile outputs in response to inputs, cause the device to perform the aforementioned method, or any of the other methods described herein.

In accordance with some embodiments, an electronic device includes a touch-sensitive surface unit to receive contacts, one or more sensor units to detect intensity of contacts with the touch-sensitive surface unit; and a processing unit coupled with the touch-sensitive surface unit and the one or more sensor units. The processing unit is configured to: detect a touch input on the touch-sensitive surface unit; in response to detecting the touch input on the touch-sensitive surface unit, determine an intensity of the touch input on the touch-sensitive surface unit; in accordance with the intensity of the touch input on the touch-sensitive surface unit and one or more preselected intensity thresholds, determine an intensity stage of the touch input, wherein the intensity stage of the touch input is selected from a plurality of predefined intensity stages; and process the touch input based on the intensity stage of the touch input.

In accordance with some embodiments, an electronic device includes a touch-sensitive surface unit to receive contacts, one or more sensor units to detect intensity of contacts with the touch-sensitive surface unit; and a processing unit coupled with the touch-sensitive surface unit and the one or more sensor units. The processing unit is configured to: detect a first touch input on the touch-sensitive surface unit; in response to detecting the first touch input on the touch-sensitive surface unit, determine a first intensity applied by the first touch input on the touch-sensitive surface unit; identify a first intensity model identifier from a plurality of predefined intensity model identifiers; in accordance with the first intensity applied by the first touch input on the touch-sensitive surface unit and one or more thresholds associated with the first intensity model identifier, determine a first touch characterization parameter; and, subsequent to determining the first touch characterization parameter, send first touch information to a first software application, wherein the first touch information includes the first intensity model identifier and the first touch characterization parameter.

In accordance with some embodiments, an electronic device includes a display unit configured to display a touch-sensitive surface unit to receive contacts, one or more sensor units to detect intensity of contacts with the touch-sensitive surface unit; and a processing unit coupled with the touch-sensitive surface unit and the one or more sensor units. The processing unit is configured to: detect a first touch input on a first touch region of the touch-sensitive surface unit; identify a first intensity model identifier, associated with the first touch region of the touch-sensitive surface unit, from a plurality of predefined intensity model identifiers; and, in response to detecting the first touch input on the first touch region of the touch-sensitive surface unit: determine a first intensity of the first touch input on the first touch region of the touch-sensitive surface unit; in accordance with the first intensity applied by the first touch input on the touch-sensitive surface unit and one or more thresholds associated with the first intensity model identifier, determine a first touch characterization parameter; and, subsequent to determining the first touch characterization parameter, send first touch information to a first software application, wherein the first touch information includes the first touch characterization parameter. The processing unit is also configured to: detect a second touch input on a second touch region of the touch-sensitive surface unit, wherein the second touch region of the touch-sensitive surface unit is distinct from the first touch region of the touch-sensitive surface unit; identify a second intensity model identifier, associated with the second touch region of the touch-sensitive surface unit, from the plurality of predefined intensity model identifiers; and, in response to detecting the second touch input on the second touch region of the touch-sensitive surface unit: determine a second intensity applied by the second touch input on the second touch region of the touch-sensitive surface unit; in accordance with the second intensity applied by the second touch input on the touch-sensitive surface unit and one or more thresholds associated with the second intensity model identifier, determine a second touch characterization parameter; and, subsequent to determining the second touch characterization parameter, send second touch information to the first software application, wherein the second touch information includes the second touch characterization parameter.

In accordance with some embodiments, an electronic device includes a touch-sensitive surface unit to receive contacts, one or more sensor units to detect intensity of contacts with the touch-sensitive surface unit; and a processing unit coupled with the touch-sensitive surface unit and the one or more sensor units. The processing unit is configured to: detect a touch input on the touch-sensitive surface unit; and, in response to detecting the touch input: in accordance with a determination that the touch input is at a location on the touch-sensitive surface unit that is associated with a first intensity model of a plurality of different intensity models, processing the touch input in accordance with an intensity applied by the touch input on the touch-sensitive surface unit and the first intensity model; and, in accordance with a determination that the touch input is at a location on the touch-sensitive surface unit that is associated with a second intensity model different from the first intensity model, processing the touch input in accordance with an intensity applied by the touch input on the touch-sensitive surface unit and the second intensity model.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable display of a user interface that includes two or more display regions, including a first display region and a second display region on the display unit; and, while displaying the user interface: detect a first intensity applied by a touch input at a first location on the touch-sensitive surface unit that corresponds to the first display region; detect a movement of the touch input across the touch-sensitive surface unit from the first location on the touch-sensitive surface unit to a second location on the touch-sensitive surface unit that corresponds to the second display region; after detecting the movement of the touch input from the first location on the touch-sensitive surface unit to the second location on the touch-sensitive surface unit, detect a second intensity applied by the touch input at the second location on the touch-sensitive surface unit; and, in response to detecting the second intensity applied by the touch input at the second location on the touch-sensitive surface unit: in accordance with a determination that the first intensity does not satisfy a first intensity threshold, process the second intensity in accordance with one or more intensity thresholds associated with the second display region; and, in accordance with a determination that the first intensity satisfies the first intensity threshold, process the second intensity in accordance with one or more intensity thresholds associated with the first display region.

In accordance with some embodiments, an electronic device includes a display unit configured to display a user interface and a plurality of input units, including a first input unit that is configured to generate tactile outputs in response to inputs, and a second input unit that is configured to generate tactile outputs. The electronic device further includes an input indication receiving unit configured to receive an indication of an input detected by a respective input unit of the plurality of input units, and an information providing unit configured to provide, in response to receiving the indication of the input, information describing the input to an application running on the electronic device that enables the application to react to the input. The electronic device further includes a reaction receiving unit configured to receive a reaction to the input from the application that indicates that a tactile output is to be generated in response to the input, and a causing unit configured to cause, in response to receiving the reaction to the input from the application, the generation of a respective tactile output. In accordance with a determination that the reaction was triggered by the first input unit, the respective tactile output is generated at the first input unit based on the reaction to the input from the application, and in accordance with a determination that the reaction was triggered by the second input unit, the respective tactile output is generated at the second input unit based on the reaction to the input from the application.

In accordance with some embodiments, an electronic device includes a display unit configured to display a user interface hierarchy and one or more input units that are configured to generate tactile outputs in response to inputs. The electronic device further includes an input indication receiving unit configured to receive an indication of an input detected by a respective input unit of the one or more input units, and an information providing unit configured to provide, in response to receiving the indication of the input, information describing the input to an application running on the electronic device that enables the application to react to the input. The electronic device further includes a reaction receiving unit configured to receive a reaction to the input from the application that indicates that a tactile output is to be generated in response to the input, and a causing unit configured to cause, in response to receiving the reaction to the input from the application, the performance of a set of operations, including comparing an input time for the reaction to an output time for the reaction. With respect to the comparing, the input time for the reaction corresponds to a time at which the input was detected by the respective input device, and the output time for the reaction corresponds to a time at which a tactile output corresponding to the reaction is configured to be generated at the respective input device. The set of operations performed in response to receiving the reaction to the input from the application further includes determining whether tactile output criteria have been met, wherein the tactile output criteria include a criterion that is met when an input time is less than a predetermined amount of time before the output time, and in accordance with a determination that the tactile output criteria have been met, causing generation, at the respective input device, of a tactile output corresponding to the reaction from the application. On the other hand, the set of operations performed in response to receiving the reaction to the input from the application includes, in accordance with a determination that the tactile output criteria have not been met, forgoing generation, at the respective input device, of the tactile output corresponding to the reaction from the application.

In accordance with some embodiments, an electronic device includes a touch-sensitive surface, one or more sensors to detect intensity of contacts with the touch-sensitive surface, optionally a display, one or more processors, and memory. The memory stores one or more programs that are configured to be executed by the one or more processors. The one or more programs include instructions for performing or causing performance of the operations of any of the methods described herein. In accordance with some embodiments, a computer readable storage medium stores therein instructions, which, when executed by an electronic device with a touch-sensitive surface and one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a touch-sensitive surface, one or more sensors to detect intensity of contacts with the touch-sensitive surface, optionally a display, and means for performing or causing performance of the operations of any of the methods described herein. In accordance with some embodiments, an information processing apparatus, for use in an electronic device with a touch-sensitive surface, one or more sensors to detect intensity of contacts with the touch-sensitive surface, and optionally a display includes means for performing or causing performance of the operations of any of the methods described herein.

In accordance with some embodiments, at least one of the aforementioned input devices has a touch-sensitive surface and one or more sensors to detect intensity of contacts with the touch-sensitive surface. Furthermore, in some embodiments, any of the aforementioned methods includes displaying, on the display, a user interface for the electronic device and detecting an input (or sequence of inputs) on the touch-sensitive surface of one of the input devices. Optionally, any of the aforementioned methods includes detecting changes in characteristics of a respective contact that is continuously detected on the touch-sensitive surface.

Thus, electronic devices with displays, one or more input devices that are configured to generate tactile outputs in response to inputs (e.g., including one or more input devices having touch-sensitive surfaces, and one or more sensors to detect intensity of contacts with the touch-sensitive surface) are provided with faster, more efficient methods and interfaces for performing an operation in accordance with a selected mode of operation, thereby increasing the effectiveness, efficiency, and user satisfaction with such devices. Such methods and interfaces may complement or replace conventional methods for performing an operation in accordance with a selected mode of operation.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6C are flow diagrams illustrating a method of processing a touch input based on an intensity stage of the touch input in accordance with some embodiments.

FIGS. 7A-7C are flow diagrams illustrating a method of processing touch inputs based on intensity model identifiers in accordance with some embodiments.

FIGS. 8A-8C are flow diagrams illustrating a method of processing touch inputs in different regions based on distinct intensity models in accordance with some embodiments.

FIGS. 9A-9D are flow diagrams illustrating a method of processing a touch input based on a location-related intensity model in accordance with some embodiments.

FIGS. 10A-10D are flow diagrams illustrating a method of processing a touch input based on latching of the touch input in accordance with some embodiments.

DESCRIPTION OF EMBODIMENTS

Figure 1A:
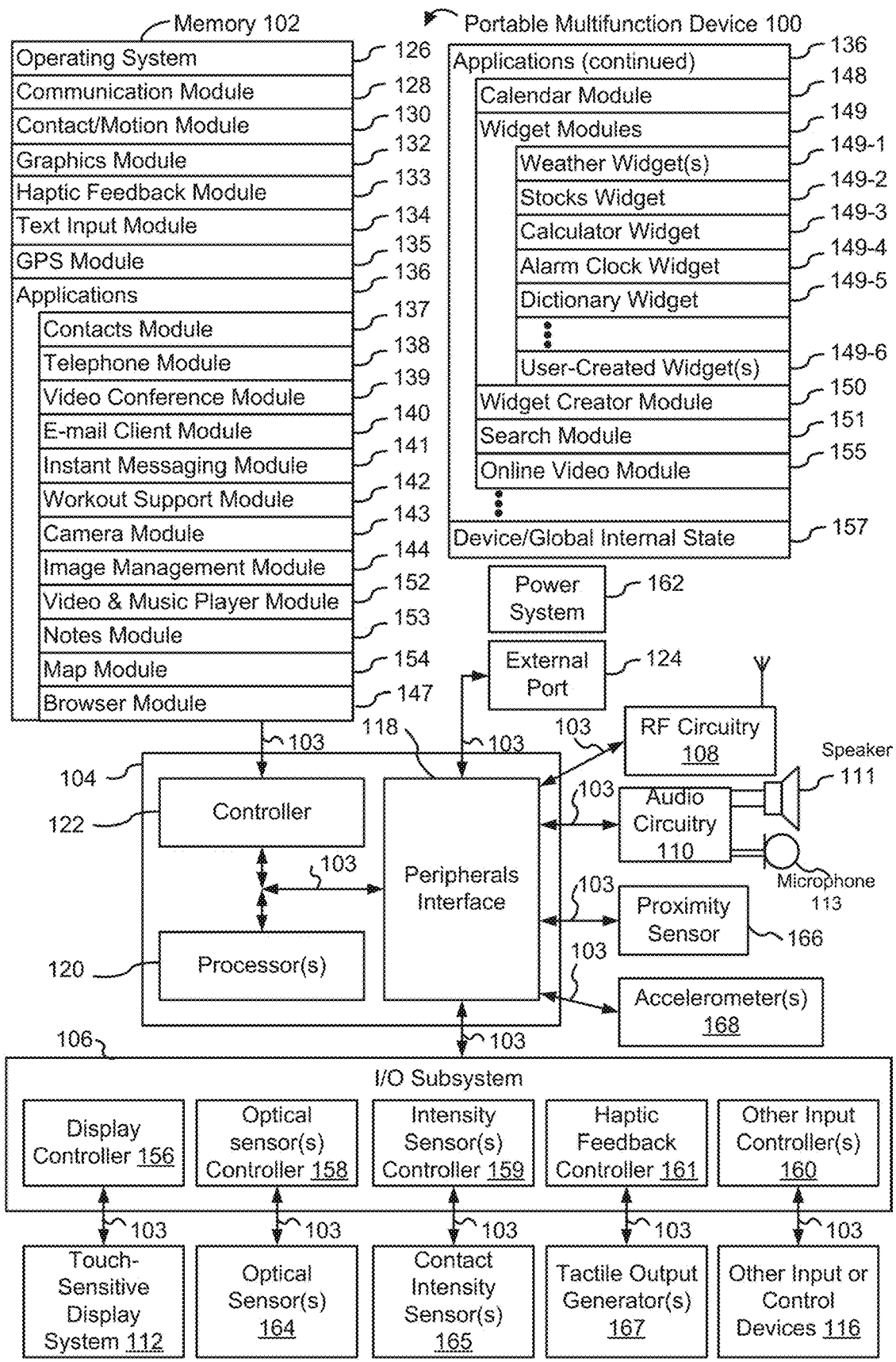
FIG. 1A is a block diagram illustrating a portable multifunction device with a touch-sensitive display in accordance with some embodiments.

Many electronic devices have user interfaces in which multiple operations are, optionally, performed in response to gestures performed using one or more input devices. In many contexts, in addition to providing the user with visual feedback on a display, to let the user know how the electronic device has responded to those gestures, it would be beneficial to provide a tactile output or tactile feedback. For example, such tactile feedback could inform the user as to when a gesture has meet predefined criteria for performing a particular operation, and/or could inform the user as to when a gesture has violated predefined criteria (e.g., for performing a particular operation or more generally for using a particular application or manipulating a user interface). The embodiments described below improve on methods for provide tactile feedback in response to an input received detected by a respective input device. For example, some embodiments described below, have one or more components, separate from an application that responds to information describing an input, for processing and routing inputs to the application, for receiving a reaction to the input from the application that indicates that a tactile output is to be generated in response to the input, and for then determining how to implement or otherwise handle the reaction received from the application.

In accordance with some embodiments, in response to detecting a touch input, the electronic device processes a touch input based on an intensity stage of the touch input. More specifically, the device determines the intensity stage of the touch input (e.g., at a contact intensity module) so that a software application that is separate from the contact intensity module does not need to determine the intensity stage of the touch input on its own.

In accordance with some embodiments, in response to detecting a touch input, the electronic device determines a touch characterization parameter for the touch input (e.g., at a contact intensity module) and sends the touch characterization parameter to a software application that is separate from the contact intensity module so that the software application does not need to directly process raw data for the touch input. More specifically, the electronic device uses an intensity model to determine the touch characterization parameter.

In accordance with some embodiments in which intensity models are mapped to different regions of a touch-sensitive surface, in response to a touch input, the electronic device uses an intensity model that corresponds to a location of the touch input to determine a touch characterization parameter. More specifically, different intensity models are used for different regions.

In accordance with some embodiments, in response to detecting movement of a touch input, the electronic device determines whether the touch input has latched to a particular region of the user interface. If the touch input is latched, the electronic device processes the touch input based on an intensity model associated with the latched region. If the touch input is not latched, the electronic device processes the touch input based on an intensity model associated with a current position of a touch input (or a cursor).

In accordance with some embodiments in which the electronic device is in communication with a plurality of input devices, including a first input device that is configured to generate tactile outputs in response to inputs and a second input device that is configured to generate tactile outputs, in response to receiving the reaction to the input from the application, the device causes the generation of a respective tactile output at the same input device as the input device from which an input was received that triggered the reaction. More specifically, in accordance with a determination that the reaction was triggered by the first input device, the respective tactile output is generated at the first input device based on the reaction to the input from the application, and in accordance with a determination that the reaction was triggered by the second input device, the respective tactile output is generated at the second input device based on the reaction to the input from the application.

In accordance with some embodiments in which the electronic device is in communication with one or more input devices that are configured to generate tactile outputs in response to inputs, in response to receiving the reaction to the input from the application, the device performs a set of operations. The set of operations include operations that conditionally cancel or forgo generation of a tactile output corresponding to the reaction from the application in accordance with a determination that tactile output criteria have not been met. The tactile output criteria include a criterion that is met when an input time is less than a predetermined amount of time before the output time.

Figure 6A:
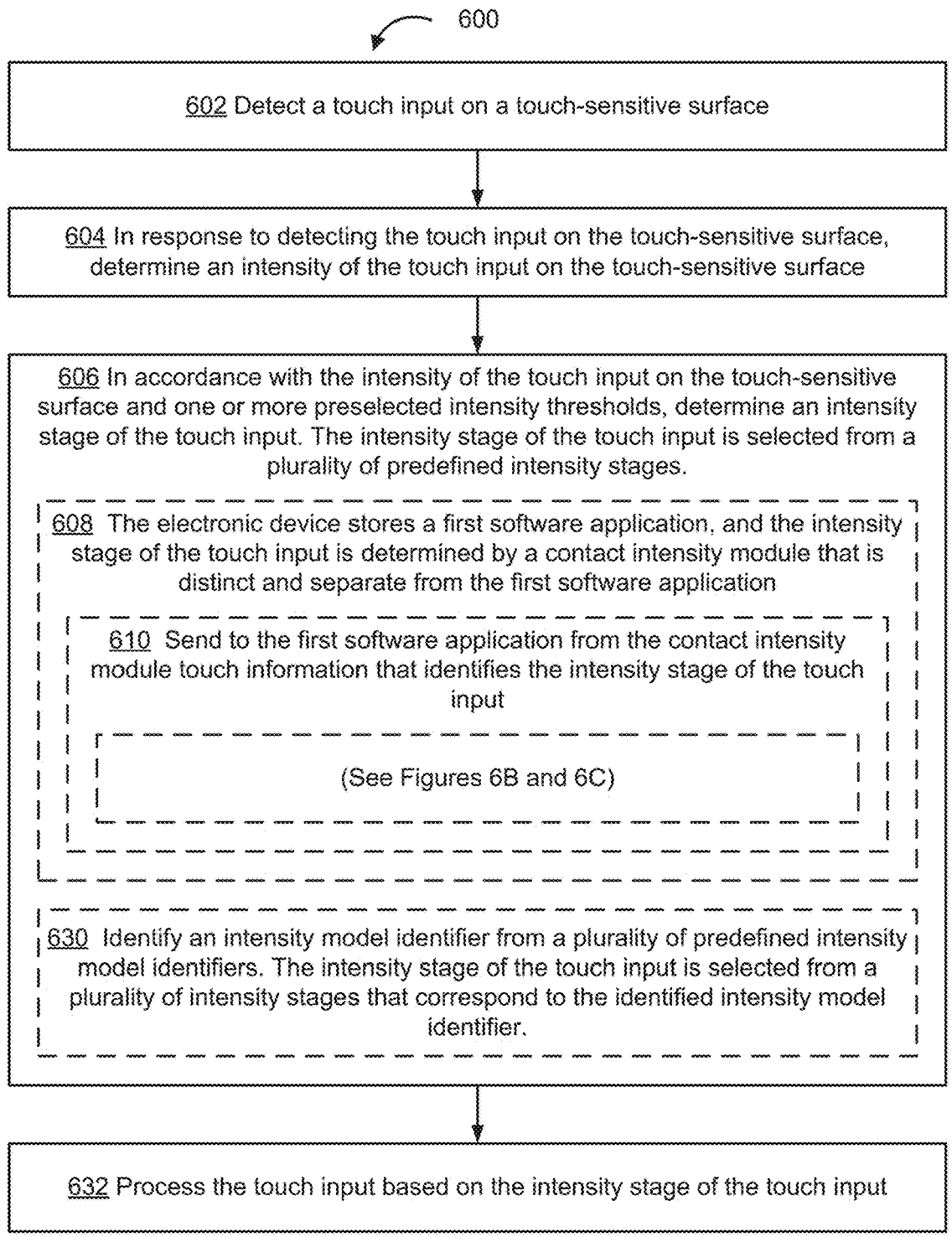
Figure 6D:
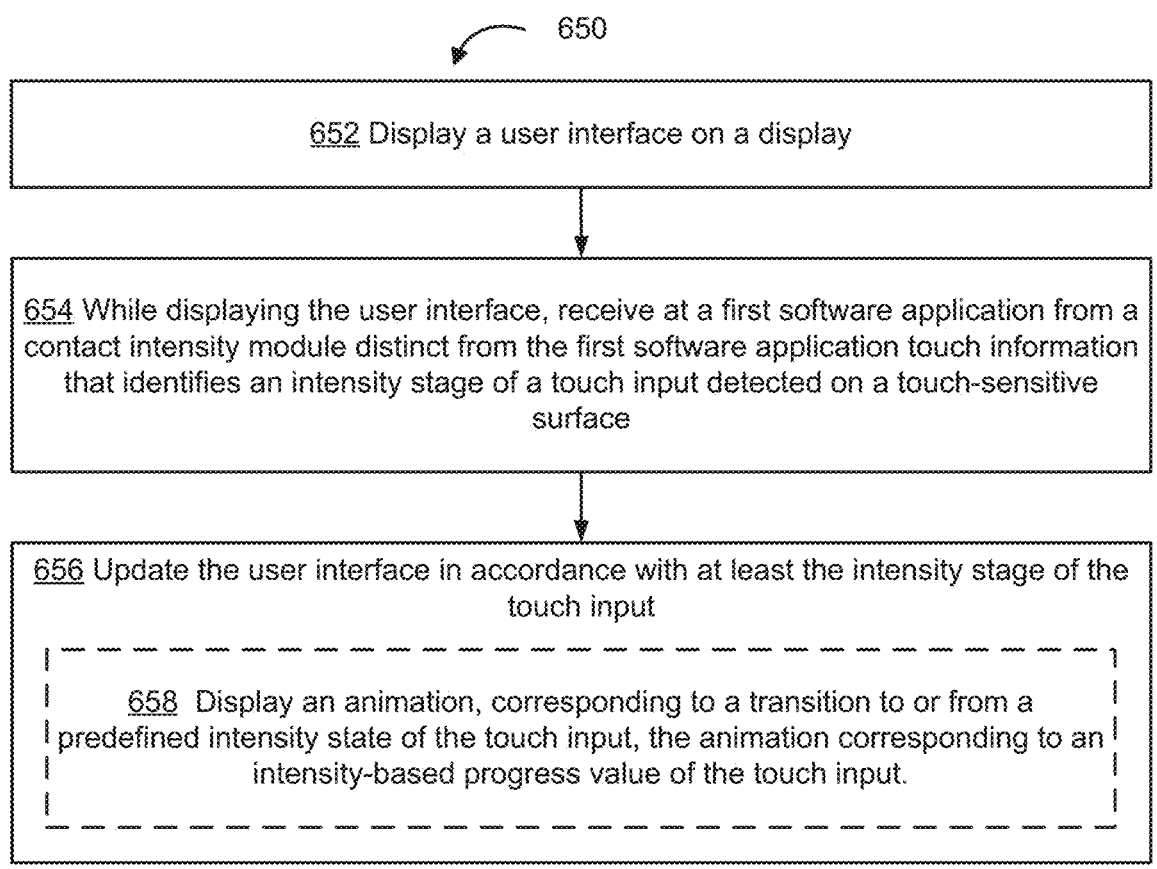
FIG. 6D is a flow diagram illustrating a method of processing touch information that includes an intensity stage of a touch input in accordance with some embodiments.
Figure 7A:
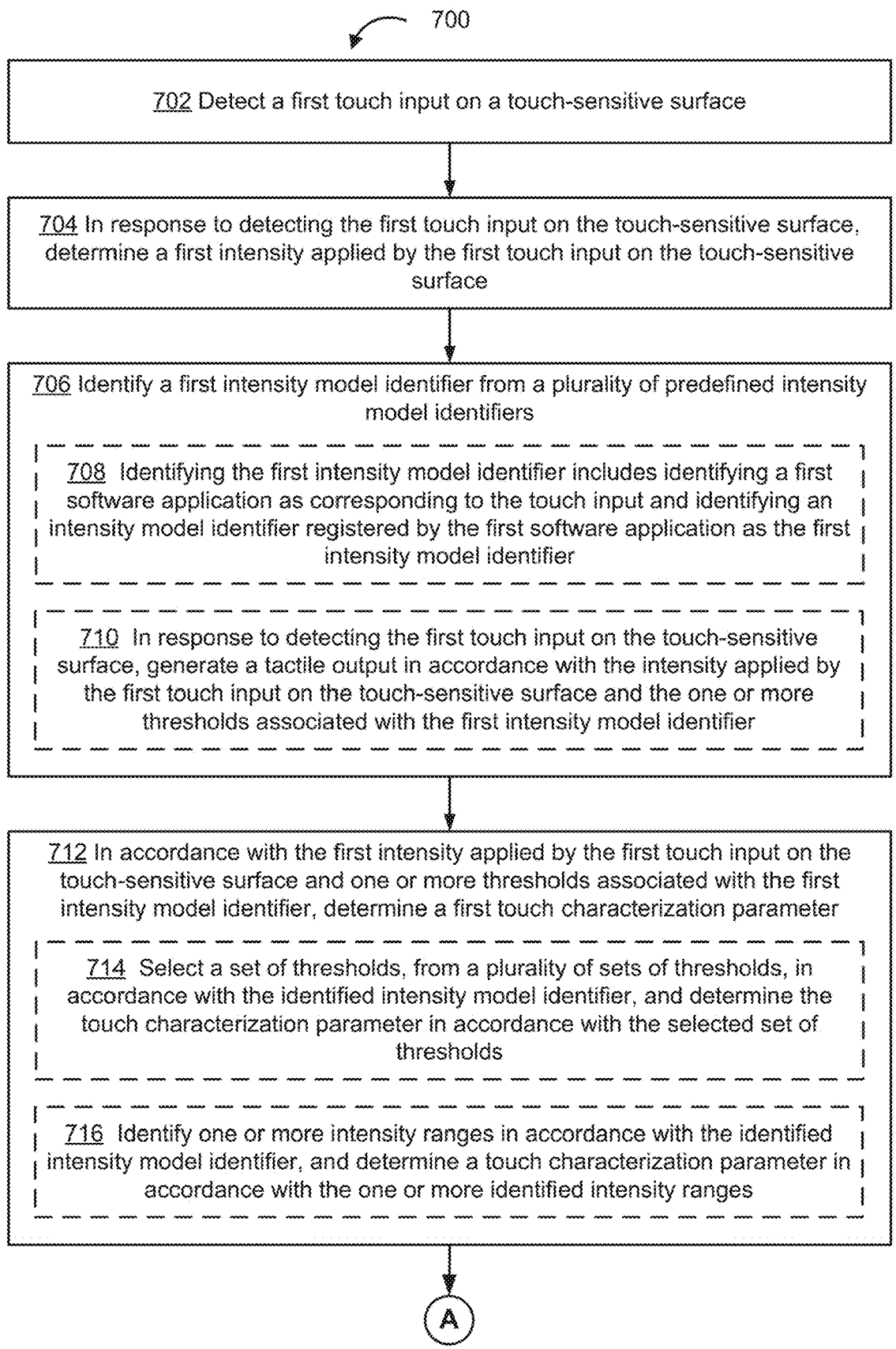
Figure 7D:
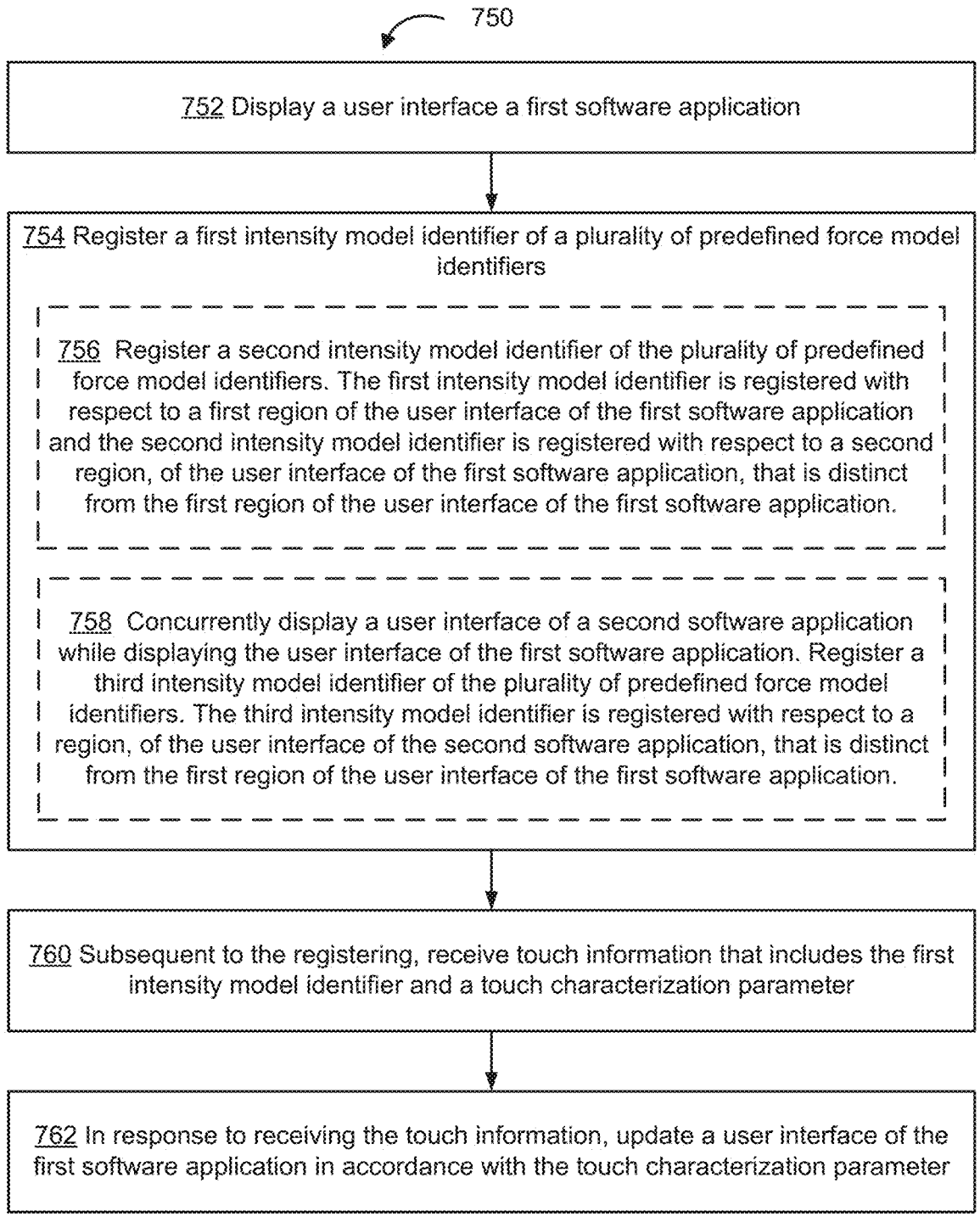
FIG. 7D is a flow diagram illustrating a method of processing touch information based on an intensity model identifier in accordance with some embodiments.
Figure 8A:
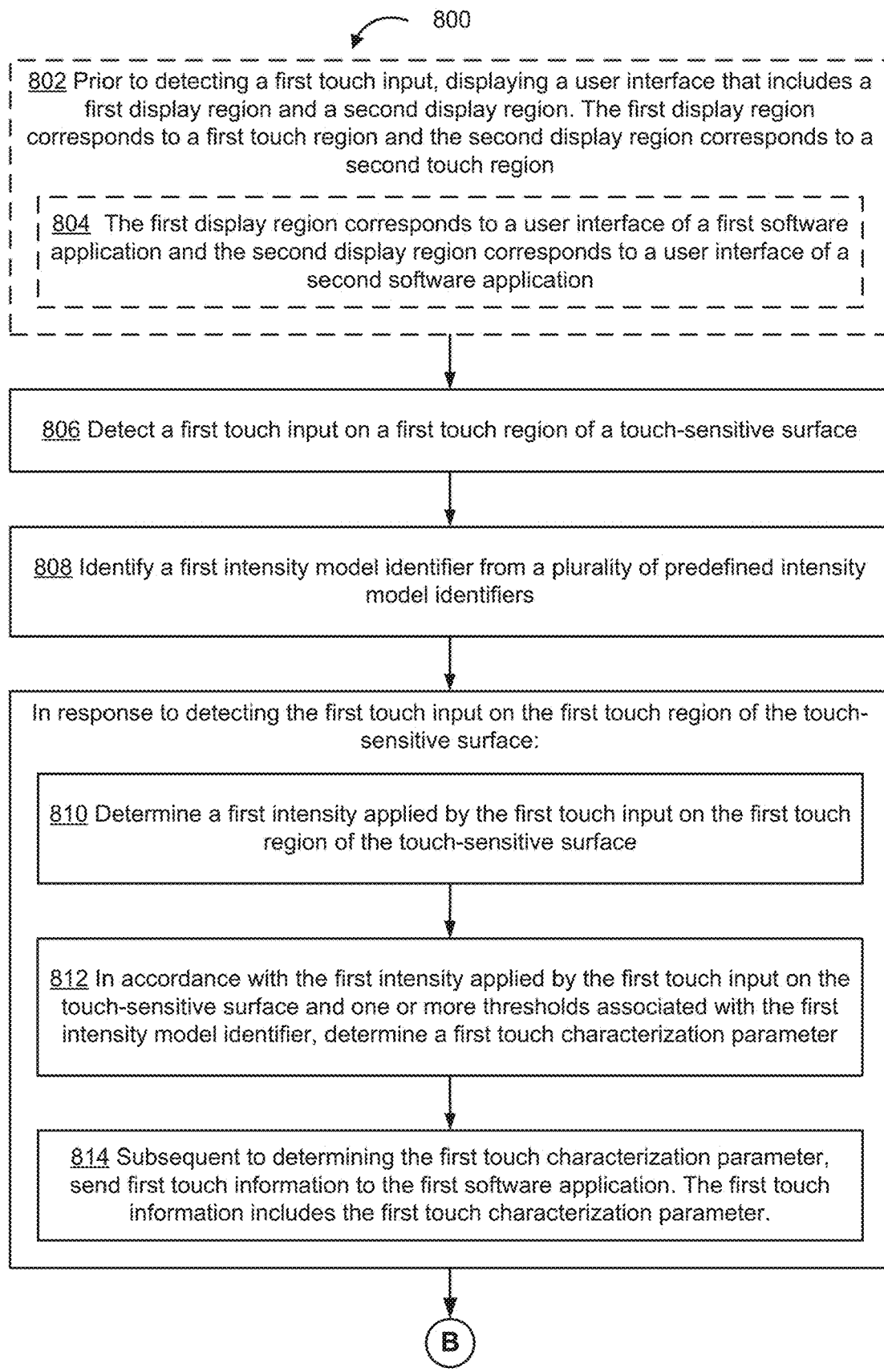
Figure 8B:
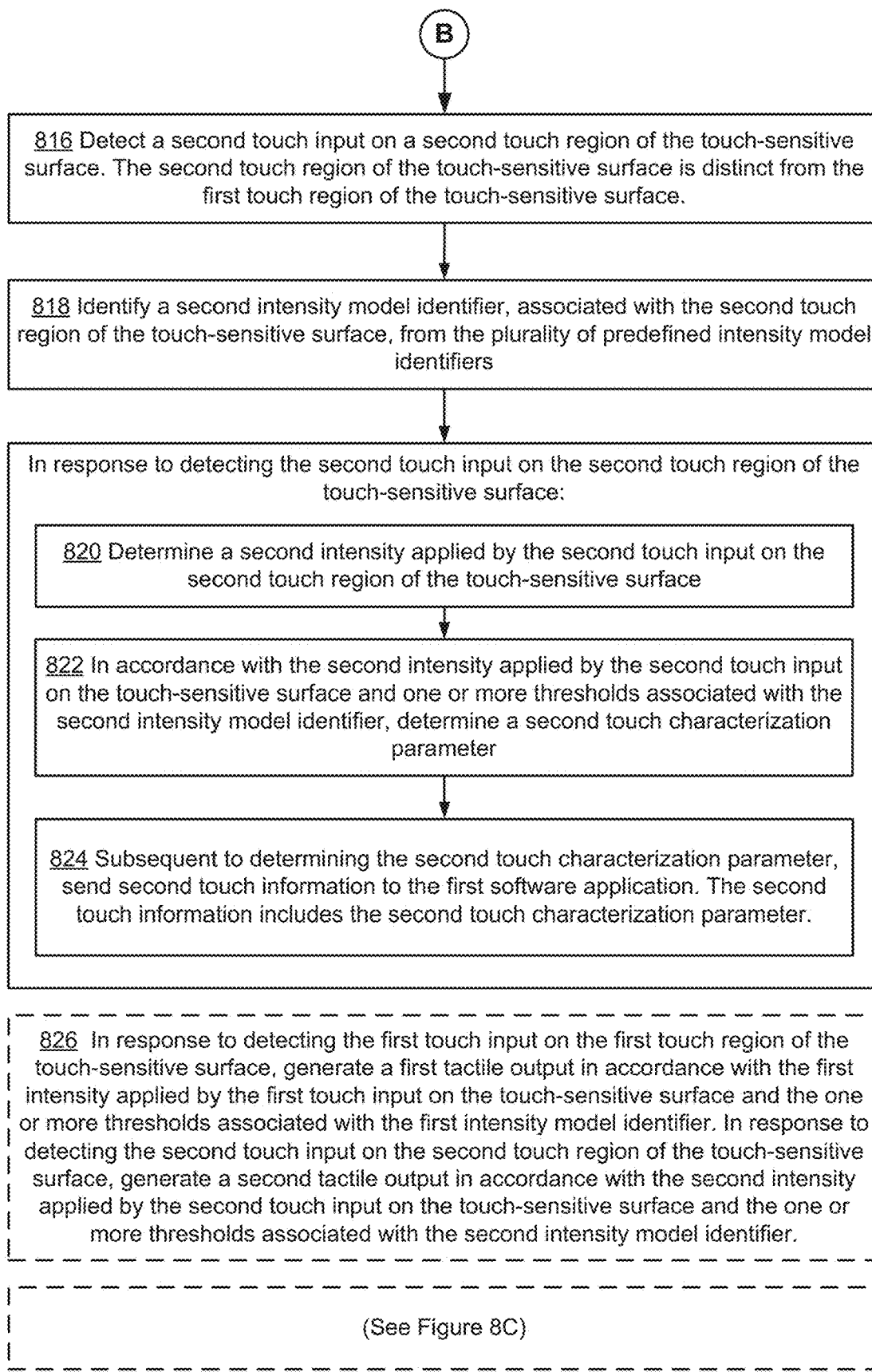
Figure 9A:
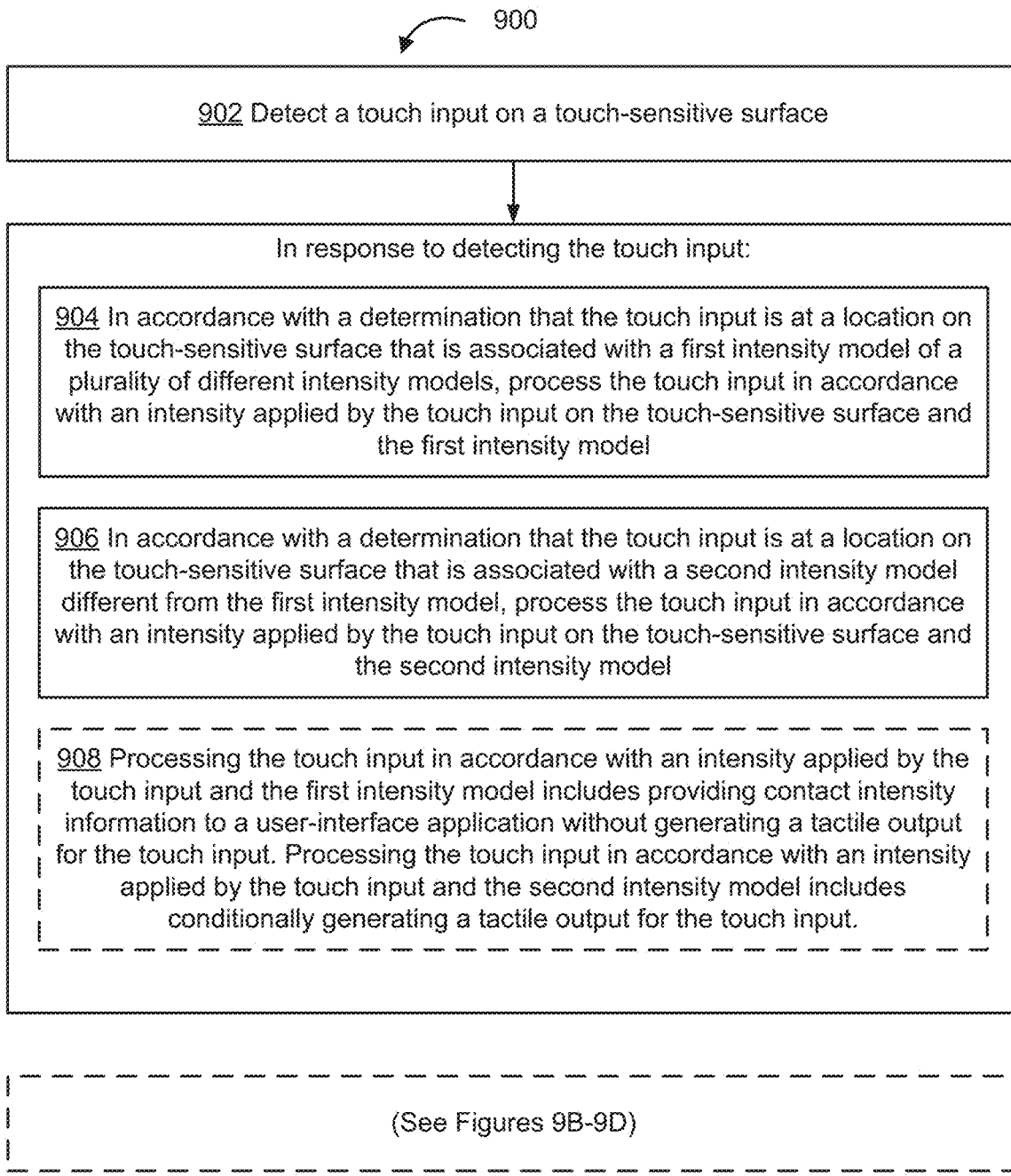
Figure 10A:
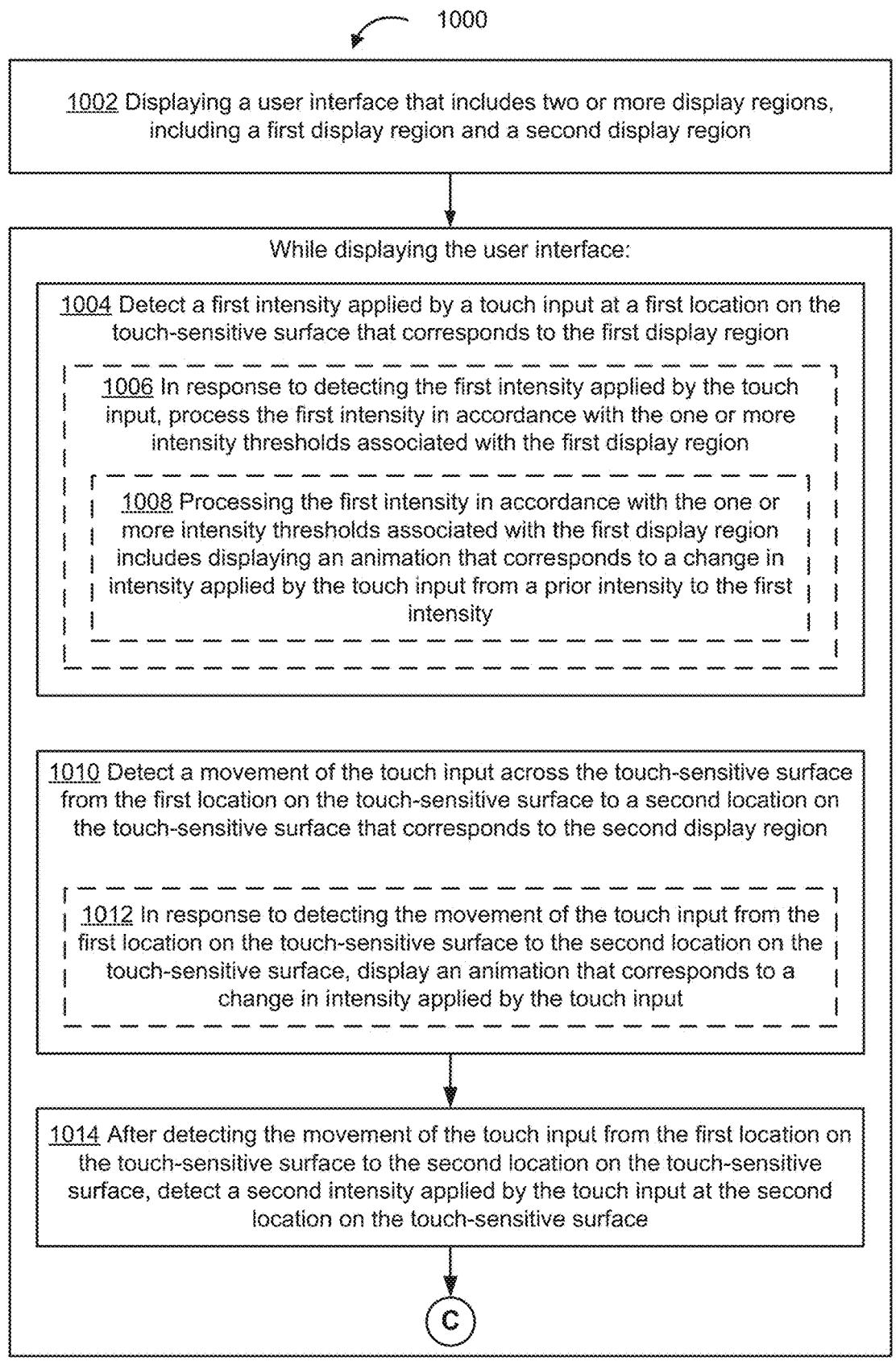
Figure 11A:
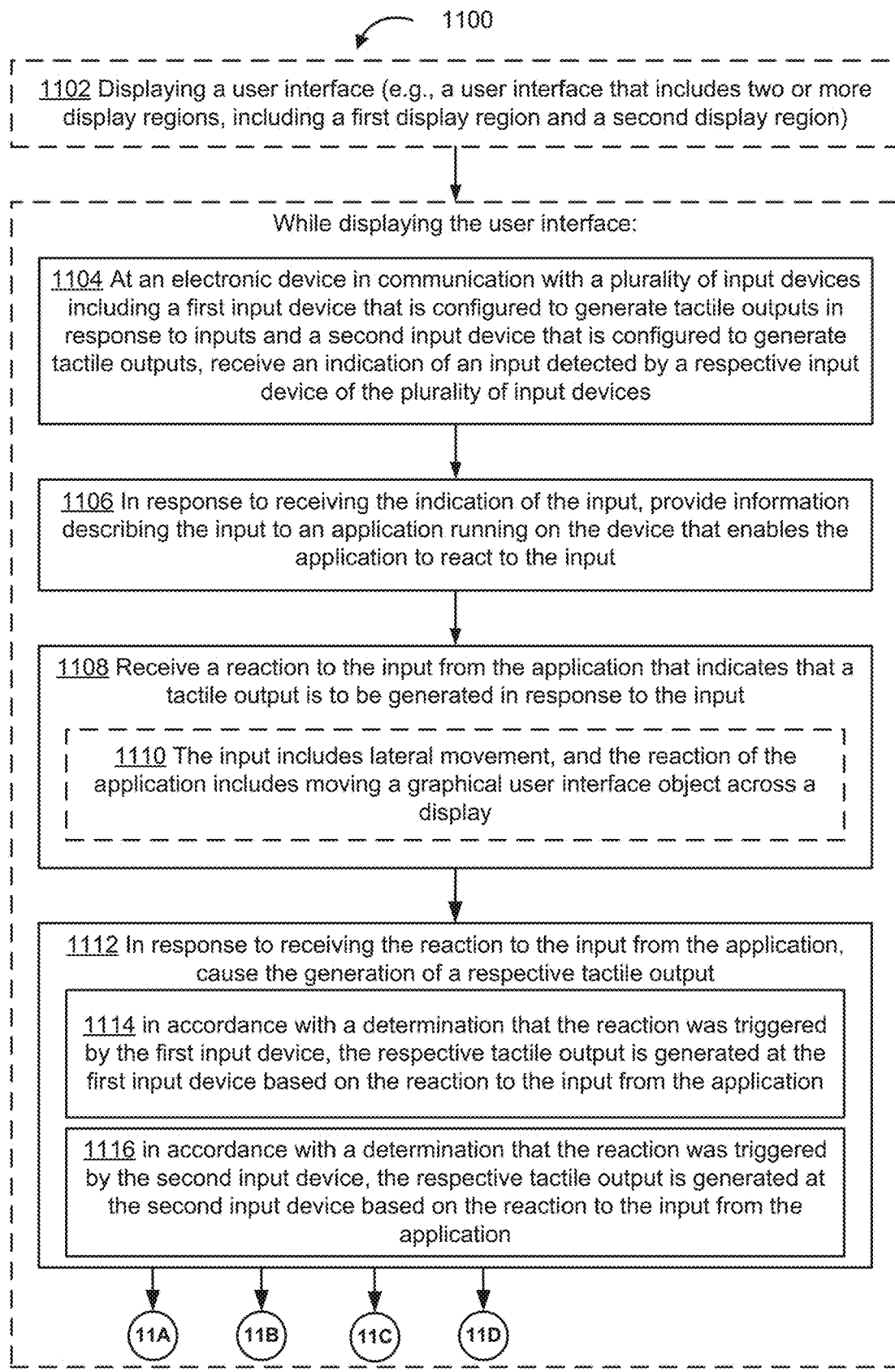
FIGS. 11A-11C are flow diagrams illustrating a method of routing a tactile output to an input device of a plurality of input devices in accordance with some embodiments.
Figure 11B:
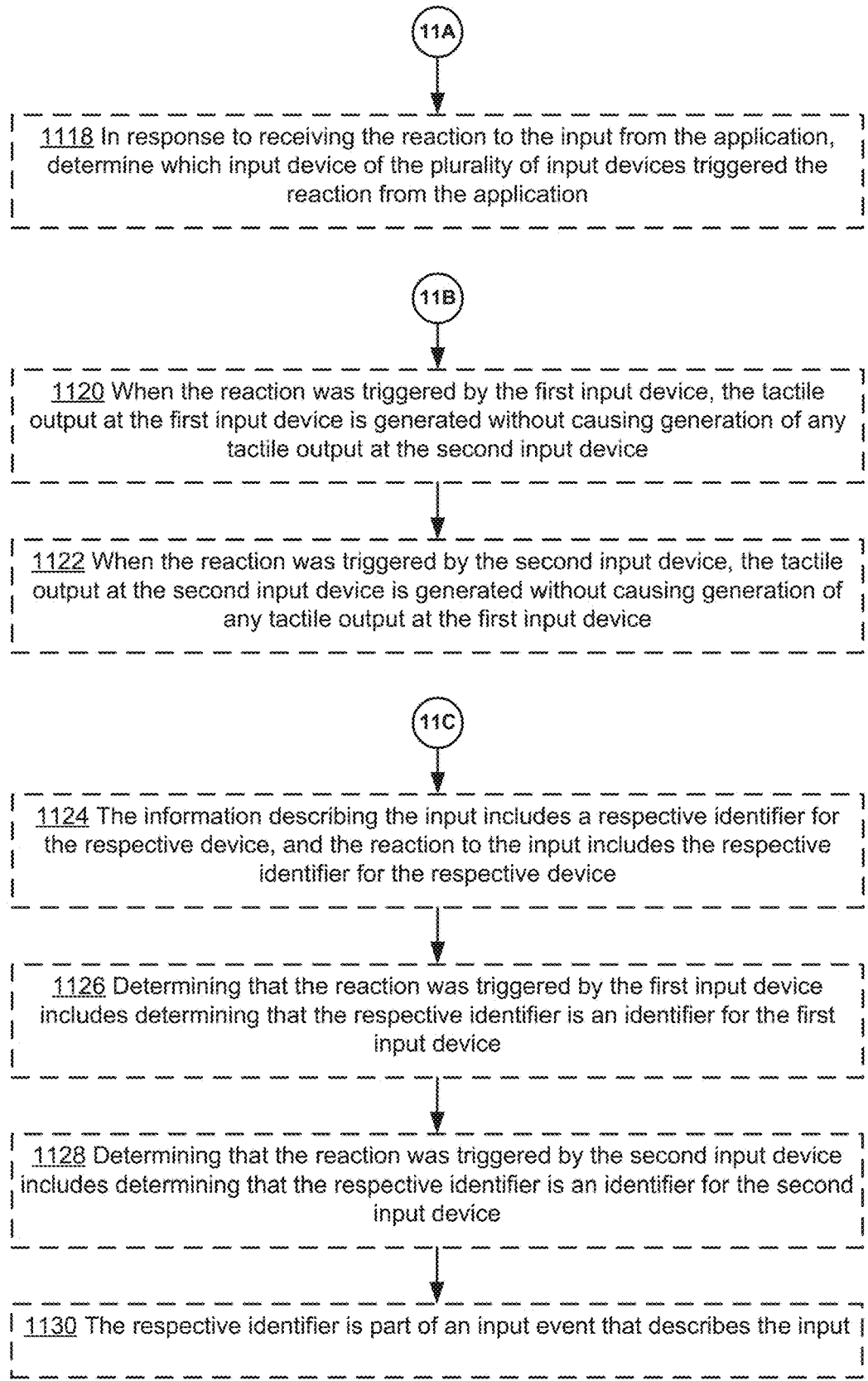
Figure 11C:
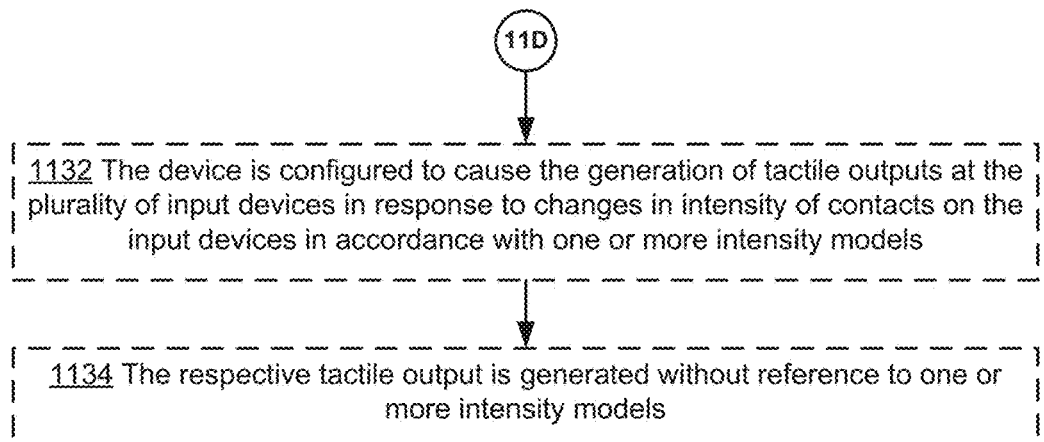
Figure 12A:
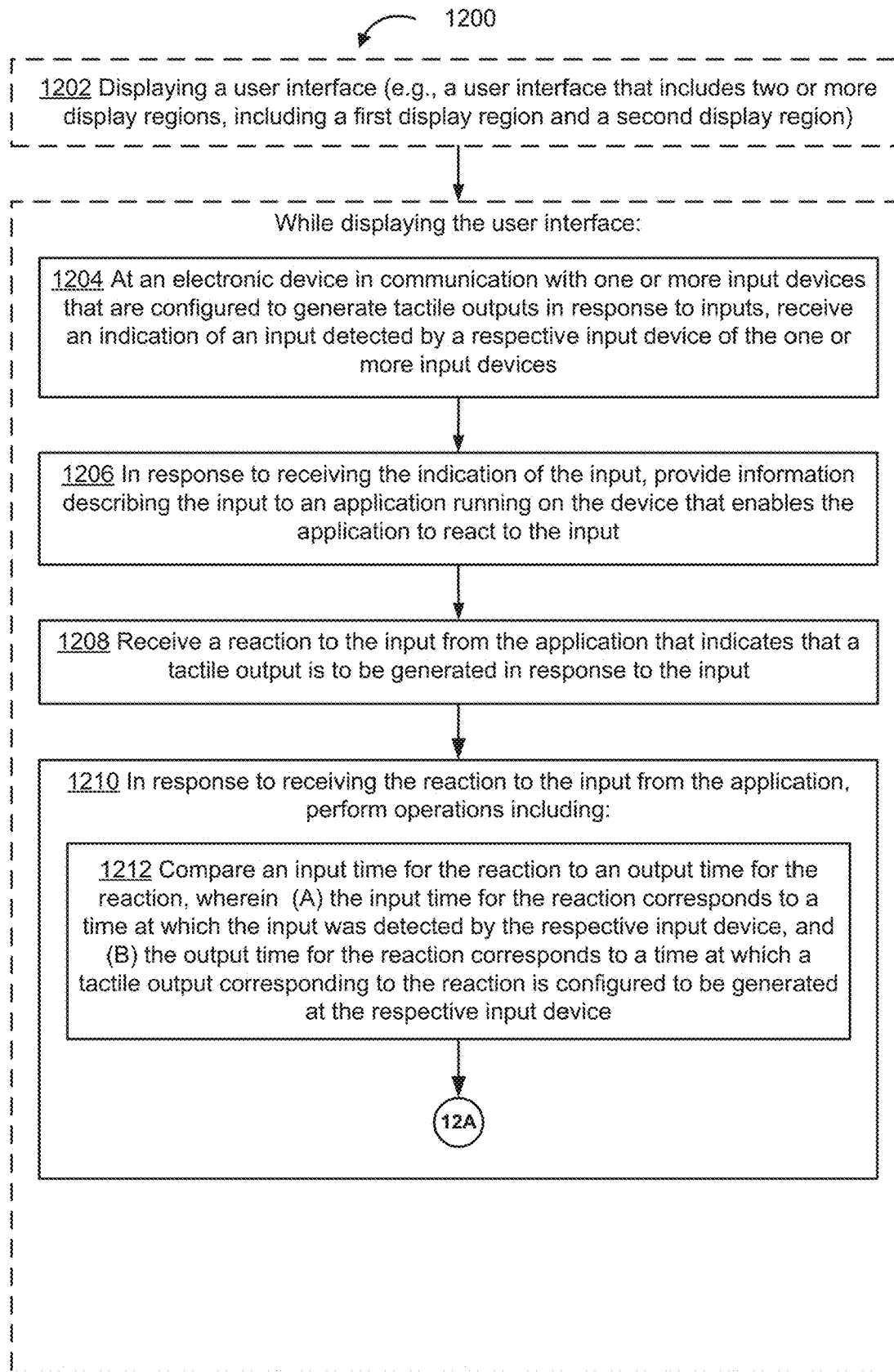
FIGS. 12A-12C are flow diagrams illustrating a method of conditionally canceling or forgoing generation of a tactile output at a respective input device in accordance with some embodiments.
Figure 12B:
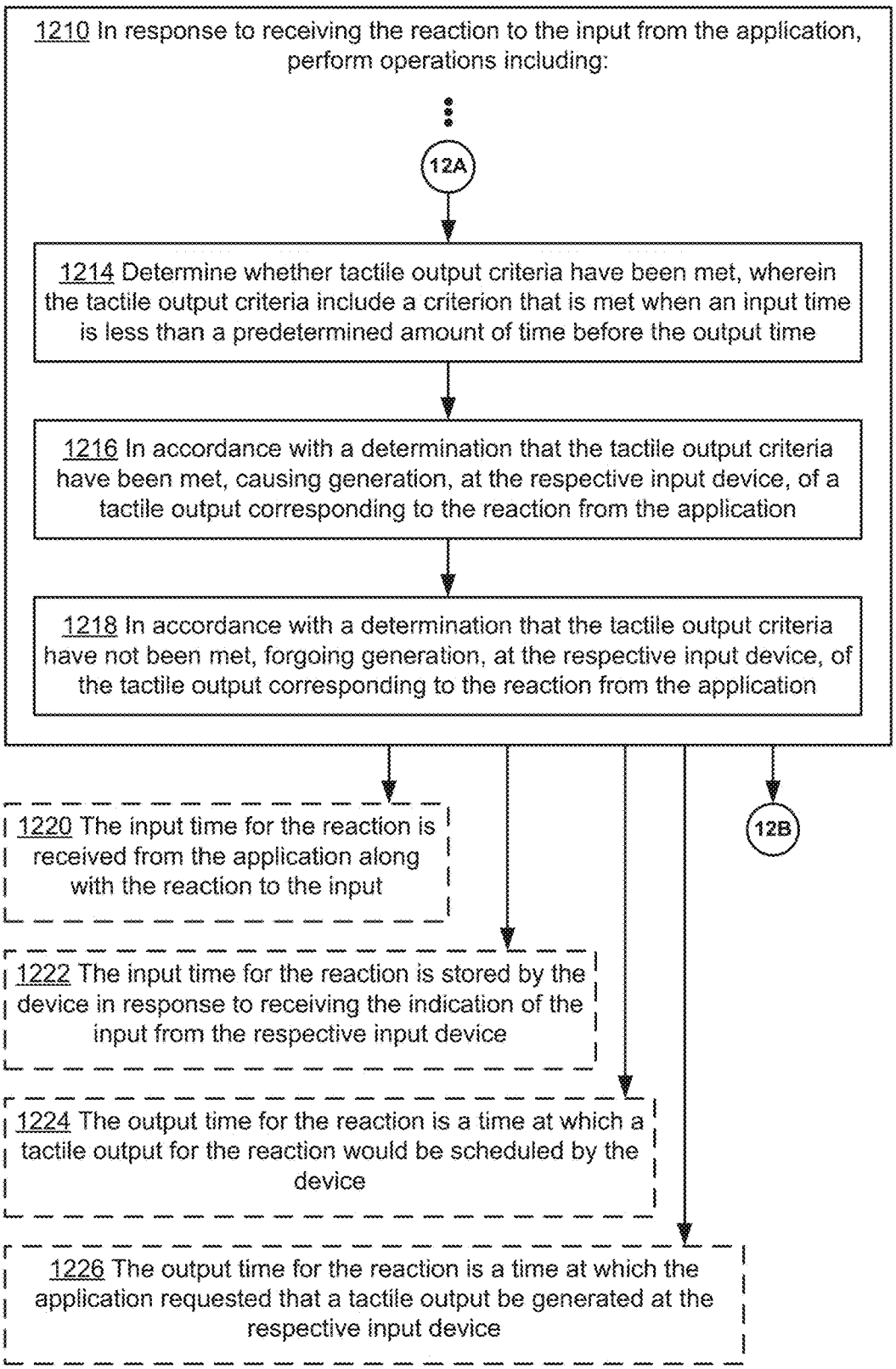
Figure 12C:
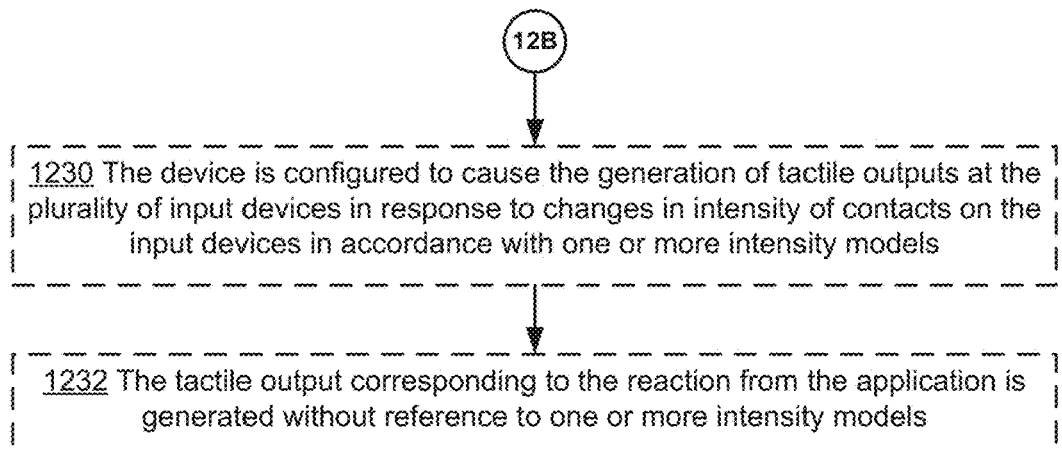

Below, FIGS. 1A-1B, 2, and 3A-3G illustrate exemplary devices. FIGS. 4A-4B and 5A-5TT illustrate exemplary user interfaces for processing touch inputs. FIGS. 6A-6C illustrate a flow diagram of a method of processing a touch input based an intensity stage of the touch input in accordance with some embodiments. FIG. 6D is a flow diagram illustrating a method of processing touch information that includes an intensity stage of a touch input in accordance with some embodiments. FIGS. 7A-7C illustrate a flow diagram of a method of processing touch inputs based on intensity model identifiers in accordance with some embodiments. FIG. 7D is a flow diagram illustrating a method of processing touch information based on an intensity model identifier in accordance with some embodiments. FIGS. 8A-8C illustrate a flow diagram of a method of processing touch inputs in different regions based on distinct intensity models in accordance with some embodiments. FIGS. 9A-9D illustrate a flow diagram of a method of processing a touch input based on an intensity model associated with a location of the touch input in accordance with some embodiments. FIGS. 10A-10D illustrate a flow diagram of a method of processing a touch input based on whether the touch input has latched on to a particular region in accordance with some embodiments. FIGS. 11A-11C are flow diagrams illustrating a method of routing a tactile output to an input device of a plurality of input devices in accordance with some embodiments. FIGS. 12A-12C are flow diagrams illustrating a method of conditionally canceling or forgoing generation of a tactile output at a respective input device in accordance with some embodiments. The user interfaces in FIGS. 5A-5TT are used to illustrate the processes in FIGS. 6A-6D, 7A-7D, 8A-8C, 9A-9D, 10A-10D, 11A-11C, and 12A-12C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., in a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors, that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some exemplary embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some exemplary embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). In some embodiments, tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3A:
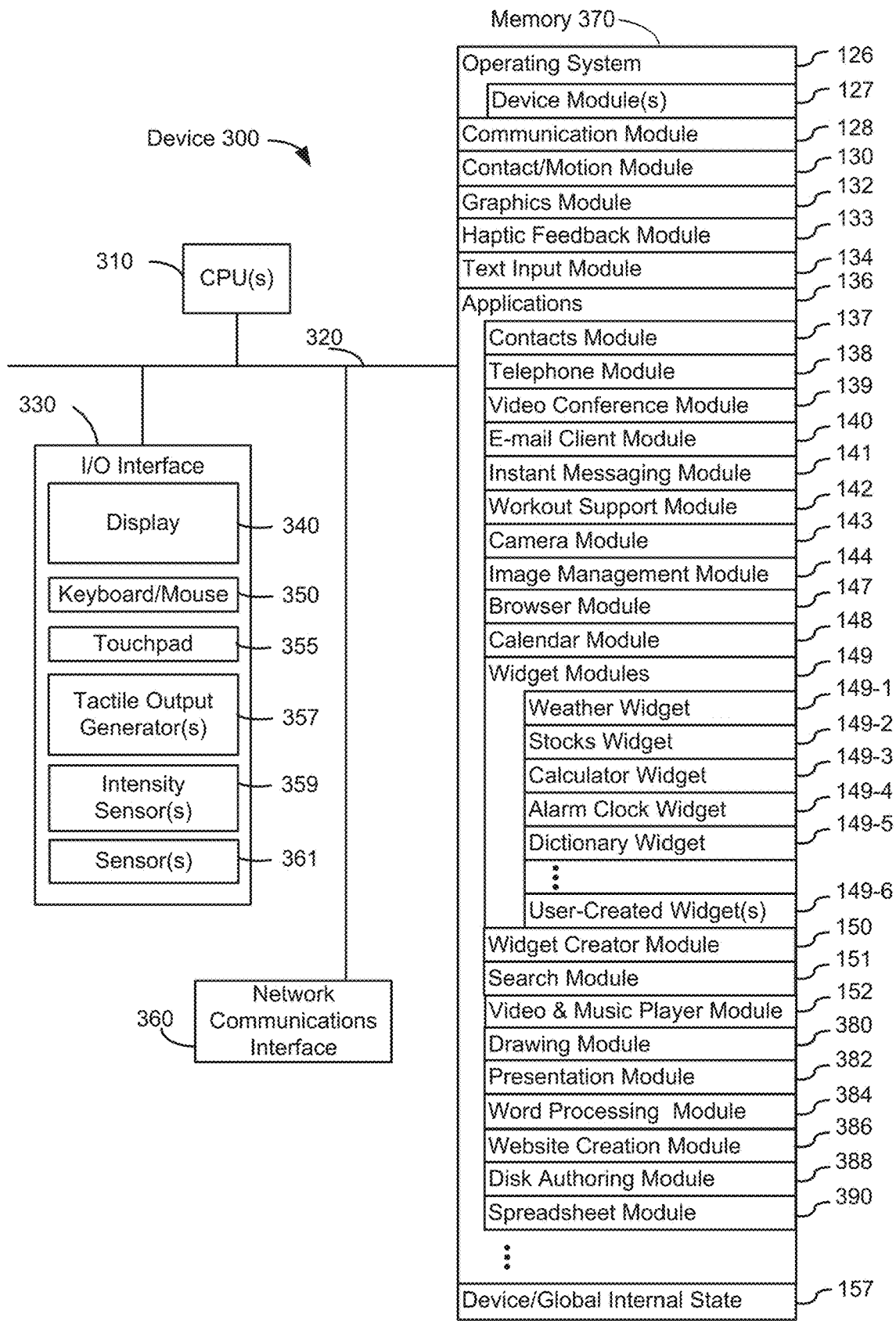
FIG. 3A is a block diagram of an exemplary multifunction device with a display and a touch-sensitive surface in accordance with some embodiments.
Figure 3B:
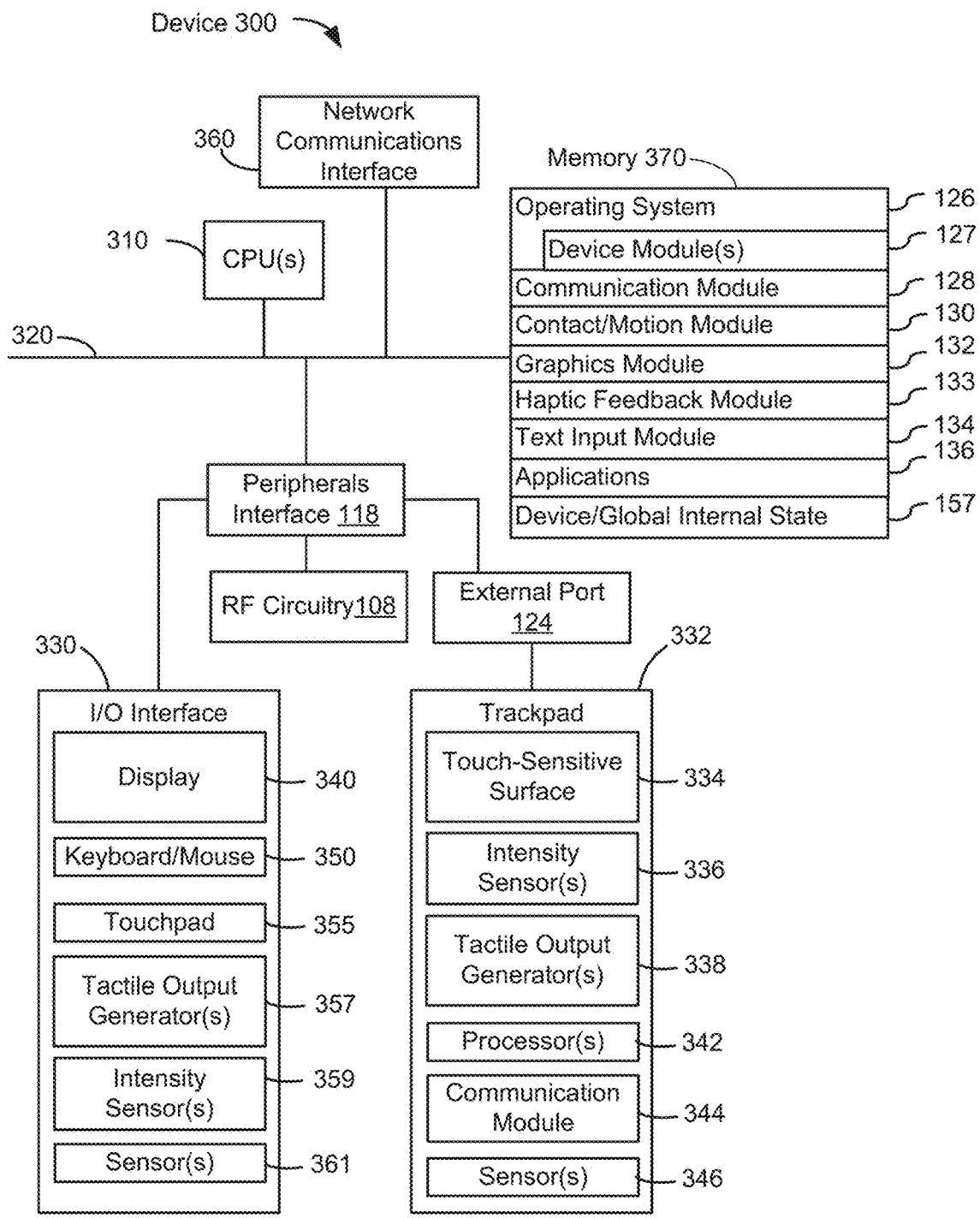
FIG. 3B is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3A-3B. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
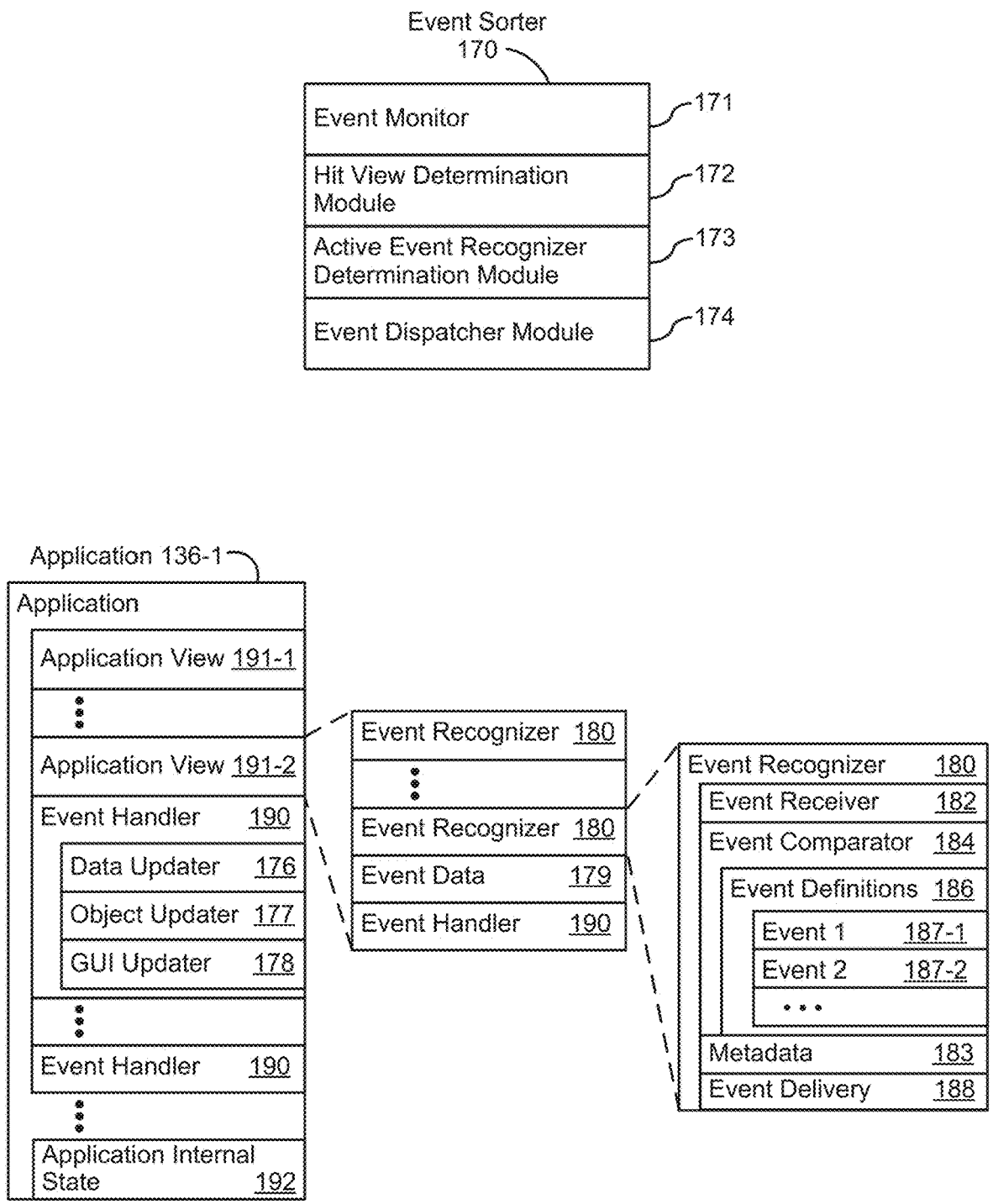
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3A or 3B) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively or additionally, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
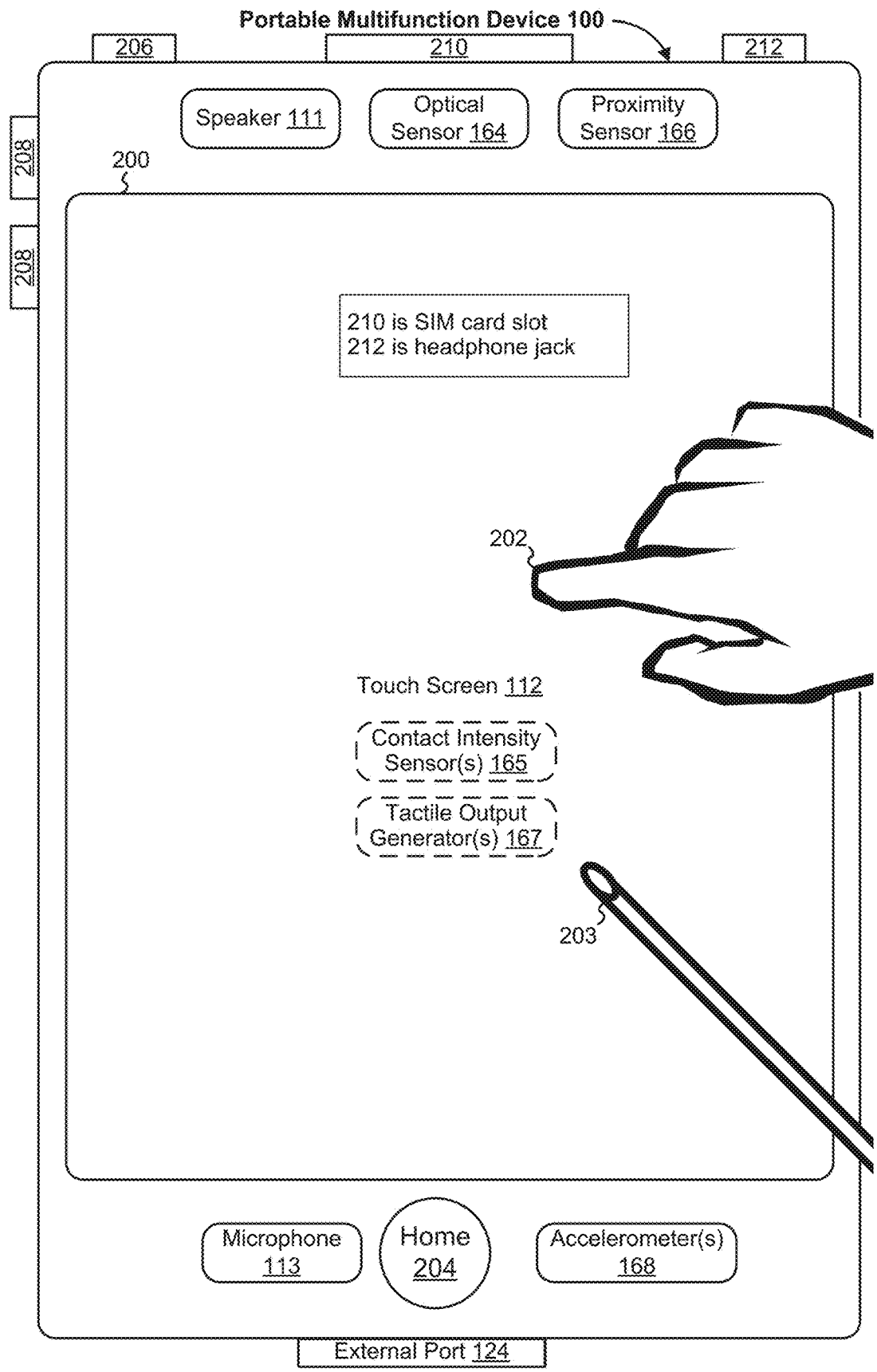
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3A is a block diagram of an exemplary multifunction device 300 with a display 340 and a touch-sensitive surface 355 in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller).

Device 300 typically includes one or more processing units (also called herein CPU's and processors) 310, one or more network or other communications interfaces 360, memory 370, and one or more communication buses 320 for interconnecting these components. Communication buses 320 optionally include circuitry (sometimes called a chipset) that interconnects and controls communications between system components.

Device 300 includes input/output (I/O) interface 330 comprising display 340, which is a touch-screen display in some embodiments. In some embodiments, I/O interface 330 is coupled to the one or more processing units 310 and/or memory 370 through a peripherals interface (not shown in FIG. 3A). I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), contact intensity sensors 359, similar to contact intensity sensor(s) 165 described above with reference to FIG. 1A, and/or other sensors 361 (e.g., optical, acceleration, proximity, and/or touch-sensitive sensors).

Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310.

In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

In some embodiments, the operating system 126 includes one or more device modules 127 (also called device drivers). The one or more device modules 127 include software components that operate or control particular hardware devices included in or in communication with the multifunction device 300 (e.g., touchpad 355, tactile output generators 357, intensity sensors 359, and other sensors 361 shown in FIG. 3A and/or trackpad 332 and its components shown in FIG. 3B).

Each of the above identified elements in FIG. 3A are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 3B is a block diagram of an exemplary multifunction device 300 with a display and a touch-sensitive surface in accordance with some embodiments. FIG. 3B is similar to FIG. 3A except that the multifunction device 300 in FIG. 3B includes trackpad 332 that is coupled to the Peripherals Interface 118 through External Port 124 (e.g., using a USB port or any other wired communication protocols). Alternatively, the trackpad 332 may be coupled to the Peripherals Interface 118 through RF circuitry 108 (e.g., using Bluetooth or any other form of wireless communication protocols). In some embodiments, the trackpad 332 is located outside an enclosure for the device 300. In comparison, the touchpad 355 is typically integrated with the enclosure for the device 300. In some embodiments, the trackpad 332 is integrated with the enclosure for the device 300. In some embodiments, the device 300 includes the trackpad 332 in addition to the touchpad 355 (and/or tactile output generator(s) 357). In some embodiments, the device 300 includes the trackpad 332 instead of the touchpad 355 (and/or tactile output generator(s) 357).

The trackpad 332 includes touch-sensitive surface 334. In some embodiments, the trackpad 332 includes one or more intensity sensors 336 to detect intensity of contacts on the touch-sensitive surface 334. In some embodiments, the trackpad 332 includes one or more tactile output generators 338. In some embodiments, the trackpad 332 includes one or more processors 342 to process signals from the touch-sensitive surface 334 and the one or more intensity sensors 336, if included, and control operations of the one or more tactile output generators 338, if included. In some embodiments, the one or more processors 342 include Intensity Sensors Controller 159 and/or Haptic Feedback Controller 161 described above with respect to FIG. 1A. In some embodiments, the one or more processors 342 are configured to detect contact (and any movement or breaking of the contact) on the touch-sensitive surface 334 and convert the detected contact into predefined user inputs, such as predefined touch gestures, which are processed by software applications to initiate interaction with user-interface objects (e.g., one or more soft keys, icons, web pages or images) that are displayed on touch-sensitive display system 112. In some embodiments, the touchpad 355 also includes a touch-sensitive surface and one or more processors similar to the one or more processors 342 of the trackpad 332.

The trackpad 332 includes Communication Module 344 to transmit information to the one or more processing units 310 through the Peripherals Interface 118 and/or receive instructions from the one or more processing units 310 and/or the Peripherals Interface 118.

In some embodiments, the trackpad 332 includes other sensors 346, such as a proximity sensor, an accelerometer, etc.

Figure 3C:
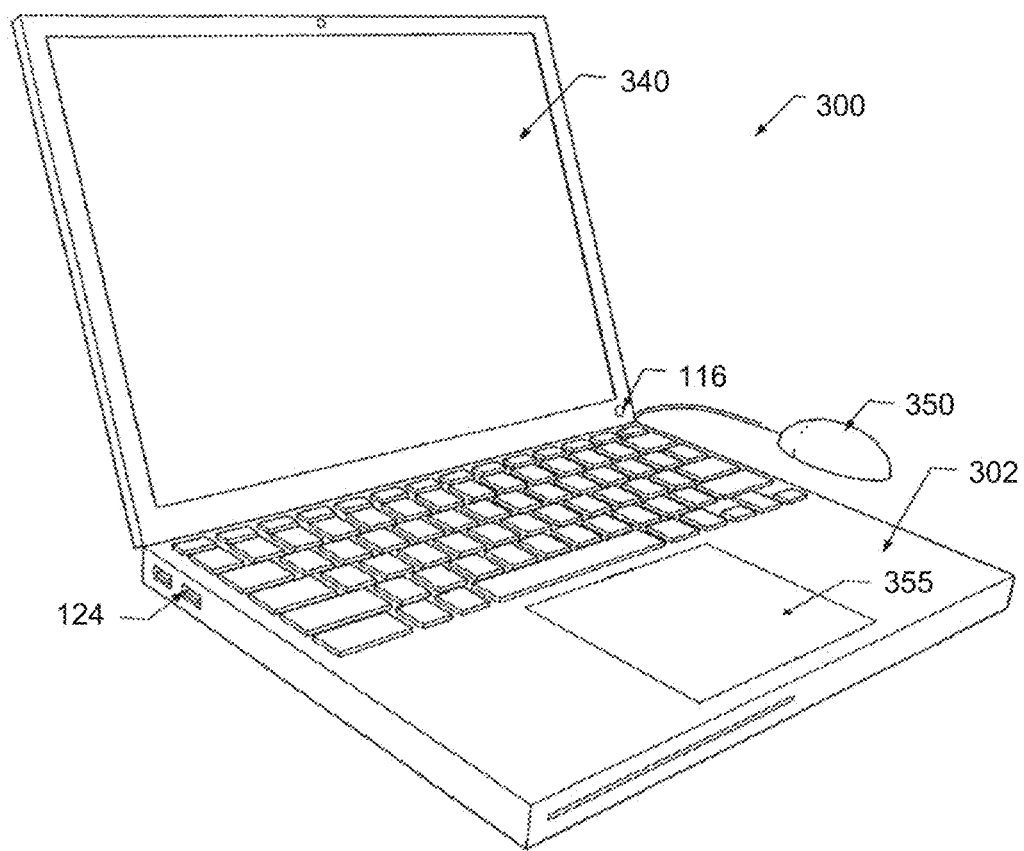
FIG. 3C is a perspective view of an exemplary multifunction device with a touch-sensitive surface in accordance with some embodiments.

FIG. 3C is a perspective view of an exemplary multifunction device 300 with a touch-sensitive surface in accordance with some embodiments. As shown in FIG. 3C, the device 300 may be a laptop computer. The device 300 includes enclosure 302, display 340, touchpad 355, mouse 350, one or more external ports 124, and one or more input or control devices 116 (e.g., a power on/off button). The enclosure 302 forms at least a portion of an exterior of the device 300. In some embodiments, the enclosure 302 at least partially surrounds certain components, such as CPUs 310 and memory 370 of the device 300.

In some embodiments, the multifunction device shown in FIG. 3C includes one or more tactile output generators 357 as shown in FIG. 3A.

Figure 3D:
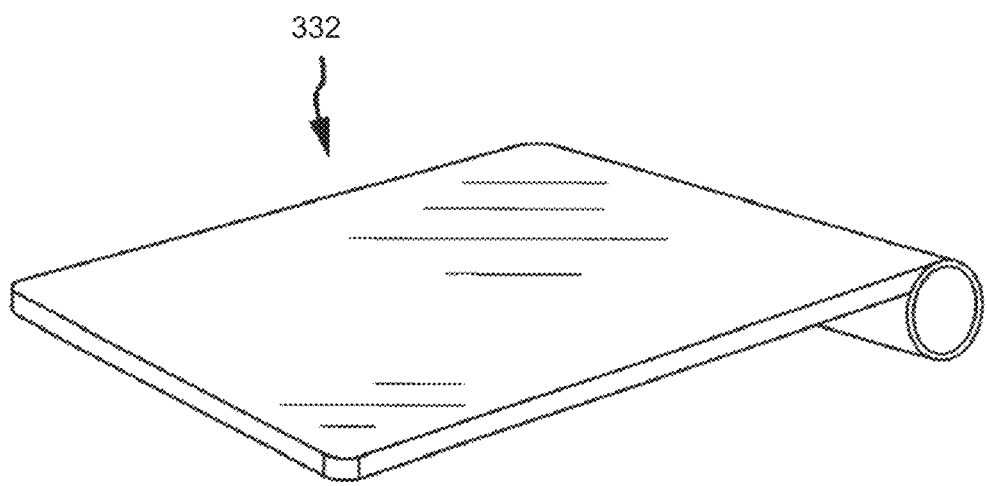
FIG. 3D is a perspective view of an input device incorporating a touch-sensitive surface separate from a multifunction device in accordance with some embodiments.

FIG. 3D is a perspective view of an input device 332 (e.g., a trackpad) incorporating a touch-sensitive surface separate from a multifunction device in accordance with some embodiments. In some embodiments, the input device 332 includes touch-sensitive surface 334 and one or more of: one or more intensity sensors 336, one or more tactile output generators 338, one or more processors 342, a communication module 344, and sensors 346, as shown in FIG. 3B. In some embodiments, the input device 332 is coupled to the device 300 shown in FIG. 3C using wireless or wired communication protocols (e.g., through the external port 124 of the device 300).

Figure 3E:
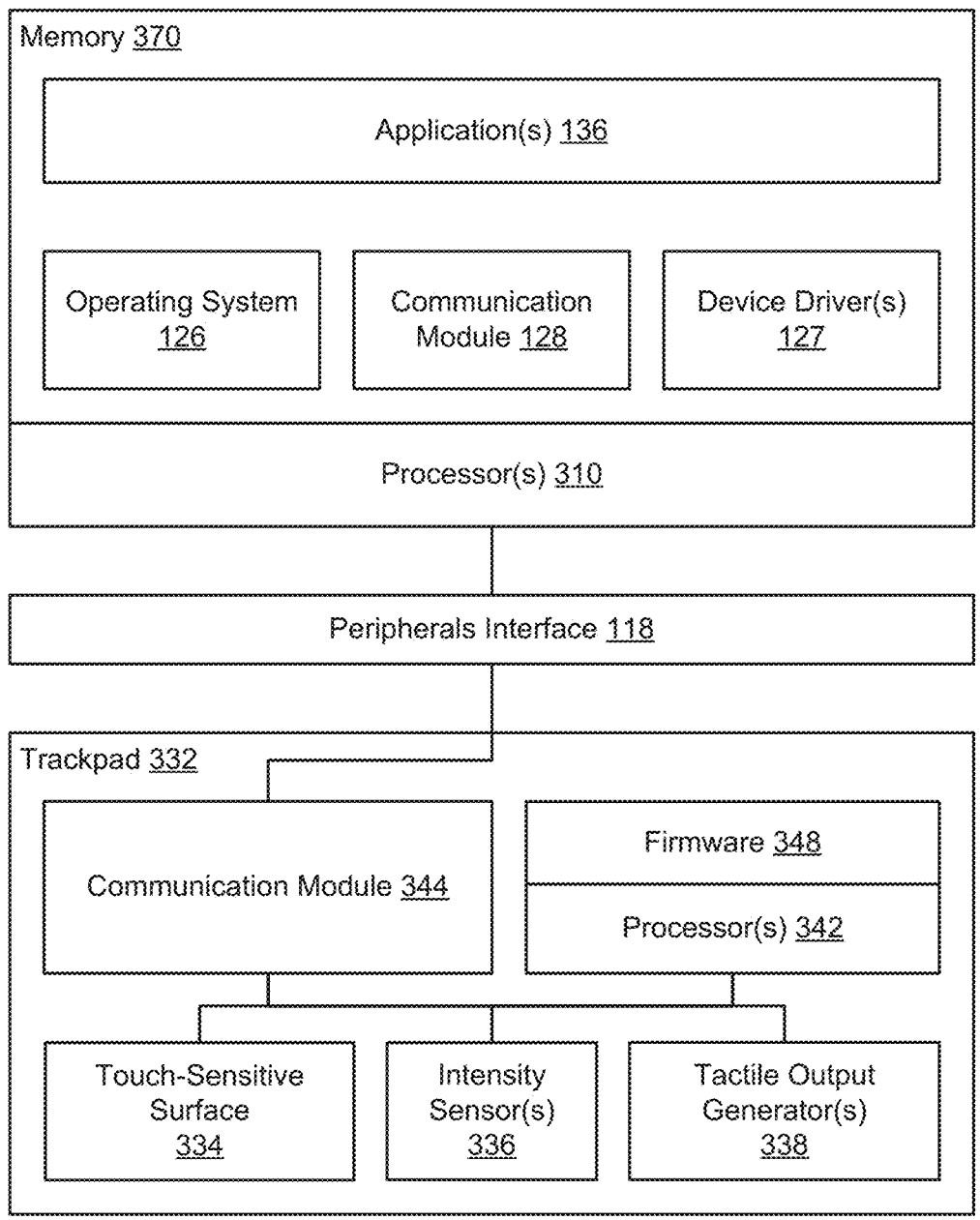
FIG. 3E is a block diagram of an exemplary multifunction device that includes a trackpad in accordance with some embodiments.

FIG. 3E is a simplified block diagram of an exemplary multifunction device that includes a trackpad (e.g., trackpad 332 in FIG. 3B) in accordance with some embodiments.

The trackpad 332 includes one or more of: a touch-sensitive surface 334, one or more intensity sensors 336, one or more tactile output generators 338, and a communication module 344, as described above with respect to FIG. 3E. In some of the embodiments in which the trackpad 332 includes one or more processors 342, the trackpad 332 includes a firmware 348 that includes instructions for execution by the one or more processors 342 to process signals from the touch-sensitive surface 334 and/or the intensity sensors 336 and operate the tactile output generators 338. In some embodiments, the one or more processors 342 process raw signals from the touch-sensitive surface 334 and/or the intensity sensors 336 and transmit processed information (e.g., coordinates of contacts and intensity of contacts, etc.) to the processors 310 for further processing (e.g., in accordance with the operating system 126, device drivers 127, and/or the applications 136), such as identifying a touch gesture and normalizing the intensity of contacts. In some embodiments, the processed information is sent via the peripherals interface 118 from the communication module 344 to the processors 310. In some embodiments, the processed information is transmitted by the processors 342 to the processors 310 without sending the raw signals from the touch-sensitive surface 334 and/or the intensity sensors 336. In some embodiments, the one or more processors 342 further process the processed information to obtain mapped information (e.g., information for an identified gesture, normalized intensity, etc.) and sends the mapped information to the processors 310. This reduces the work load of the processors 310. In some embodiments, the processors 310 are multi-purpose processing units (e.g., CPUs, APUs, etc.) and the processors 342 are application-specific processing units (e.g., application-specific integrated circuits (ASICs)) and/or field-programmable gate arrays (FPGA), which may be more power efficient than multi-purpose processing units.

In some embodiments, information received through the peripherals interface 118 is processed by the processors 310 using the communication module 128, and then using the device drivers 127. For example, information based on signals measured by the touch-sensitive surface 334 is routed to a device driver that corresponds to the touch-sensitive surface 334, and information based on signals measured by the one or more intensity sensors 336 is routed to a device driver that corresponds to the one or more intensity sensors 336. In some embodiments, a single device driver that corresponds to the trackpad 332 includes instructions for handling the information based on signals measured by the touch-sensitive surface 334 and the information based on signals measured by the one or more intensity sensors 336.

In some embodiments, the processors 310 sends instructions to the trackpad 332 (e.g., in accordance with the applications 136) to generate a tactile output using a device driver that corresponds to the tactile output generators 338.

In some embodiments, the device drivers 127 are separate from the operating system 126 as illustrated in FIG. 3E. In some embodiments, the device drivers 127 are included in the operating system 126. In some embodiments, the communication module 128 is separate from the operating system 126. In some embodiments, the communication module 128 is included in the operating system 126.

Figure 3F:
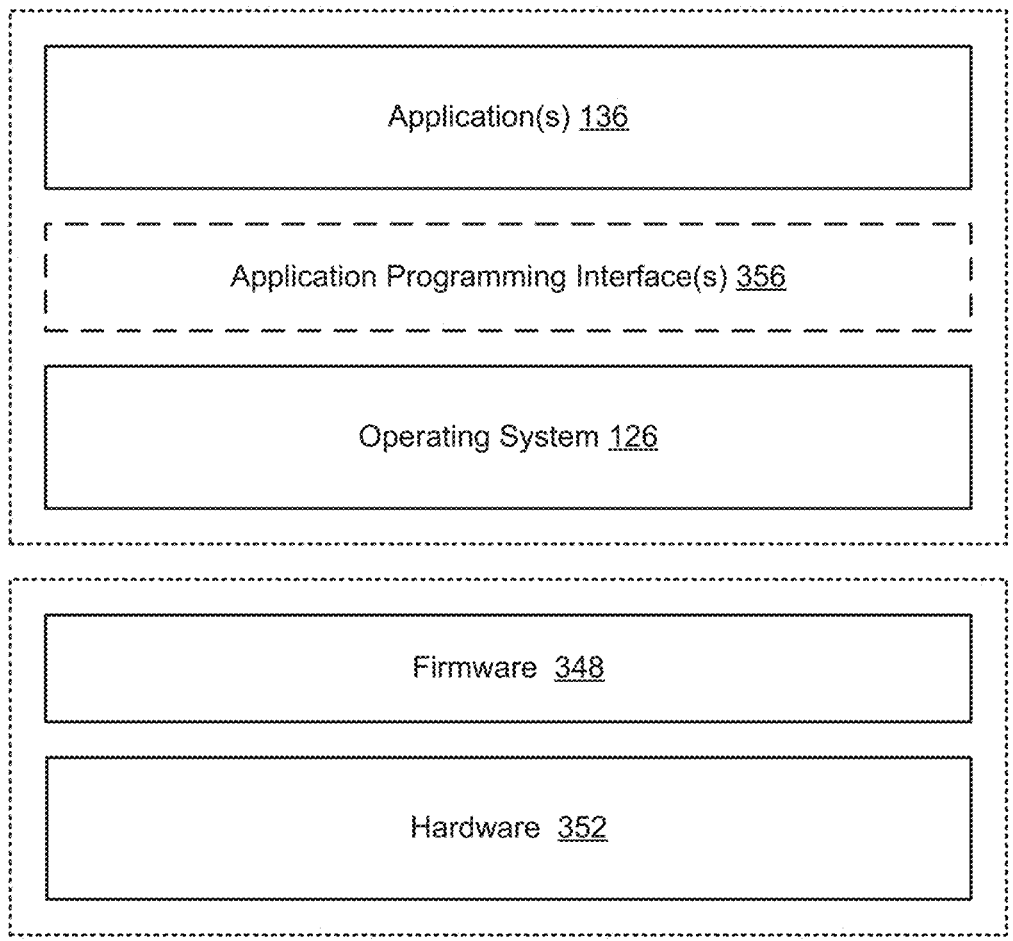
FIG. 3F is a simplified block diagram illustrating architecture of an exemplary multifunction device in accordance with some embodiments.

FIG. 3F is a simplified block diagram illustrating architecture of an exemplary multifunction device in accordance with some embodiments.

Hardware (e.g., electronic circuitry) 352 of the device is at the base level of the architecture. Hardware 352 can include various hardware interface components, such as the components depicted in FIGS. 1A, 3A and/or 3B. For example, Hardware 352 includes Touch-Sensitive Surface 334 and the one or more Intensity Sensors 336 described above with respect to FIGS. 1A, 3A, 3B, and 3E. At least some of the other elements (348, 126, 356, and 136) of the architecture are software procedures, or portions of software procedures, that process inputs received from Hardware 352 and generate various outputs that are presented through a hardware user interface (e.g., one or more of a display, speakers, device vibration actuator, etc.).

Firmware 348 is used to communicate with Hardware 352. In some embodiments, Firmware 348 includes device drivers. Firmware 348 is used to receive and process input data received from Hardware 352. In some embodiments, at least a portion of Hardware 352 and Firmware 348 is implemented in Trackpad 332.

In some embodiments, Operating System ("OS") 126 communicates with Firmware 348. OS 126 can process raw input data or processed data received from Firmware 348.

Application Programming Interfaces ("APIs") 356 are software procedures that are used to communicate with OS 126 (or Device Drivers 127 of FIG. 3E). In some embodiments, APIs 356 are included in the device's operating system, but at a level above its core OS. APIs 356 are designed for use by Applications 136 running on the electronic devices or apparatuses discussed herein. Application software 136 includes one or more applications 136 (FIGS. 1A, 3A, and 3B).

While each layer in the architecture can utilize the layer underneath it, that is not always required. For example, in some embodiments, Applications 136 may directly communicate with OS 126. In some embodiments, Applications 136 and API 356 cannot directly access Firmware 348 or Hardware 352, as these layers are considered private. Applications 136 usually direct calls API 356, which in turn, accesses OS 126, Firmware 348, and Hardware 352.

Figure 3G:
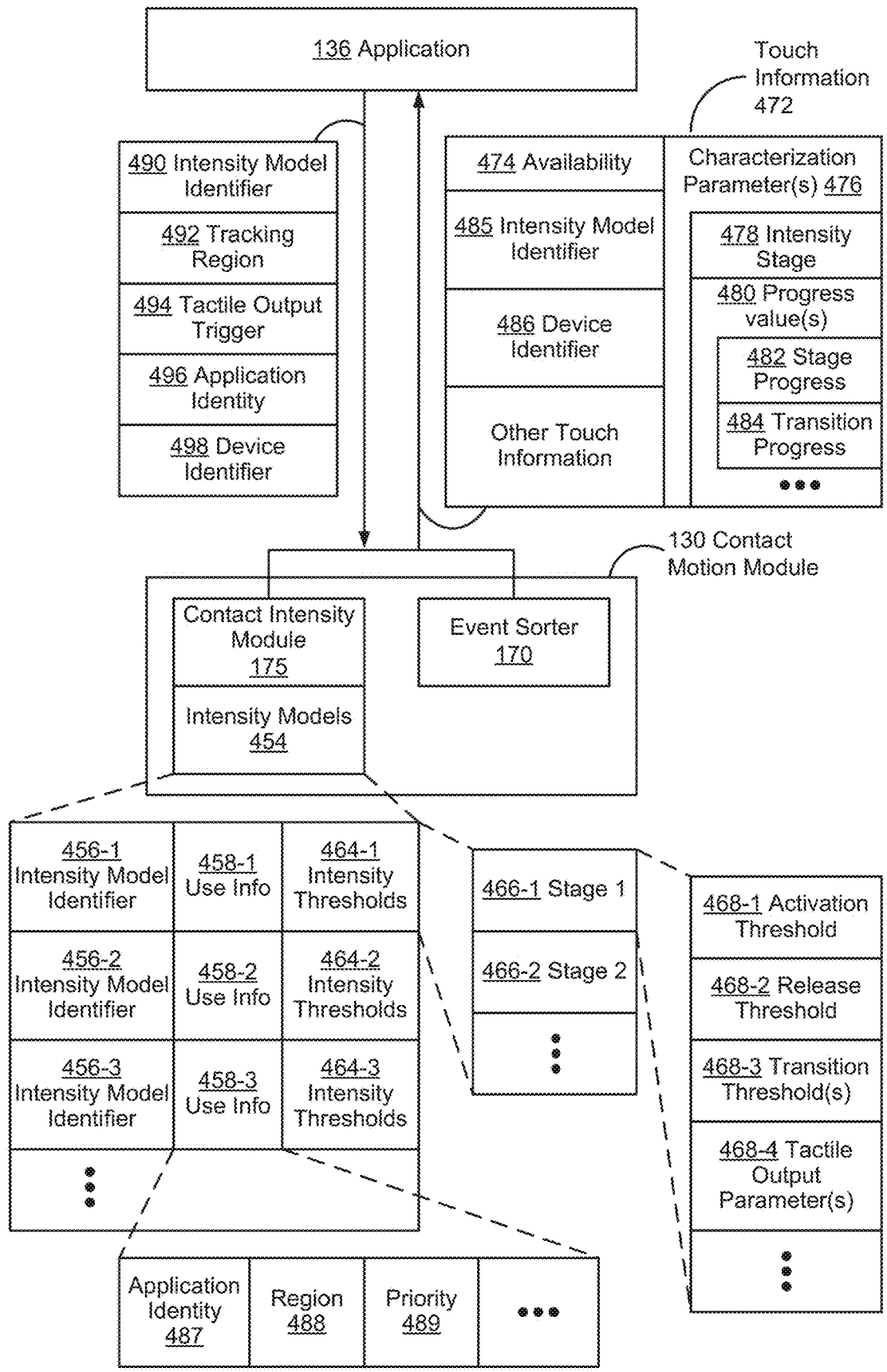
FIG. 3G is a block diagram illustrating data structures used by an exemplary multifunction device in accordance with some embodiments.

FIG. 3G is a block diagram illustrating data structures used by an exemplary multifunction device in accordance with some embodiments.

In FIG. 3G, application 136 communicates with contact motion module 130. In some embodiments, contact motion module 130 is implemented in OS 126. In some embodiments, contact motion module 130 is separate from OS 126. In some embodiments, contact motion module 130 is implemented in firmware 348 (FIG. 3E).

In some embodiments, contact module 130 includes event sorter 170 (FIG. 1B). In some embodiments, contact intensity module 130 includes contact intensity module 175 that detects intensity of a contact on a touch-sensitive surface.

In some embodiments, contact motion module 130 stores a plurality of intensity models 454. In some embodiments, the plurality of intensity models 454 (e.g., two or more intensity models, or alternatively three or more intensity models) is used by contact intensity module 175. A respective intensity model in the plurality of intensity models 454 includes one or more of the following, or a superset or subset thereof:
Intensity Model Identifier 456, which identifies (typically uniquely identifies) an intensity model (see Appendix A for exemplary intensity models and corresponding intensity model identifiers);
Use Info 458-1, which includes information that identifies conditions for which the corresponding intensity model is configured for use and/or conditions for which the corresponding intensity model is prohibited for use (e.g., for particular applications identified by Application Identity 487, and/or for particular Regions 488 of a user interface and/or a touch-sensitive surface), and/or one or more priorities 489 associated with the corresponding intensity model; and
Intensity Thresholds 464, which is described in further detail below.

In some embodiments, intensity thresholds 464 include one or more intensity thresholds for one or more intensity stages (e.g., 466-1, 466-2, etc.). For example, intensity thresholds 464 include an activation threshold 468-1 for entering a respective intensity stage. In some embodiments, intensity thresholds 464 include a release threshold 468-2 for exiting from the respective intensity stage. In some embodiments, the release threshold 468-2 for the respective intensity stage is identical to the activation threshold 468-1 for the respective intensity stage. In some embodiments, the release threshold 468-2 for the respective intensity stage is distinct from the activation threshold 468-1 for the respective intensity stage. In some embodiments, intensity thresholds 464 include one or more transition intensity thresholds 468-3. For example, intensity thresholds 464 may include a transition intensity threshold associated with the activation threshold 468-1, which is used to indicate that a contact of certain intensity is in a transition range from the activation threshold 468-1. Additionally or alternatively, intensity thresholds 464 may include a transition intensity threshold associated with the release threshold 468-2, which is used to indicate that a contact of certain intensity is in a transition range from the release threshold 468-2. In some embodiments, intensity thresholds 464 include tactile output parameters 468-2, which indicate whether or not a tactile output is to be generated that intensity of a contact crosses one of the intensity thresholds and, if a tactile output is to be generated, what type of a tactile output is to be generated (e.g., intensity, duration, and waveform of the tactile output).

In some embodiments, information sent by application 136 to contact motion module 130 (especially contact intensity module 175 of contact motion module 130) includes one or more of the following, or a subset or superset thereof:
Intensity Model Identifier 490, which identifies which intensity model is to be used by contact intensity module 175;
Tracking Region 492, which identifies a region for which a particular intensity model is to be used;
Tactile Output Trigger 494, which initiates generation of a tactile output by one or more tactile output generators controlled by contact motion module 130;
Application Identity 496, which identifies application 136 that sends the information; and
Device Identifier 498, which identifies an input device (e.g., a touchpad or a trackpad) that will use the identified intensity model and/or generate a tactile output.

In some embodiments, information sent by contact motion module 130 (especially contact intensity module 175 of contact motion module 130) includes one or more of the following, or a subset or superset thereof:
Availability Information 474, which indicates whether an input device (e.g., a touch pad or a trackpad) is configured to provide intensity information;
Characterization Parameters 476, such as Intensity Stage 478 and/or one or more Progress Values 480 (e.g., Stage Progress Value 482 and Transition Progress Value 484);
Intensity Model Identifier 485, which indicates an intensity model used by the contact intensity module 175 (e.g., for determining characterization parameters 476);
Device Identifier 486, which identifies an input device from which intensity signals have been received (e.g., for determining characterization parameters 476); and
Other Touch Information (e.g., gesture type, number of contacts, time stamp, etc.).

These information to and/or from contact motion module 130 need not be transmitted concurrently. For example, in some embodiments, availability information 474 is sent, separately from characterization parameters 476, by contact intensity module 175. In another example, tactile output trigger 494 is transmitted separately from tracking region 492, in some embodiments.

In some embodiments, information exchanged between application 136 and contact/motion module 130 is transmitted through Application Programming Interface(s) 356 (FIG. 3F).

Although FIG. 3G illustrates communication between contact motion module 130 and application 136, contact motion module 130 can be in communication with multiple different applications 136 (e.g., contacts module 137, telephone module 138, video conference module 139, e-mail client module 140, instant messaging module 141, workout support module 142, camera module 143, image management module 144, browser module 147, calendar module 148, widget modules 149, search module 151, video and music player module 152, drawing module 380, presentation module 382, word processing module 384, website creation module 386, disk authoring module 388, spreadsheet module 390) that are configured to receive contact information (e.g., touch events that include contact information). In some embodiments, contact motion module 130 is also in communication with third party applications. In some embodiments, contact motion module 130 controls, for multiple applications, how press inputs are interpreted (e.g., changing intensity thresholds). This allows press inputs to be interpreted consistently across the multiple applications (e.g., providing consistent trackpad configurations, and/or providing consistent tactile outputs).

Attention is now directed towards embodiments of user interfaces ("UI") that are, optionally, implemented on portable multifunction device 100.

Figure 4A:
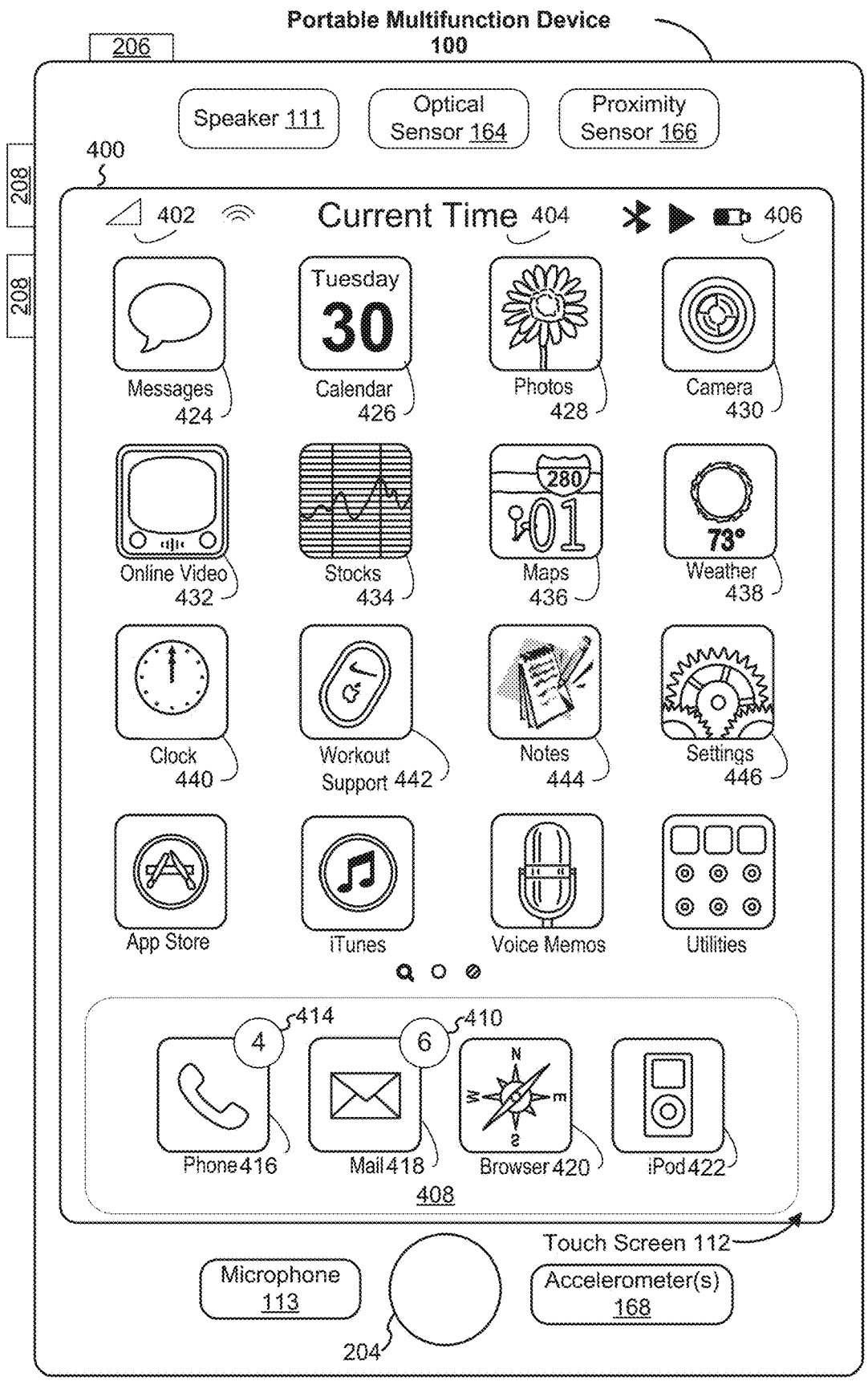
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
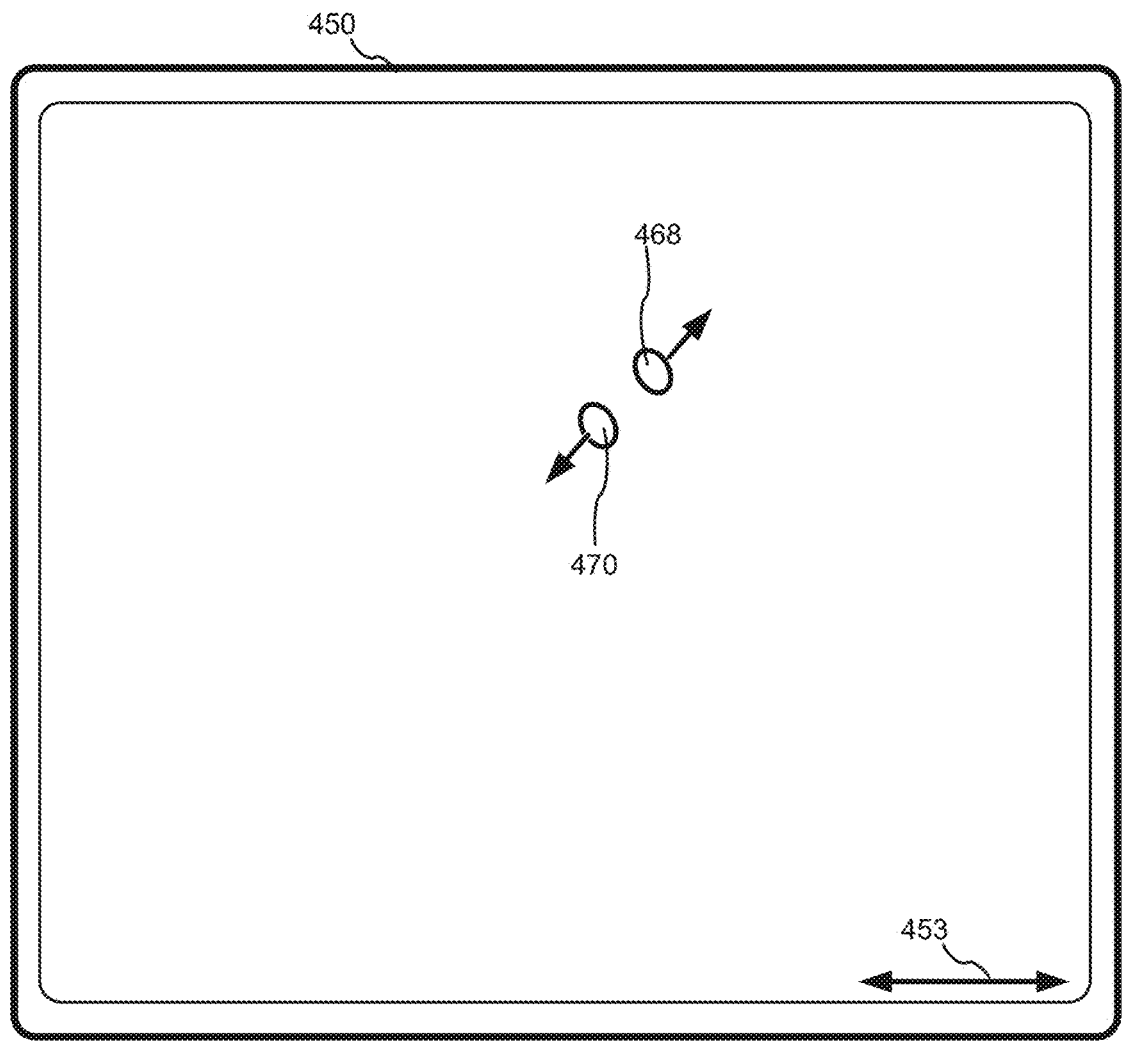
FIG. 4B illustrates an exemplary user interface for a multifunction device with a touch-sensitive surface that is separate from the display in accordance with some embodiments.
Figure 4B:
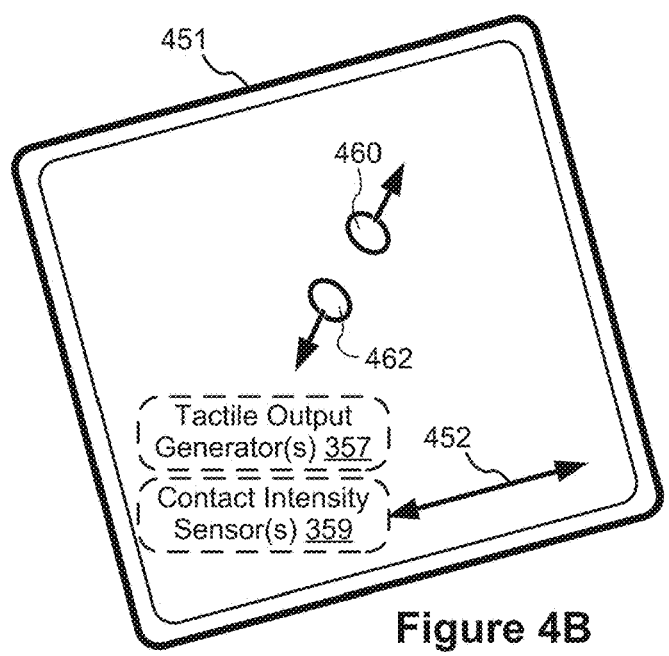

FIG. 4B illustrates an exemplary user interface on a device (e.g., device 300, FIG. 3A or 3B) with a touch-sensitive surface 451 (e.g., a tablet or touchpad 355, FIG. 3A or 3B) that is separate from the display 450. Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

FIG. 4B illustrates an exemplary user interface on a device (e.g., device 300, FIG. 3A or 3B) with a touch-sensitive surface 451 (e.g., a tablet or touchpad 355, FIG. 3A or 3B) that is separate from the display 450. Many of the examples that follow will be given with reference to a device that detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3A or 3B or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 5A-5TT) described below optionally include various intensity diagrams that show the current intensity of the contact on the touch-sensitive surface relative to one or more intensity thresholds (e.g., a contact detection intensity threshold $IT_0$, a latching intensity threshold $IT_L$, an activation intensity threshold $IT_A$, and/or one or more other intensity thresholds). This intensity diagram is typically not part of the displayed user interface, but is provided to aid in the interpretation of the figures. In some embodiments, a light press intensity threshold (e.g., a lower intensity threshold) corresponds to an intensity at which the device will perform operations typically associated with clicking a button of a physical mouse or a trackpad. In some embodiments, a deep press intensity threshold (e.g., a higher intensity threshold) corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

Figure 4C:
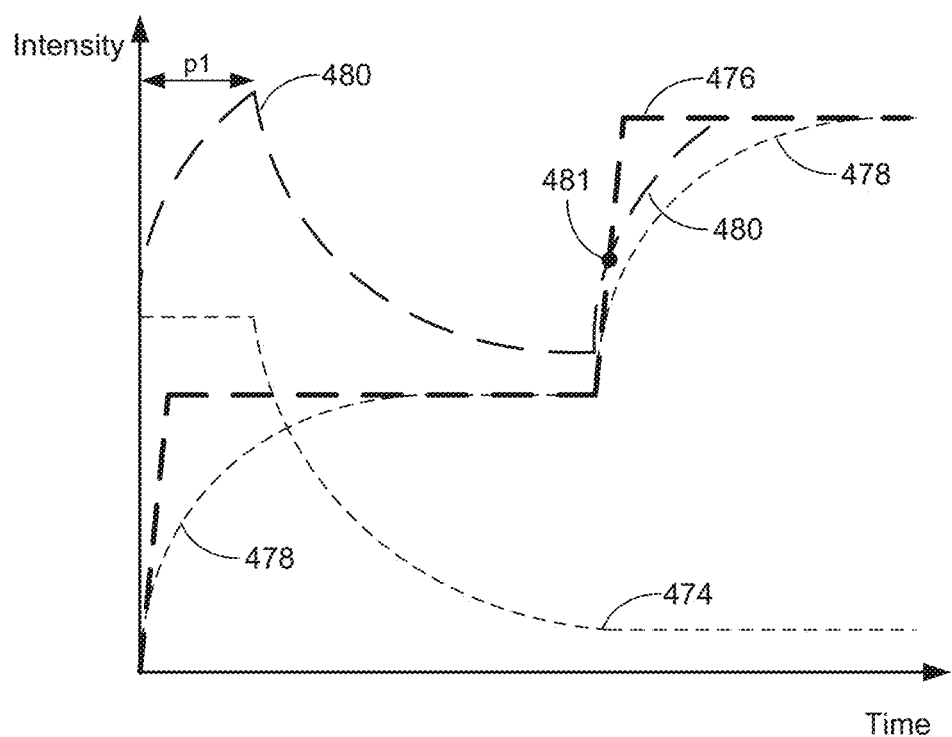
FIGS. 4C-4E illustrate exemplary dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of a touch input. In some embodiments, when touch input 476 satisfies dynamic intensity threshold 480 (e.g., at point 481 in FIG. 4C), the "deep press" response is triggered.

Figure 4D:
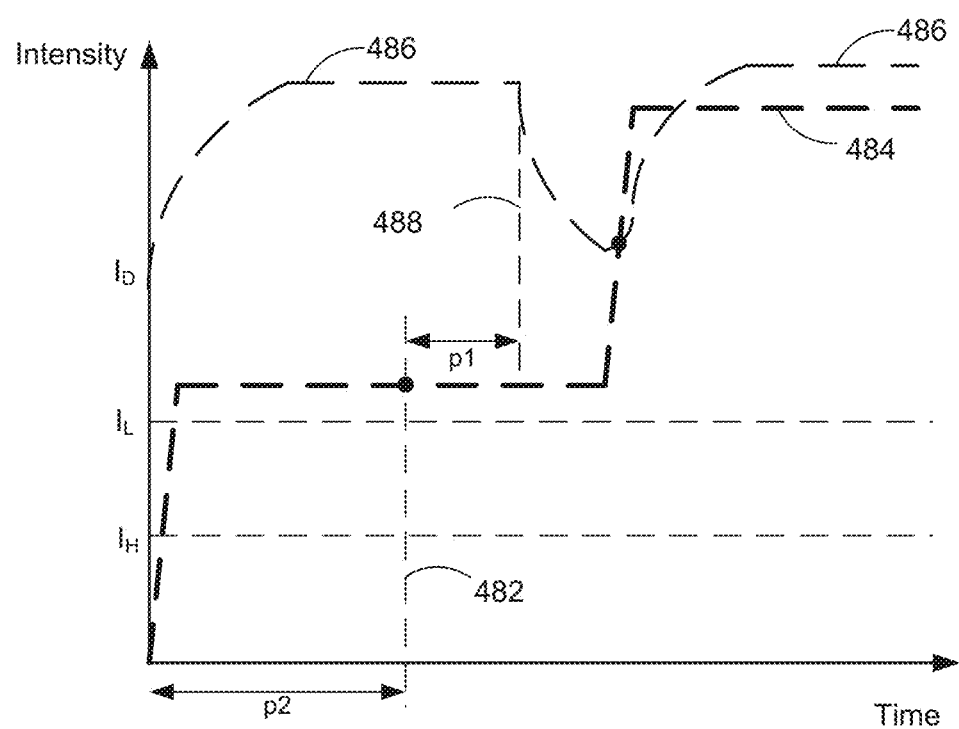

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
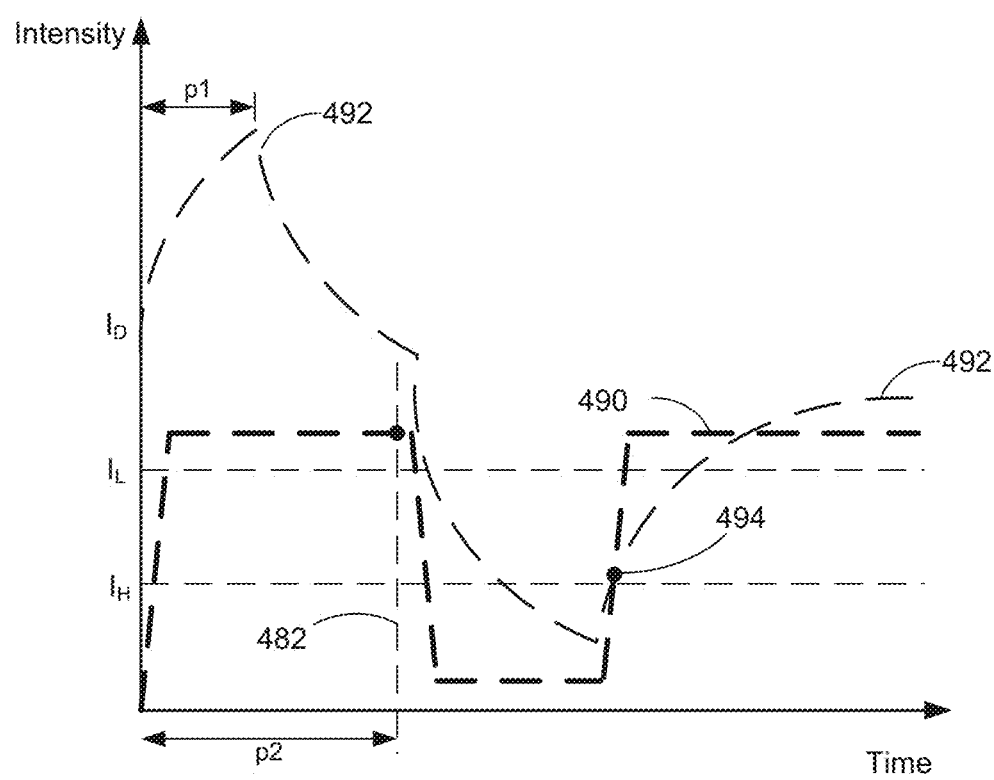

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

Figure 5A:
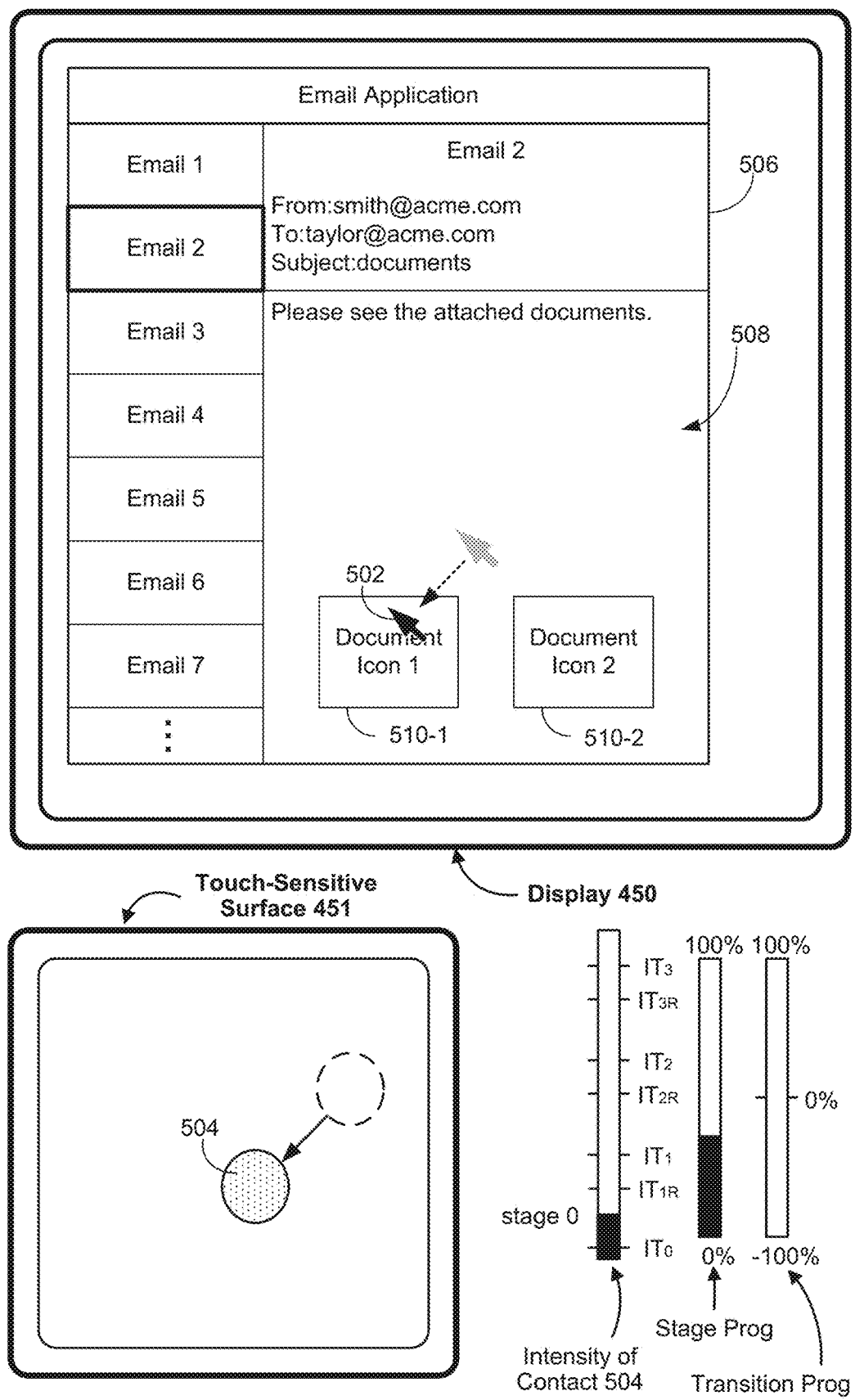
FIGS. 5A-5TT illustrate exemplary user interfaces for processing touch inputs in accordance with some embodiments.
Figure 5B:
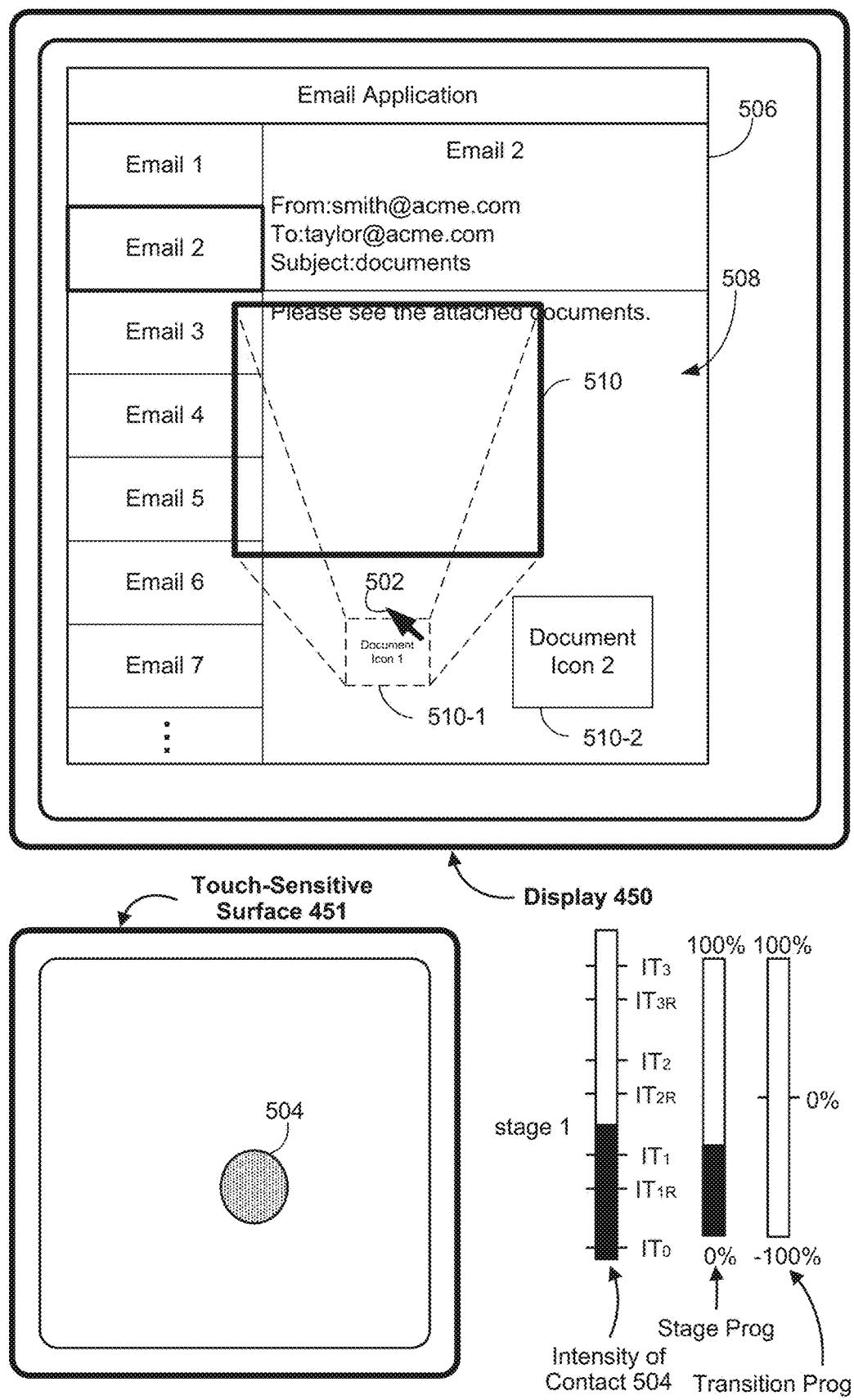
Figure 5C:
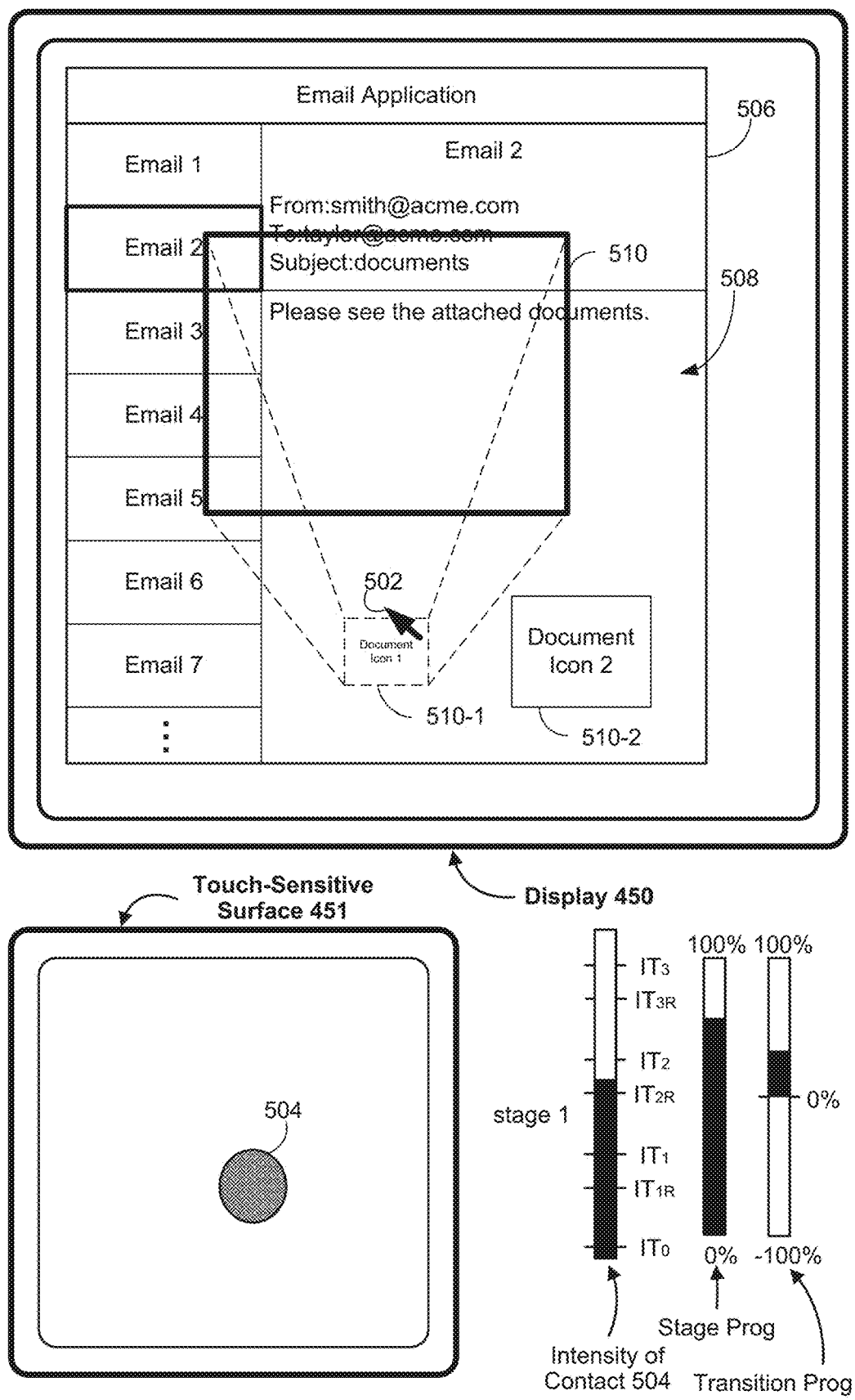
Figure 5D:
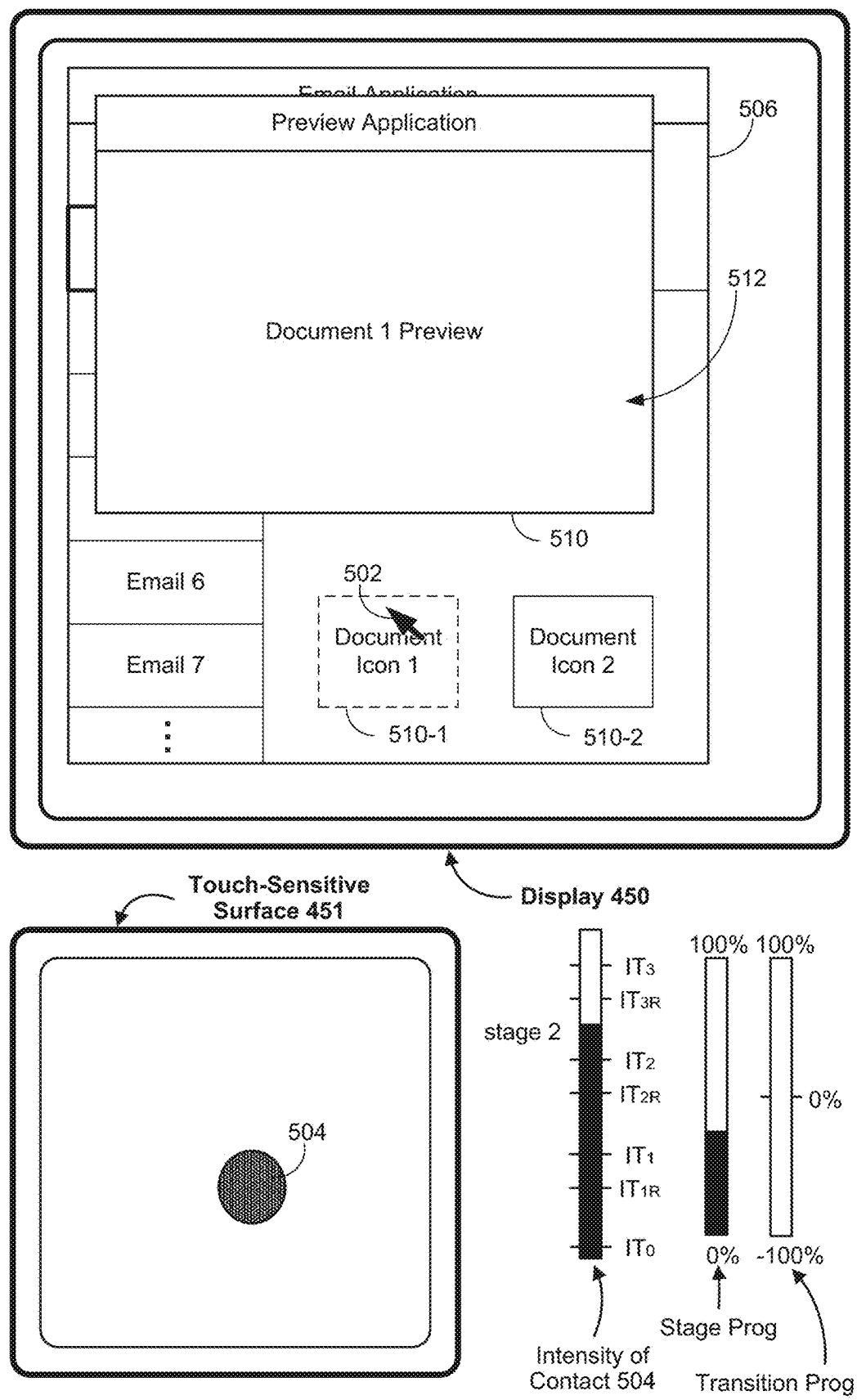
Figure 5E:
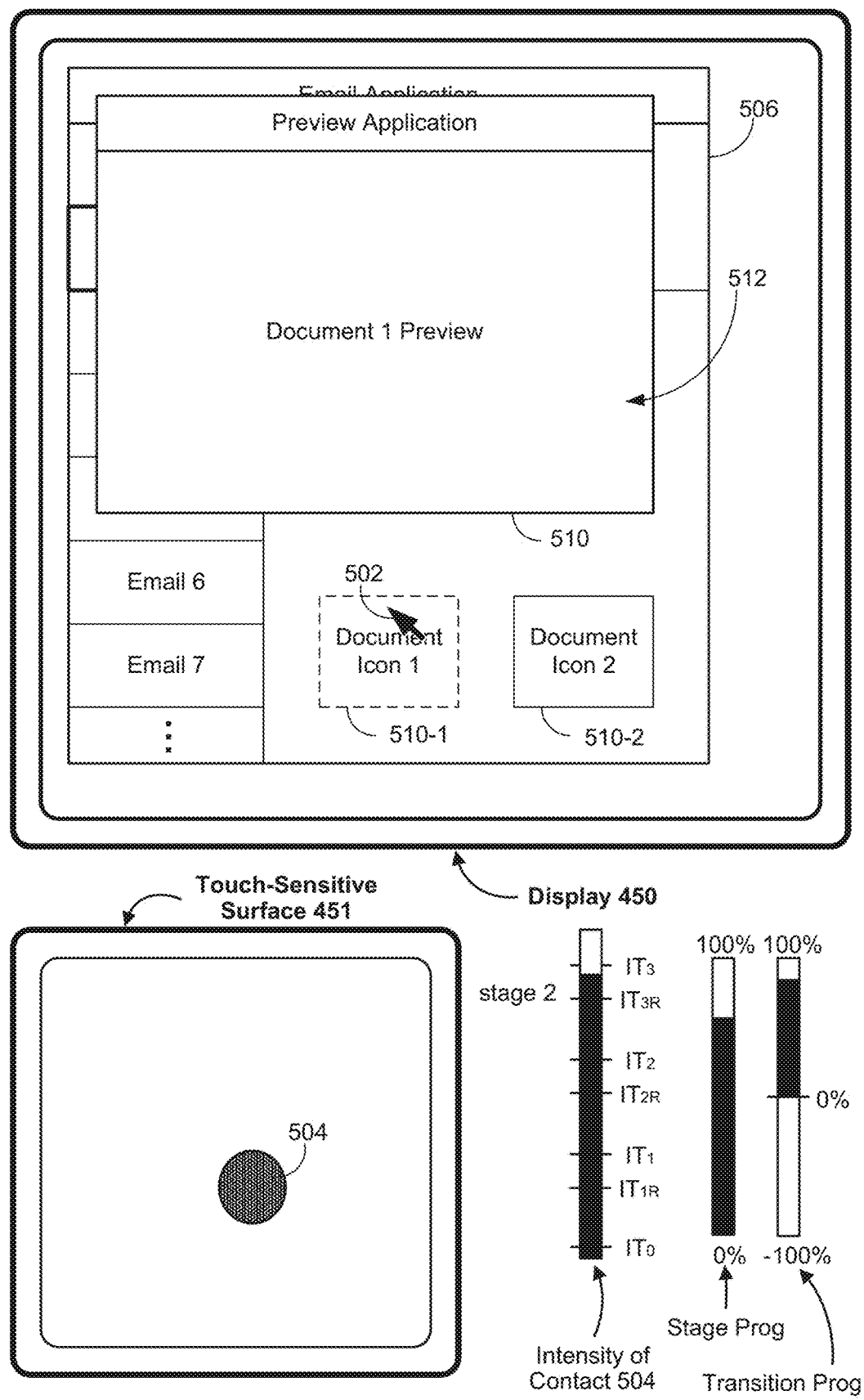
Figure 5F:
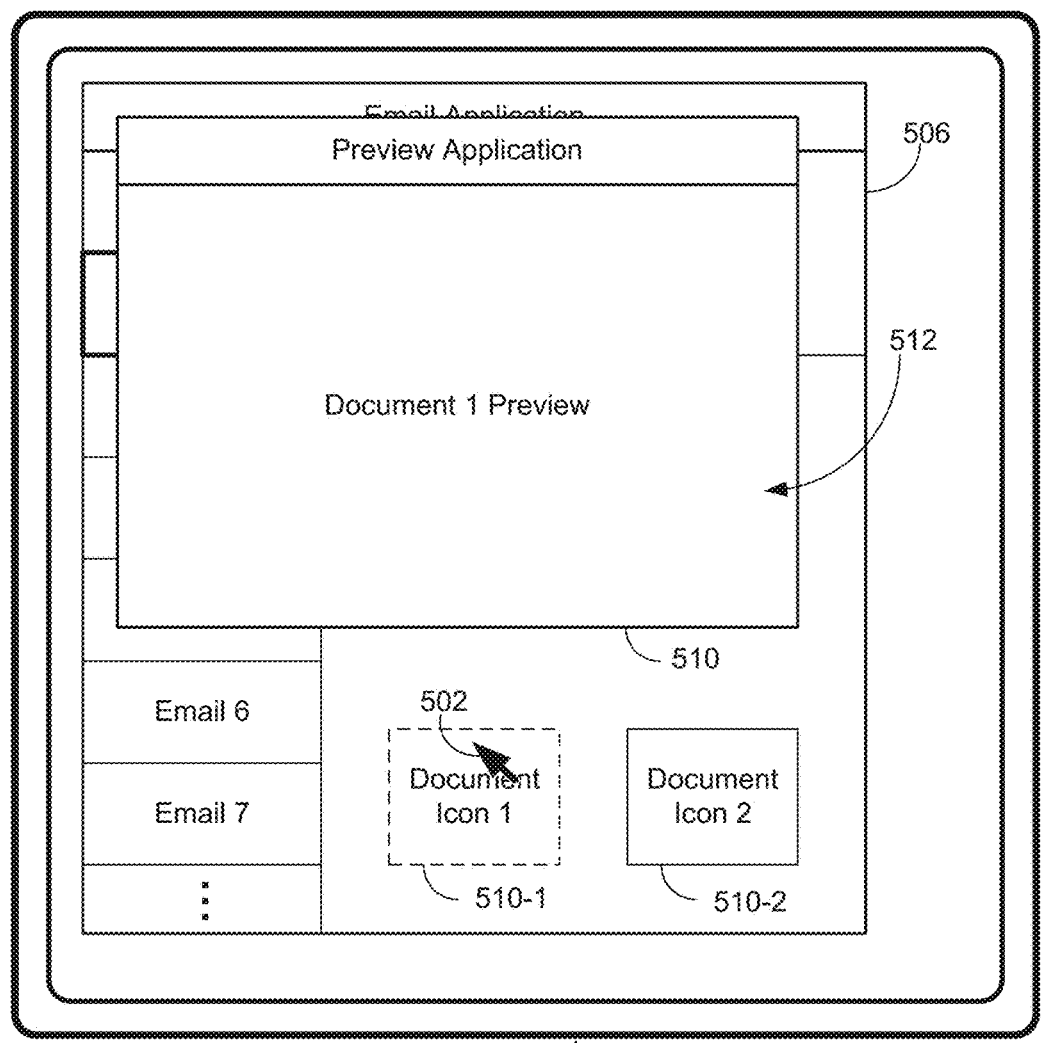
Figure 5F:
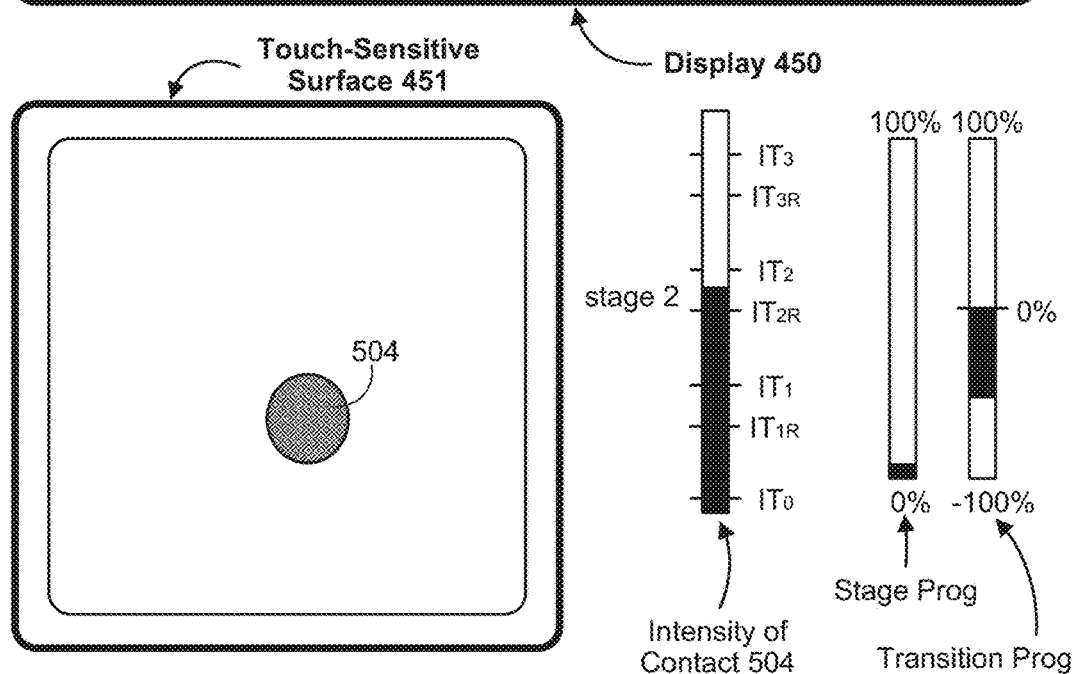
Figure 5G:
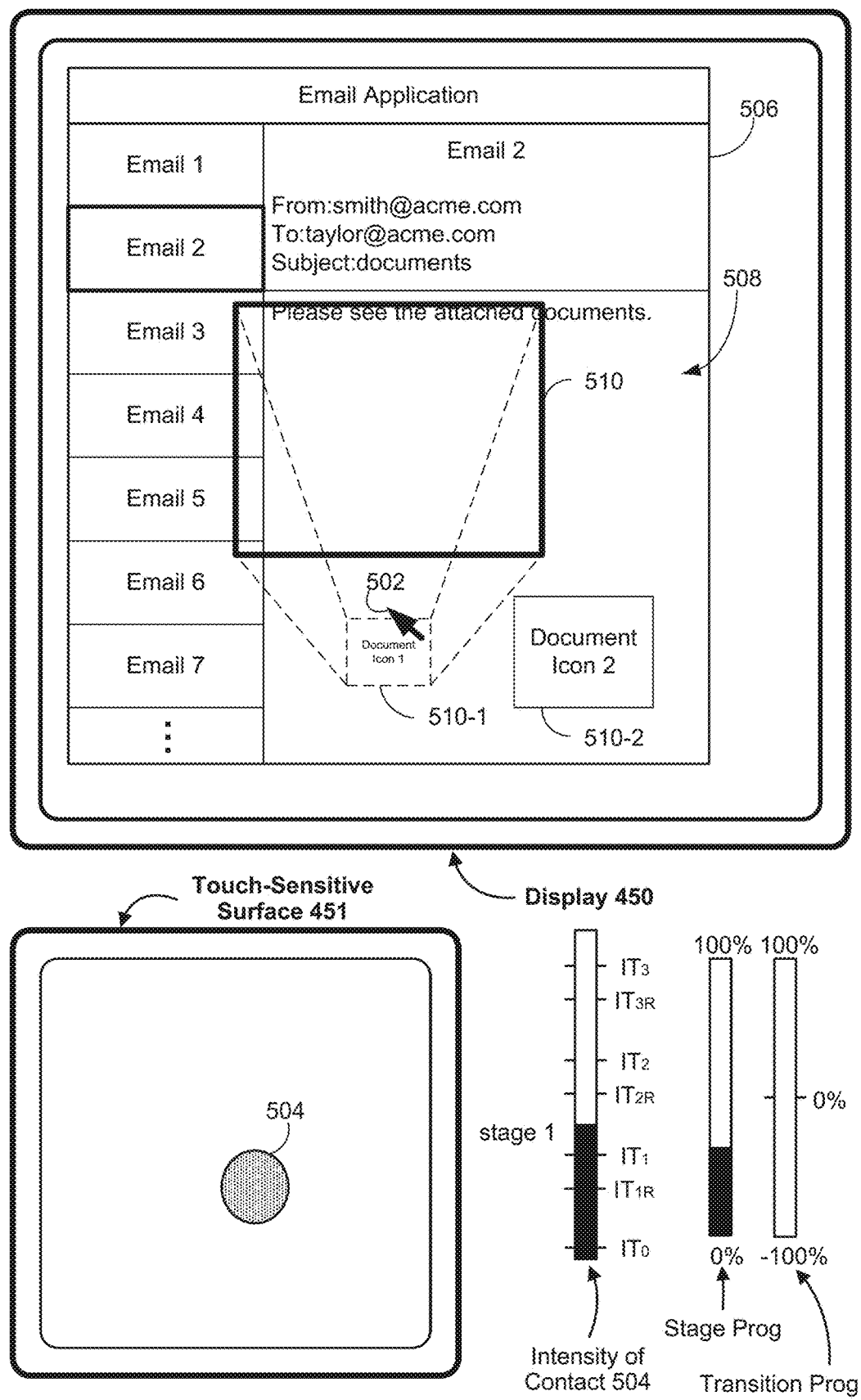
Figure 5H:
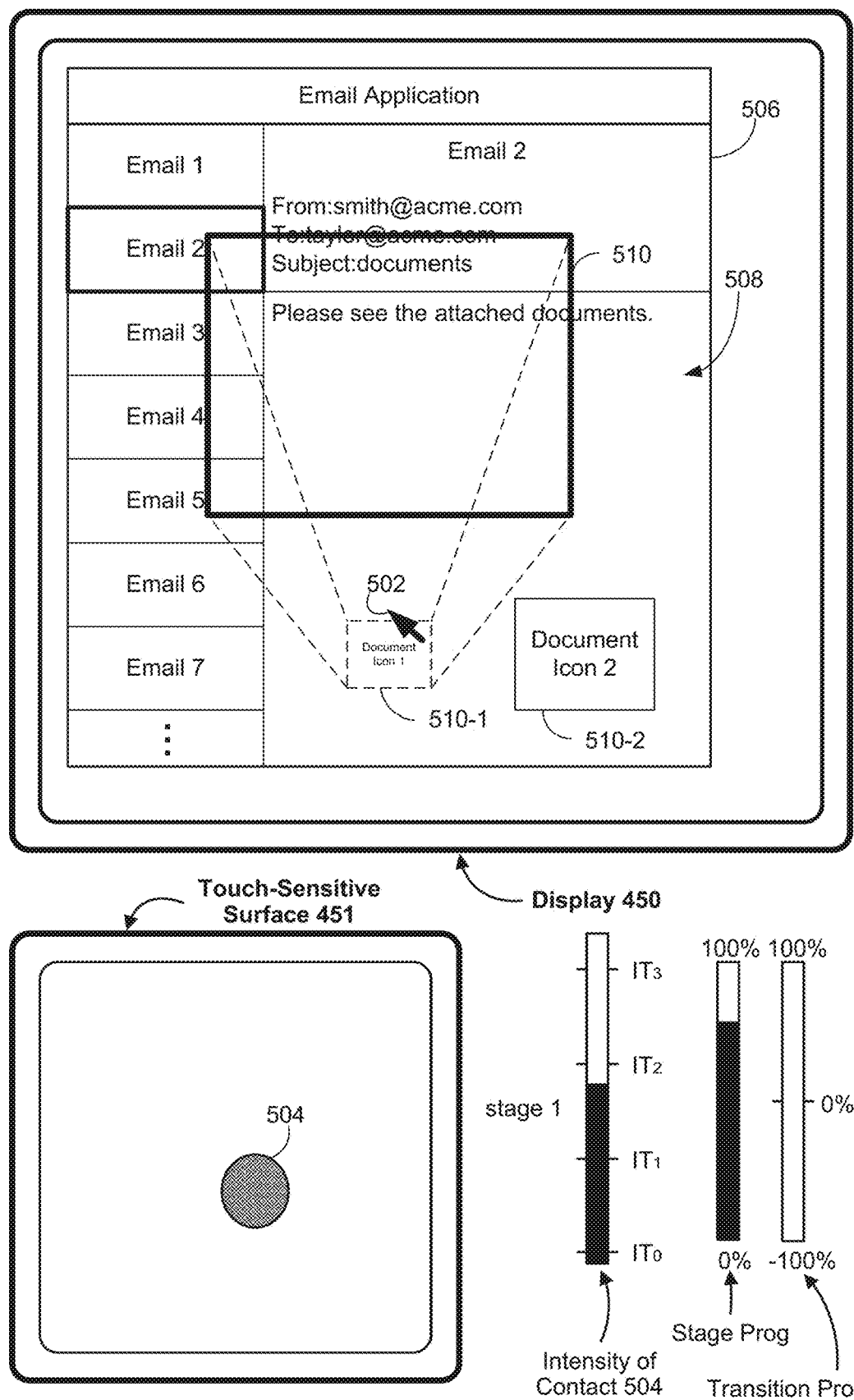
Figure 5I:
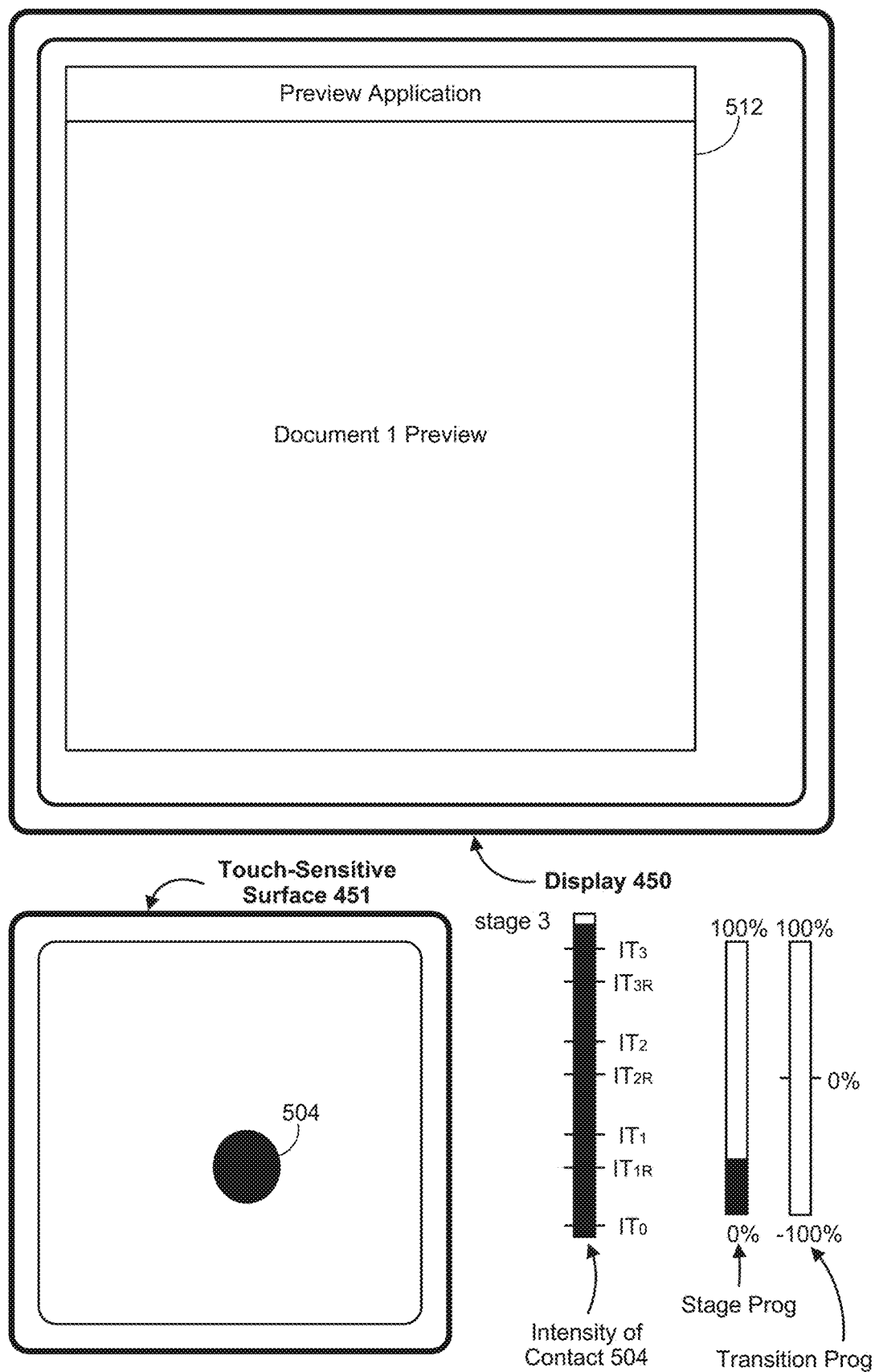
Figure 5J:
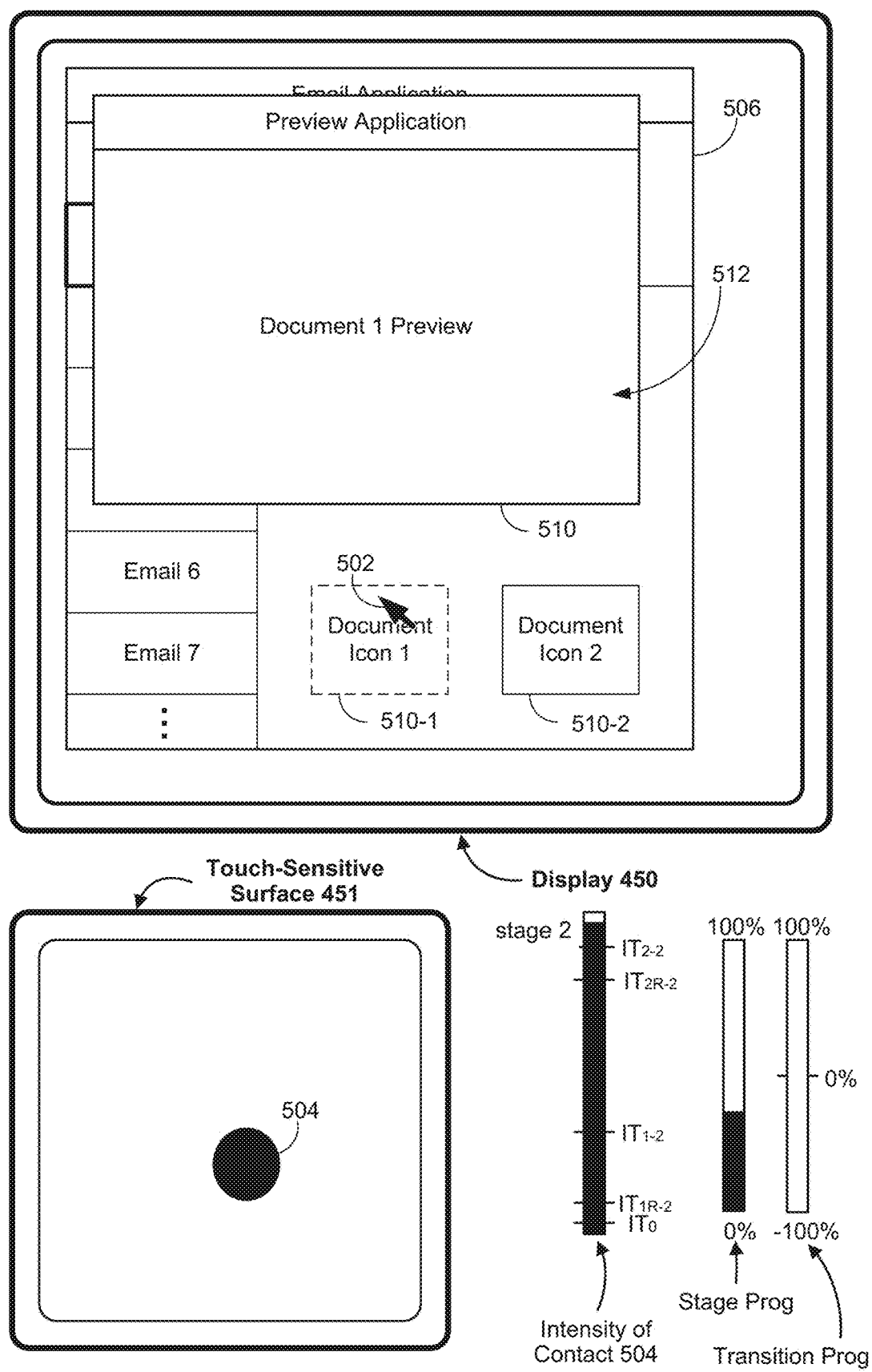
Figure 5K:
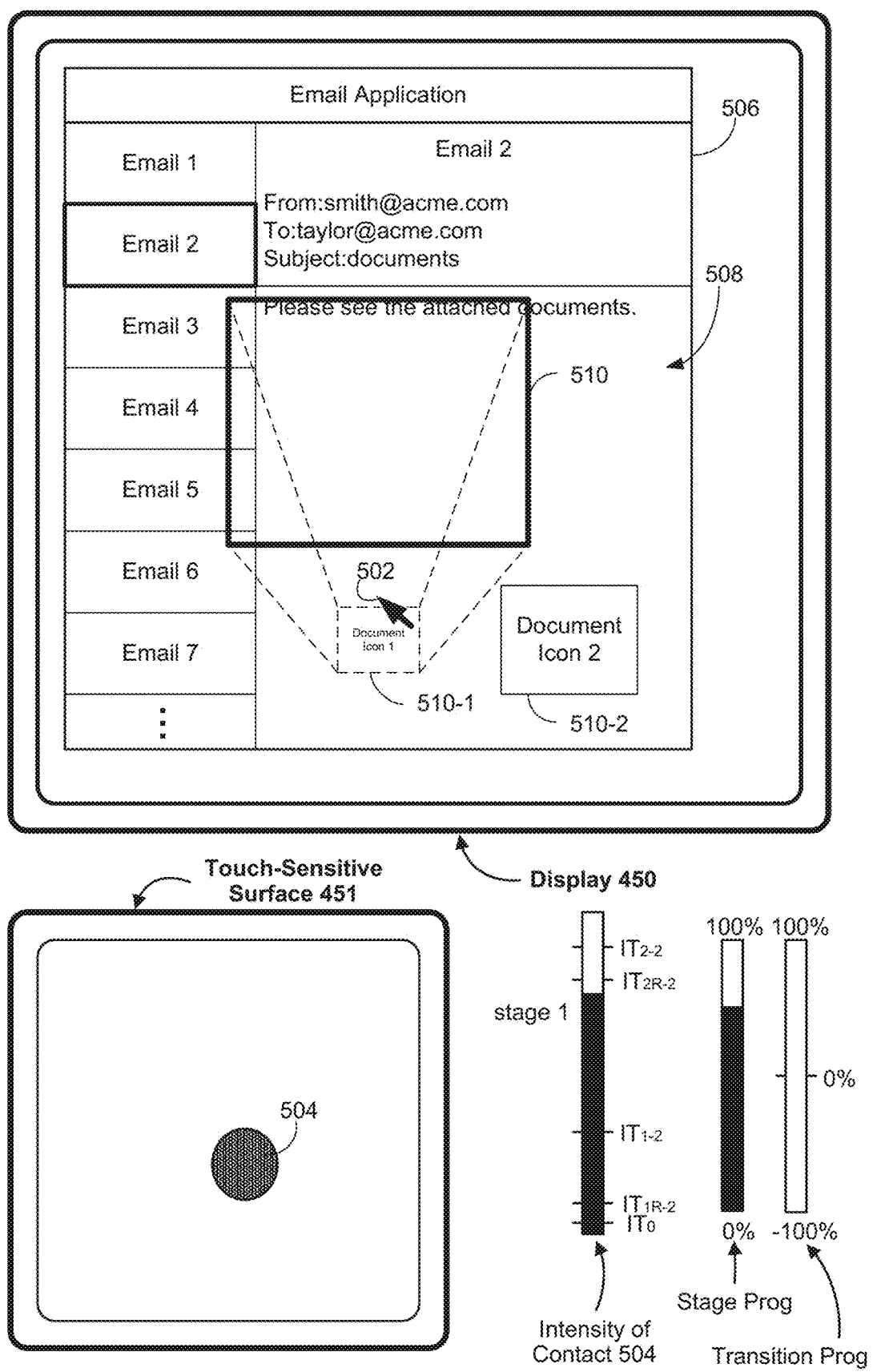
Figure 5L:
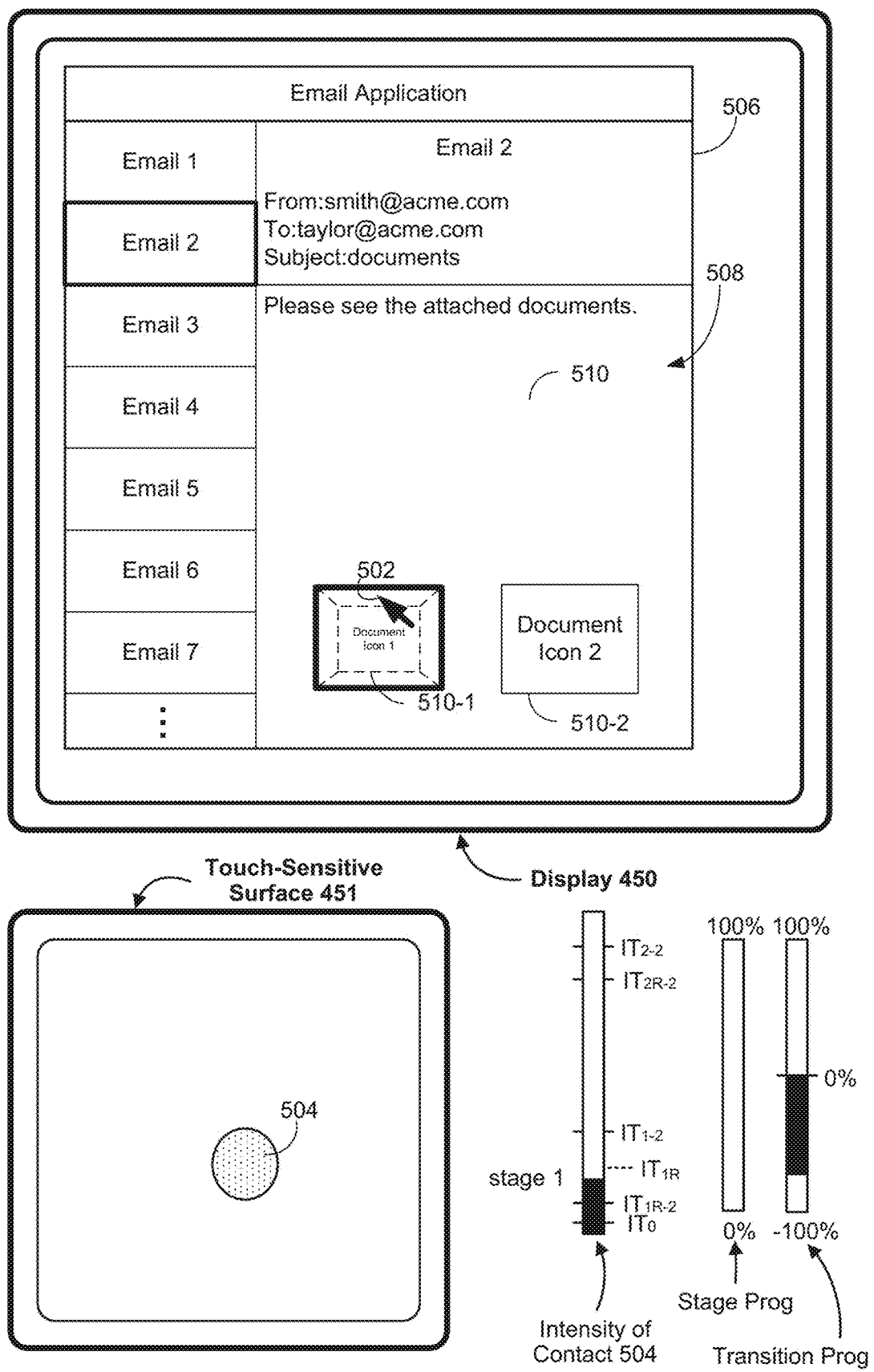
Figure 5M:
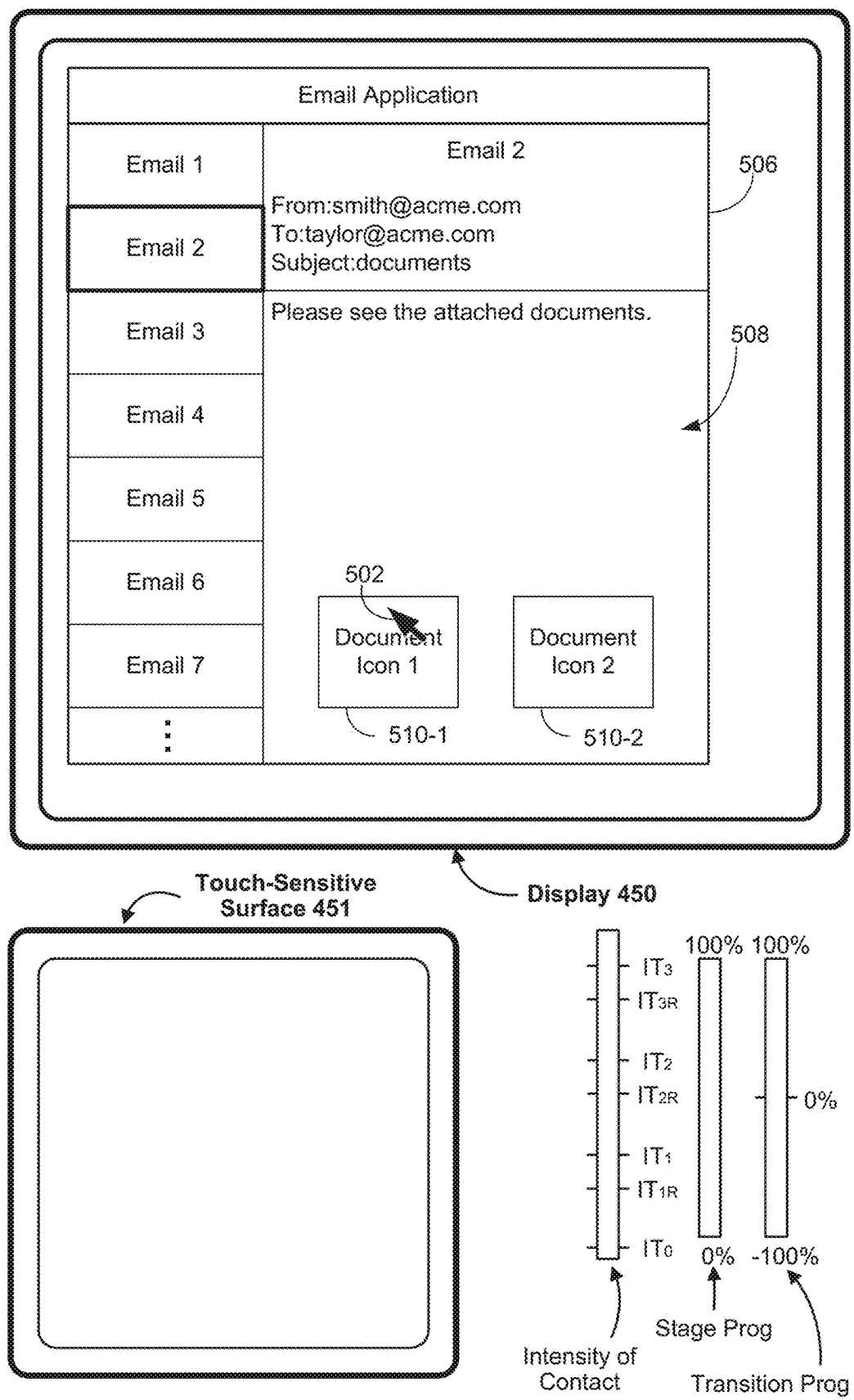
Figure 5N:
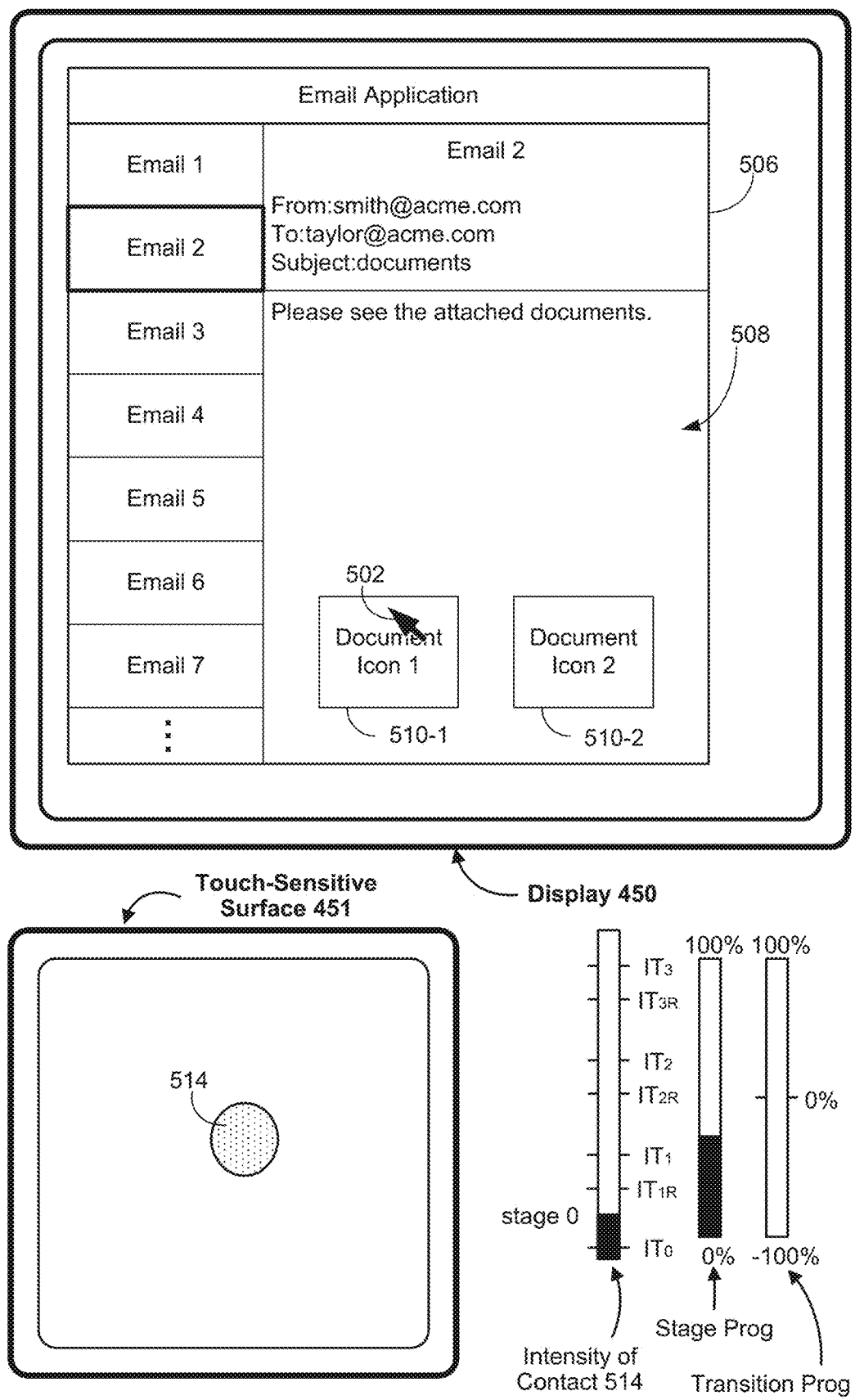
Figure 5O:
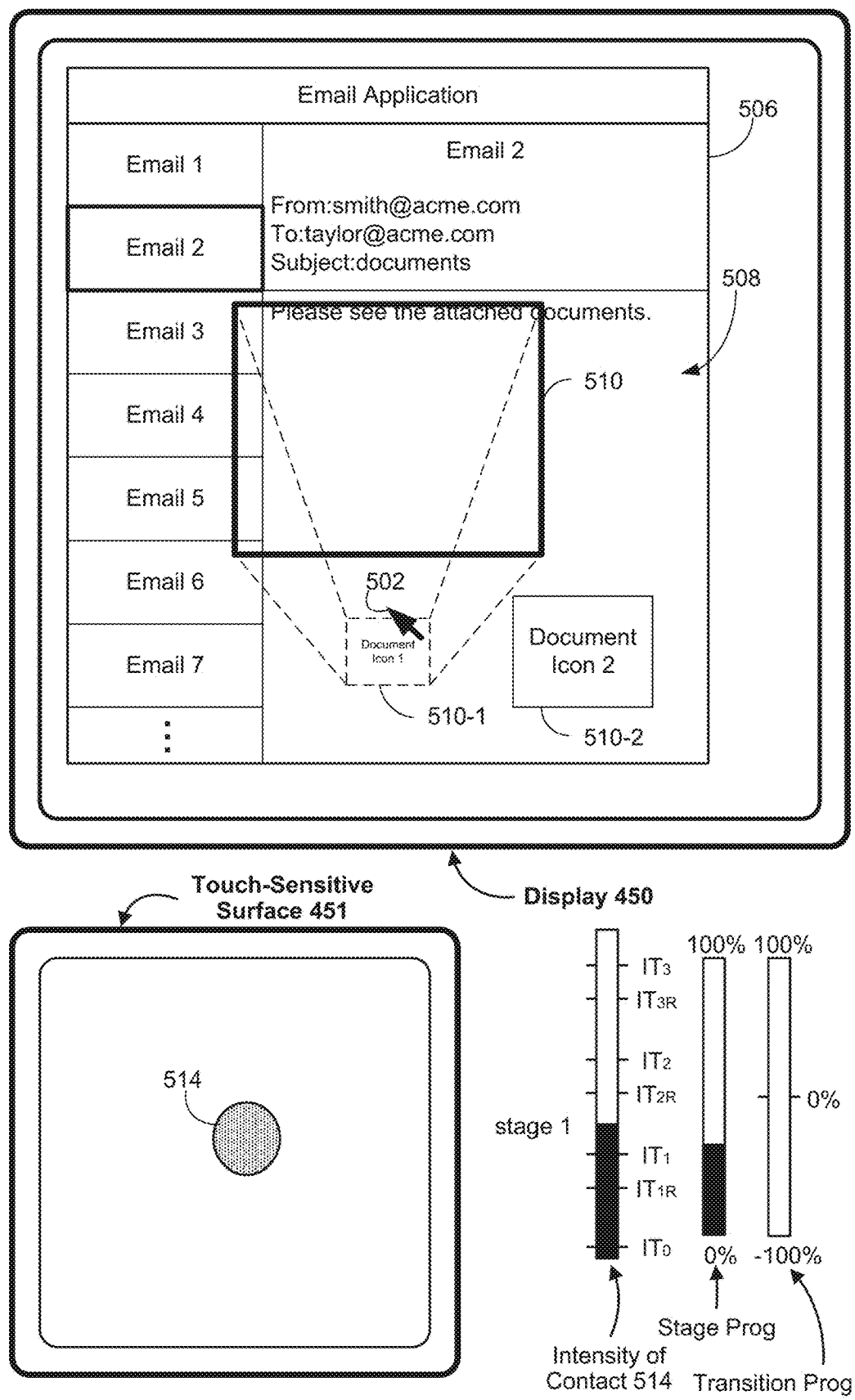
Figure 5P:
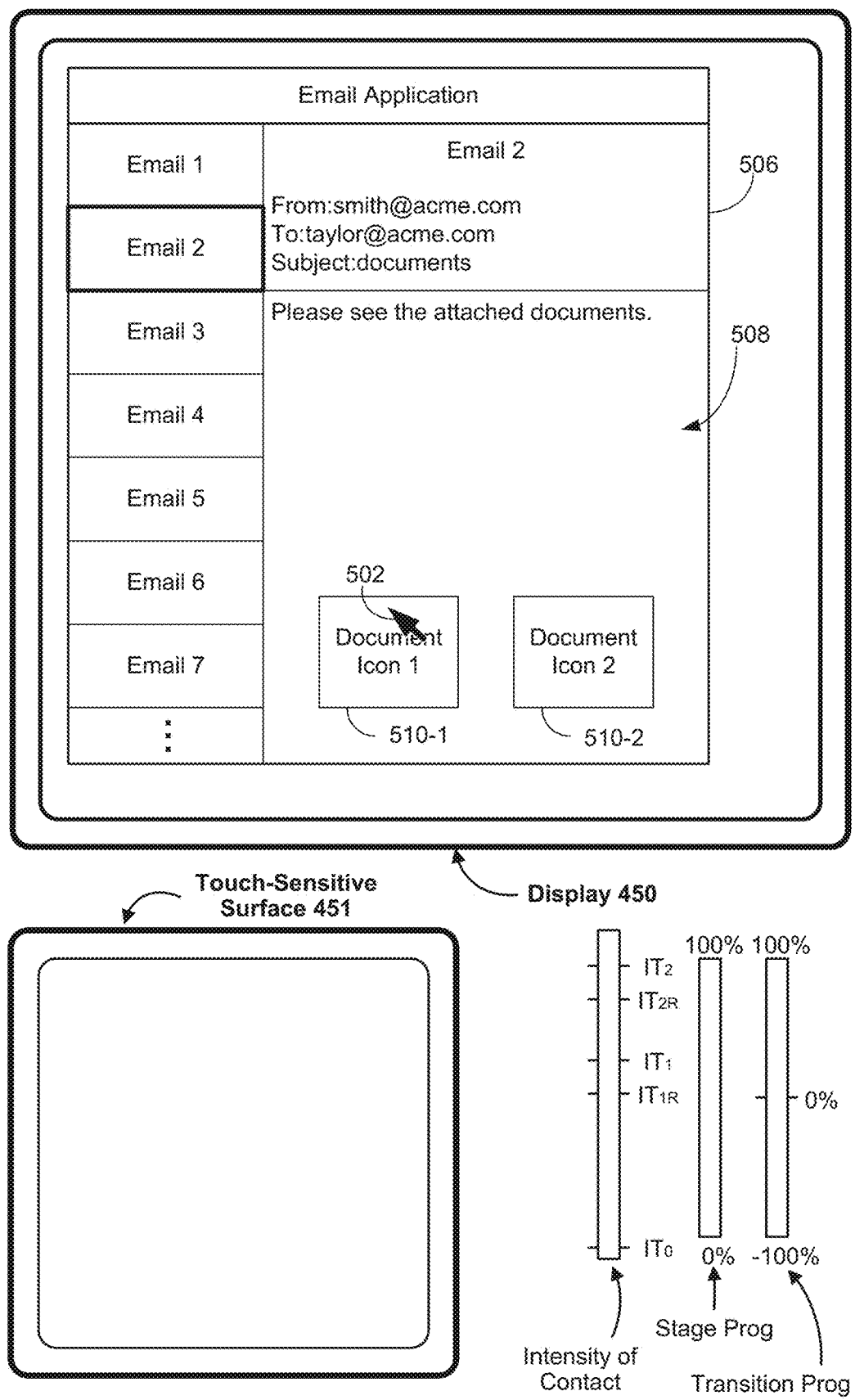
Figure 5Q:
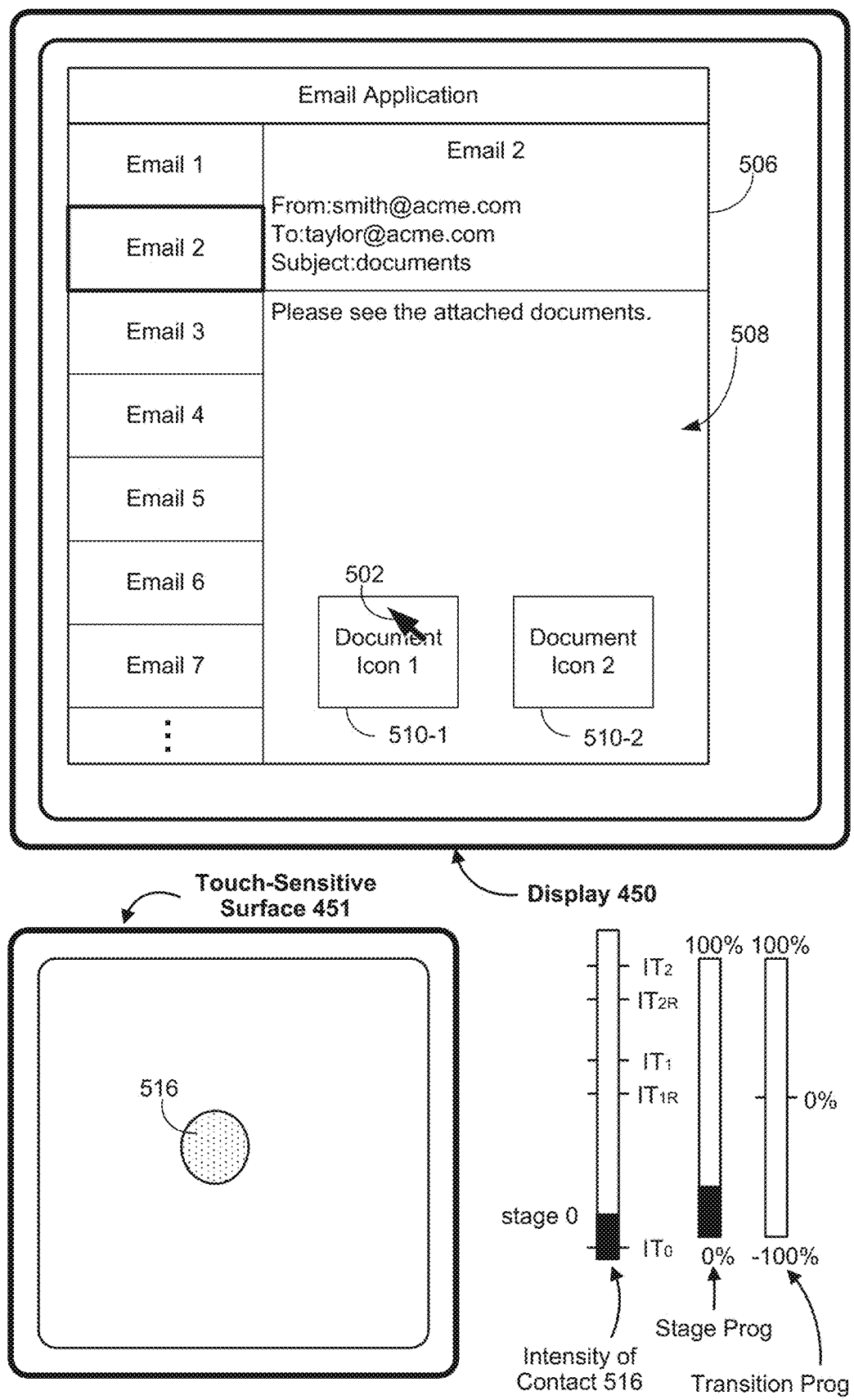
Figure 5R:
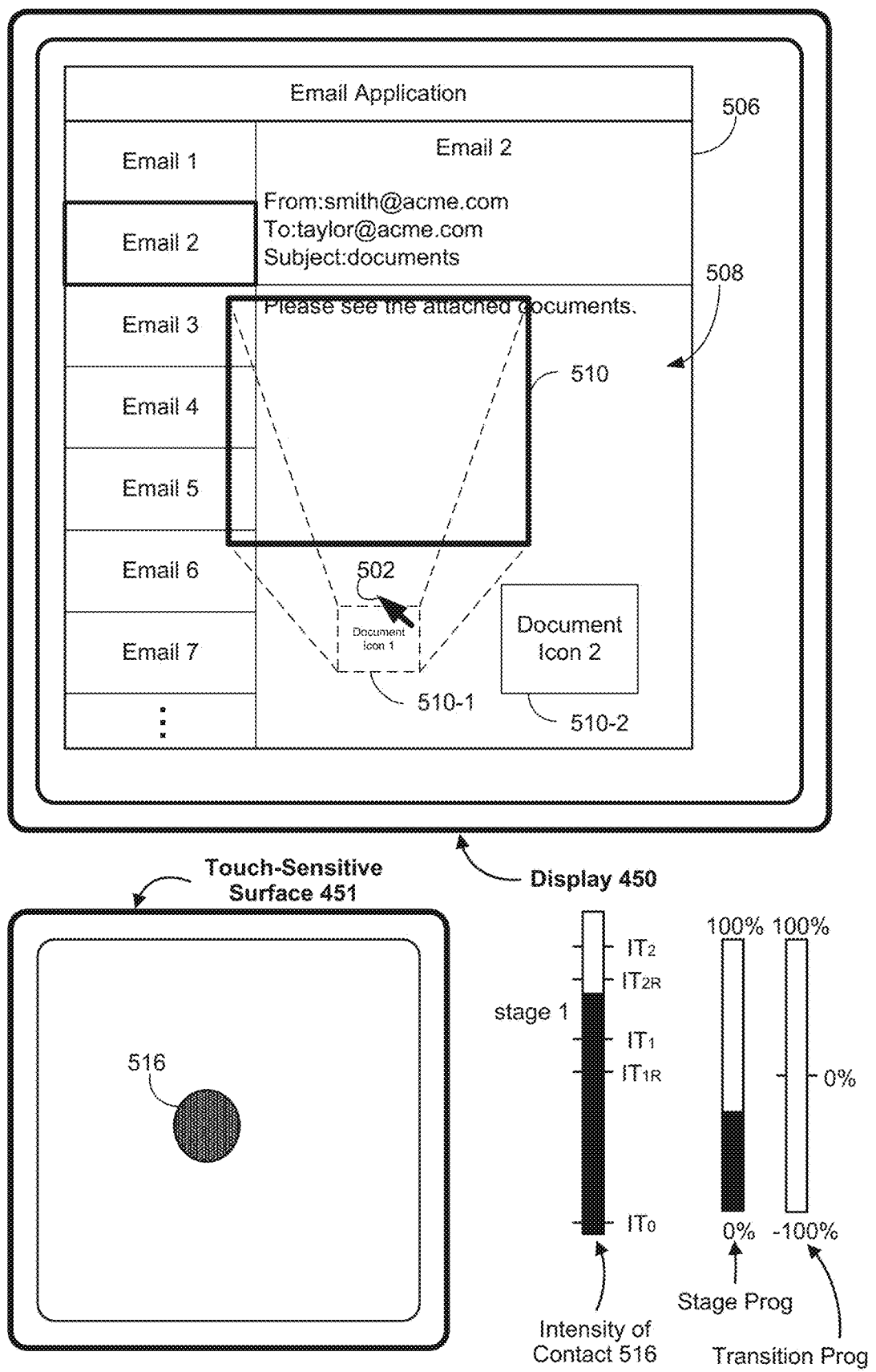
Figure 5S:
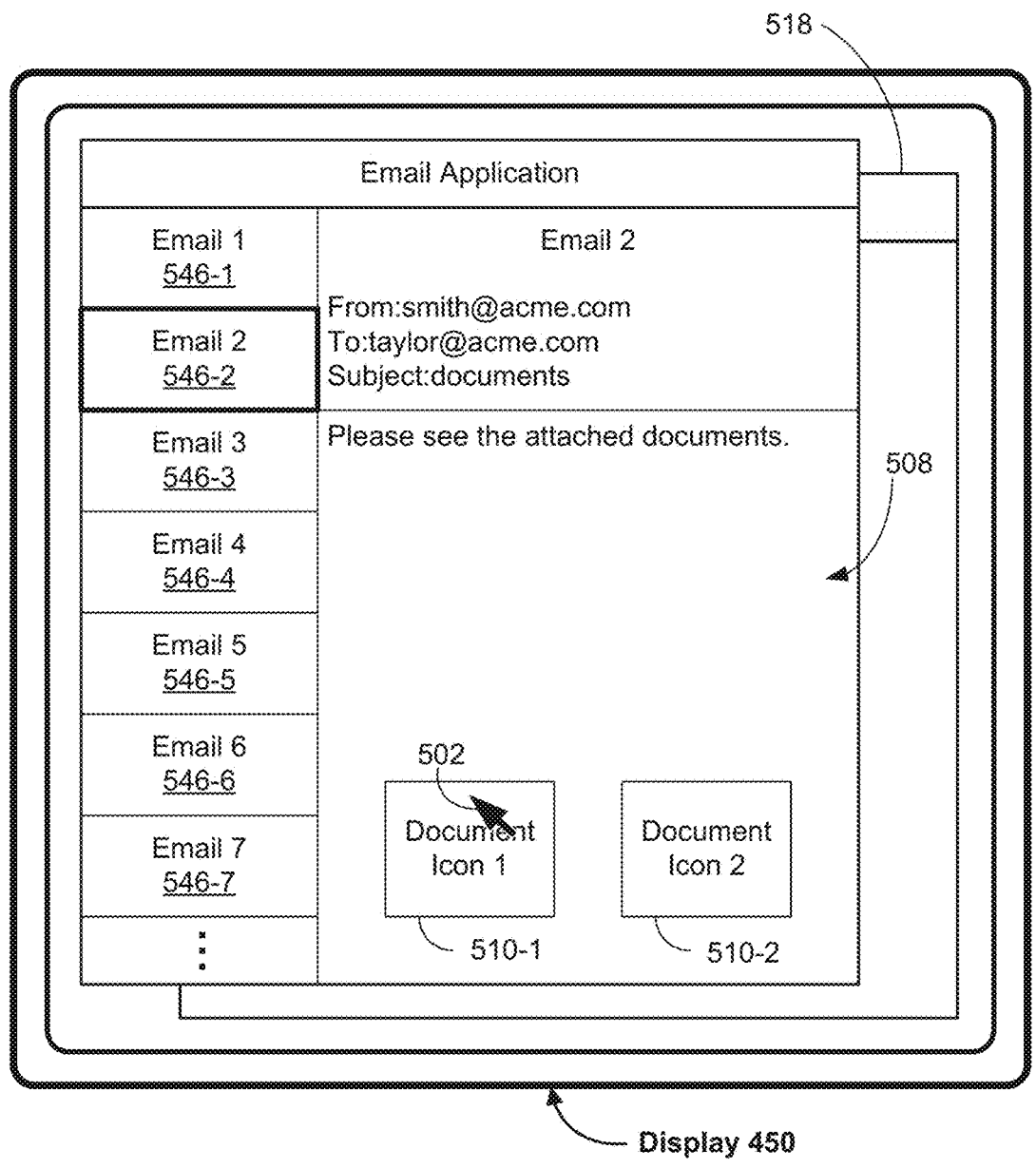
Figure 5T:
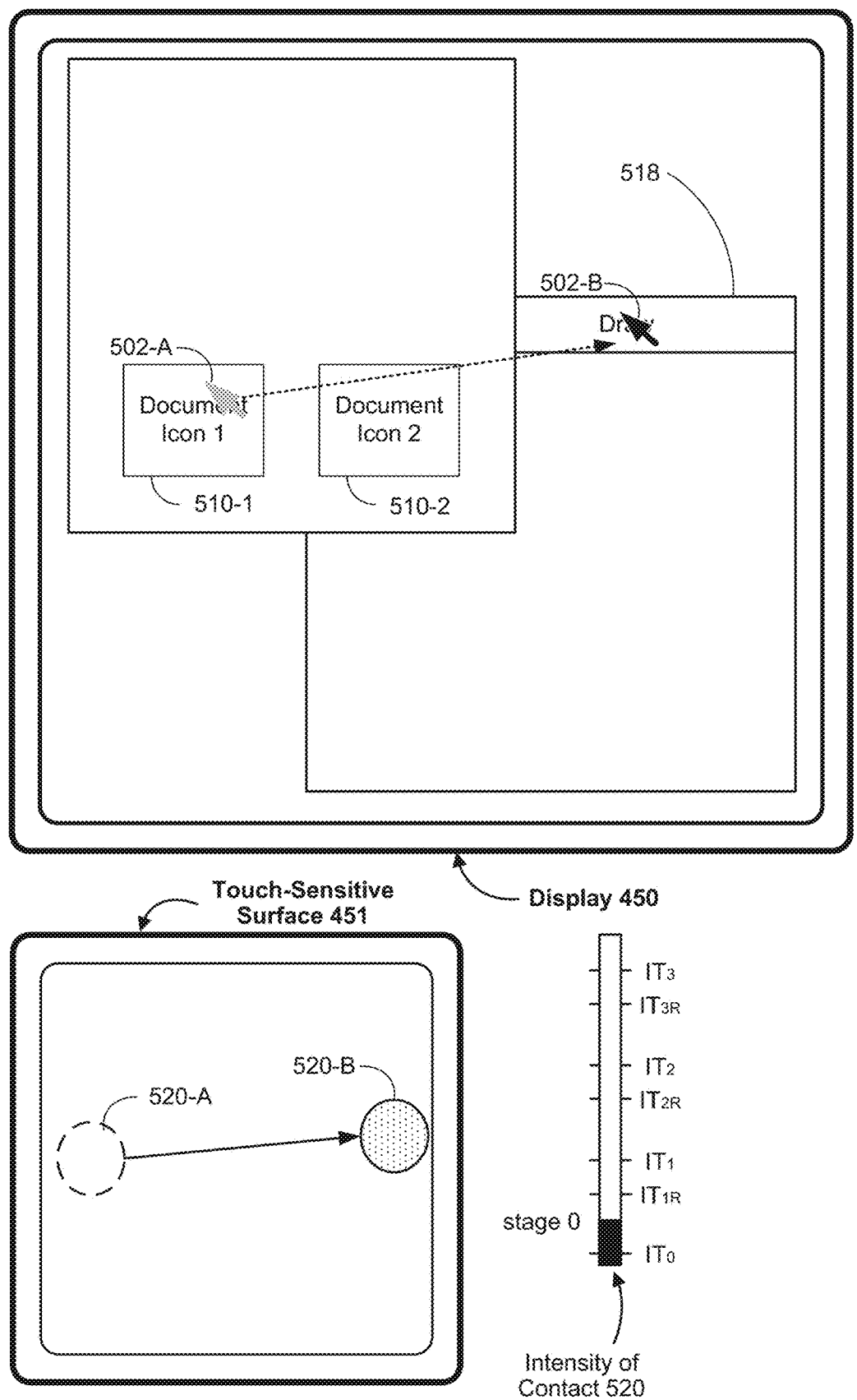

FIGS. 5A-5TT illustrate exemplary user interfaces for processing touch inputs in accordance with some embodiments. The user interfaces in these figures are used to illustrate the processes described below, including method 600 described below with respect to FIGS. 6A-6C, method 650 described below with respect to FIG. 6D, method 700 described below with respect to FIGS. 7A-7C, method 750 described below with respect to FIG. 7D, method 800 described below with respect to FIGS. 8A-8C, method 900 described below with respect to FIGS. 9A-9D, method 1000 described below with respect to FIGS. 10A-10D, method 1100 described below with respect to FIGS. 11A-11C, and method 1200 described below with respect to FIGS. 12A-12C. Although some of the examples which follow will be given with reference to inputs on a touch-sensitive surface 451 that is separate from the display 450, in some embodiments, the device detects inputs on a touch-screen display (where the touch-sensitive surface and the display are combined), as shown in FIG. 4A.

FIG. 5A illustrates window 506 of an application displayed on display 450 (e.g., display 340, touch screen 112) of a device (e.g., device 300, 100). The application with which window 506 is associated is an application that displays content, such as an email application. Content, such as document 508, is displayed in window 506. Document 508 optionally includes embedded content, attached content, and/or links to other content (for convenience, collectively referred to below as "embedded content"). The embedded content is, optionally, represented by document icons 510. For example, document 508 includes document icons 510-1 and 510-2, each of which corresponds to respective embedded content (e.g., a document) embedded in document 508. The respective documents corresponding to icons 510-1 and 510-2 are associated with respective applications. For example, icon 510-1 optionally corresponds to a presentation document, which is associated with a presentation application. The document associated with an icon 510 is, optionally, a word processing document, a spreadsheet, a presentation, a drawing, a graphic or image, an audio file, a video file, a text document, or a Portable Document Format document (sometimes referred to as a PDF).

Cursor 502 is also displayed on display 450. Cursor 502 is an example of a focus selector. A user may move cursor 502 on display 450 (e.g., using touch-sensitive surface 451 of the device) to bring focus to an element displayed on display 450 (e.g., a user interface object, an icon, a link, etc.) by moving a contact on touch-sensitive surface 451. FIG. 5A shows movement of contact 504 down and to the left on touch-sensitive surface 451 that causes the device to move cursor 502 down and to the left on display 450.

FIG. 5A also shows that intensity of contact 504 is below a first intensity threshold (e.g., "$IT_1$"). In some embodiments, contact 504 is deemed to be in stage 0 based on a determination that the intensity of contact 504 is below the first intensity threshold. A stage progress value indicates a normalized intensity of contact 504, where an intensity that corresponds to the first intensity threshold is deemed to correspond to 100% (or 1) stage progress value for stage 0, and an intensity that corresponds to a base intensity threshold or a detection intensity threshold (e.g., "$IT_0$") is deemed to correspond to 0% (or 0) stage progress value for stage 0. When the intensity of contact 504 increases from a value below the first intensity threshold and approaches the first intensity threshold, the stage progress value increases toward 100%.

When the intensity of contact 504 increases from an intensity below the first intensity threshold to an intensity above the first intensity threshold, the device expands icon 510-1 to show an animation of converting icon 510-1 into preview interface 512 (FIG. 5D). In accordance with a determination that the intensity of contact 504 satisfies (e.g., is above) the first intensity threshold, contact 504 is deemed to be in stage 1. The stage progress value is updated for stage 1. In some embodiments, an intensity that corresponds to the first intensity threshold is deemed to correspond to 0% (or 0) stage progress value for stage 1, and an intensity that corresponds to a second intensity threshold (e.g., "$IT_2$") is deemed to correspond to 100% (or 1) stage progress value for stage 1.

FIG. 5B shows that, in response to the detection of increase in intensity of contact 504 above the first intensity threshold, the device shows the animation of converting icon 510-1 into preview interface 512 (FIG. 5D). In some embodiments, the stage progress value of contact 504 is used to initiate the animation (e.g., the animation is initiated in response to determining that the stage progress value of contact 504 satisfies predefined criteria). In some embodiments, the transition progress value of contact 504 is used to initiate the animation (e.g., the animation is initiated in response to determining that the transition progress value of contact 504 satisfies predefined criteria) (not shown).

FIG. 5C shows that, in response to the detection of further increase in intensity of contact 504, the device shows a further expanded icon 510. Contact 504 is still deemed to be in stage 1, and the stage progress value has increased further.

FIG. 5C also shows that a transition progress value has increased from 0%. The transition progress value indicates that contact 504 is within a predefined intensity range from an intensity threshold (e.g., the second intensity threshold). In some cases, the transition progress value also indicates how much additional intensity is required for a stage transition (e.g., from stage 1 to stage 2) in normalized intensity. In some embodiments, the intensity range is defined by a transition range intensity threshold (also called herein a transition intensity threshold) that indicates one end of the intensity range and an activation intensity threshold that indicates an intensity at which a stage transition occurs. In FIG. 5C, the transition intensity threshold for a transition from stage 1 to stage 2 is identical to a release intensity threshold "$IT_{2R}$" for stage 2. However, the transition intensity threshold need not be identical to a release intensity threshold.

FIG. 5D shows that the intensity of contact 504 has increased above the second intensity threshold (e.g., "$IT_2$"). In accordance with a determination that the intensity of contact 504 satisfies (e.g., is above) the second intensity threshold, contact 504 is deemed to be in stage 2. In response, preview interface 512 is displayed. The stage progress value for contact 504 is updated for stage 2. In some embodiments, an intensity that corresponds to the second intensity threshold is deemed to correspond to 0% (or 0) stage progress value for stage 2, and an intensity that corresponds to a third intensity threshold (e.g., "$IT_3$") is deemed to correspond to 100% (or 1) stage progress value for stage 2.

FIG. 5E shows further increase in the intensity of contact 504. Contact 504 has not satisfied the third intensity threshold, and still remains in stage 2. The stage progress value and the transition progress value are increased.

FIG. 5F shows that the intensity of contact 504 has decreased below the second intensity threshold (e.g., "$IT_2$"), but remains above a release intensity threshold for stage 2 (e.g., "$IT_{2R}$"). In accordance with a determination that the intensity of contact 504 does not satisfy (e.g., remains above) the release intensity threshold for stage 2, contact 504 is deemed to remain in stage 2. Thus, preview interface 512 remains on display. In FIG. 5F, the stage progress value is 0% for stage 2, because the intensity of contact 504 is below the second intensity threshold. The transition progress value indicates that the intensity of contact 504 is within a predefined intensity range from the release intensity threshold for stage 2.

FIG. 5G shows that the intensity of contact 504 has further decreased below the release intensity threshold for stage 2. In accordance with a determination that the intensity of contact 504 satisfies (e.g., is below) the release intensity threshold for stage 2, contact 504 is deemed to be in stage 1. Preview interface 512 (FIG. 5F) ceased to be displayed and an animation that shows a transition from icon 510-1 to preview interface 512 is shown in accordance with the intensity of contact 504.

FIG. 5H shows that, in some embodiments, a release intensity threshold is identical to an activation intensity threshold (e.g., "$IT_1$"="$IT_{1R}$"). Thus, the release intensity threshold is not separately shown in FIG. 5H.

FIG. 5I shows that the intensity of contact 504 has significantly increased to satisfy the third intensity threshold (e.g., "$IT_3$"). In accordance with a determination that the intensity of contact 504 satisfies the third intensity threshold, contact 504 is deemed to be in stage 3. In response, preview interface 512 is enlarged to fill window 506.

FIG. 5J shows that intensity thresholds have been changed. For example, in some embodiments, the device determines that previously used intensity thresholds are too low for a user (e.g., the user tends to apply high intensity contacts frequently or is found to have difficulty applying low intensity contacts), and updates the intensity thresholds (e.g., increases at least one of the intensity thresholds and/or decreases at least one of the intensity thresholds). In some embodiments, a software application (e.g., a user interface application, such as an email application) determines that the intensity thresholds based on user interactions and/or internal operations (e.g., so as to avoid conflicts with other functions, such as accessibility). In some embodiments, the intensity thresholds are associated with a particular intensity model. Thus, the device switches from a first intensity model (e.g., "normal user" intensity model) to a second intensity model (e.g., "high intensity user" intensity model) that is distinct from the first intensity model to use different intensity thresholds.

In FIG. 5J, although the intensity of contact 504 has not changed from FIG. 5I, due to the change in the intensity thresholds, contact 504 is deemed to be in stage 2. Thus, preview interface 512 ceases to fill window 506 (e.g., preview interface 512 is reduced from the enlarged preview interface 512 shown in FIG. 5I).

FIG. 5K shows that the intensity of contact 504 has decreased from above the release intensity threshold for stage 2 ("$IT_{2R-2}$") to below the release intensity threshold for stage 2. In accordance with a determination that the intensity of contact 504 satisfies (e.g., is below) the release intensity threshold for stage 2, contact 504 is deemed to be in stage 1. In response, preview interface 512 is replaced with an animation showing a transition between preview interface 512 and icon 510-1.

FIG. 5L shows that the intensity of contact 504 has further decreased to below a previous release intensity threshold for stage 1 (e.g., "$IT_{1R}$") and above a current release intensity threshold for stage 1 (e.g., "$IT_{1R-2}$"). In accordance with a determination that the intensity of contact 504 does not satisfy (e.g., remains above) the current release intensity threshold for stage 1, contact 1 is deemed to be in stage 1. If the previous release intensity threshold was to be used, contact 504 would be deemed to be in stage 0 in accordance with a determination that the intensity of contact 504 satisfies the previous release intensity threshold for stage 1.

FIG. 5M shows that contact 504 ceases to be detected on touch-sensitive surface 451. In FIG. 5M, the intensity thresholds are reset so that previous intensity thresholds are used. For example, in some embodiments, changes to the intensity thresholds expire upon lift-off of a contact from touch-sensitive surface 451 (or alternatively the intensity of the contact falling below the detection intensity threshold $IT_0$).

FIGS. 5N-5O illustrate that subsequent contact 514 is detected on touch-sensitive surface 451, and contact 514 is processed in accordance with the intensity thresholds that have been reset.

FIGS. 5P-5R illustrate that the intensity thresholds are changed while no contact is detected on touch-sensitive surface 451 (or prior to detecting contact 516). FIGS. 5P-5R also illustrate that contact 516 is processed in accordance with the changed intensity thresholds.

In some embodiments, the intensity thresholds are predefined or preselected for respective regions. For example, in FIG. 5S, icon 510-1 is associated with a first intensity model that includes a first set of intensity thresholds, and an email icon (e.g., 546-1 through 546-7) is associated with a second intensity model that is distinct from the first intensity model and includes a second set of intensity thresholds. FIG. 5S also shows that at least a portion of a user interface 518 of a second software application (e.g., a drawing application) is also shown. In FIG. 5S, the user interface 518 of the second software application is associated with a third intensity model that is distinct from the first intensity model and the second intensity model and includes a third set of intensity threshold.

FIG. 5T shows that at least a portion of a user interface of a first software application (e.g., an email application) that includes icons 510-1 and 510-2 and at least a portion of a user interface 518 of a second software application (e.g., a drawing application) are concurrently displayed.

FIG. 5T also illustrates a movement of contact 520 from a first location 520-A on touch-sensitive surface 451 across touch-sensitive surface 451 (e.g., while remaining contact on touch-sensitive surface 451) to a second location 520-B on touch-sensitive surface 451. FIG. 5T further illustrate a corresponding movement of cursor 502 from a first location 502-A on display 450 to a second location 502-B on display 450. In FIG. 5T, the first location 520-A on touch-sensitive surface 451 corresponds to the first location 502-A on display 450 and the second location 520-B on touch-sensitive surface 451 corresponds to the second location 502-B on display 450.

Figure 5U:
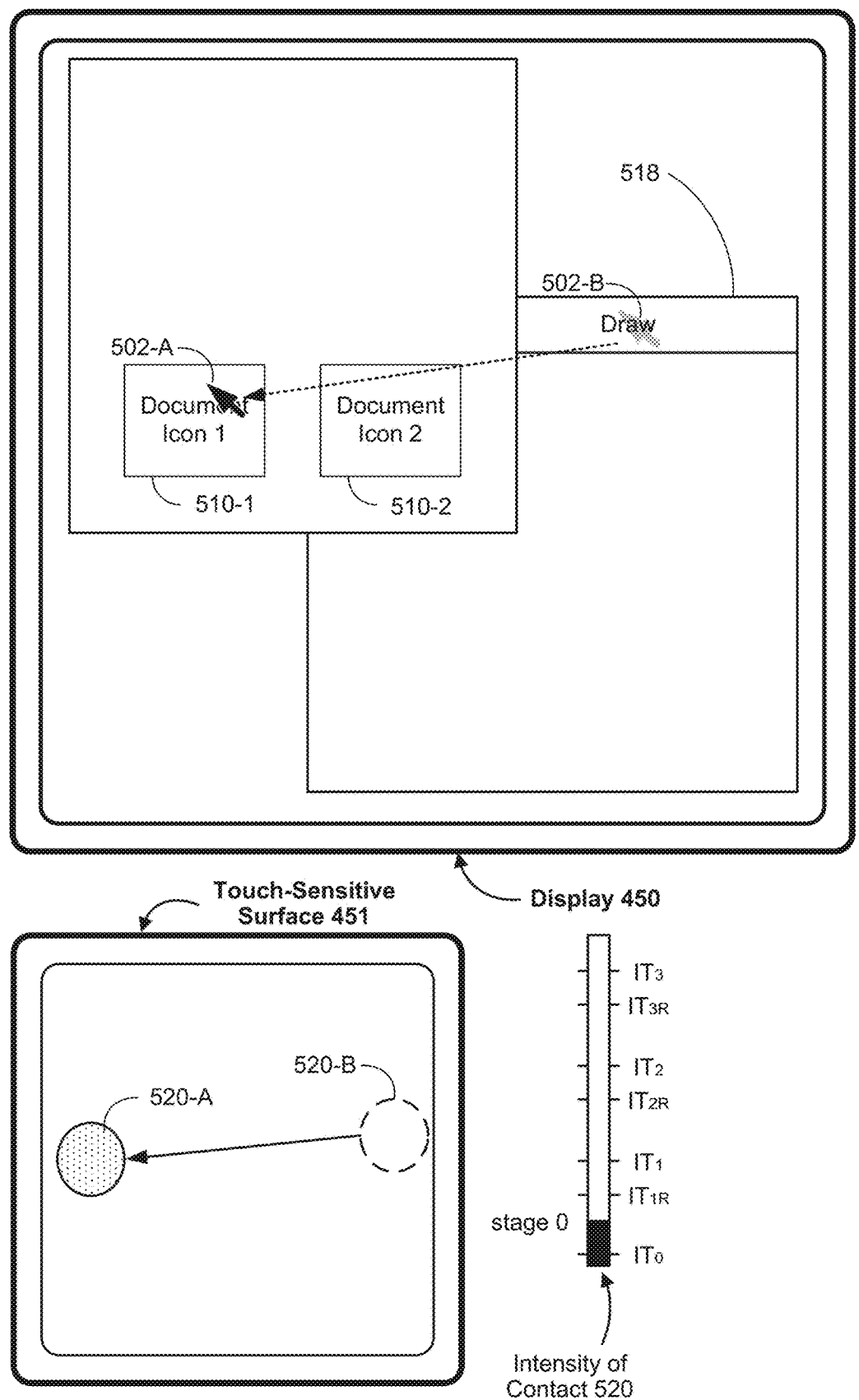

FIG. 5U illustrates a movement of contact 520 from the second location 520-B on touch-sensitive surface 451 across touch-sensitive surface 451 to the first location 520-A on touch-sensitive surface 451 and a corresponding movement of cursor 502 from the second location 502-B on display 450 to the first location 502-A on display 450.

Figure 5V:
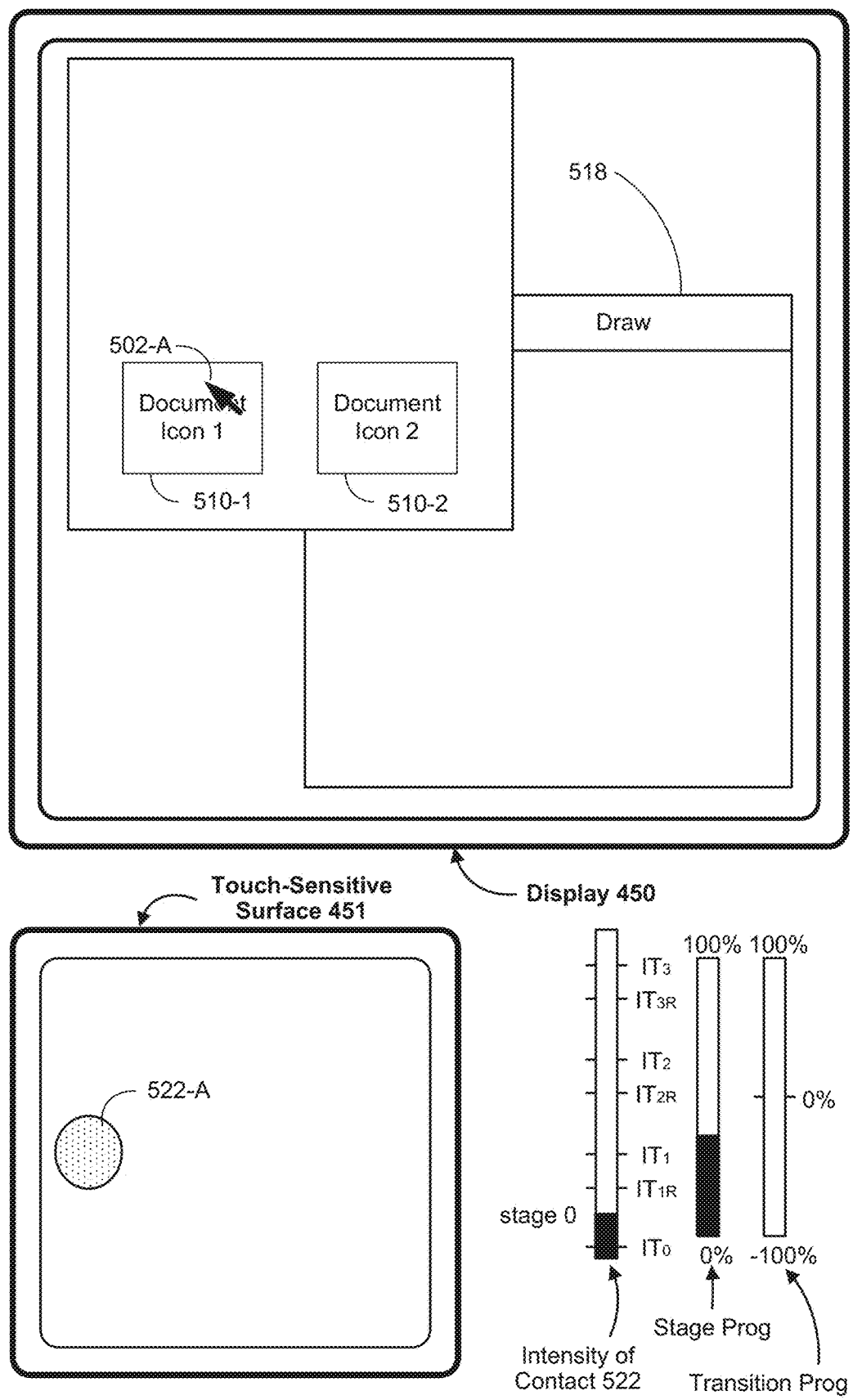
Figure 5W:
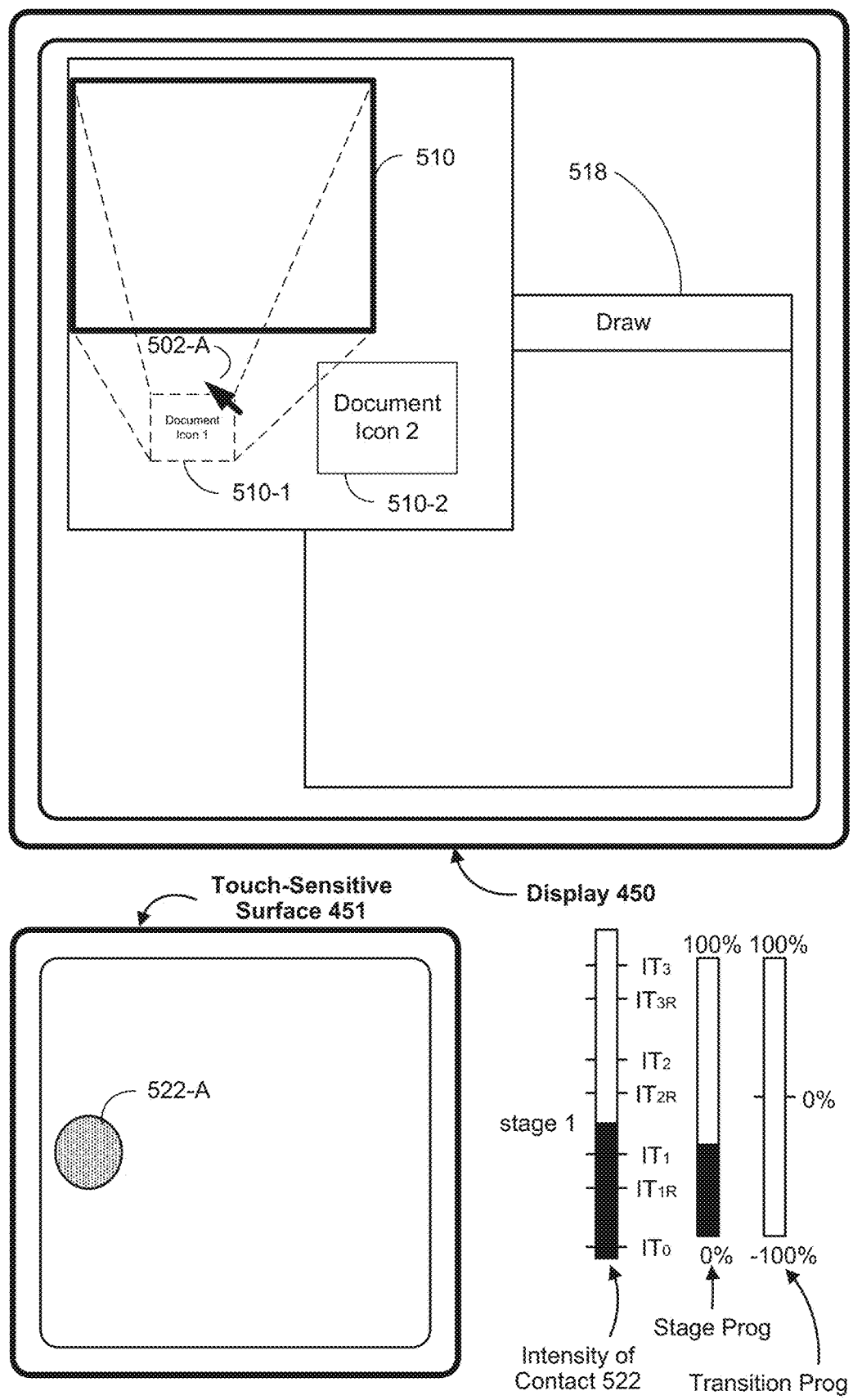

FIGS. 5V-5W show that subsequent contact 522 is detected at the first location 522-A and intensity of contact 522 is increased. In FIGS. 5V-5W, contact 522 is processed in accordance with a first intensity model that includes a first set of intensity thresholds (e.g., an intensity model associated with icon 510-1 or the first location 502-A on the display).

Figure 5X:
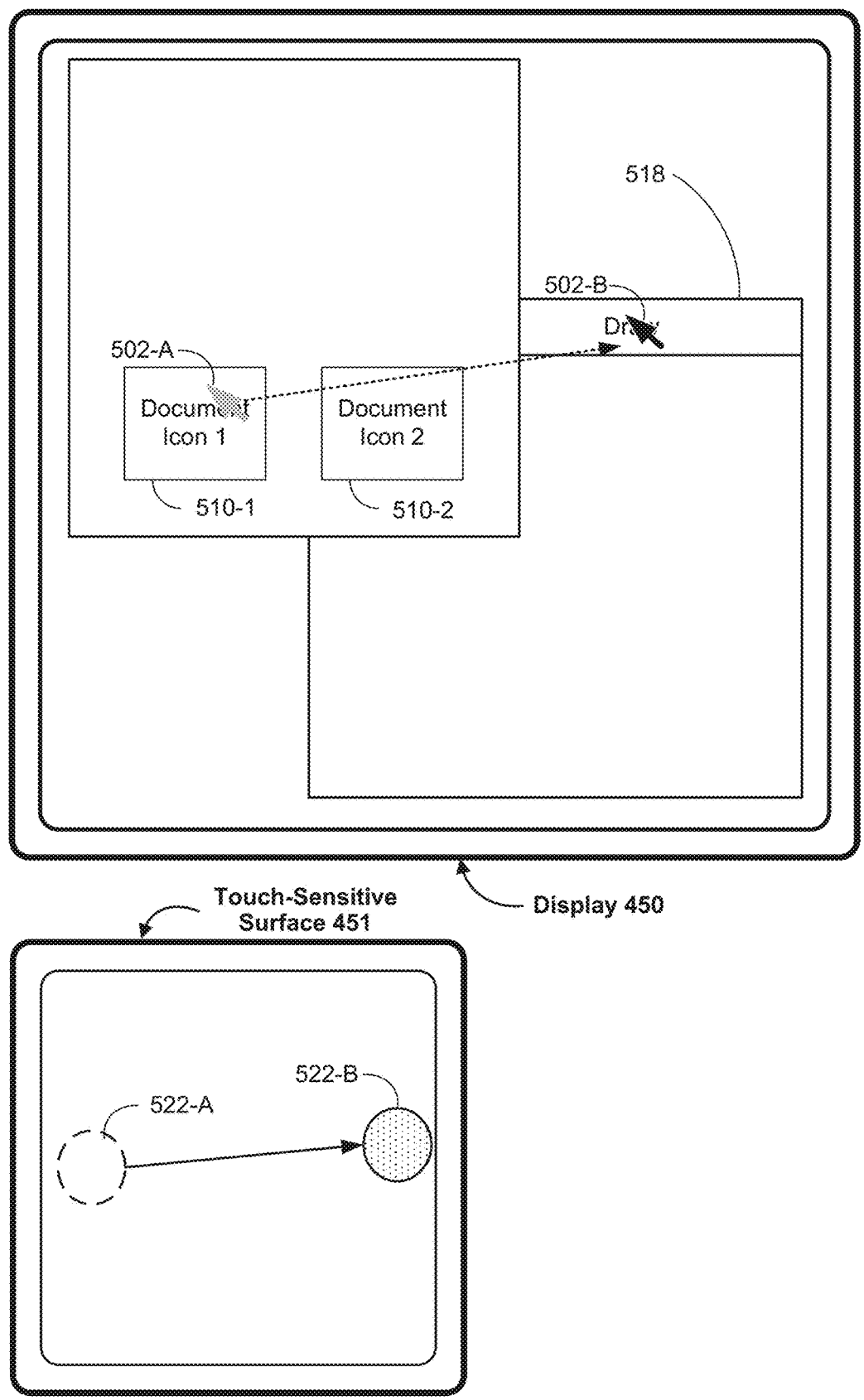

FIG. 5X shows that the intensity of contact 522 is reduced (e.g., below any activation intensity threshold for the first location 502-A on the display) and moved across touch-sensitive surface 451 to the second location 522-B on touch-sensitive surface 451. FIG. 5X also shows a corresponding movement of cursor 502 from the first location 502-A on display 451 to the second location 502-B on display 450.

Figure 5Y:
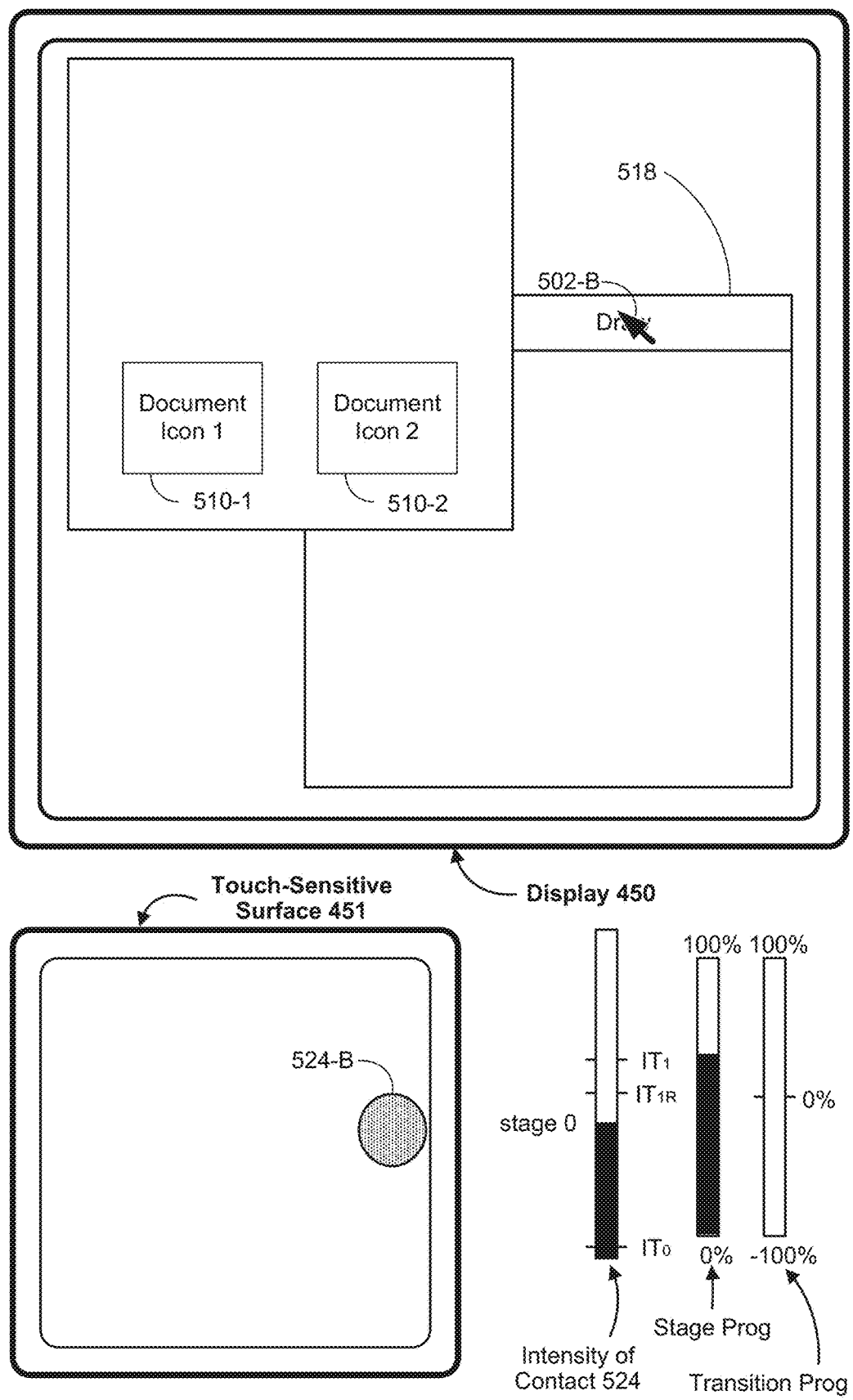
Figure 5Z:
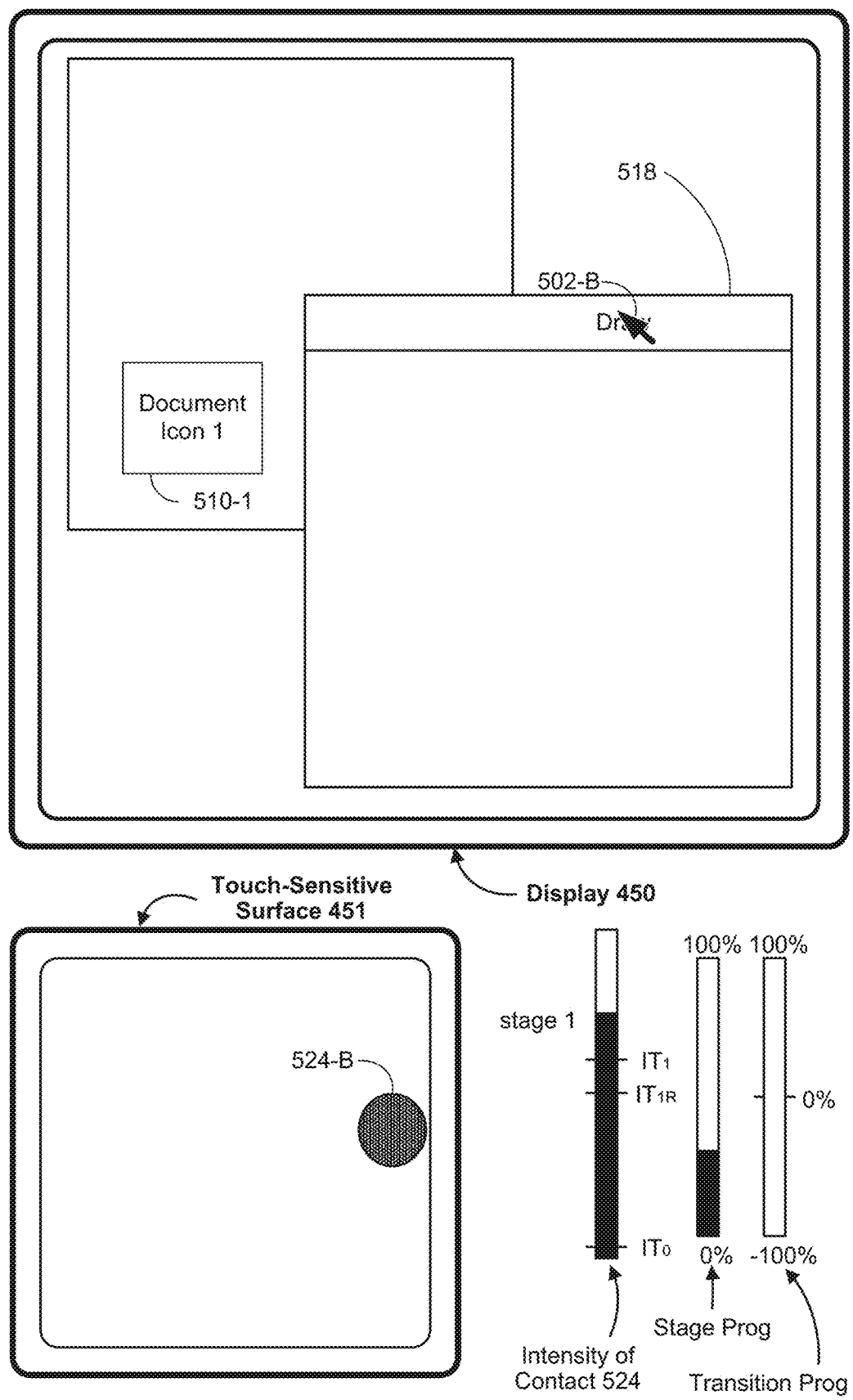
Figure 5A:
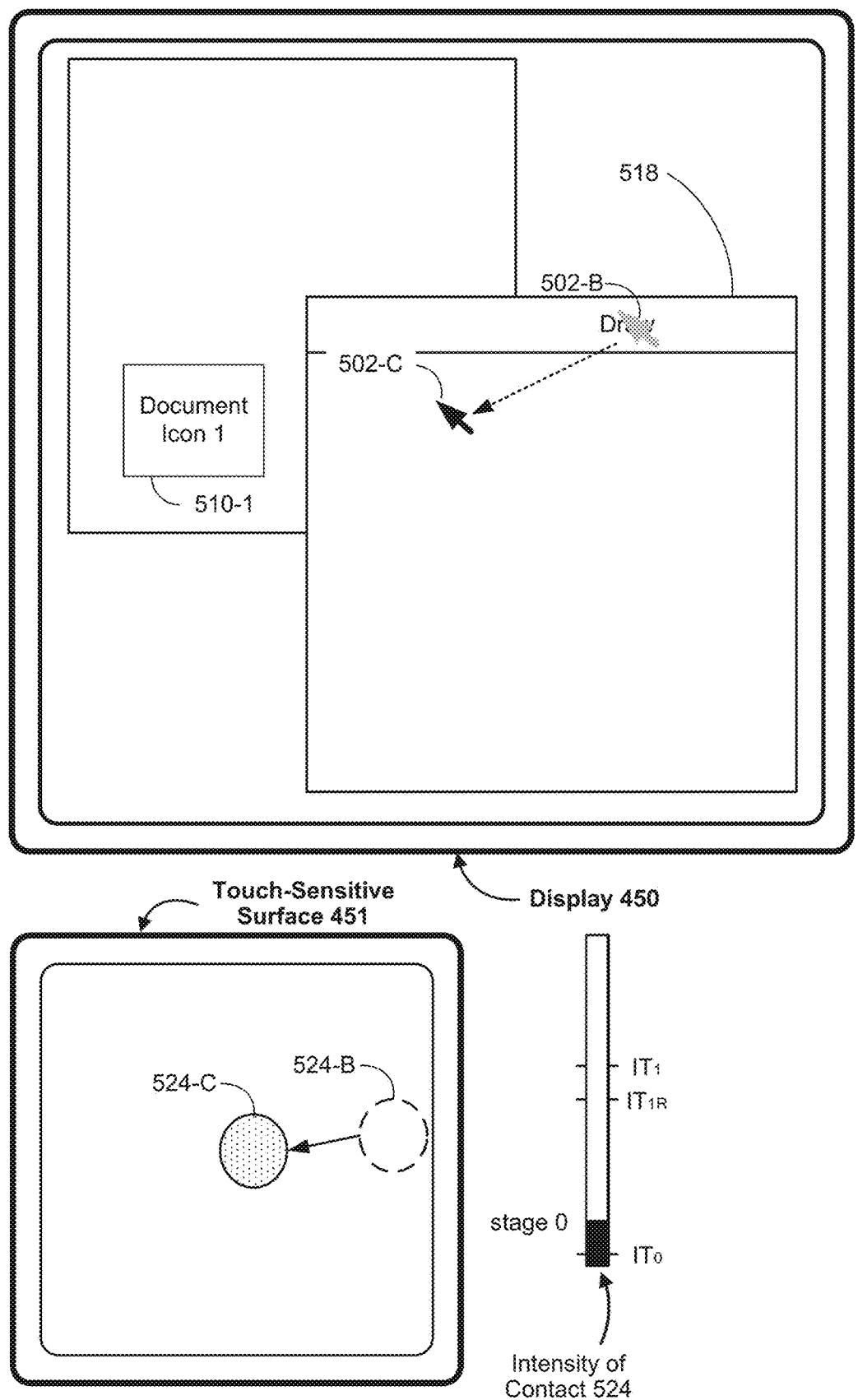
Figure 5B:
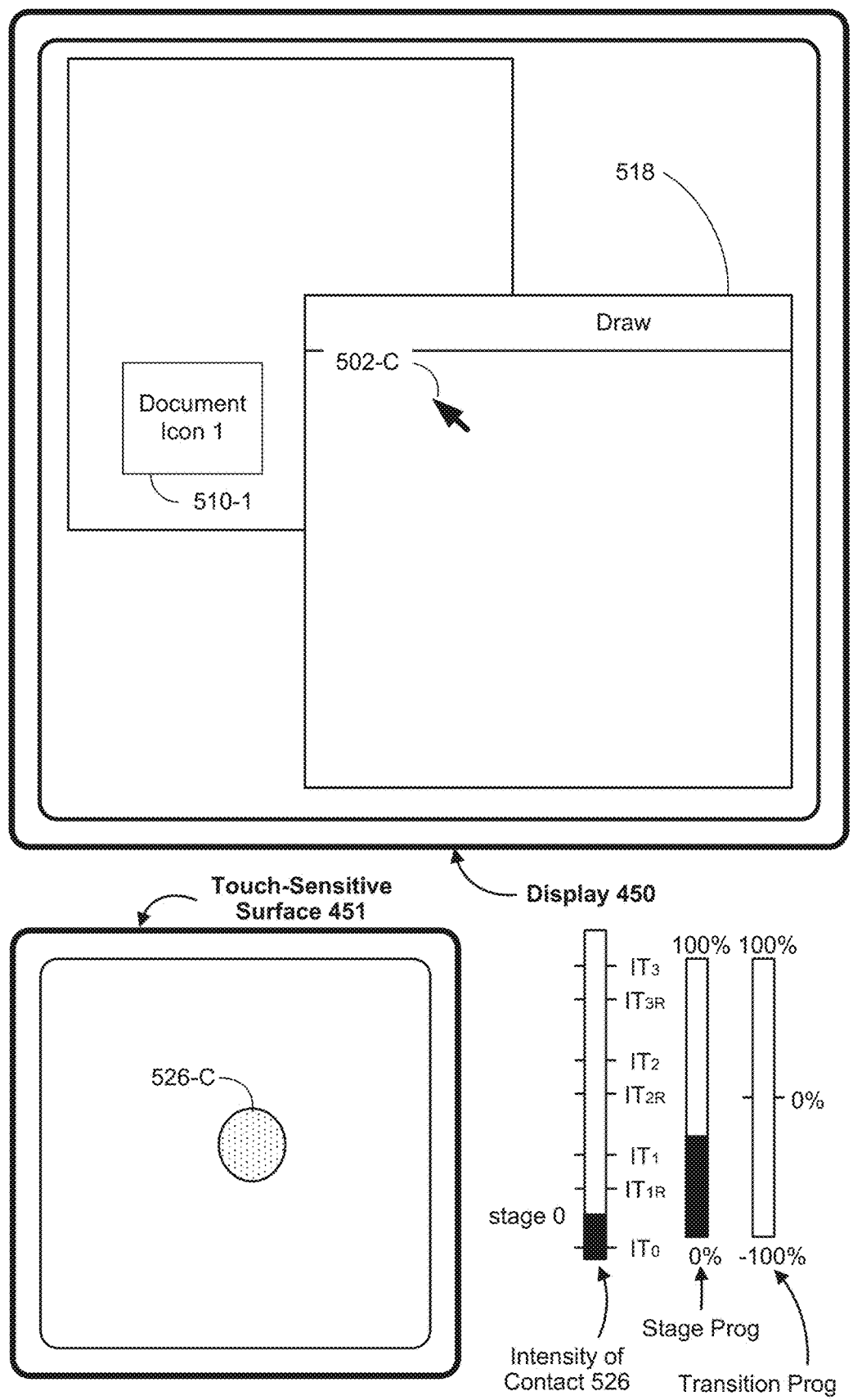
Figure 5C:
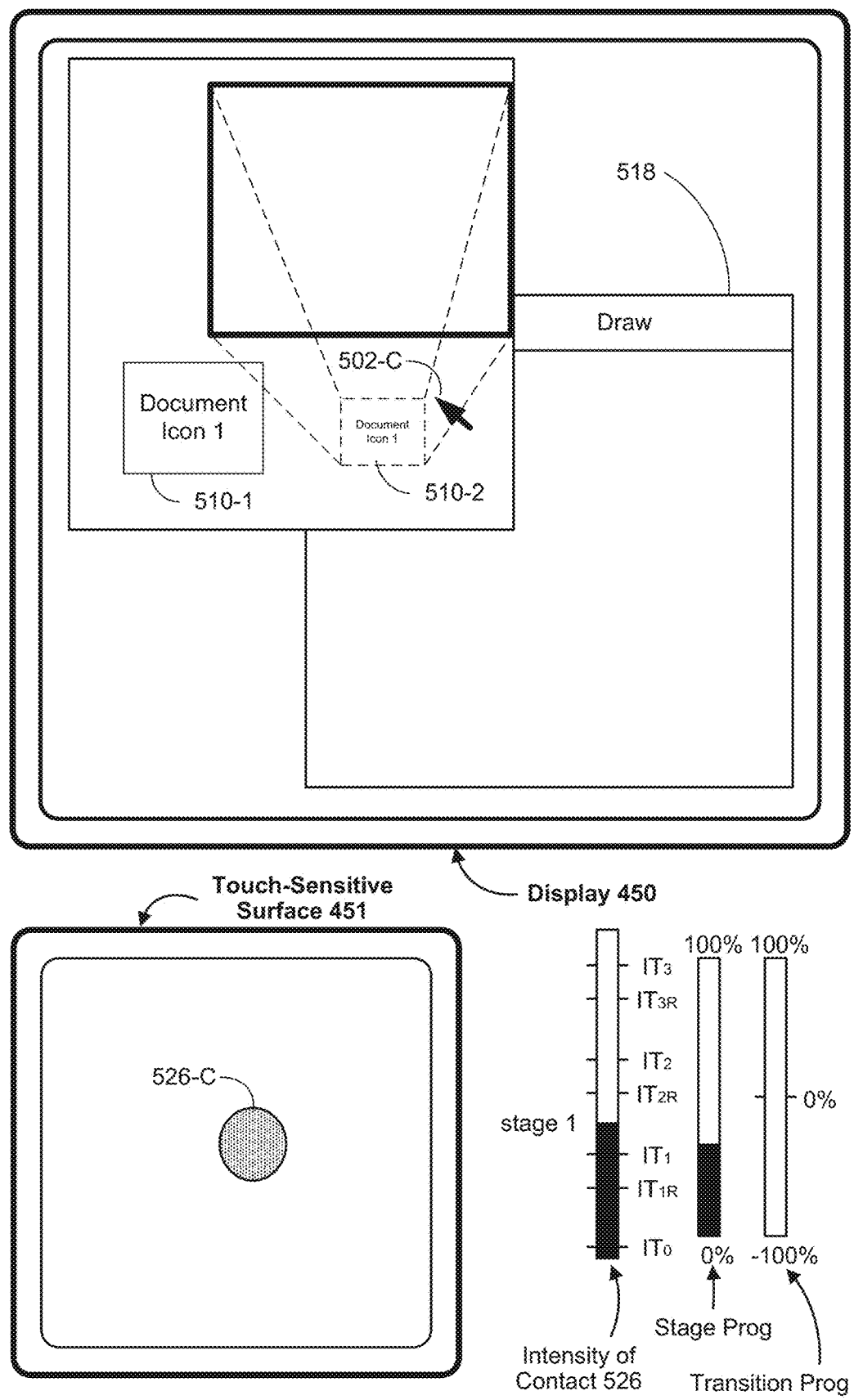
Figure 5D:
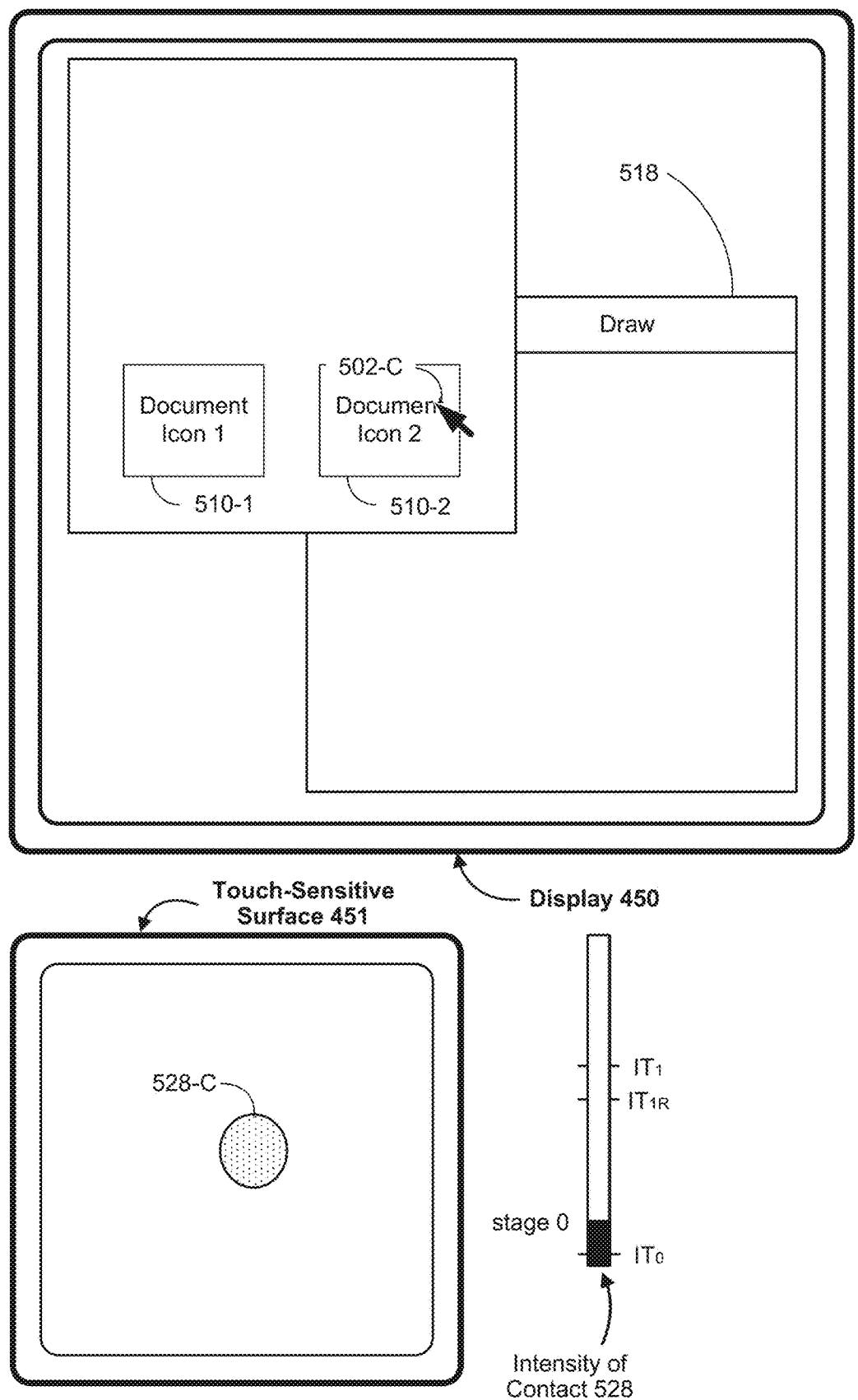
Figure 5E:
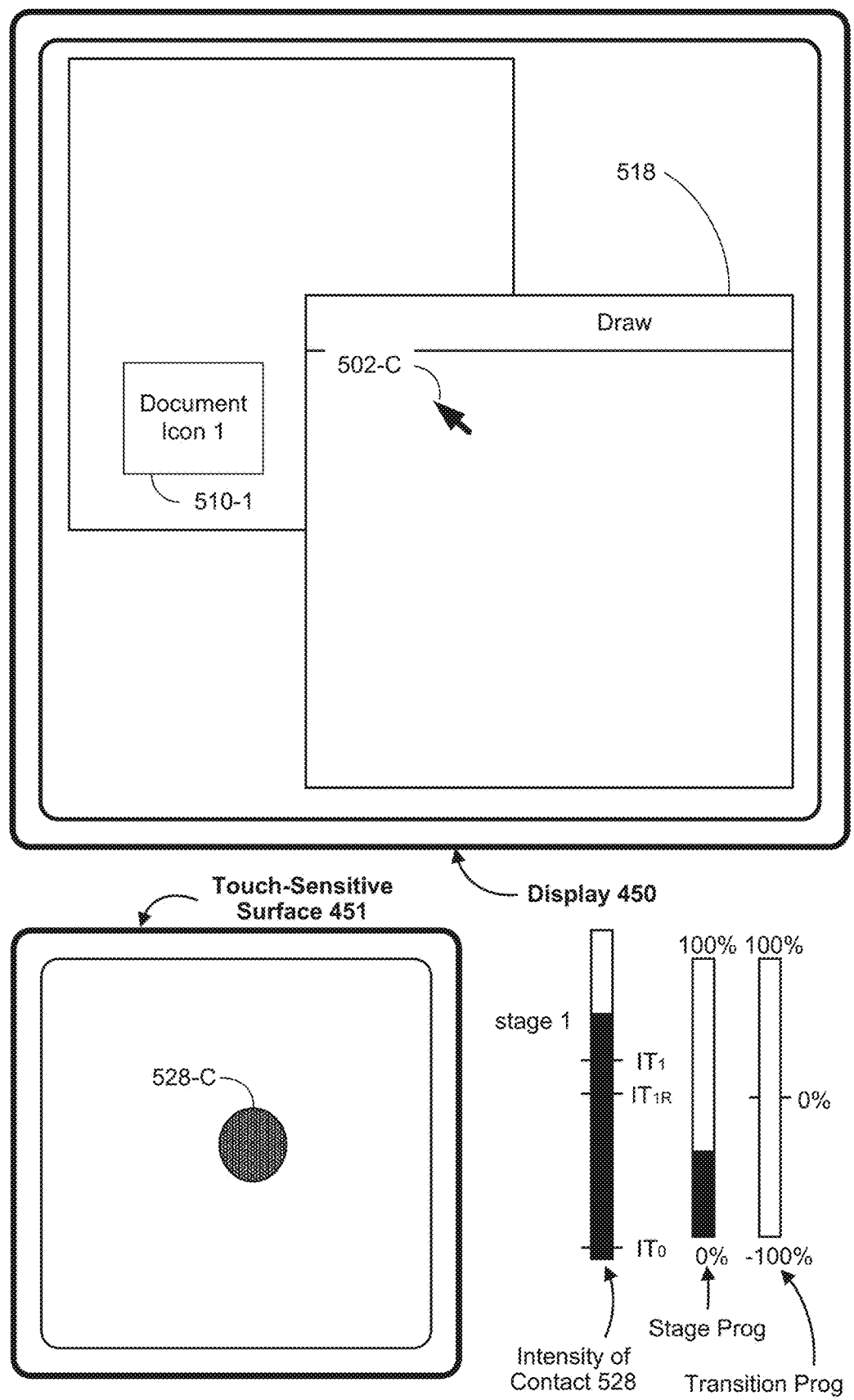
Figure 5F:
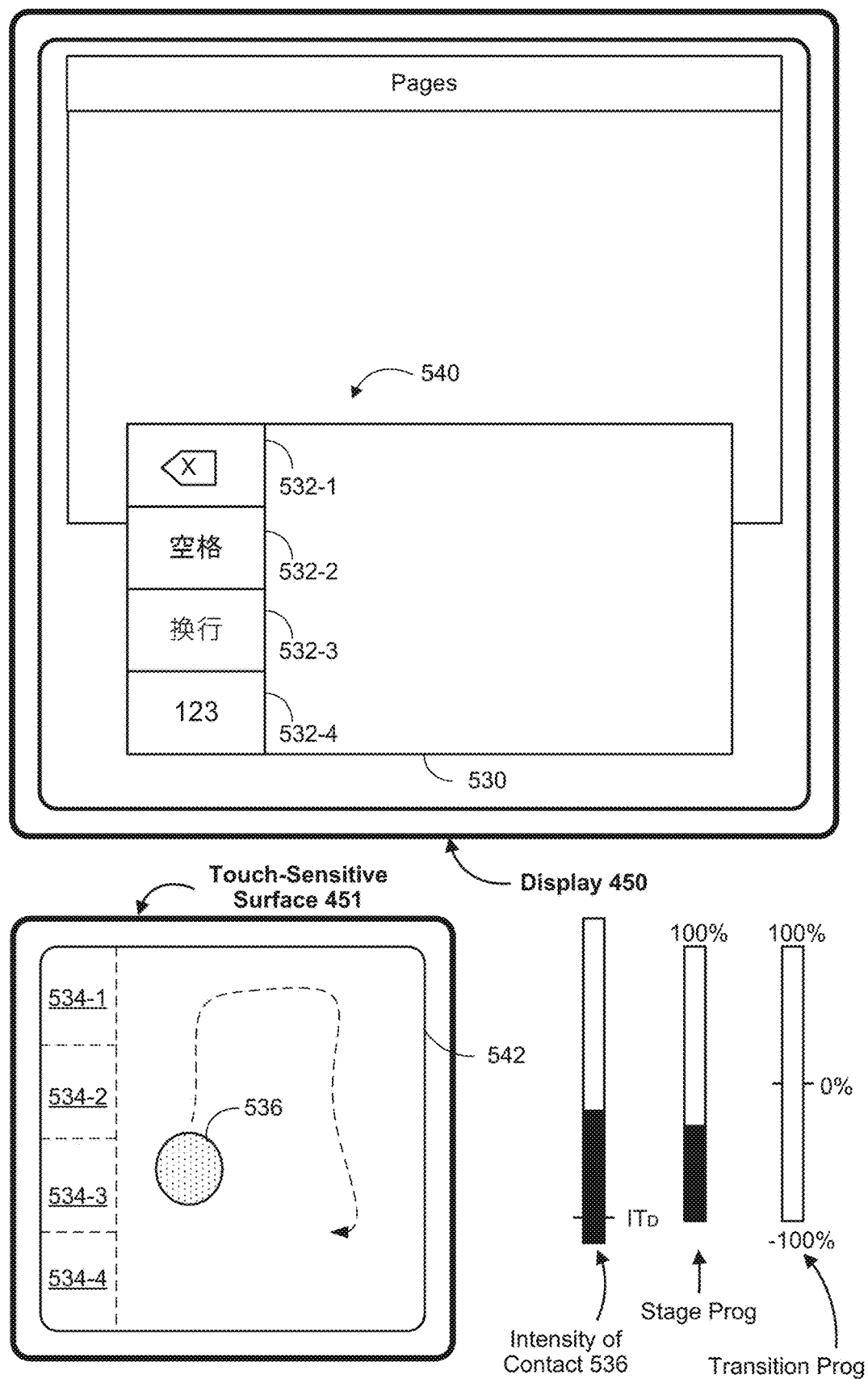
Figure 5G:
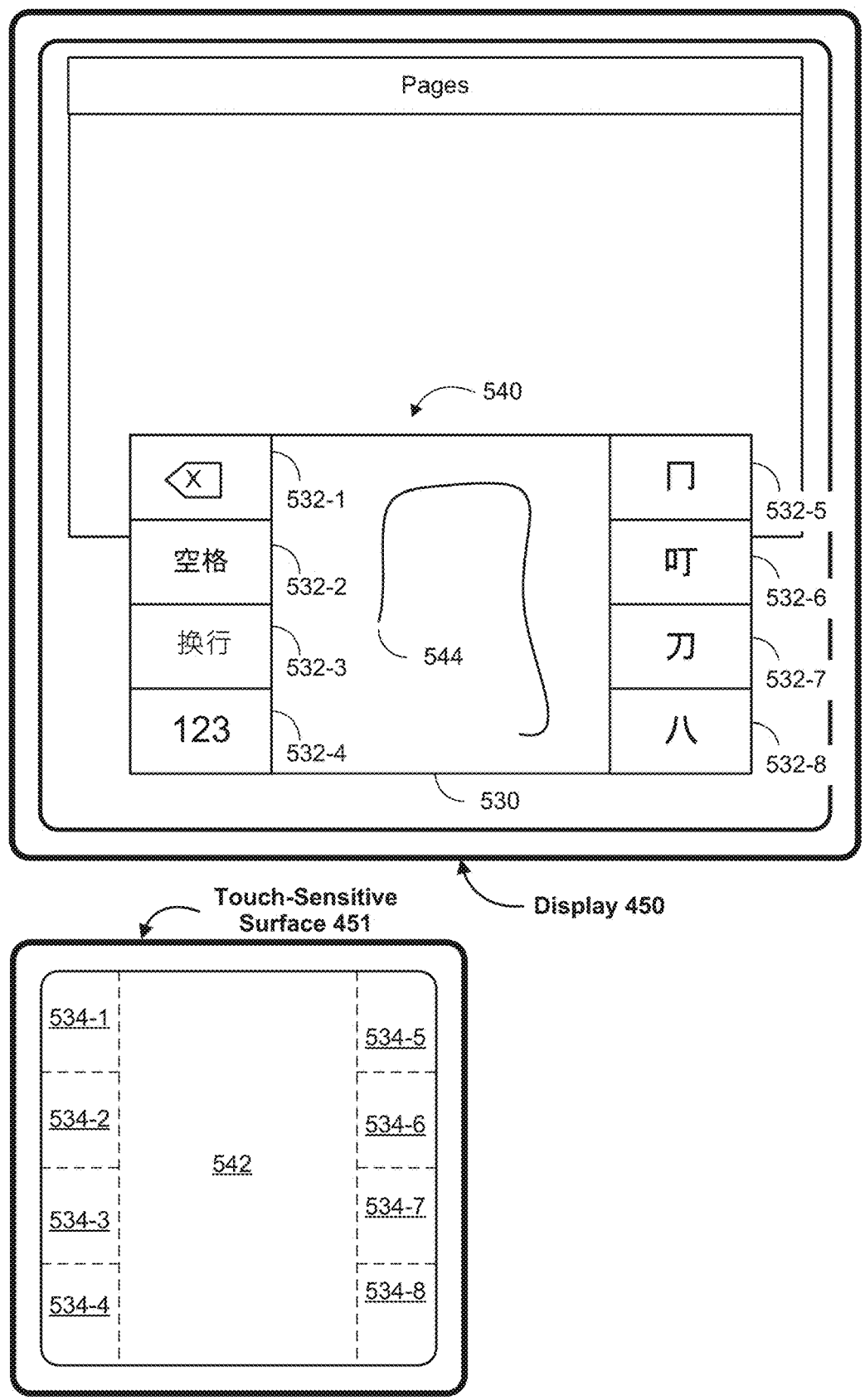
Figure 5H:
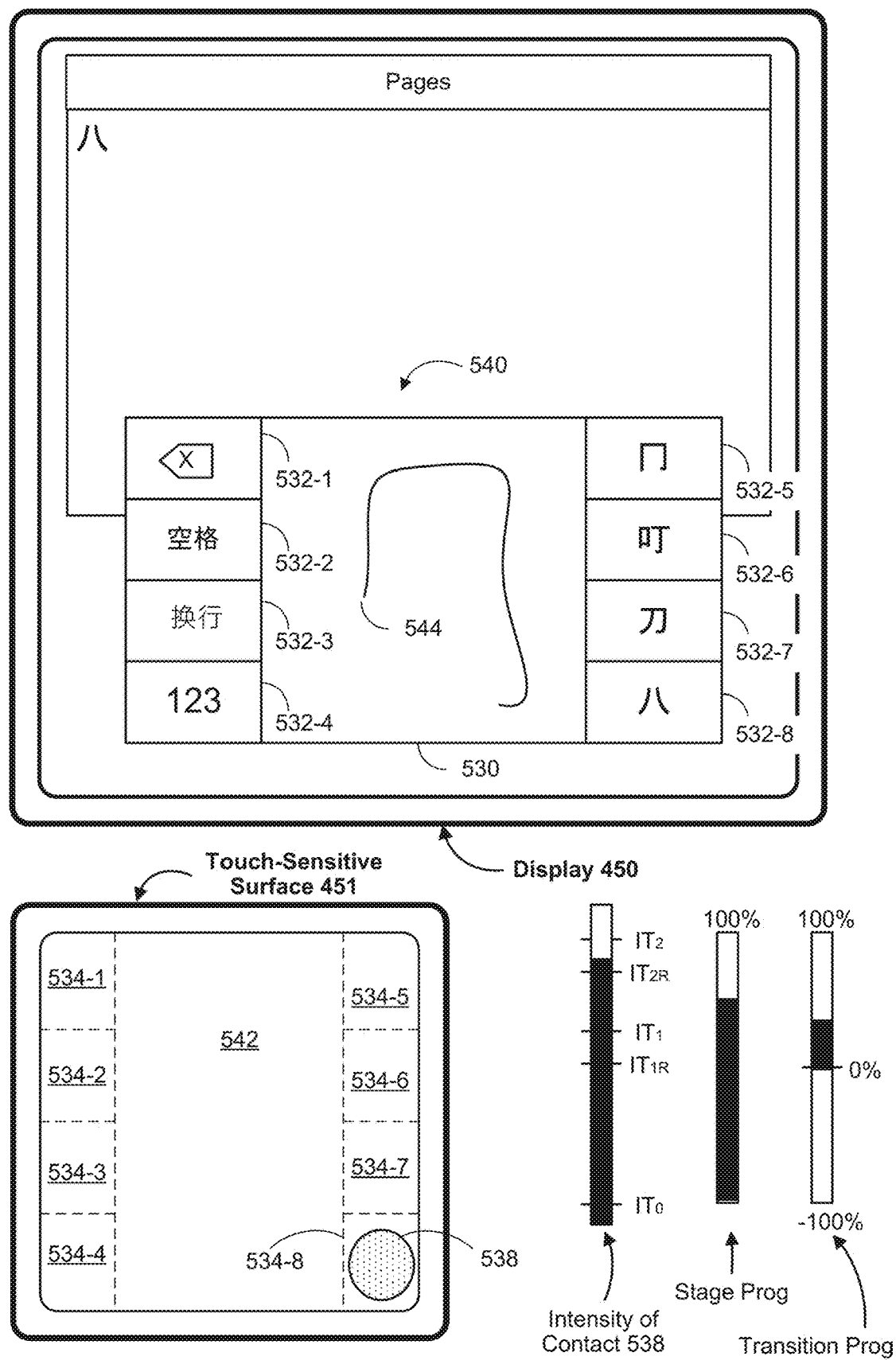
Figure 5I:
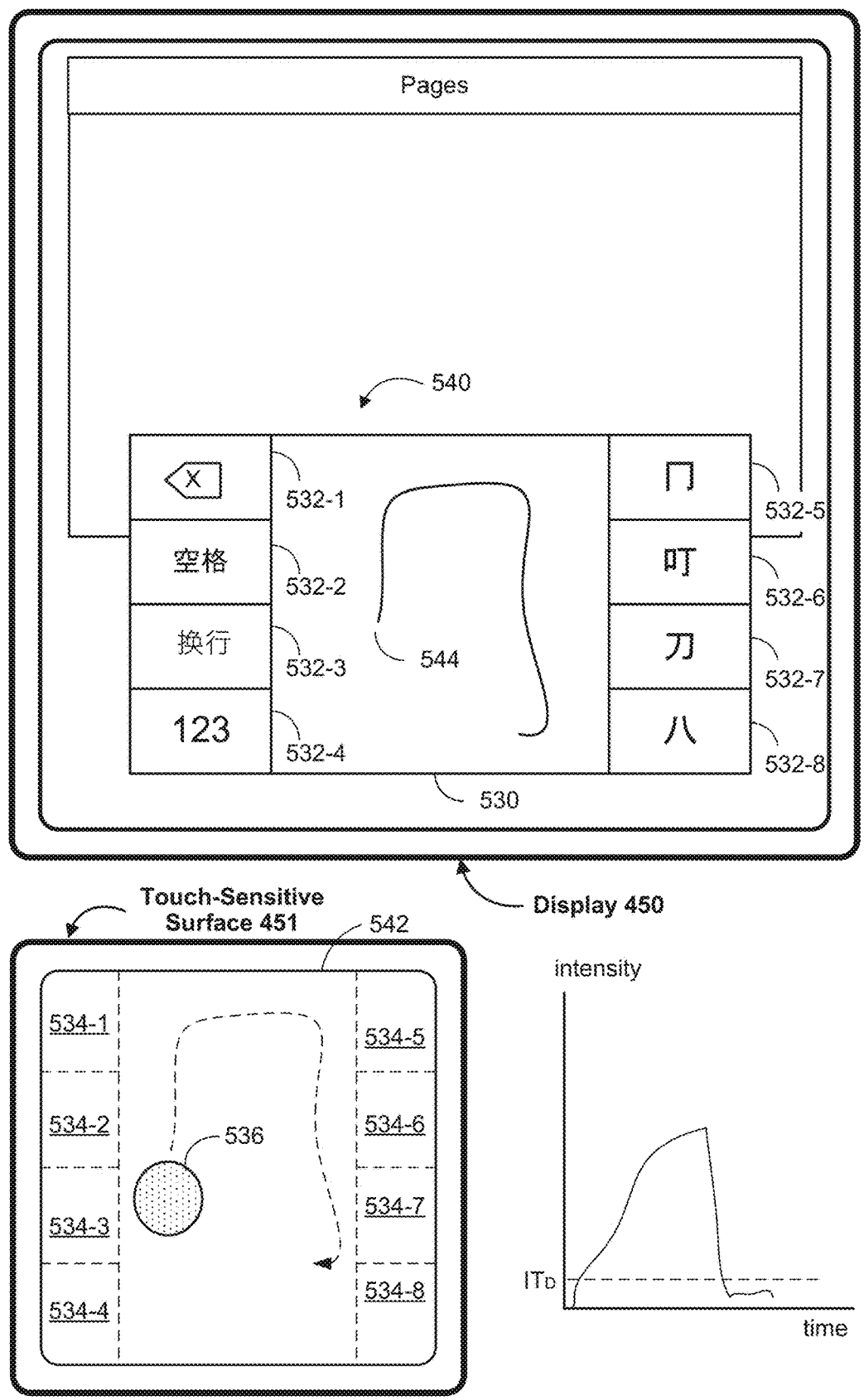
Figure 5J:
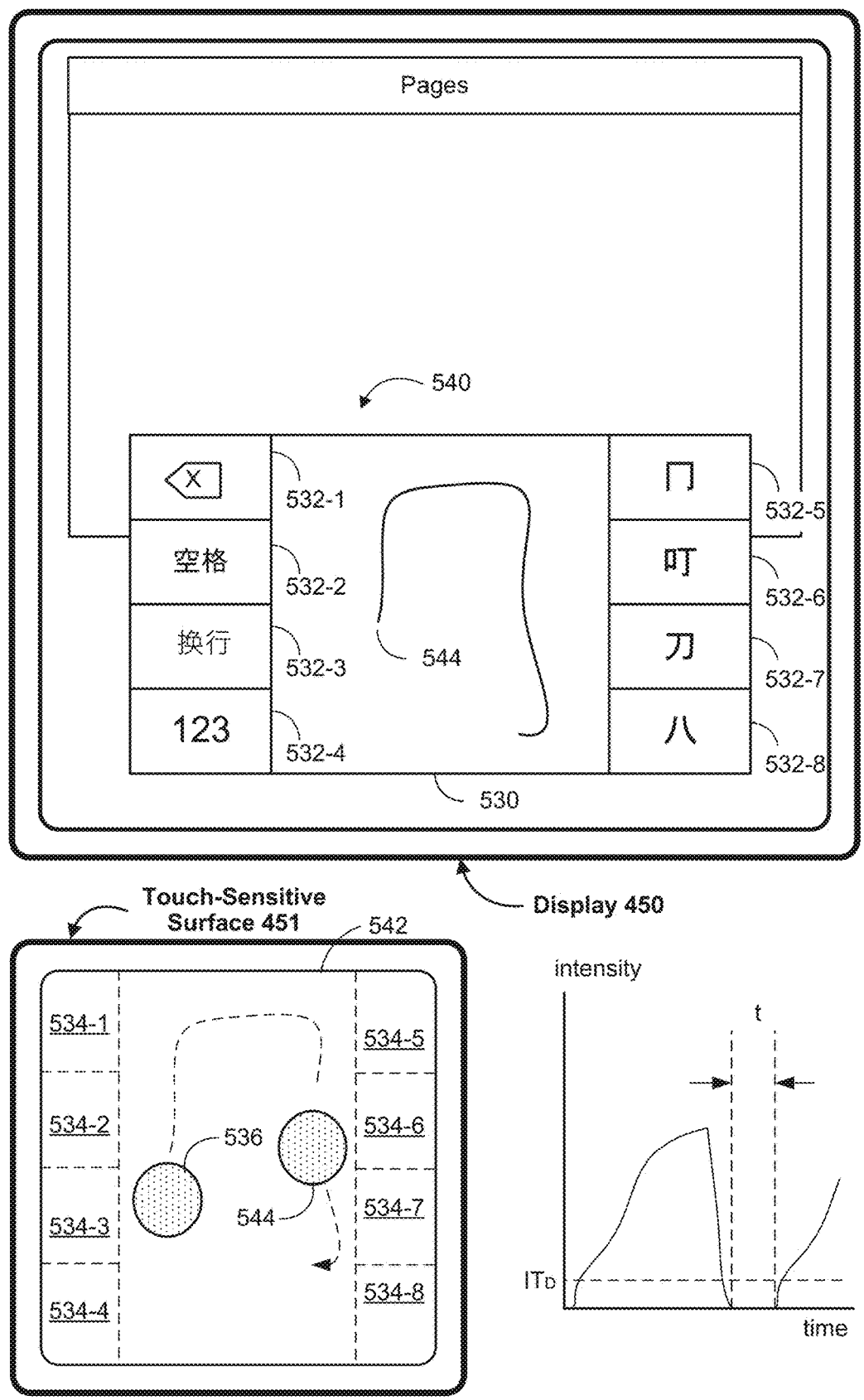
Figure 5K:
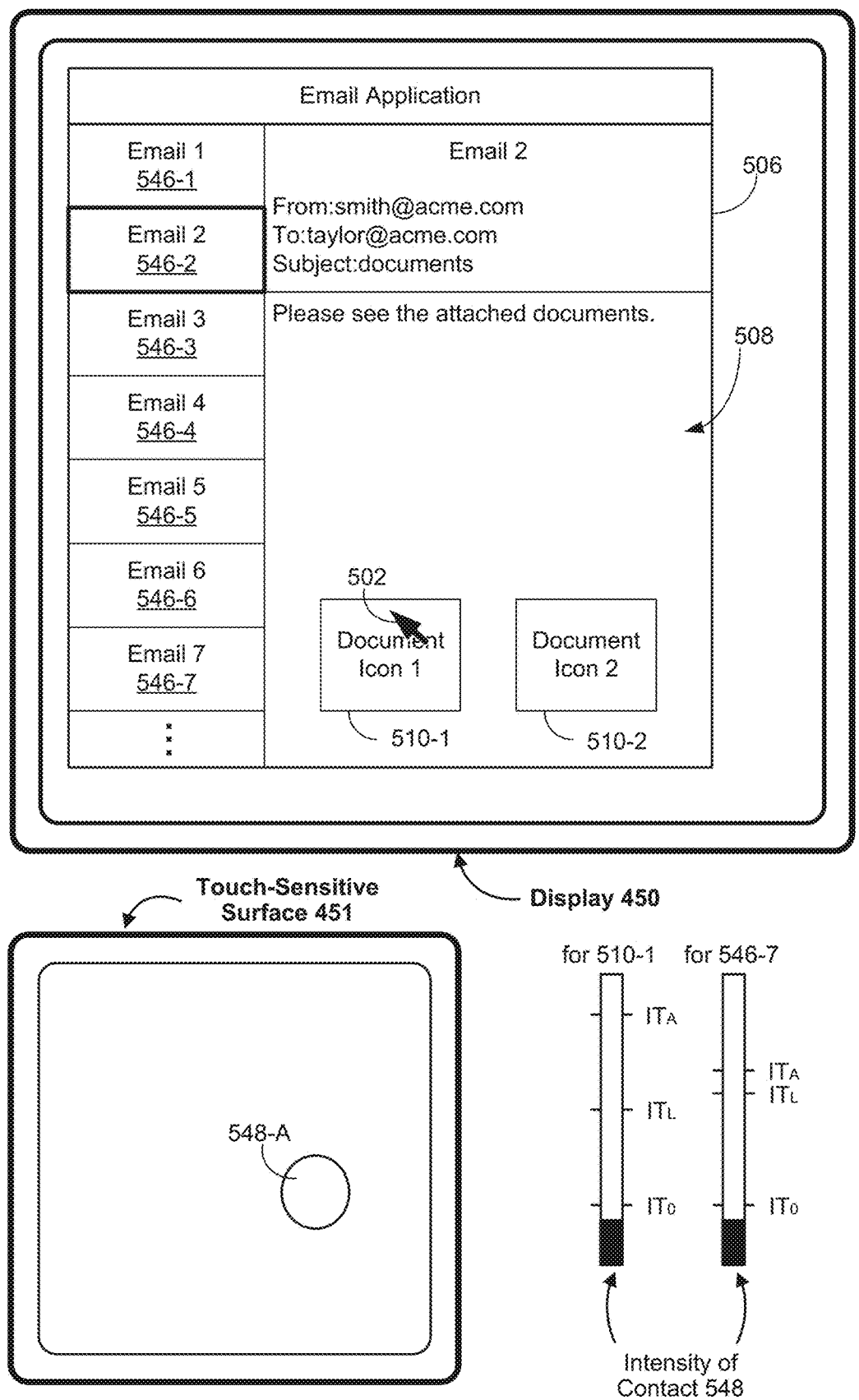
Figure 5L:
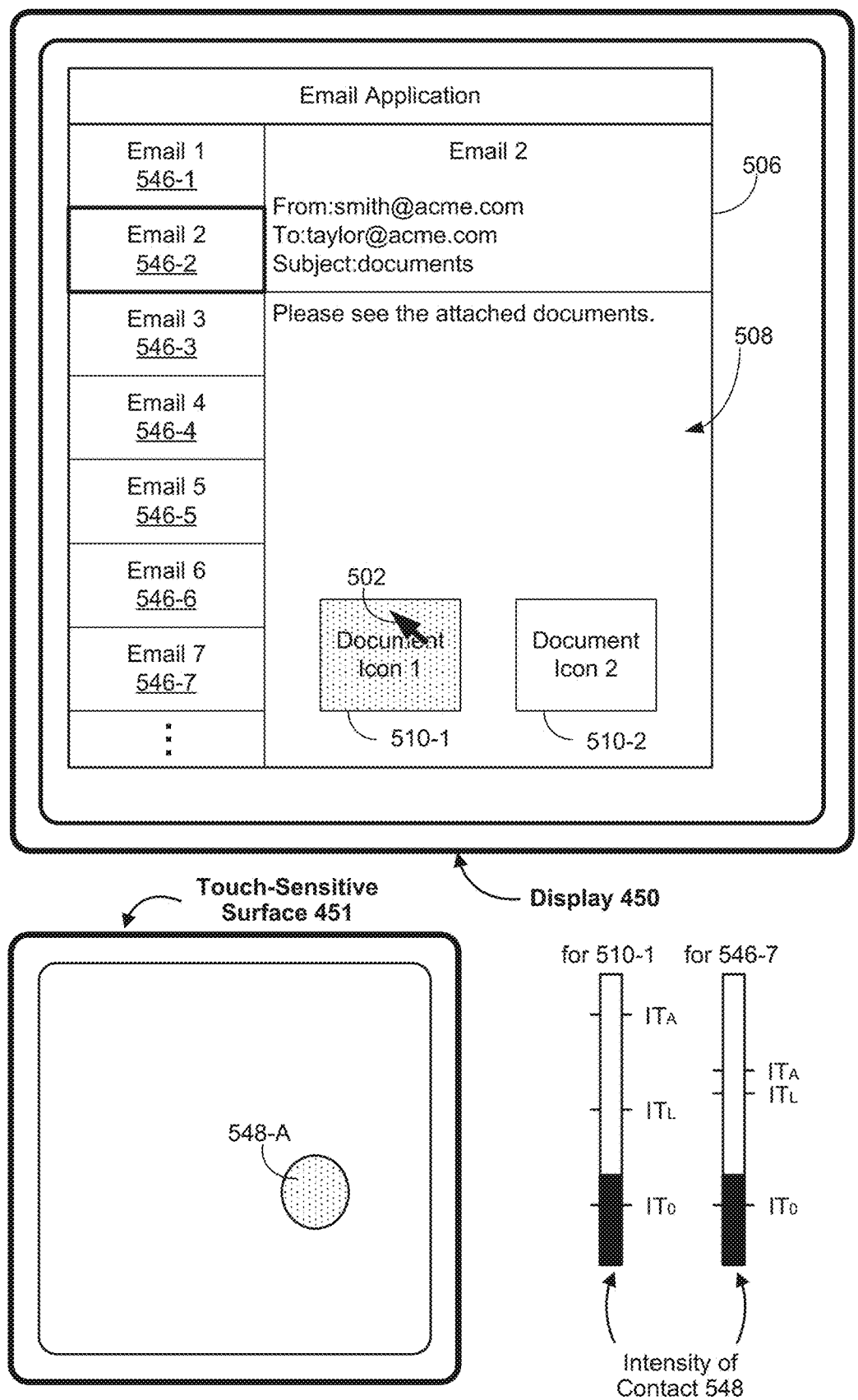
Figure 5M:
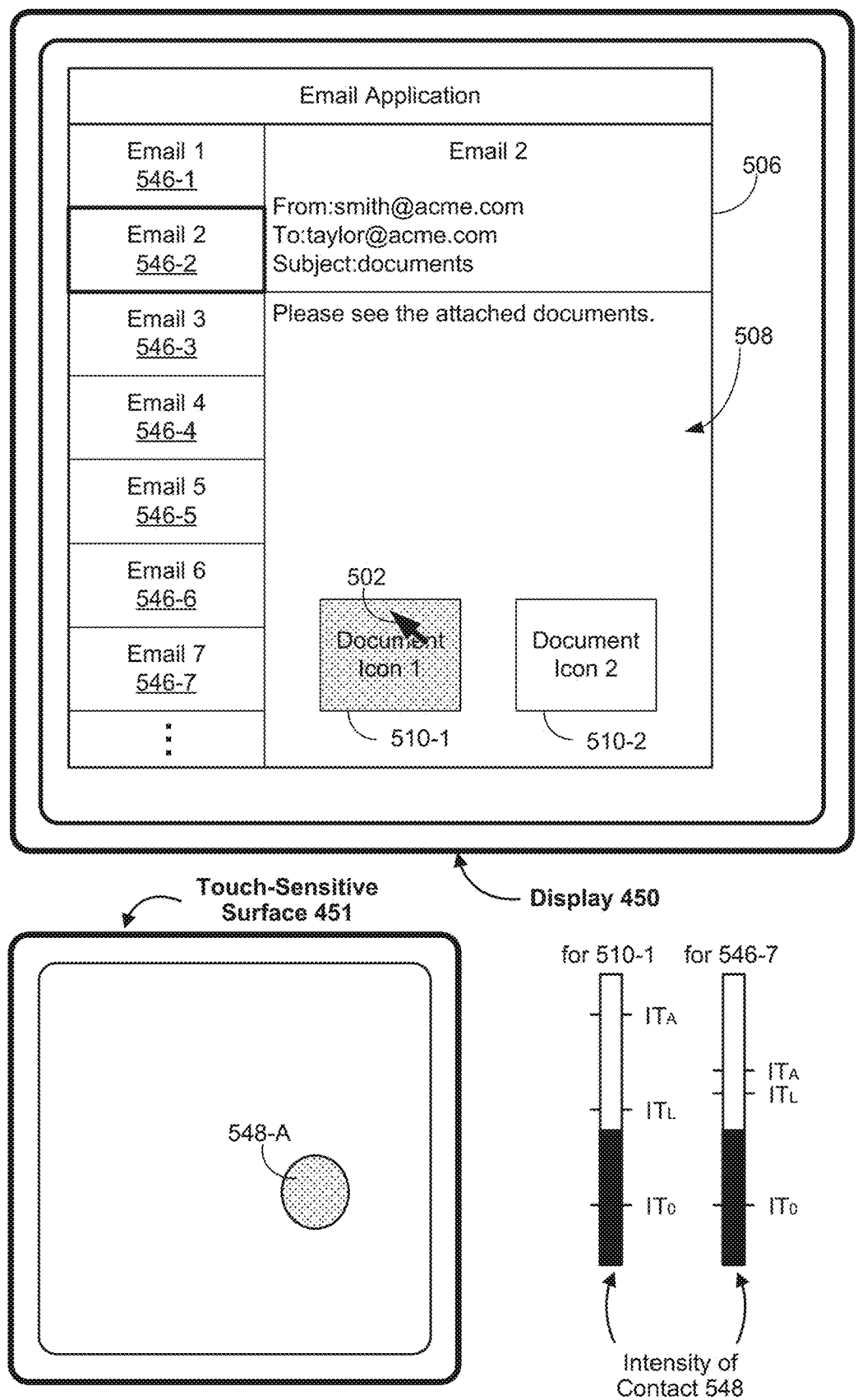
Figure 5N:
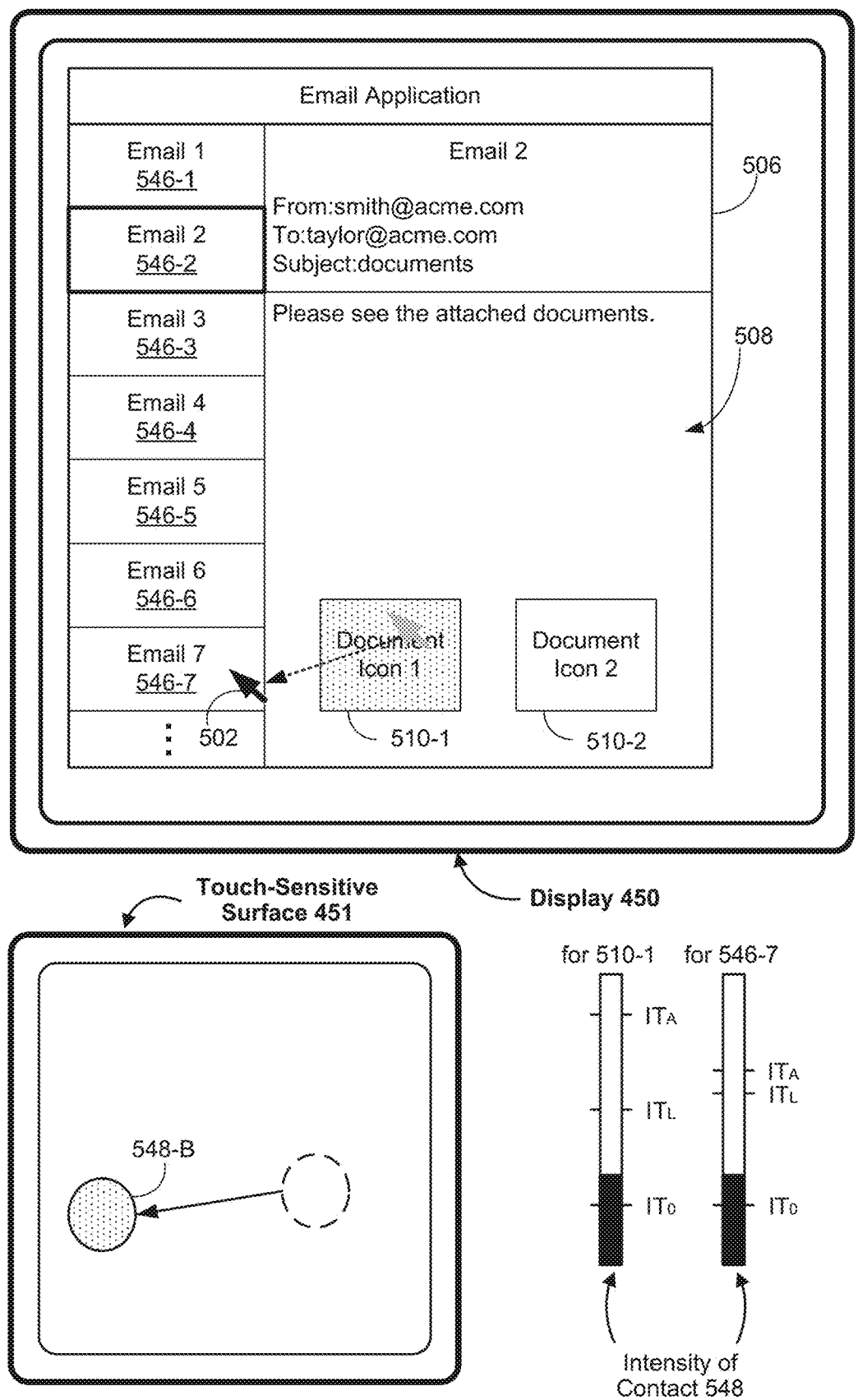
Figure 5O:
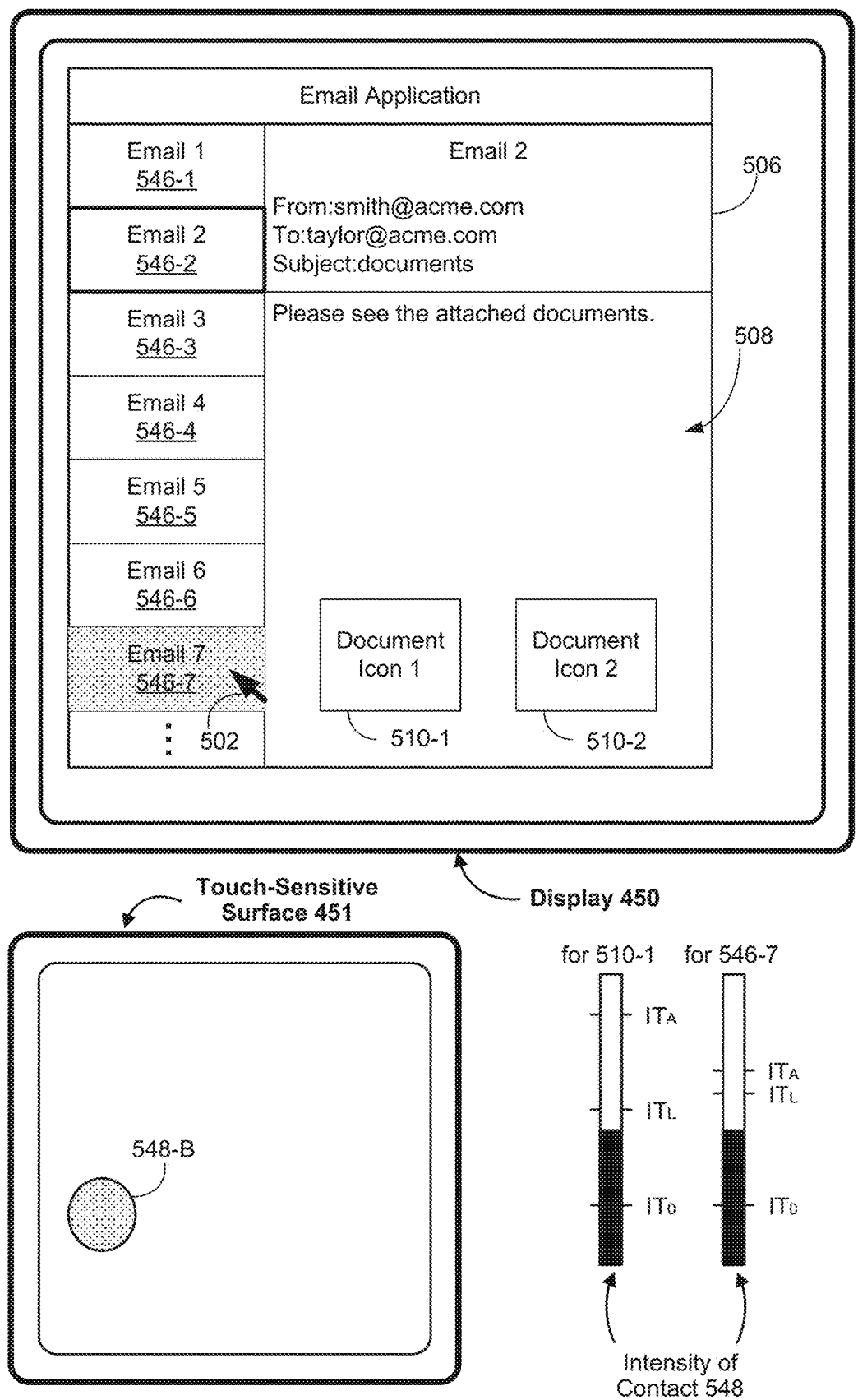
Figure 5P:
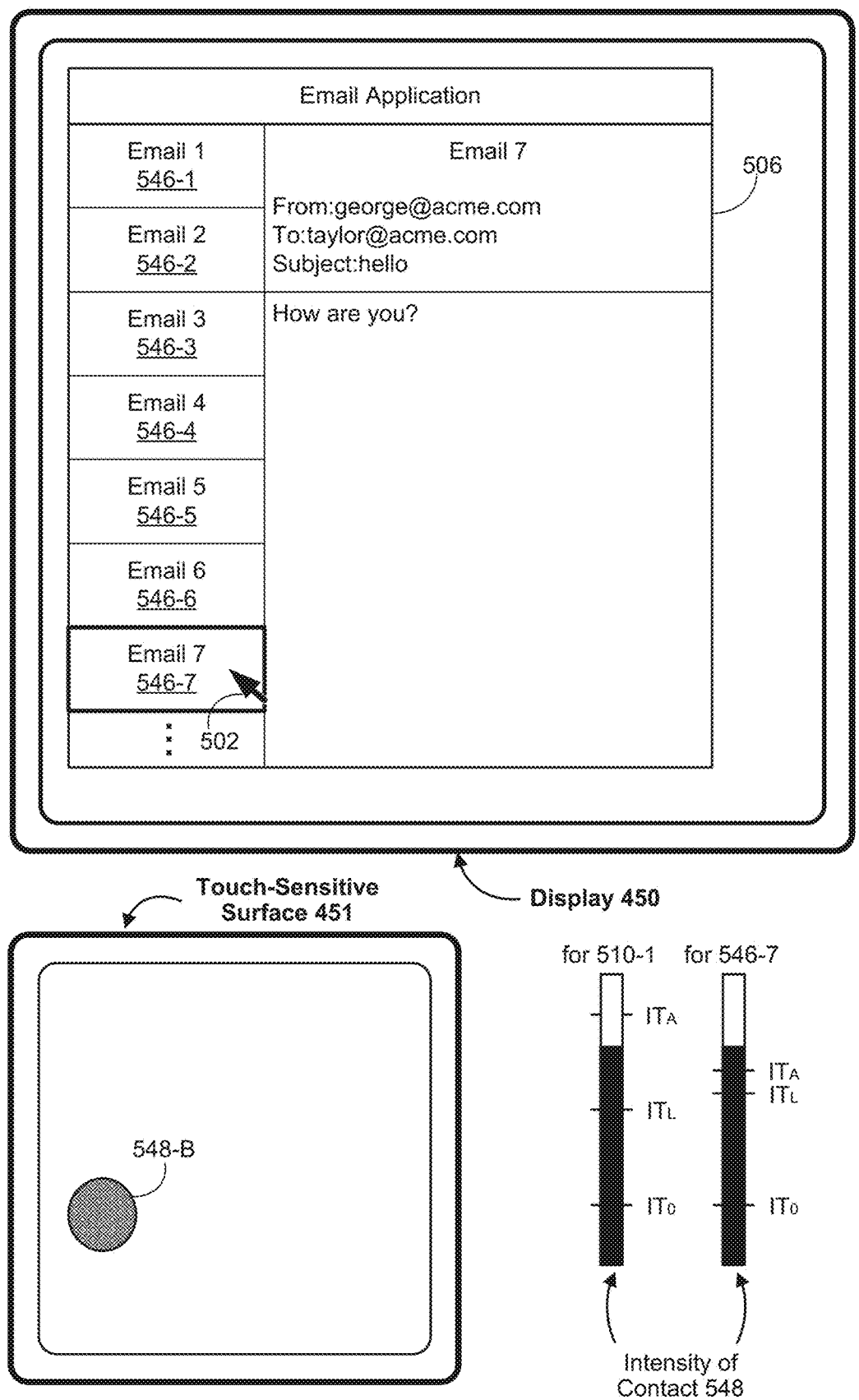
Figure 5Q:
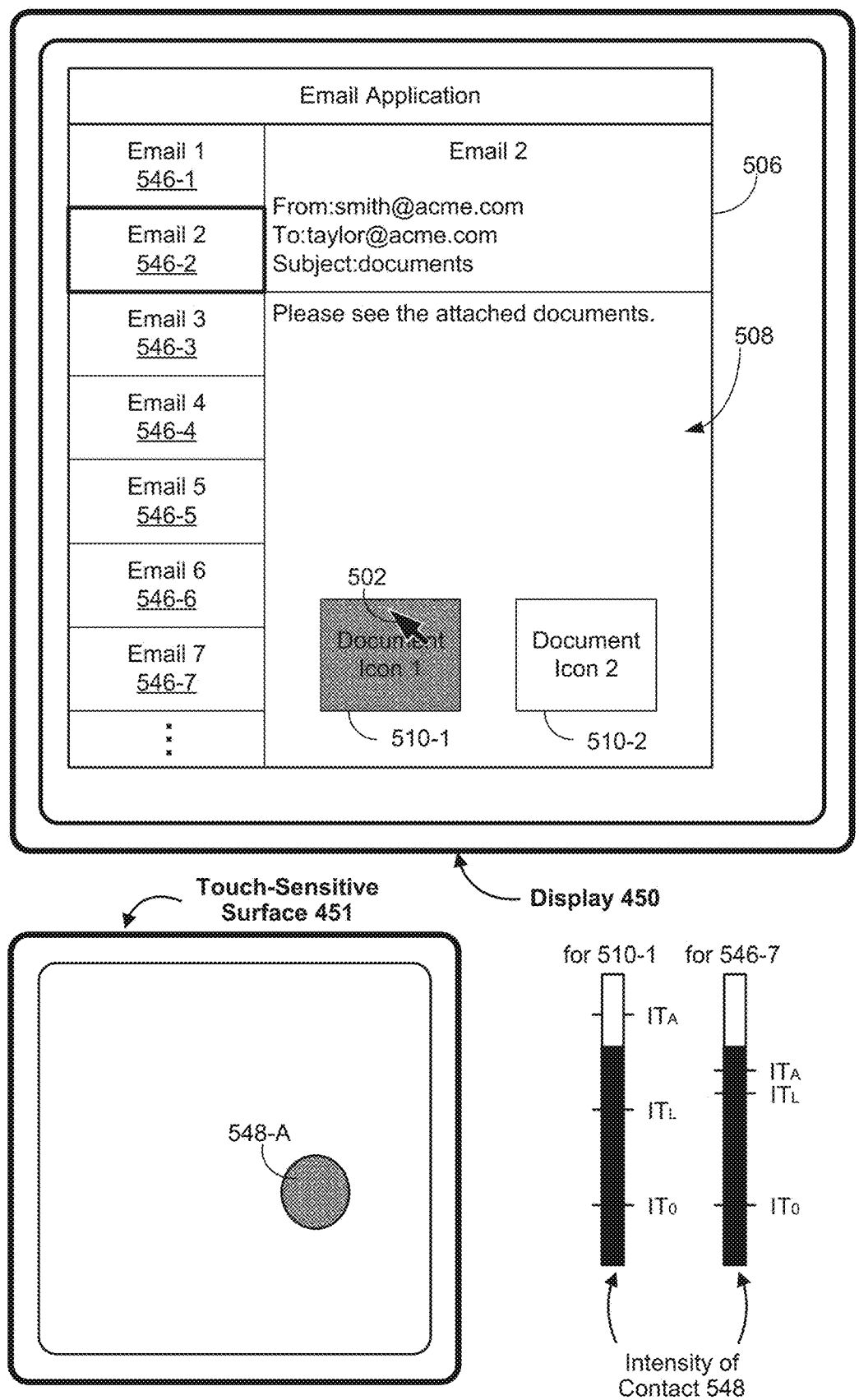
Figure 5R:
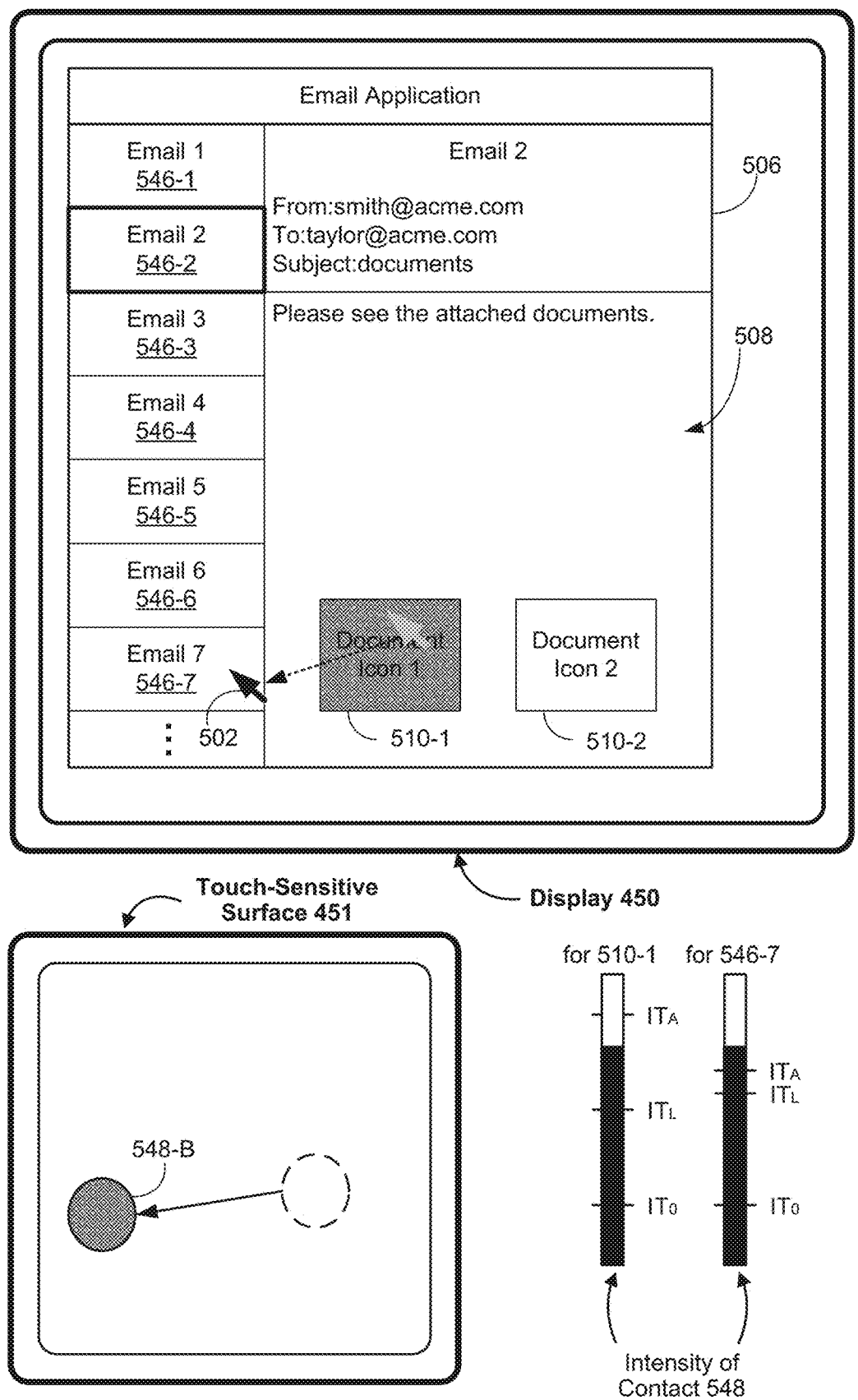
Figure 5S:
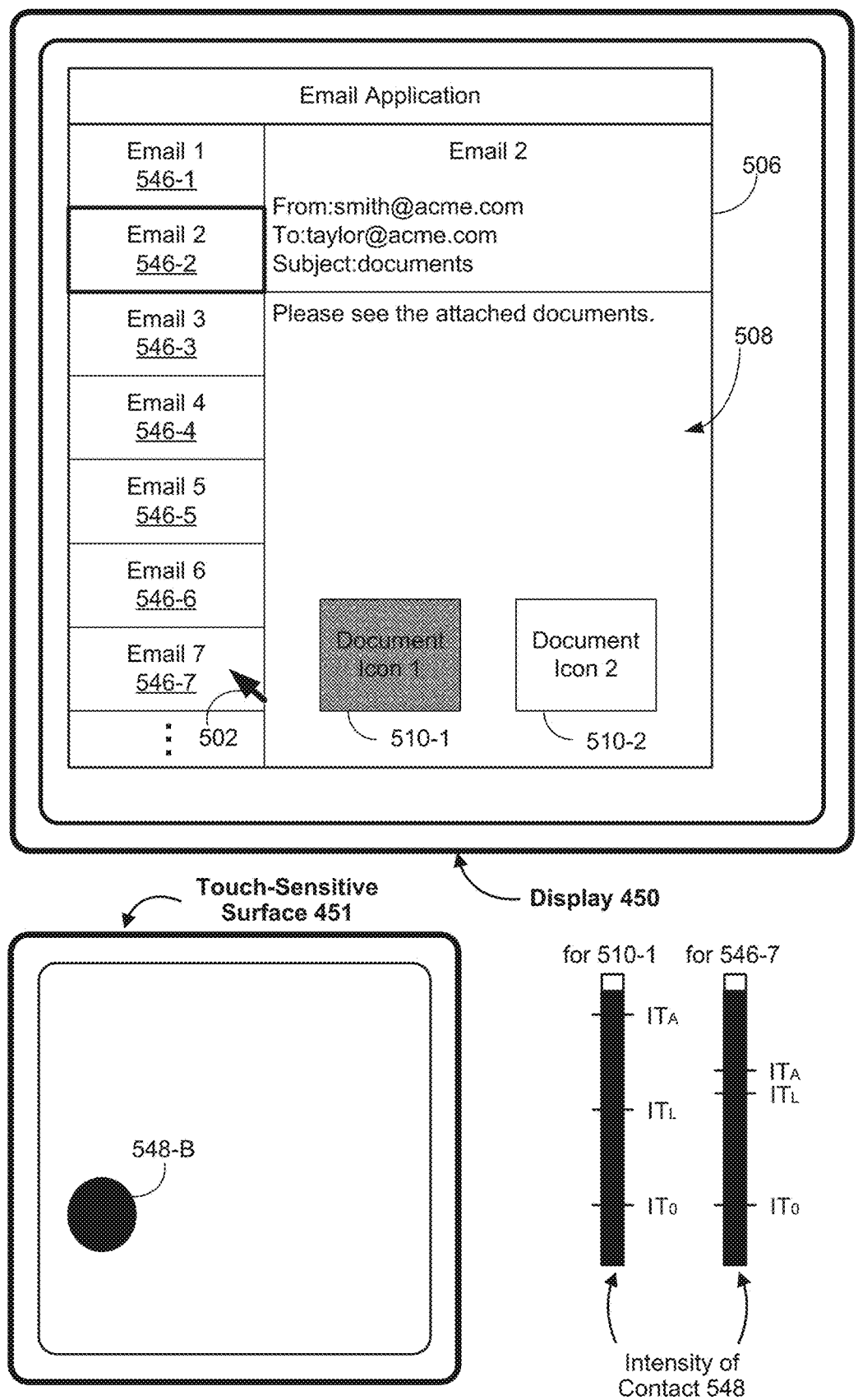
Figure 5T:
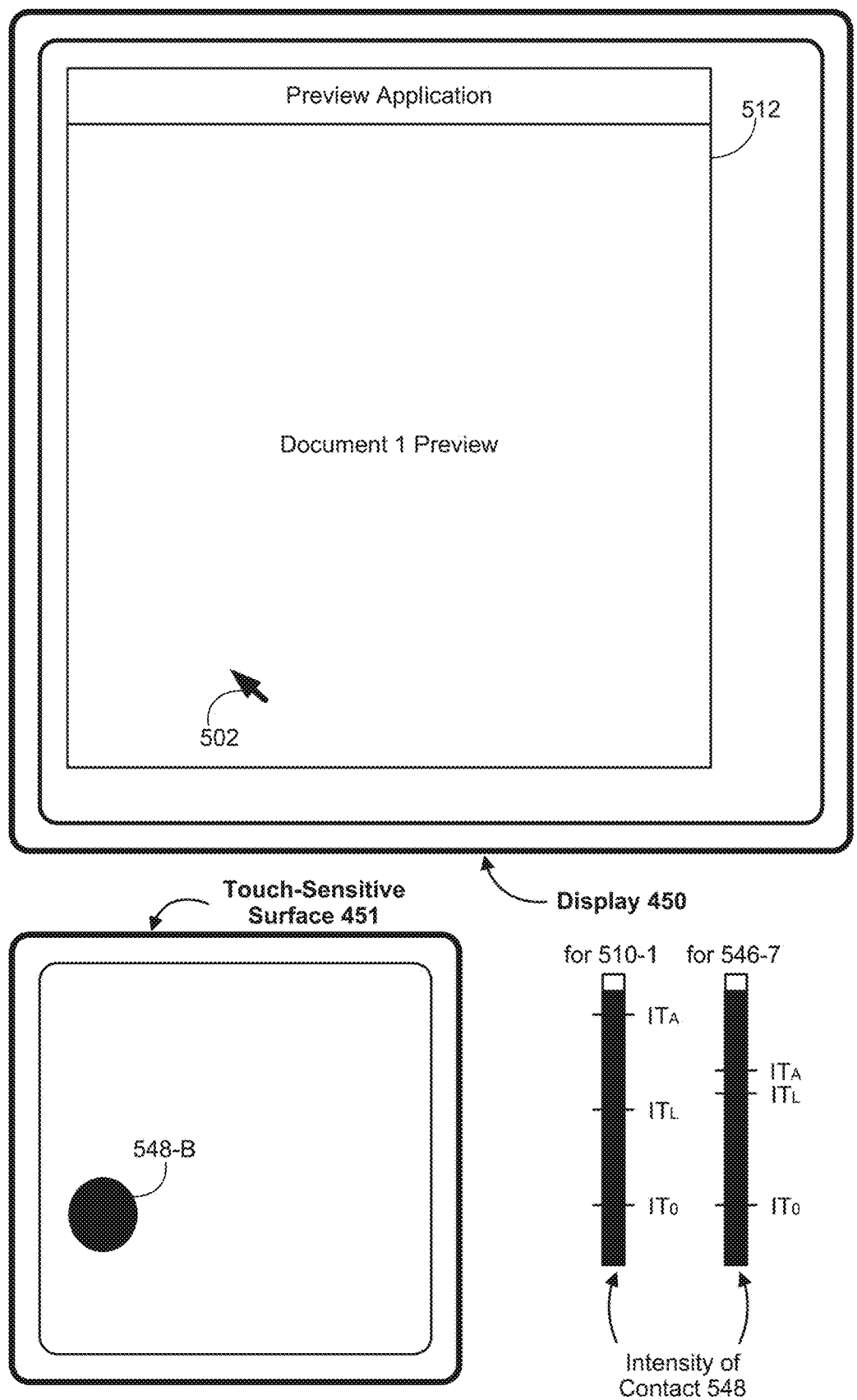

FIGS. 5Y-5Z show that contact 524 is detected at the second location 522-B on touch-sensitive surface 451 and intensity of contact 524 is increased. In FIGS. 5Y-5Z, contact 524 is processed in accordance with a second intensity model that is distinct from the first intensity model and includes a second set of intensity thresholds (e.g., an intensity model associated with user interface 518 of the second software application or the second location 502-B on the display).

FIG. 5AA illustrates that the intensity of contact 524 is reduced (e.g., below any activation intensity threshold for the second location 502-B on the display) and moved across touch-sensitive surface 451 to a third location 524-C on touch-sensitive surface 451. FIG. 5AA also shows a corresponding movement of cursor 502 from the second location 502-B on display 451 to the third location 502-C on display 450. The third location 502-C is deemed to correspond to an overlapping region of the user interface of the first software application and the user interface 518 of the second software application.

FIG. 5BB illustrates that contact 526 is detected at the third location 526-C on touch-sensitive surface 451. In some embodiments, contact 526 is processed in accordance with the second intensity model (e.g., associated with user interface 518, which is the topmost foreground user interface in FIG. 5BB). However, in some other embodiments, contact 526 is processed in accordance with the first intensity model (even though icon 510-2 is not displayed on display 450) based on the priority of the first intensity model and the priority of the second intensity model (e.g., the first intensity model is selected because the first intensity model has a higher priority than the second intensity model). In some embodiments or in some circumstances, the user interface of the first software application is displayed over user interface 518 as shown in FIG. 5CC.

FIG. 5DD illustrates that contact 528 is detected at the third location 528-C on touch-sensitive surface 451. In some embodiments, contact 528 is processed in accordance with the first intensity model (e.g., associated with user interface 518, which is the topmost foreground user interface in FIG. 5DD). However, in some other embodiments, contact 528 is processed in accordance with the second intensity model (even though the user interface 518 of the second software application is overlaid by the user interface of the first software application at the third location 502-C on display) based on the priority of the first intensity model and the priority of the second intensity model. Although the priority of the first intensity model was higher than the priority of the second intensity model during the operations illustrated in FIGS. 5BB-5CC, the priorities may be updated real-time. For example, the first software application and/or the second software application may send a request to process any contact in a particular display or user interface region, which in this example includes the third location 528-C, in accordance with the second intensity model, and as a result, the contact at the third location 528-C is processed (e.g., by contact motion module 130, FIG. 3G) using the second intensity model.

FIGS. 5FF-5JJ illustrate user interfaces associated with handwriting recognition (e.g., handwritten characters, hand-drawn shapes, etc.) in accordance with some embodiments.

FIG. 5FF shows a user interface of a word processing software application partially overlaid by handwriting input tool region 540 (e.g., a character input tool region). As shown in FIGS. 5FF-5JJ, handwriting input tool region 540 includes a plurality of selection regions (e.g., at least some of 532-1 through 532-8) and handwriting input region 530 (e.g., a character input region). A respective selection region (e.g., 532-1) on display 450 corresponds to a region (e.g., 534-1) on touch-sensitive surface 451. In addition, handwriting input region 530 on display 450 corresponds region 542 on touch-sensitive surface 451. In some embodiments, the respective selection region (e.g., 532-1) on display 450 is associated with an intensity model that defines two or more intensity stages (e.g., a state indicating that a contact is detected but a corresponding user interface element has not been activated, and a state indicating that a contact is detected and the corresponding user interface element has been activated). In some embodiments, tactile outputs are enabled for the intensity model associated with the respective selection region. For example, a press input (with sufficient intensity) will trigger a tactile output, which indicates that intensity of the press input is sufficient to activate a corresponding user interface element.

FIG. 5FF also shows that contact 536 is detected in region 542 of touch-sensitive surface 451 and moved across touch-sensitive surface 451 along a particular path. In some embodiments, region 542 of touch-sensitive surface 451 is associated with an intensity model that has a single stage for which tactile outputs are suppressed. This prevents tactile outputs from interfering with a user's writing/drawing on the touch-sensitive surface. In some embodiments, for a contact that is initially detected on region 542 of touch-sensitive surface 451, tactile outputs are suppressed even if the contact moves across touch-sensitive surface 451 to a region (e.g., 534-1) that corresponds to a respective selection region (e.g., 532-1). This "latching" feature is described further below with respect to FIGS. 5KK-5TT.

In some embodiments, for a contact starting from the region 542, tactile outputs are suppressed even when the contact moves to a location that corresponds to a selection region on display.

FIG. 5GG shows that graphical element 544 that corresponds to the particular path of contact 536 is displayed in handwriting input region 530. In some embodiments, a width of graphical element 544 varies along its path based on one or more measured characteristics of contact 536 in region 542 of touch-sensitive surface 451 while contact 536 follows the particular path. In some embodiments, the width is determined based on intensity and/or a speed of contact 536. In some embodiments, the width is increased when the intensity of contact 536 increases. In some embodiments, the width is reduced when the speed of contact 536 increases.

FIG. 5GG also shows that a plurality of selection regions 532-5 through 532-8 is displayed. Each of selection regions 532-5 through 532-8 includes a character that is selected based on graphical element 544. For example, characters in selection regions 532-5 through 532-8 are selected in accordance with (e.g., that best match) the shape of graphical element 544 (e.g., that best match one or more characteristics of the shape of graphical element 544).

FIG. 5HH shows that contact 538 is detected on region 534-8 of touch-sensitive surface 451, which corresponds to selection region 532-8. Contact 538 is processed using an intensity model that is associated with region 534-8. For example, a tactile output is generated when intensity of contact 538 crosses one or more thresholds of the intensity model associated with region 534-8. In FIG. 5HH, a character shown in selection region 532-8 is displayed in the user interface of the word processing software application (and inserted into a document of the word processing software application).

FIG. 5II shows the path of contact 536 on touch-sensitive surface 451, discussed above with respect to FIG. 5FF. In FIG. 5II, shown to the right side of touch-sensitive surface 451 is an intensity graph that illustrates intensity of contact 536 over time while contact 536 follows the path on touch-sensitive surface 451. The graph shows that the intensity of contact 536 starts from below a drawing intensity threshold ITS, increases above the drawing intensity threshold, and falls below the drawing intensity threshold. In some embodiments, once the intensity of contact 536 satisfies (is above) the drawing intensity threshold, contact 536 continues to be processed even if the intensity of contact 536 falls below the drawing intensity threshold. For example, a portion of the path in which the contact has intensity below the drawing intensity threshold is used to extend or update the graphical element 544. However, in some embodiments, the intensity of contact 536 needs to satisfy the drawing intensity threshold to initiate display of a graphical element.

FIG. 5JJ shows that contact 536 ceases to be detected while following the path on touch-sensitive surface 451. FIG. 5JJ also shows that contact 538 is detected on touch-sensitive surface 451, continuing the path. For example, contact 536 may be slightly lifted-off while drawing the path on touch-sensitive surface 451 and quickly brought back into contact with touch-sensitive surface 451 to complete the path. In some embodiments, a brief absence of contact with touch-sensitive surface 451 is ignored and the path of contact 536 and the path of contact 544 are merged to form a single continuous path. In some embodiments, the merger of the two paths is performed based on a time interval between the lift-off of contact 536 and the detection of contact 544 satisfying predefined timing criteria (e.g., less than 0.1 second, 0.2, second, 0.5, second, etc.). In some other embodiments, the path of contact 536 and the path of contact 544 are maintained separately. In some embodiments, the path of contact 544 is initiated in response to determining that intensity of contact 544 satisfies the drawing intensity threshold (e.g., instead of contact 544 merely contacting touch-sensitive surface 451).

Although FIGS. 5FF-5JJ are described above with respect to recognition of handwritten characters, similar methods, devices, and user interfaces may be used for recognition of hand drawn content (sometimes called or including handwritten content) of a different type (e.g., recognition of shapes or a combination of shapes and characters/letters).

In addition, although FIGS. 5FF-5JJ illustrate a user interface of a handwriting input tool region with a plurality of selection regions, in some embodiments, a drawing region without any selection regions is used. For example, when character recognition (or shape recognition) is not needed, the plurality of selection regions may be omitted. In some embodiments, a single intensity model is used for the entire handwriting input tool region.

FIGS. 5KK-5TT illustrate latching of touch inputs in accordance with some embodiments.

FIG. 5KK shows a window 506 that includes a user interface of a software application (e.g., an email application). The user interface in window 506 includes a plurality of regions (e.g., email regions 546-1 through 546-7, icons 510-1, and 510-2). Some of these regions are associated with different intensity models. For example, icon 510-1 is associated with a first intensity model and region 546-7 is associated with a second intensity model that is distinct from the first intensity model.

FIG. 5LL shows contact 548 is detected at location 548-A on touch-sensitive surface 451 that corresponds to icon 510-1 on display 450. In FIG. 5LL, icon 510-1 is visually distinguished to indicate the detection of contact 548 on touch-sensitive surface 451.

FIGS. 5MM-5PP show operations associated with a movement of a contact without latching to a region of a user interface in accordance with some embodiments.

FIG. 5MM shows that intensity of contact 548 has increased and icon 510-1 is further visually distinguished to indicate increase in the intensity of contact 548.

FIG. 5NN shows that the intensity of contact 548 has been reduced and icon 510-1 is visually distinguished to indicate decrease in the intensity of contact 548. FIG. 5NN also shows that a movement of contact 548 across touch-sensitive surface 451 to location 548-B on touch-sensitive surface 451, and a corresponding movement of cursor 502 to region 546-7 on display 450. Prior to the movement of contact 548 to location 548-B on touch-sensitive surface 451, the intensity of contact 548 has not satisfied a latching intensity threshold (e.g., "$IT_L$") for icon 510-1.

FIG. 5OO shows that, in response to the movement of cursor 502 to region 546-7 on display 450, visual distinction of icon 510-1 is removed and region 546-7 is visually distinguished to indicate detection of contact 548 at a location 548-B that correspond to region 546-7 on display 450.

FIG. 5PP shows that the intensity of contact 548 has increased above the activation intensity threshold (e.g., "$IT_A$") for region 546-7. In response, region 546-7 is visually distinguished to indicate that region 546-7 has been activated. In addition, the visual distinction of region 546-2, which was previously activated, is removed. FIG. 5PP also shows that window 506 is updated to show content of Email 7 that corresponds to region 546-7.

FIGS. 5QQ-5TT show operations associated with a movement of a contact while latched to a region of a user interface in accordance with some embodiments.

FIG. 5QQ shows that the intensity of contact 548 has increased to satisfy the latching intensity threshold (e.g., "$IT_L$") for icon 510-1. FIG. 5QQ also illustrates that icon 510-1 is further visually distinguished to indicate that cursor 502 is latched to icon 510-1.

FIG. 5RR shows a movement of contact 548 across touch-sensitive surface 451 to location 548-B on touch-sensitive surface 451 while maintaining intensity above the latching intensity threshold (e.g., "$IT_L$") for icon 510-1, and a corresponding movement of cursor 502 to region 546-7 on display 450. In FIG. 5RR, although the intensity of contact 548 would satisfy the activation intensity threshold (e.g., "$IT_A$") for region 546-7, region 546-7 is not activated because cursor 502 is latched to icon 510-1.

FIG. 5SS shows that the intensity of contact 548 has further increased to satisfy an activation intensity threshold (e.g., "$IT_A$") for icon 510-1, which activates icon 510-1 even though cursor 502 is located in region 546-7.

FIG. 5TT shows that, in response to the intensity of contact 548 satisfying the activation intensity threshold (e.g., "$IT_A$") for icon 510-1, icon 510-1 is activated. In FIG. 5TT, preview interface 512 is displayed in response to the intensity of contact 548 satisfying the activation intensity threshold (e.g., "$IT_A$") for icon 510-1.

FIGS. 6A-6C illustrate a flow diagram of a method 600 of processing a touch input based on an intensity stage of the touch input in accordance with some embodiments. The method 600 is performed at an electronic device (e.g., device 300, FIG. 3A or 3B, or portable multifunction device 100, FIG. 1A) with a touch-sensitive surface, and one or more sensors to detect intensity of contacts with the touch-sensitive surface. In some embodiments, the electronic device includes a display. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, the method 600 simplifies processing of touch inputs. The method reduces the computational burden on a software application, thereby creating a more efficient electronic device. In addition, the size of the software application is reduced, thereby occupying less storage space and memory.

The device detects (602) a touch input on the touch-sensitive surface (e.g., contact 504, FIG. 5B).

In response to detecting the touch input on the touch-sensitive surface, the device determines (604) an intensity of the touch input (e.g., a force applied by the touch input) on the touch-sensitive surface (e.g., Intensity of Contact 504, FIG. 5B).

In accordance with the intensity of the touch input on the touch-sensitive surface and one or more preselected intensity thresholds, the device determines (606) an intensity stage of the touch input. For example, contact 504 is determined to be in stage 1 in FIG. 5B. The intensity stage of the touch input is selected from a plurality of predefined intensity stages (e.g., stages 1, 2, and 3). In some embodiments, the plurality of predefined intensity stages includes three or more distinct intensity stages. In some embodiments, the plurality of predefined intensity stages includes three or more non-overlapping intensity stages.

In some embodiments, determining the intensity stage of the touch input includes comparing the intensity of the touch input with the one or more preselected intensity thresholds. In some embodiments, determining the intensity stage of the touch input depends on a previous intensity stage of the touch input. For example, if the touch input has been in stage 2, the intensity of the touch input is compared with an activation intensity threshold for stage 3 to determine whether the touch input transitions to stage 3, and with a release intensity threshold for stage 2 to determine whether the touch input transitions to stage 1. In some embodiments, the determination of the intensity stage of the touch input is performed by the contact motion module 130 (FIG. 3G) (e.g., the contact intensity module 175 in the contact motion module 130).

In some embodiments, the intensity stage of the touch input is determined in accordance with the intensity of the touch input on the touch-sensitive surface, the one or more predefined intensity thresholds, and time-based criteria described above. As explained above, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold.

In some embodiments, the device stores (608) a first software application (e.g., E-mail Client Module 140, FIG. 3A). The intensity stage of the touch input is determined by a contact intensity module that is distinct and separate from the first software application (e.g., a firmware embedded in a touch-sensitive input device, such as a trackpad, that include the touch-sensitive surface, an operating system, etc.). For example, in FIG. 3G, contact intensity module 175 in contact/motion module 130 sends touch information 472, which in some embodiments include intensity stage 478, to application 136.

In some embodiments, the device sends (610) to the first software application from the contact intensity module touch information that identifies the intensity stage of the touch input (e.g., in FIG. 3G, touch information 472 including intensity stage 478 is sent from contact intensity module 175 to application 136).

In some embodiments, the device sends (612, FIG. 6B) information from the contact intensity module, the information indicating that the intensity of the touch input is available to the first software application (e.g., availability information 474, FIG. 3G).

In some embodiments, the device repeats (614) the operations of determining an intensity of the touch input, determining an intensity stage of the touch input, and sends touch information while the touch input is detected on the touch-sensitive surface. In some embodiments, the operations are repeated at a predefined interval (or a predefined frequency). For example, the device repeats such operations while a contact remains on the touch-sensitive surface.

In some embodiments, the device determines (616) one or more intensity-based progress values of the touch input based on an intensity range associated with the determined intensity stage; and sends touch information to the first software application (e.g., touch information 472 in FIG. 3G). The touch information includes the one or more intensity-based progress values of the touch input (e.g., stage progress value 482 and transition progress value 484) and information identifying the intensity stage of the touch input (e.g., intensity stage 478).

In some embodiments, the one or more intensity-based progress values of the touch input include (618) a transition progress value of the touch input (e.g., transition progress value 484, FIG. 3G). In some embodiments, the transition progress value indicates a normalized intensity required for a transition to an intensity stage that is adjacent to the determined intensity stage.

In some embodiments, the one or more intensity-based progress values of the touch input include (620) a stage progress value of the touch input (e.g., stage progress value 482, FIG. 3G). In some embodiments, the stage progress value indicates a normalized intensity that is based on the intensity of the touch input and predefined intensity thresholds for the determined intensity stage.

In some embodiments, in response to detecting the touch input, the device determines (622) a first intensity applied by the touch input on the touch-sensitive surface (e.g., intensity of contact 504 in FIG. 5C). In accordance with a determination that the first intensity applied by the touch input on the touch-sensitive surface does not satisfy a stage activation intensity threshold for a second intensity stage, the device determines that the touch input is in a first intensity stage that is distinct from the second intensity stage (e.g., in FIG. 5C, contact 504 remains in stage 1). In some embodiments, the second intensity stage is adjacent to the first intensity stage. In some embodiments, the method includes sending first touch information that identifies the first intensity stage of the touch input to the first software application. Subsequent to determining that the touch input is in the first intensity stage, the device determines a second intensity applied by the touch input on the touch-sensitive surface (e.g., intensity of contact 504 in FIG. 5D). The second intensity is distinct from the first intensity. In some embodiments, the device determines that an intensity applied by the touch input on the touch-sensitive surface has changed from the first intensity to the second intensity. In accordance with a determination that the second intensity applied by the touch input on the touch-sensitive surface satisfies the stage activation intensity threshold for the second intensity stage (e.g., intensity of contact 504 is above "IT$_2$" in FIG. 5D), the device determines that the touch input is in the second intensity stage (e.g., in FIG. 5D, contact 504 is in stage 2).

In some embodiments, subsequent to determining that the touch input is in the second intensity stage, the device determines (624, FIG. 6C) a third intensity applied by the touch input on the touch-sensitive surface (e.g., intensity of contact 504 in FIG. 5F). The third intensity is distinct from the second intensity. In accordance with a determination that the third intensity does not satisfy a stage release intensity threshold for the second intensity stage (e.g., intensity of contact 504 is above "IT$_{2R}$" in FIG. 5F), distinct from the stage activation intensity threshold for the second intensity stage (e.g., "IT$_2$" in FIG. 5F), the device determines that the touch input remains in the second intensity stage (e.g., contact 504 remains in stage 2 in FIG. 5F). Subsequent to determining that the touch input remains in the second intensity stage, the device determines a fourth intensity applied by the touch input on the touch-sensitive surface (e.g., intensity of contact 504 in FIG. 5G). The fourth intensity is distinct from the third intensity. In accordance with a determination that the fourth intensity satisfies the stage release intensity threshold for the second intensity stage (e.g., "IT$_{2R}$" in FIG. 5F), the device determines that the touch input is in the first intensity stage (e.g., contact 504 is in stage 1 in FIG. 5G).

In some embodiments, subsequent to determining that the touch input remains in the second intensity stage, the device determines (626) a third intensity applied by the touch input on the touch-sensitive surface (e.g., intensity of contact 504 in FIG. 5I). The third intensity is distinct from the second intensity. In accordance with a determination that the third intensity satisfies a stage activation threshold for the third intensity stage (e.g., "IT$_3$" in FIG. 5I), distinct from the stage activation intensity threshold for the second intensity stage, the device determines that the touch input is in the third intensity stage (e.g., contact 504 is in stage 3 in FIG. 5I).

In some embodiments, subsequent to determining that the touch input is in the third intensity stage, the device determines (628) a fourth intensity applied by the touch input on the touch-sensitive surface (e.g., intensity of contact 504 in FIG. 5F). The fourth intensity is distinct from the third intensity. In accordance with a determination that the fourth intensity satisfies a stage release intensity threshold for the third intensity stage (e.g., intensity of contact 504 is below "IT$_{3R}$" in FIG. 5F), distinct from the stage activation threshold for the third intensity stage, the device determines that the touch input is in the second intensity stage.

In some embodiments, the device identifies (630, FIG. 6A) an intensity model identifier from a plurality of predefined intensity model identifiers (e.g., exemplary intensity models and corresponding intensity model identifiers described in Appendix A). The intensity stage of the touch input is selected from a plurality of intensity stages that correspond to the identified intensity model identifier.

The device processes (632) the touch input based on the intensity stage of the touch input (e.g., generates a tactile output).

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 650, 700, 750, 800, 900, 1000, 1100, and 1200) are also applicable in an analogous manner to method 600 described above with respect to FIGS. 6A-6C. For example, the touch input processing described above with reference to method 600 optionally have one or more of the characteristics of the touch input processing based on a touch characterization parameter described herein with reference to other methods described herein (e.g., methods 650, 700, 750, 800, 900, 1000, 1100, and 1200). For brevity, these details are not repeated here.

In addition, one of ordinary skill in the art would recognize that many modifications and variations are possible in view of the above teachings.

For example, in accordance with some embodiments, a method is performed at an electronic device with a touch-sensitive surface. The electronic device includes one or more sensors to detect intensity of contacts with the touch-sensitive surface (e.g., the touch-sensitive surface includes one or more sensors to detect the intensity of contacts with the touch-sensitive surface). In some embodiments, the touch-sensitive surface is integrated with a display. In some embodiments, the touch-sensitive surface is separate from the display. The method includes, in response detecting the touch input on the touch-sensitive surface, determining an intensity of the touch input on the touch-sensitive surface; and, in accordance with the intensity of the touch input on the touch-sensitive surface and one or more preselected intensity thresholds, a transition progress value of the touch input. The method also includes processing the touch input based on the transition progress value of the touch input.

For another example, in accordance with some embodiments, a method is performed at an electronic device with a touch-sensitive surface. The electronic device includes one or more sensors to detect intensity of contacts with the touch-sensitive surface (e.g., the touch-sensitive surface includes one or more sensors to detect the intensity of contacts with the touch-sensitive surface). In some embodiments, the touch-sensitive surface is integrated with a display. In some embodiments, the touch-sensitive surface is separate from the display. The method includes, in response detecting the touch input on the touch-sensitive surface, determining an intensity of the touch input on the touch-sensitive surface; and, in accordance with the intensity of the touch input on the touch-sensitive surface and one or more preselected intensity thresholds, a stage progress value of the touch input. The method also includes processing the touch input based on the stage progress value of the touch input.

FIG. 6D illustrate a flow diagram of a method 650 of updating a user interface based on an intensity stage of a touch input in accordance with some embodiments. The method 650 is performed at an electronic device (e.g., device 300, FIG. 3A or 3B, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 650 are, optionally, combined and/or the order of some operations is, optionally, changed.

The device displays (652) a user interface on the display (e.g., a user interface of an email application is displayed in FIG. 5A).

While displaying the user interface, the device receives (654) at the first software application from a contact intensity module distinct from the first software application touch information that identifies an intensity stage of a touch input detected on the touch-sensitive surface (e.g., application 136 receives touch information 472 from contact intensity module 175).

The device updates (656) the user interface in accordance with at least the intensity stage of the touch input (e.g., an animation is shown in FIG. 5B).

In some embodiments, the device displays (658) an animation, corresponding to a transition to or from a predefined intensity state of the touch input, the animation corresponding to an intensity-based progress value of the touch input. For example, the animation illustrated in FIGS. 5A-5D corresponds to a stage progress value of contact 504. In some embodiments, the touch information received at the first software application from the contact intensity module also identifies the intensity-based progress value of the touch input.

It should be understood that the particular order in which the operations in FIG. 6D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 750, 800, 900, 1000, 1100, and 1200) are also applicable in an analogous manner to method 650 described above with respect to FIG. 6D. For example, the intensity stage described above with reference to method 650 optionally have one or more of the characteristics of the intensity stage described herein with reference to other methods described herein (e.g., methods 600, 700, 800, 900, 1000, 1100, and 1200). For brevity, these details are not repeated here.

FIGS. 7A-7C illustrate a flow diagram of a method 700 of processing touch inputs based on intensity model identifiers in accordance with some embodiments. The method 700 is performed at an electronic device (e.g., device 300, FIG. 3A or 3B, or portable multifunction device 100, FIG. 1A) with a touch-sensitive surface, and one or more sensors to detect intensity of contacts with the touch-sensitive surface. The electronic device stores a first software application. In some embodiments, the electronic device includes a display. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 700 simplifies processing of touch inputs. The method reduces the computational burden on a software application, thereby creating a more efficient electronic device. In addition, the size of the software application is reduced, thereby occupying less storage space and memory.

The device detects (702) a first touch input on the touch-sensitive surface (e.g., contact 504 in FIG. 5A).

In response to detecting the first touch input on the touch-sensitive surface, the device determines (704) a first intensity applied by the first touch input on the touch-sensitive surface (e.g., intensity of contact 504 in FIG. 5A).

The device identifies (706) a first intensity model identifier from a plurality of predefined intensity model identifiers.

In some embodiments, identifying the first intensity model identifier includes (708) identifying the first software application as corresponding to the touch input and identifying an intensity model identifier registered by (or for or corresponding to) the first software application as the first intensity model identifier. For example, the device may identify use info 458 in intensity models 454 (FIG. 3G) and identify an intensity model identifier registered by the first software application.

In some embodiments, in response to detecting the first touch input on the touch-sensitive surface, the device generates (710) a tactile output in accordance with the intensity applied by the first touch input on the touch-sensitive surface and the one or more thresholds associated with the first intensity model identifier (e.g., a tactile output is generated when intensity of a contact crosses one of the intensity thresholds). In some embodiments, a tactile output can be generated by either the contact intensity module or the first software application (e.g., the contact intensity and/or the first software application may send instructions to one or more tactile output generators to initiate the generation of a tactile output).

In accordance with the first intensity applied by the first touch input on the touch-sensitive surface and one or more thresholds associated with the first intensity model identifier, the device determines (712) a first touch characterization parameter (e.g., intensity stage, transition progress or stage progress). In some embodiments, the intensity thresholds are adjusted based on historical user actions. For example, if a user repeatedly applying high intensity that exceeds certain criteria, intensity thresholds are increased for the user.

In some embodiments, the device selects (714) a set of thresholds (e.g., intensity thresholds), from a plurality of sets of thresholds, in accordance with the identified intensity model identifier, and determines the touch characterization parameter in accordance with the selected set of thresholds. For example, the touch characterization parameter may be determined using the set of thresholds (e.g., associated with a first intensity model identifier) shown in FIG. 5J or the set of thresholds (e.g., associated with a second intensity model identifier) shown in FIG. 5K.

In some embodiments, the device identifies (716) one or more (or alternatively two or more) intensity ranges in accordance with the identified intensity model identifier, and determines a touch characterization parameter in accordance with the one or more identified intensity ranges. For example, intensity ranges may be used instead of, or in addition to, using intensity thresholds to determine one or more touch characterization parameters.

Subsequent to determining the first touch characterization parameter, the device sends (718, FIG. 7B) first touch information to the first software application. The first touch information includes the first intensity model identifier and the first touch characterization parameter (e.g., in FIG. 3G, touch information 472 includes intensity model identifier 485 and characterization parameters 476).

In some embodiments, sends (720) a stream of intensity events to the first software application, each intensity event corresponding to an intensity applied by the touch input at a corresponding time.

In some embodiments, the device receives (722) one or more instructions from the first software application to generate a tactile output (e.g., tactile output trigger 494, FIG. 3G). In response to receiving the one or more instructions from the software application, the device generates the tactile output in accordance with the one or more instructions from the software application.

In some embodiments, while continuing to detect the first touch input on the touch-sensitive surface, the device receives (724) one or more instructions to use an intensity model that corresponds to a second intensity model identifier that is distinct from the first intensity model identifier (e.g., from the first software application). For example, in FIG. 3G, application 136 sends intensity model identifier 490 to be used by contact intensity module 175 for a specified range of locations (e.g., tracking region 492) on the display. Subsequent to receiving the one or more instructions to use the intensity model that corresponds to the second intensity model identifier, the device determines a second intensity applied by the first touch input on the touch-sensitive surface, and processes the first touch input based on the second intensity model identifier. For example, in FIG. 5S, icon 510-1 and email icon 546-1 are associated with distinct intensity models, and the first touch input, once moved on the touch-sensitive surface to a location that corresponds to email icon 546-1, is processed based on an intensity model associated with email icon 546, such as a second intensity model). In some embodiments or in some circumstances, the first intensity and the second intensity are identical. Even though the first intensity and the second intensity are identical, the device may respond differently based on the intensity thresholds in the intensity models. In some embodiments or some circumstances, the second intensity and the first intensity are distinct.

In some embodiments, the device determines that the first touch input has ceased to be detected on the touch-sensitive surface (e.g., a complete lift-off of the first touch input or reduced intensity below a detection threshold), and detects a subsequent touch input. The device identifies a second intensity model identifier based on a location of the subsequent touch input (e.g., a location on touch-sensitive surface 451 or a corresponding location on display 450).

In some embodiments, while continuing to detect the first touch input on the touch-sensitive surface, subsequent to processing the first touch input based on the second intensity model identifier, the device receives (726, FIG. 7C) one or more instructions to use an intensity model that corresponds to a third intensity model identifier that is distinct from the first intensity model identifier and the second intensity model identifier (e.g., from the first software application). Subsequent to receiving the one or more instructions to use the intensity model that corresponds to the third intensity model identifier, the device determines a third intensity applied by the first touch input on the touch-sensitive surface; and processes the first touch input based on the third intensity model identifier. In some embodiments, the third intensity corresponds to the second intensity. In some embodiments, the third intensity and the second intensity are identical.

In some embodiments, the device determines (728) that the first touch input has ceased to be detected on the touch-sensitive surface. Subsequent to determining that the first touch input has ceased to be detected on the touch-sensitive surface, the device detects a second touch input on the touch-sensitive surface that is separate from the first touch input, and processes the second touch input based on the first intensity model identifier. For example, as shown in FIG. 5L-5N, the second intensity model expires (e.g., the device switches back to the first intensity model) upon the lift-off of the first touch input. In some embodiments, the device selects the first intensity model identifier based on a location of the second touch input.

In some embodiments, processing the touch input based on the second intensity model identifier includes (730), in accordance with the second intensity applied by the touch input on the touch-sensitive surface and one or more thresholds associated with the second intensity model identifier, determining a second touch characterization parameter (e.g., intensity stage, stage progress value, and/or transition progress value in FIG. 5J). The second touch characterization parameter is distinct from the first touch characterization parameter. For example, the touch characterization parameter (e.g., stage, transition progress, stage progress, etc.) has changed because the intensity model identifier (and the corresponding intensity model) has changed regardless of whether the intensity of the touch input has changed. Processing the touch input also includes, subsequent to determining the second touch characterization parameter, sending second touch information to the first software application.

The second touch information includes the second intensity model identifier and the second touch characterization parameter.

In some embodiments, processing the touch input based on the second intensity model identifier includes (732) foregoing generation of a tactile output in accordance with the second intensity failing to satisfying the one or more thresholds associated with the second intensity model identifier. The electronic device (e.g., the touch-sensitive surface of the electronic device) is configured to generate a tactile output in accordance with the second intensity satisfying at least one of the one or more thresholds associated with the first intensity model identifier. For example, as shown in FIG. 5L, when intensity of contact 504 decreases below a previous release intensity threshold $IT_{1R}$ but remains above a current release intensity threshold $IT_{1R\text{-}2}$, the device foregoes generating a tactile output even though the device would have generated a tactile output if the previous release intensity threshold $IT_{1R}$ were used.

In some embodiments, subsequent to detecting the first touch input, the device receives (734, FIG. 7B) one or more instructions to use an intensity model that corresponds to a second intensity model identifier that is distinct from the first intensity model identifier (e.g., from the first software application). Subsequent to receiving the one or more instructions to use the intensity model that corresponds to the second intensity model identifier, the device detects a second touch input on the touch-sensitive surface; and, in response to detecting the second touch input on the touch-sensitive surface, determines a second intensity applied by the second touch input on the touch-sensitive surface. The device also processes the second touch input based on the second intensity model identifier.

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 650, 750, 800, 900, 1000, 1100, and 1200) are also applicable in an analogous manner to method 700 described above with respect to FIGS. 7A-7C. For example, the touch characterization parameter described above with reference to method 700 optionally have one or more of the characteristics of the intensity stage described herein with reference to other methods described herein (e.g., method 600, 650, 750, 800, 900, 1000, 1100, and 1200). For brevity, these details are not repeated here.

In addition, one of ordinary skill in the art would recognize that many modifications and variations are possible in view of the above teachings.

For example, in accordance with some embodiments, a method is performed at an electronic device with a touch-sensitive surface. The electronic device includes one or more sensors to detect intensity of contacts with the touch-sensitive surface (e.g., the touch-sensitive surface includes one or more sensors to detect the intensity of contacts with the touch-sensitive surface) and the electronic device stores a first software application. In some embodiments, the touch-sensitive surface is integrated with a display. In some embodiments, the touch-sensitive surface is separate from the display. The method is performed using instructions other than instructions in the first software application (e.g., using a contact intensity module). The method includes detecting a touch input on a touch-sensitive surface; and, in response to detecting the touch input on the touch-sensitive surface, determining an intensity applied by the touch input on the touch-sensitive surface. The method also includes selecting a set of thresholds, from a plurality of sets of thresholds, for the touch input. At least one set of thresholds of the plurality of sets of thresholds includes multiple thresholds. The method further includes determining a touch characterization parameter of the touch input in accordance with the selected set of thresholds; and sending touch information to the first software application. The touch information includes the touch characterization parameter.

In some embodiments, the set of thresholds is selected based on a behavior identifier.

In some embodiments, the set of thresholds is selected based on a location of the touch input. In some embodiments, the behavior identifier is selected based on the location of the touch input.

In accordance with some embodiments, a method is performed at an electronic device with a touch-sensitive surface. The electronic device includes one or more sensors to detect intensity of contacts with the touch-sensitive surface (e.g., the touch-sensitive surface includes one or more sensors to detect the intensity of contacts with the touch-sensitive surface) and the electronic device stores a first software application. In some embodiments, the touch-sensitive surface is integrated with a display. In some embodiments, the touch-sensitive surface is separate from the display. The method is performed using instructions other than instructions in the first software application (e.g., using a contact intensity module). The method includes detecting a touch input on a touch-sensitive surface; and, in response to detecting the touch input on the touch-sensitive surface, determining an intensity applied by the touch input on the touch-sensitive surface. The method also includes selecting a set of intensity ranges, from a plurality of sets of intensity ranges, for the touch input. In some embodiments, at least one set of intensity ranges of the plurality of sets of intensity ranges includes multiple intensity ranges. The method further includes determining a touch characterization parameter of the touch input in accordance with the selected set of intensity ranges; and sending touch information to the first software application. The touch information includes the touch characterization parameter.

FIG. 7D illustrate a flow diagram of a method 750 of updating a user interface based on a touch characterization parameter in accordance with some embodiments. The method 750 is performed at an electronic device (e.g., device 300, FIG. 3A or 3B, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 750 are, optionally, combined and/or the order of some operations is, optionally, changed.

The device displays (752) a user interface of the first software application.

The device registers (754) a first intensity model identifier of a plurality of predefined force model identifiers.

In some embodiments, the device registers (756) a second intensity model identifier of the plurality of predefined force model identifiers. The first intensity model identifier is registered with respect to a first region of the user interface of the first software application and the second intensity model identifier is registered with respect to a second region, of the user interface of the first software application, that is distinct from the first region of the user interface of the first software application. In some embodiments, the first and second regions can be overlapping, but still distinct.

In some embodiments, the device concurrently displays (758) a user interface of a second software application while displaying the user interface of the first software application, and registers a third intensity model identifier of the plurality of predefined force model identifiers. The third intensity model identifier is registered with respect to a region, of the user interface of the second software application, that is distinct from the first region of the user interface of the first software application.

Subsequent to the registering, the device receives (760) touch information that includes the first intensity model identifier and a touch characterization parameter; and, in response to receiving the touch information, the device updates (762) a user interface of the first software application in accordance with the touch characterization parameter.

It should be understood that the particular order in which the operations in FIG. 7D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 650, 700, 800, 900, 1000, 1100, and 1200) are also applicable in an analogous manner to method 750 described above with respect to FIG. 7D. For example, the touch characterization parameter described above with reference to method 750 optionally have one or more of the characteristics of the touch characterization parameter described herein with reference to other methods described herein (e.g., methods 600, 650, 700, 800, 900, 1000, 1100, and 1200). For brevity, these details are not repeated here.

In addition, one of ordinary skill in the art would recognize that many modifications and variations are possible in view of the above teachings.

For example, in accordance with some embodiments, a method is performed at an electronic device with a touch-sensitive surface. The electronic device includes one or more sensors to detect intensity of contacts with the touch-sensitive surface (e.g., the touch-sensitive surface includes one or more sensors to detect the intensity of contacts with the touch-sensitive surface) and the electronic device stores a first software application. In some embodiments, the touch-sensitive surface is integrated with a display. In some embodiments, the touch-sensitive surface is separate from the display. The method includes registering first and second intensity model identifiers of a plurality of predefined intensity model identifiers; and, subsequent to the registering, receiving touch information that includes a respective intensity model identifier and a touch characterization parameter. The respective intensity model identifier is the first intensity model identifier or the second intensity model identifier. The method also includes updating a user interface of the first software application in accordance with the touch characterization parameter and the respective force model identifier.

FIGS. 8A-8C illustrate a flow diagram of a method 800 of processing touch inputs in different regions based on distinct intensity models in accordance with some embodiments. The method 800 is performed at an electronic device (e.g., device 300, FIG. 3A or 3B, or portable multifunction device

100, FIG. 1A) with a touch-sensitive surface and one or more sensors to detect intensity of contacts with the touch-sensitive surface. In some embodiments, the device stores a first software application. In some embodiments, the device includes a display. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, the method 800 simplifies processing of touch inputs. The method reduces the computational burden on a software application, thereby creating a more efficient electronic device. In addition, the size of the software application is reduced, thereby occupying less storage space and memory.

In some embodiments, prior to detecting a first touch input, the device displays (802) a user interface that includes a first display region and a second display region (e.g., a user interface of a first software application and a user interface of a second software application, as shown in FIG. 5T). The first display region corresponds to a first touch region of the touch-sensitive surface and the second display region corresponds to a second touch region of the touch-sensitive surface (e.g., in FIG. 5T, the user interface of the first software application corresponds to location 502-A on touch-sensitive surface 451 and the user interface of the second software application corresponds to location 502-B on touch-sensitive surface 451).

In some embodiments, the first display region corresponds (804) to a user interface of the first software application and the second display region corresponds to a user interface of a second software application (e.g., as shown in FIG. 5T). In some embodiments, both the first display region and the second display region correspond to the first software application (e.g., icon 510-1 and email icon 546-7 in FIG. 5S).

The device detects (806) a first touch input on a first touch region of the touch-sensitive surface (e.g., contact 522 in FIG. 5V).

The device identifies (808) a first intensity model identifier, associated with the first touch region of the touch-sensitive surface, from a plurality of predefined intensity model identifiers (e.g., an intensity model identifier that corresponds an intensity model with intensity thresholds $IT_1$, $IT_2$, and $IT_3$, etc. as shown in FIG. 5W).

In response to detecting the first touch input on the first touch region of the touch-sensitive surface, the device determines (810) a first intensity applied by the first touch input on the first touch region of the touch-sensitive surface (e.g., intensity of contact 522 in FIG. 5W).

In accordance with the first intensity applied by the first touch input on the touch-sensitive surface and one or more thresholds associated with the first intensity model identifier, the device determines (812) a first touch characterization parameter (e.g., stage, transition progress or stage progress).

Subsequent to determining the first touch characterization parameter, the device sends (814) first touch information to the first software application (e.g., touch information 472 is sent from contact motion module 130 in FIG. 3G). The first touch information includes the first touch characterization parameter.

The device detects (816, FIG. 8B) a second touch input on a second touch region of the touch-sensitive surface (e.g., contact 524 in FIG. 5Y). The second touch region of the touch-sensitive surface is distinct from the first touch region of the touch-sensitive surface.

The device identifies (818) a second intensity model identifier, associated with the second touch region of the touch-sensitive surface, from the plurality of predefined intensity model identifiers (e.g., an intensity model identifier that corresponds an intensity model with intensity thresholds $IT_1$ and $IT_{1R}$, as shown in FIG. 5Y).

In response to detecting the second touch input on the second touch region of the touch-sensitive surface, the device determines (820) a second intensity applied by the second touch input on the second touch region of the touch-sensitive surface (e.g., intensity of contact 524 in FIG. 5Z).

In accordance with the second intensity applied by the second touch input on the touch-sensitive surface and one or more thresholds associated with the second intensity model identifier, the device determines (822) a second touch characterization parameter (e.g., stage, transition progress or stage progress).

Subsequent to determining the second touch characterization parameter, the device sends (824) second touch information to the first software application (e.g., touch information 472 is sent from contact motion module 130 in FIG. 3G). The second touch information includes the second touch characterization parameter.

In some embodiments, in response to detecting the first touch input on the first touch region of the touch-sensitive surface, the device generates (826) a first tactile output in accordance with the first intensity applied by the first touch input on the touch-sensitive surface and the one or more thresholds associated with the first intensity model identifier (e.g., a tactile output is generated when intensity of contact 522 crosses the intensity threshold $IT_1$ in FIG. 5W). In response to detecting the second touch input on the second touch region of the touch-sensitive surface, the device generates a second tactile output in accordance with the second intensity applied by the second touch input on the touch-sensitive surface and the one or more thresholds associated with the second intensity model identifier (e.g., a tactile output is generated when intensity of contact 524 crosses the intensity threshold $IT_1$ in FIG. 5Z).

In some embodiments, at least a portion of the first touch region overlaps (828, FIG. 8C) with at least a portion of the second touch region. For example, as shown in FIG. 5AA, the user interface of the first software application and the user interface of the second software application at least partially overlap. Thus, the corresponding touch regions also overlap at least partially.

In some embodiments, the device detects (830) a third touch input on an overlapping touch region, of the touch-sensitive surface, that corresponds to an overlap of the first touch region and the second touch region (e.g., contact 526 in FIG. 5BB). The device selects an intensity model identifier between the first intensity model identifier and the second intensity model identifier for the overlapping touch region; and, in response to detecting the third touch input on the overlapping touch region, determines a third intensity applied by the third touch input on the overlapping touch region of the touch-sensitive surface. In accordance with the third intensity applied by the third touch input on the overlapping touch region of the touch-sensitive surface and one or more thresholds associated with the selected intensity model identifier, the device determines a third touch characterization parameter (e.g., stage, transition progress or stage progress). Subsequent to determining the third touch characterization parameter, the device sends third touch information to the first software application. The third touch information includes the third touch characterization parameter. For example, if a first intensity model (associated with the first software application) is selected, intensity of contact 526 is processed based on the first intensity model (e.g., FIG. 5BB). If a second intensity model (associated with the second software application) is selected, intensity of contact 526 is processed based on the second intensity model (e.g., FIG. 5CC).

In some embodiments, both the first intensity model identifier and the second intensity model identifier are associated (832) with priorities applicable to the overlapping touch region, and the intensity model identifier is selected based on the priority of the first intensity model identifier and the priority of the second intensity model identifier for the overlapping touch region (e.g., priority 489 of each respective intensity model 456-1, 456-2, and 456-3 in FIG. 3G). In some embodiments, the priority of an intensity model is explicitly assigned (e.g., the priority is stored in a dedicated data field, such as priority 489 in FIG. 3G). In some embodiments, the priority of an intensity model is indicated by its position within a list or group of intensity models (e.g., an intensity model positioned first in intensity models 454 in FIG. 3G has a higher priority than an intensity model positioned second in intensity models 454).

In some embodiments, the device foregoes (834) determination of a touch characterization parameter in accordance with the third intensity and one or more thresholds associated with an intensity model identifier that has not been selected between the first intensity model identifier and the second intensity model identifier. For example, in FIG. 5CC, a touch characterization parameter is determined in accordance with the first intensity model, and the device foregoes determination of a touch characterization parameter in accordance with the second intensity model.

In some embodiments, the first intensity model identifier has been selected (836) for the overlapping region. Subsequent to detecting the third touch input, the device detects a fourth touch input on the overlapping region of the touch-sensitive surface (e.g., contact 528, FIG. 5DD). The device selects the second intensity model identifier for the overlapping touch region (e.g., based on one or more instructions from a software application). In response to detecting the fourth touch input on the overlapping touch region, the device determines a fourth intensity applied by the fourth touch input on the overlapping touch region of the touch-sensitive surface. In accordance with the fourth intensity applied by the fourth touch input on the overlapping touch region of the touch-sensitive surface and the one or more thresholds associated with the second intensity model identifier, the device determines a fourth touch characterization parameter (e.g., an intensity stage, a stage progression value, and/or a transition progress value of contact 528 in FIG. 5EE). Subsequent to determining the touch characterization parameter, the device sends fourth touch information to the first software application. The fourth touch information includes the fourth touch characterization parameter.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 650, 700, 750, 900, 1000, 1100, and 1200) are also applicable in an analogous manner to method 800 described above with respect to FIGS. 8A-8C. For example, the touch characterization parameter described above with reference to method 800 optionally have one or more of the characteristics of the touch characterization parameter described herein with reference to other methods described herein (e.g., methods 600, 650, 700, 750, 900, 1000, 1100, and 1200). For brevity, these details are not repeated here.

In addition, one of ordinary skill in the art would recognize that many modifications and variations are possible in view of the above teachings.

For example, in some embodiments, a method is performed at an electronic device with a touch-sensitive surface. The electronic device includes one or more sensors to detect intensity of contacts with the touch-sensitive surface (e.g., the touch-sensitive surface includes one or more sensors to detect the intensity of contacts with the touch-sensitive surface) and the electronic device stores a first software application. In some embodiments, the touch-sensitive surface is integrated with a display. In some embodiments, the touch-sensitive surface is separate from the display. The method includes displaying a user interface that includes a first display region and a second display region that is distinct from the first display region; and, while displaying the user interface, detecting a first touch input at a location on the touch-sensitive surface that corresponds to the first display region (e.g., while a cursor is displayed over the first display region in the user interface). The method also includes, in response to detecting the first touch input at a location on the touch-sensitive surface that corresponds to the first display region, determining a first intensity applied by the first touch input on the touch-sensitive surface; in accordance with the first intensity applied by the first touch input on the touch-sensitive surface and a first set of one or more thresholds associated with the first display region, determining a first touch characterization parameter (e.g., stage, transition progress or stage progress); and, subsequent to determining the first touch characterization parameter, sending first touch information to the first software application. The first touch information includes the first touch characterization parameter. The method further includes detecting a second touch input at a location on the touch-sensitive surface that corresponds to the second display region; and, in response to detecting the second touch input at a location on the touch-sensitive surface that corresponds to the second display region, determining a second intensity applied by the second touch input on the touch-sensitive surface; in accordance with the second intensity applied by the second touch input on the touch-sensitive surface and a second set of one or more thresholds associated with the second display region, determining a second touch characterization parameter (e.g., stage, transition progress or stage progress); and, subsequent to determining the second touch characterization parameter, sending second touch information to the first software application. The second touch information includes the second touch characterization parameter.

FIGS. 9A-9D illustrate a flow diagram of a method 900 of processing a touch input based on a location-based intensity model in accordance with some embodiments. The method 900 is performed at an electronic device (e.g., device 300, FIG. 3A or 3B, or portable multifunction device 100, FIG. 1A) with a touch-sensitive surface and one or more sensors to detect intensity of contacts with the touch-sensitive surface. In some embodiments, the device includes a display. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, the method 900 simplifies processing of touch inputs. The method reduces the computational burden on a software application, thereby creating a more efficient electronic device. In addition, the size of the software application is reduced, thereby occupying less storage space and memory.

The device detects (902) a touch input on the touch-sensitive surface (e.g., contact 536 in FIG. 5FF or contact 538 in FIG. 5HH).

In response to detecting the touch input, the device, in accordance with a determination that the touch input is at a location on the touch-sensitive surface that is associated with a first intensity model of a plurality of different intensity models, processes (904) the touch input in accordance with an intensity applied by the touch input on the touch-sensitive surface and the first intensity model (e.g., without processing the touch input in accordance with the second intensity model). The device, in accordance with a determination that the touch input is at a location on the touch-sensitive surface that is associated with a second intensity model different from the first intensity model, processes (906) the touch input in accordance with an intensity applied by the touch input on the touch-sensitive surface and the second intensity model (e.g., without processing the touch input in accordance with the first intensity model). For example, in FIG. 5FF, in accordance with a determination that contact 536 is detected in region 542, contact 536 is processed based on a first intensity model (without processing contact 536 based on a second intensity model associated with region 534-8). In FIG. 5HH, in accordance with a determination that contact 538 is detected in region 534-8, contact 538 is processed based on the second intensity model (without processing contact 538 based on the first intensity model associated with region 542).

In some embodiments, the device processes (908) the touch input in accordance with an intensity applied by the touch input and the first intensity model includes providing contact intensity information to a user-interface application (e.g., a first software application) without generating a tactile output for the touch input (e.g., a stage progress value of contact 536 in FIG. 5FF is provided to application 136 in FIG. 3G for determining a width of a graphical element, such as a pen stroke, and a tactile output is suppressed for contacts in region 542). Processing the touch input in accordance with an intensity applied by the touch input and the second intensity model includes conditionally generating a tactile output for the touch input (e.g., in FIG. 5HH, a tactile output is generated when the intensity crosses a certain intensity threshold for region 534-8).

In some embodiments, during the touch input, the electronic device detects (910, FIG. 9B) application of a respective intensity on the touch-sensitive surface that is attributed to the touch input. Processing the touch input in accordance with an intensity applied by the touch input on the touch-sensitive surface and the first intensity model includes providing, to a user interface application, first touch input state information that indicates that the touch input has applied the respective intensity on the touch-sensitive surface without generating a tactile output for the touch input (e.g., a stage progress value of contact 536 in FIG. 5FF is provided to application 136, as shown in FIG. 3G, for determining a width of a graphical element, such as a pen stroke, and a tactile output is suppressed for contacts in region 542). Processing the touch input in accordance with an intensity applied by the touch input on the touch-sensitive surface and the second intensity model includes providing, to a user interface application, second touch input state information that indicates that the touch input has applied the respective intensity on the touch-sensitive surface and generating a tactile output for the touch input (e.g., a stage progress value, a transition progress value of contact 538 in FIG. 5HH, or a discrete indication that a corresponding user interface element has been activated).

In some embodiments, the first touch input state information includes (912) a continuously variable representation of intensity of the touch input (e.g., a value that varies as the intensity of the touch input changes, such as a stage progress value or a transition progress value). The second touch input state information includes an indication that the intensity of the touch input is within a range of values that correspond to activation of a user interface element that corresponds to the location on the touch-sensitive surface that is associated with the second intensity model (e.g., a discrete indication that does not vary as the intensity of the touch input changes so long as the intensity of the touch input is maintained within a predefined range of intensity values, and indicates whether a button or other affordance has been selected).

In some embodiments, the device detects (914) a first touch input on a first touch region (e.g., a non-tactile feedback region) of the touch-sensitive surface (e.g., contact 536 in FIG. 5FF). The device also identifies a first intensity model identifier, associated with the first touch region of the touch-sensitive surface, from a plurality of predefined intensity model identifiers (e.g., the first intensity model identifier corresponds to the first intensity model). In response to detecting the first touch input on the first touch region of the touch-sensitive surface, the device determines a first intensity applied by the first touch input on the first touch region of the touch-sensitive surface; and, in accordance with the first intensity applied by the first touch input on the touch-sensitive surface and the first intensity model identifier, processes the first touch input and foregoes generation of a tactile output for the first touch input (e.g., a graphical element corresponding to a movement of contact 536 is displayed in FIG. 5GG). The device detects a second touch input on a second touch region (e.g., a tactile feedback region) of the touch-sensitive surface (e.g., contact 538 in FIG. 5HH). The second touch region of the touch-sensitive surface is distinct from the first touch region of the touch-sensitive surface. The device identifies a second intensity model identifier, associated with the second touch region of the touch-sensitive surface, from the plurality of predefined intensity model identifiers (e.g., the second intensity model identifier corresponds to the second intensity model). In response to detecting the second touch input on the second touch region of the touch-sensitive surface, the device determines a second intensity applied by the second touch input on the second touch region of the touch-sensitive surface; and, in accordance with the second intensity applied by the second touch input on the touch-sensitive surface and the second intensity model identifier, processes the second touch input (e.g., a corresponding character is inserted into a document, as shown in FIG. 5HH) and conditionally generates a tactile output for the second touch input in accordance with the second touch input and one or more model parameters associated with the second intensity model identifier (e.g., one or more model parameters in the second intensity model).

In some embodiments, conditionally generating the tactile output for the second touch input includes (916, FIG. 9C) foregoing generation of the tactile output for the second touch input in accordance with a determination that the second touch input fails to satisfy one or more criteria corresponding to the one or more model parameters associated with the second intensity model identifier. For example, in some embodiments, a tactile output is not generated when a touch input does not cross an intensity threshold.

In some embodiments, the first intensity model identifier indicates (918) that no tactile output is to be generated for a touch input on the first touch region of the touch-sensitive surface.

In some embodiments, the electronic device stores (920) a first software application, and the first user input and the second user input are detected while the electronic device displays a user interface of the first software application (e.g., a user interface of a word processing software application as shown in FIGS. 5FF-5JJ).

In some embodiments, the user interface of the first software application includes (922) a handwriting input tool region (e.g., a character input tool region) (e.g., a handwriting input tool region 540 in FIG. 5FF). In some embodiments, the handwriting input tool region is distinct from the user interface of the first software application and the handwriting input tool region overlays the user interface of the first software application (e.g., a user interface of a word processing software application). In some embodiments, the handwriting input tool region is separate from the user interface of the first software application.

In some embodiments, the handwriting input tool region includes (924) a plurality of selection regions, and at least a respective selection region of the one or more selection regions corresponds to the second touch region (e.g., a tactile feedback region) of the touch-sensitive surface. For example, in FIG. 5JJ, selection region 532-1 corresponds to touch region 534-1. In some embodiments, the one or more selection regions collectively correspond to the second touch region.

In some embodiments, the handwriting input tool region includes (926) a handwriting input region, and the handwriting input region corresponds to the first touch region (e.g., a potential non-tactile feedback region) of the touch-sensitive surface. For example, in FIG. 5FF, handwriting input region 530 corresponds to region 542.

In some embodiments, in response to detecting the first touch input on the first touch region of the touch-sensitive surface, the device displays (928) one or more graphical elements (e.g., pen strokes, such as 544 in FIG. 5GG) in the handwriting input region in accordance with the first touch input.

In some embodiments, in response to detecting the first touch input on the first touch region (e.g., a potential non-tactile feedback region} of the touch-sensitive surface, the device displays (930, FIG. 9D) a plurality of groups of characters in the plurality of selection regions (e.g., characters in selection regions 532-5 through 532-8 in FIG. 5GG). A respective group of characters is selected based on the one or more displayed graphical elements in the handwriting input region, and the respective group of characters is displayed in a respective selection region (e.g., characters, such as Chinese, Korean, and Japanese characters, that correspond to displayed pen strokes). In response to detecting the second user input on the second touch region of the touch-sensitive surface at a location that corresponds to the respective selection region, the device selects the respective group of characters (e.g., in FIG. 5HH, in response to contact 538 in region 534-8, the character in a corresponding selection region 532-8 is selected). In some embodiments, in response to detecting the second user input on the second touch region of the touch-sensitive surface at a location that corresponds to the respective selection region and subsequent to selecting the respective group of characters, the device displays the respective group of characters in the user interface of the first software application other than the handwriting input tool region (e.g., in FIG. 5HH, in response to contact 538 on region 534-8, the character in a corresponding selection region 532-8 is inserted into the document).

In some embodiments, processing the first touch input detected on the first touch region of the touch-sensitive surface includes (932) determining that the first touch input has satisfied a drawing intensity threshold; and, in accordance with a determination that the first touch input has exceeded the drawing intensity threshold, displaying the one or more graphical elements in the handwriting input region in accordance with the first touch input. A first terminal region of a respective graphical element of the one or more graphical elements corresponds to a location where the first touch input has been determined to satisfy the drawing intensity threshold. For example, as shown in FIG. 5II, drawing of a graphical element is initiated in response to intensity of contact 536 satisfying the drawing intensity threshold $IT_D$.

In some embodiments, processing the first touch input detected on the first touch region of the touch-sensitive surface includes (934) while continuing to detect the first touch input on the touch-sensitive surface, continuing to update the one or more graphical elements in the handwriting input region in accordance with the first touch input regardless of whether the first touch input has ceased to satisfy the drawing intensity threshold. For example, as shown in FIG. 5II, once the drawing of a graphical element is initiated, the drawing continues even if intensity of contact 536 falls below the drawing intensity threshold.

In some embodiments, processing the first touch input detected on the first touch region of the touch-sensitive surface includes (936) detecting that the first touch input has ceased to be detected on the touch-sensitive surface and detecting that the first touch input has resumed contact with the touch-sensitive surface within a predefined time interval subsequent to the first touch input ceasing to be detected on the touch-sensitive surface. Processing the first touch input also includes, in response to the first touch input resuming contact with the touch-sensitive surface within the predefined time interval subsequent to the first touch input ceasing to be detected on the touch-sensitive surface, updating the one or more graphical elements in the handwriting input region in accordance with the first touch input. For example, as shown in FIG. 5JJ, even if contact 536 breaks contact with touch-sensitive surface 451 while following a path on touch-sensitive surface 451 and subsequent contact 544 continues the path, the paths of contact 536 and contact 544 are treated as a single path.

It should be understood that the particular order in which the operations in FIGS. 9A-9D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 650, 700, 750, 800, 1000, 1100, and 1200) are also applicable in an analogous manner to method 900 described above with respect to FIGS. 9A-9D. For example, the intensity model described above with reference to method 900 optionally have one or more of the characteristics of the intensity model described herein with reference to other methods described herein (e.g., methods 600, 650, 700, 750, 800, 1000, 1100, and 1200). For brevity, these details are not repeated here.

FIGS. 10A-10D illustrate a flow diagram of a method 1000 of processing a touch input based on latching of the touch input in accordance with some embodiments. The method 1000 is performed at an electronic device (e.g., device 300, FIG. 3A or 3B, or portable multifunction device 100, FIG. 1A) with a touch-sensitive surface and one or more sensors to detect intensity of contacts with the touch-sensitive surface. The device stores a first software application. In some embodiments, the device includes a display. In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

As described below, the method 1000 simplifies processing of touch inputs. The method reduces the computational burden on a software application, thereby creating a more efficient electronic device. In addition, the size of the software application is reduced, thereby occupying less storage space and memory.

The device displays (1002) a user interface that includes two or more display regions, including a first display region and a second display region (e.g., icon 510-1 and email icon 546-7 in FIG. 5KK).

While displaying the user interface, the device detects (1004) a first intensity applied by a touch input at a first location on the touch-sensitive surface that corresponds to the first display region (e.g., intensity of contact 548 in FIG. 5LL).

In some embodiments, in response to detecting the first intensity applied by the touch input, the device processes (1006) the first intensity in accordance with the one or more intensity thresholds associated with the first display region (e.g., in FIG. 5LL, intensity of contact 548 is processed in accordance with intensity thresholds associated with icon 510-1).

In some embodiments, processing the first intensity in accordance with the one or more intensity thresholds associated with the first display region includes (1008) displaying an animation that corresponds to a change in intensity applied by the touch input from a prior intensity to the first intensity (e.g., from intensity, detected prior to detecting the first intensity, to the first intensity) (e.g., icon 510-1 is visually distinguished in FIG. 5MM). For example, the device displays a pre-latch animation that indicates that the user is interacting with a particular control in the first display region such as a change in appearance of a first button in the first display region that is proximate to a focus selector. This pre-latch animation is optionally presented at a rate that is dependent on a rate of change in the intensity of the contact or magnitude of intensity of the contact so as to provide feedback to the user as to their progress toward activating the button or latching onto the button.

The device detects (1010) a movement of the touch input across the touch-sensitive surface from the first location on the touch-sensitive surface to a second location on the touch-sensitive surface that corresponds to the second display region (e.g., while a cursor is displayed over the first display region) (e.g., movement of contact 548 in FIG. 5NN). In some embodiments, the movement of the touch input across the touch-sensitive surface from the first location on the touch-sensitive surface to the second location on the touch-sensitive surface is detected after detecting the first intensity applied by the touch input at the first location.

In some embodiments, in response to detecting the movement of the touch input from the first location on the touch-sensitive surface to the second location on the touch-sensitive surface, the device displays (1012) an animation that corresponds to a change in intensity applied by the touch input (e.g., from an intensity, detected prior to detecting the first intensity, to the first intensity). For example, the device displays a pre-latch animation that indicates that the user is interacting with a particular control in the second display region such as a change in appearance of a second button in the second display region that is proximate to a focus selector. This pre-latch animation is optionally presented at a rate that is independent of a rate of change in the intensity of the contact so as to catch the animation up to a current point in the pre-activation animation that corresponds to a current intensity of the contact.

After detecting the movement of the touch input from the first location on the touch-sensitive surface to the second location on the touch-sensitive surface, the device detects (1014) a second intensity applied by the touch input at the second location on the touch-sensitive surface (e.g., intensity of contact 548 in FIG. 5OO).

In response to detecting the second intensity applied by the touch input at the second location on the touch-sensitive surface, the device, in accordance with a determination that the first intensity does not satisfy a first intensity threshold (e.g., a latching intensity threshold), processes (1016, FIG. 10B) the second intensity in accordance with one or more intensity thresholds associated with the second display region (e.g., in FIG. 5PP, contact 548 is processed based on intensity thresholds associated with email icon 546-7).

In some embodiments, the first intensity threshold is (1018) distinct from an activation intensity threshold. In some embodiments, the device detects a touch input at a location on the touch-sensitive surface that corresponds to the first display region; and, in response to detecting the touch input, determines an intensity applied by the touch input on the touch-sensitive surface. In accordance with a determination that the intensity applied by the touch input on the touch-sensitive surface satisfies the activation intensity threshold, the device initiates activation of the first software element (e.g., sends to the first software element one or more instructions to activate the first software element).

In some embodiments, processing the second intensity in accordance with the one or more intensity thresholds associated with the second display region includes (1020) displaying an animation that corresponds to a change in intensity applied by the touch input on the touch-sensitive surface (e.g., from the first intensity to the second intensity). For example, the device displays a pre-activation animation corresponding to the user interface element in the second display region such as a button press animation that indicates that a button in the second display region will be activated if the intensity of the contact increases above the button-activation intensity threshold. This pre-activation animation is optionally presented at a rate that is dependent on a rate of change in the intensity of the contact or magnitude of intensity of the contact so as to provide feedback to the user as to their progress toward activating the button.

In some embodiments, processing the second intensity in accordance with one or more intensity thresholds associated with the second display region includes (1022) activating a second control associated with the second display region (e.g., when the contact meets activation criteria that include a criterion that is met when the contact exceeds an activation intensity threshold for the second control).

In response to detecting the second intensity applied by the touch input at the second location on the touch-sensitive surface, the device, in accordance with a determination that the first intensity satisfies the first intensity threshold, processes (1024) the second intensity in accordance with one or more intensity thresholds associated with the first display region (e.g., in FIG. 5SS, contact 548 is processed based on intensity thresholds associated with icon 510-1).

In some embodiments, the one or more intensity thresholds associated with the first display region are (1026, FIG. 10C) different from the one or more intensity thresholds associated with the second display region (e.g., the first display region and the second display region are both associated with different intensity models).

In some embodiments, the one or more intensity thresholds associated with the first display region are (1028) the same as the one or more intensity thresholds associated with the second display region (e.g., the first display region and the second display region are both associated with a same intensity model).

In some embodiments, processing the second intensity in accordance with the one or more intensity thresholds associated with the first display region includes (1030) displaying an animation that corresponds to a change in intensity applied by the touch input on the touch-sensitive surface (e.g., from the first intensity to the second intensity). For example, the device displays a pre-activation animation corresponding to a user interface element in the first display region such as a pre-button press animation that indicates that a button in the first display region will be activated if the intensity of the contact increases above a button-activation intensity threshold. This pre-activation animation is optionally presented at a rate that is dependent on a rate of change in the intensity applied by the touch input or magnitude of the intensity applied by the touch input so as to provide feedback to the user as to their progress toward activating the button.

In some embodiments, processing the second intensity in accordance with one or more intensity thresholds associated with the first display region includes (1032) activating a first control associated with the first display region (e.g., when the contact meets activation criteria that include a criterion that is met when the contact exceeds an activation intensity threshold for the first control).

In some embodiments, the device sends (1034, FIG. 10B) first touch information to the first software application in accordance with a determination that the first intensity satisfies a reporting intensity threshold that is distinct from the first intensity threshold. The first touch information includes one or more touch parameters that correspond to the first intensity. In some embodiments, the first intensity threshold requires a higher intensity than the reporting intensity threshold. In some embodiments, the method includes, in accordance with a determination that the first intensity does not satisfy the reporting intensity threshold, foregoing sending the first touch information. The device sends second touch information to the first software application in accordance with a determination that the second intensity satisfies the reporting intensity threshold. The second touch information includes one or more touch parameters that correspond to the second intensity.

In some embodiments, a first display region of the two or more display regions is associated (1036, FIG. 10D) with a first software element of the first software application and a second display region of the two or more display regions is associated with a second software element of the second software application.

In some embodiments, in accordance with the determination that the first intensity does not satisfy the first intensity threshold (e.g., not latched on the first display region), the second touch information is sent (1038) to the second software element without sending the second touch information to the first software element.

In some embodiments, in accordance with the determination that the first intensity satisfies the first intensity threshold (e.g., latched on the first display region), the second touch information is sent (1040) to the first software element without sending the second touch information to the second software element.

In some embodiments, in accordance with the determination that the first intensity satisfies the reporting intensity threshold, the first touch information is sent (1042) to the first software element. In some embodiments, the first touch information is sent to the first software element without sending the first touch information to the second software element.

In some embodiments, in response to detecting the touch input, the device updates (1044, FIG. 10B) the user interface in accordance with the first touch information using the first software application prior to the first intensity satisfying the first intensity threshold. In some embodiments, updating the user interface in accordance with the first touch information using the first software application includes displaying an animation that indicates detection of the touch input. For example, the animation may be used to inform the user as to the intensity required to achieve latching. In some embodiments, updating the user interface in accordance with the first touch information using the first software application includes displaying an animation that indicates increase and/or decrease in an intensity applied by the touch input on the touch-sensitive surface.

It should be understood that the particular order in which the operations in FIGS. 10A-10D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 650, 700, 750, 800, 900, 1100, and 1200) are also applicable in an analogous manner to method 1000 described above with respect to FIGS. 10A-10D. For example, the intensity thresholds described above with reference to method 1000 optionally have one or more of the characteristics of the intensity thresholds described herein with reference to other methods described herein (e.g., methods 600, 650, 700, 750, 800, 900, 1100, and 1200). For brevity, these details are not repeated here.

FIGS. 11A-11C are flow diagrams illustrating a method 1100, performed by an electronic device of routing tactile outputs among a plurality of input devices that are in communication with the electronic device. In some embodiments, the electronic device includes one or more of the input devices (e.g., a touch-screen display or trackpad). As described below, the method 1100 provides tactile feedback, herein called a tactile output, to the same input device as the input device from which an input was received that triggered a reaction by an application executed by the electronic device. The method enables and/or facilitates the use of multiple input devices at which tactile outputs can be generated, and enables the use of tactile feedback by a broad range of applications that can be executed by the electronic device. The method also reduces the cognitive burden on a user when performing an operation in conjunction with an application, by providing tactile feedback that facilitates efficient use of the electronic device and the application, thereby creating a more efficient human-machine interface. For battery-operated electronic devices, enabling a user to perform an operation in accordance with a selected mode of operation faster and more efficiently conserves power and increases the time between battery charges.

Optionally, but typically, the device displays (1102), on a display that is part of the device or in communication with the device, a user interface for the electronic device. Examples of such user interfaces being displayed by an electronic device are shown in FIGS. 5A-5S. In some embodiments, the user interface includes two of more display regions, including a first display region and a second display region. Typically, the user interface continues to be displayed throughout performance of method 1100, although content of the user interface may change, for example in response to inputs by a user of the electronic device. Furthermore, the device is in communication with a plurality of input devices including a first input device (e.g., a first input device having a first touch-sensitive surface that includes one or more sensors to detect intensity of contacts with the first touch-sensitive surface) that is configured to generate tactile outputs in response to inputs and a second input device (e.g., a second input device having a second touch-sensitive surface that includes one or more sensors to detect intensity of contacts with the second touch-sensitive surface) that is configured to generate tactile outputs. Non-limiting examples of the first input device are a trackpad and touch-sensitive display, and non-limiting examples of the second input device are a trackpad and touch-sensitive display.

The device receives (1104) an indication of an input detected by a respective input device of the plurality of input devices. In some embodiments, the touch input can be a finger touch input by a person's finger, or a stylus touch input. In response to receiving the indication of the input, the device provides (1106) information describing the input to an application running on the device that enables the application to react to the input. For example, a touch event specifying the movement (if any), location, intensity, etc. of one or more contacts is provided to an application. In some embodiments, the touch event provided to the application includes a plurality of lists, such as two or more of: a list of all touches currently detected by input devices in communication with the device, a list of all touches associated with a particular view of an application, and a list of changed touches, comprising touches for which at least one parameter or aspect (e.g., location and/or intensity) has changed since a prior touch event was provided to the application.

The device receives (1108) a reaction to the input from the application that indicates that a tactile output is to be generated in response to the input. For example, in some circumstances, the input includes (1110) lateral movement, and the reaction of the application includes moving a graphical user interface object across a display.

In response to receiving the reaction to the input from the application, the device causes (1112) the generation of a respective tactile output. More specifically, in accordance with a determination (1114) that the reaction was triggered by the first input device, the respective tactile output is generated at the first input device (e.g., touch-screen display 340, FIG. 3B) based on the reaction to the input from the application; and in accordance with a determination (1116) that the reaction was triggered by the second input device (e.g., trackpad 332, FIG. 3B), the respective tactile output is generated at the second input device based on the reaction to the input from the application.

In some embodiments, in response to receiving the reaction to the input from the application, the device determines (1118) which input device of the plurality of input devices triggered the reaction from the application. For example, in the context of FIG. 3B, which includes both a trackpad 332 and touch-sensitive display 340, the device determines which of the trackpad and touch-sensitive display triggered the reaction from the application. In some embodiments, that determination is made by the application. For example, in some circumstances, inputs may be received concurrently, or during overlapping time periods, from two or more input devices, and the application may make the determination as to which of the input devices triggered the reaction. Continuing with this example, the input from one of the input devices may be used by the application to select a mode of operation or select an option, while the input from another one of the input devices triggers the reaction, and it is the application that makes this determination.

More specifically, and consistent with what has been described above, in some embodiments, when the reaction was triggered by the first input device, the tactile output at the first input device is generated (1120) without causing generation of any tactile output at the second input device, and when the reaction was triggered by the second input device, the tactile output at the second input device is generated (1122) without causing generation of any tactile output at the first input device.

In some embodiments, the information describing the input includes (1124) a respective identifier for the respective device, the reaction to the input includes the respective identifier for the respective device, and determining that the reaction was triggered by the first input device includes determining (1126) that the respective identifier is an identifier for the first input device. Similarly, the determination that the reaction was triggered by the second input device includes determining (1128) that the respective identifier is an identifier for the second input device. Furthermore, in some embodiments, the respective identifier is (1130) part of an input event (e.g., a touch event) that describes the input. Thus, in such embodiments, the module(s) that initially process inputs from the input devices and that generate or cause the generation of tactile outputs, and the application that responds to such inputs, utilize distinct identifiers for each of the input devices in communication with the device. In some embodiments, this facilitates routing tactile feedback to the input device determined (e.g., see 1118) to have triggered the reaction from the application.

In some embodiments, the device is configured (1132) to cause the generation of tactile outputs at the plurality of input devices in response to changes in intensity of contacts on the input devices in accordance with one or more intensity models. For example, this is described in greater detail above with reference to methods 600, 700, 800, 900 and 1000. Furthermore, in some circumstances, the respective tactile output is generated (1134) without reference to the one or more intensity models. The following is a non-limiting set of examples of such circumstances. In one example, the tactile feedback requested by an application is in response to a lateral movement of a touch input that moves one object adjacent to, near, over or partially over another object, and the tactile feedback concerns the lateral movement, but not the intensity of the contact corresponding to the touch input. Another example in a respective tactile output is generated without reference to the one or more intensity models is a movement of the touch input that results in the application adjusting the position of an object, for example "snapping" the object to a horizontal and/or vertical position defined by a grid or guide. Yet another example in a respective tactile output is generated without reference to the one or more intensity models is a movement of the touch input that violates a predefined rule or condition (e.g., a movement of the touch input that is construed by the application to be an instruction to move an object over another object, in violation of a rule), or that satisfies a predefined rule or condition (e.g., a movement of the touch input that is construed by the application to be an instruction to move an object over another object, thereby initiating or enabling an action, such as adding the object to a collection, changing a property of the moved object or the other object, etc.

It should be understood that the particular order in which the operations in FIGS. 11A-11C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 650, 700, 750, 800, 900, 1000, and 1200) are also applicable in an analogous manner to method 1100 described above with respect to FIGS. 11A-11C. For example, the contacts, user interface objects, tactile outputs, intensity thresholds, and focus selectors described above with reference to method 1100 optionally have one or more of the characteristics of the contacts, user interface objects, tactile outputs, intensity thresholds, and focus selectors described herein with reference to other methods described herein (e.g., methods 600, 650, 700, 750, 800, 900, 1000, and 1200). For brevity, these details are not repeated here.

FIGS. 12A-12C are flow diagrams illustrating a method 1200, performed by an electronic device that is in communication with one or more input devices that are configured to generate tactile outputs in response to inputs, in which the device conditionally cancels or forgoes generation of a tactile output corresponding to the reaction from the application in accordance with a determination that tactile output criteria have not been met. The tactile output criteria include a criterion (sometimes called a timing criterion or latency criterion) that is met when an input time is less than a predetermined amount of time before the output time. In some embodiments, the electronic device includes one or more of the input devices (e.g., a touch-screen display or trackpad).

Method 1200 enables and/or facilitates the use of complex application software for which tactile outputs can be generated, and enables the use of tactile feedback by a broad range of applications that can be executed by the electronic device. The method also reduces the cognitive burden on a user when performing an operation in conjunction with an application, by providing limiting the provision of tactile feedback to circumstances in which the tactile feedback will be intuitively meaningful, and forgoing the provision of tactile feedback in circumstances in which the tactile feedback might be confusing to the user or even mis-informative due to latency between the input that cause the application's reaction and the time at which the tactile output would be generated.

In a non-limiting example, the generation of a reaction to an input by an application may be delayed by connectivity issues, a stalled process executing on the same device or another device, a failed procedure call to another application or module, or any of a potentially large number of circumstances. In at least some situations, when that delay results in a time difference between the input time, at which the input was detected by a respective input device, and an output time for the reaction by the application that exceeds a predetermined amount of time, the method forgoes generation of the tactile output corresponding to the reaction from the application.

Method 1200 therefore facilitates efficient use of the electronic device and the application, thereby creating a more efficient human-machine interface. For battery-operated electronic devices, enabling a user to perform an operation in accordance with a selected mode of operation faster and more efficiently conserves power and increases the time between battery charges.

Optionally, but typically, the device displays (1202), on a display that is part of the device or in communication with the device, a user interface for the electronic device. Examples of such user interfaces being displayed by an electronic device are shown in FIGS. 5A-5S. In some embodiments, the user interface includes two of more display regions, including a first display region and a second display region. Typically, the user interface continues to be displayed throughout performance of method 1200, although content of the user interface may change, for example in response to inputs by a user of the electronic device. Furthermore, the device is in communication with a plurality of input devices including a first input device (e.g., a first input device having a first touch-sensitive surface that includes one or more sensors to detect intensity of contacts with the first touch-sensitive surface) that is configured to generate tactile outputs in response to inputs and a second input device (e.g., a second input device having a second touch-sensitive surface that includes one or more sensors to detect intensity of contacts with the second touch-sensitive surface) that is configured to generate tactile outputs. Non-limiting examples of an input device of the one or more input devices is a trackpad or touch-sensitive display.

The device receives (1204) an indication of an input detected by a respective input device of the one or more of input devices. In some embodiments, the touch input can be a finger touch input by a person's finger, or a stylus touch input. In response to receiving the indication of the input, the device provides (1206) information describing the input to an application running on the device that enables the application to react to the input. For example, a touch event specifying the movement (if any), location, intensity, etc. of one or more contacts is provided to an application. In some embodiments, the touch event provided to the application includes a plurality of lists, such as two or more of: a list of all touches currently detected by input devices in communication with the device, a list of all touches associated with a particular view of an application, and a list of changed touches, comprising touches for which at least one parameter or aspect (e.g., location and/or intensity) has changed since a prior touch event was provided to the application.

The device receives (1208) a reaction to the input from the application that indicates that a tactile output is to be generated in response to the input. For example, in some circumstances, the input includes movement, and the reaction of the application includes moving a graphical user interface object across a display.

In response to receiving the reaction to the input from the application, the device performs (1210) a set of operations, including comparing (1212) an input time for the reaction to an output time for the reaction, wherein the input time for the reaction corresponds to a time at which the input was detected by the respective input device, and the output time for the reaction corresponds to a time at which a tactile output corresponding to the reaction is configured to be generated at the respective input device. Stated another way, the comparing operation compares an input time for the input detected by the respective input device to an output time for the reaction. The set of operations performed by the device also includes determining (1214) whether tactile output criteria have been met, wherein the tactile output criteria include a criterion that is met when an input time is less than a predetermined amount of time before the output time, causing generation (1216), at the respective input device, of a tactile output corresponding to the reaction from the application in accordance with a determination that the tactile output criteria have been met, and forgoing generation (1218)), at the respective input device, of the tactile output corresponding to the reaction from the application in accordance with a determination that the tactile output criteria have not been met. In some embodiments, the tactile output criteria also include tactile output routing criteria to enable tactile outputs to be generated at the device that detected an input that caused the tactile output to be generated (e.g., as described in greater detail above with reference to method 1100.

In some embodiments, the input time for the reaction (e.g., the input time for the input detected by the respective input device) is stored (1222) by the device in response to receiving the indication of the input from the respective input device. Thus, the device monitors input times to ensure that stale tactile outputs are not generated at the respective input device.

In some embodiments, the input time for the reaction (e.g., the input time for the input detected by the respective input device) is received (1220) from the application along with the reaction to the input. Thus, in these embodiments, the application monitors input times and provides input time information to the device to ensure that stale tactile outputs are not generated at the respective input device.

In some embodiments, the output time for the reaction is (1224) a time at which a tactile output for the reaction would be scheduled by the device. Thus, in at least some such embodiments, the output time is a computed time, in the near future, that is either the time at which the tactile output would be generated, or is a time that the tactile output is scheduled to be generated. The later times are not necessarily identical, since in some embodiments the actual tactile output generation time may not be entirely predictable or schedulable.

In some embodiments, the output time for the reaction is (1226) a time at which the application requested that a tactile output be generated at the respective input device. In these embodiments, the output time is determined by the time that the application posts, transfers, or otherwise communicates its request to generate a tactile output.

In some embodiments, the device is configured (1230) to cause the generation of tactile outputs at the plurality of input devices in response to changes in intensity of contacts on the input devices in accordance with one or more intensity models. For example, this is described in greater detail above with reference to methods 600, 700, 800, 900 and 1000. Furthermore, in some circumstances, the respective tactile output is generated (1234) without reference to the one or more intensity models. A non-limiting set of examples of such circumstances are described above with respect to operation 1132 of method 1100.

In some embodiments, the predetermined amount of time that is used to determine whether the tactile output criteria have been met has a first value in a normal mode of operation, and a second value, larger than the first value, in an accessibility mode of operation. In these embodiments, in the accessibility mode, a slower reaction time to user inputs is acceptable, as is slower tactile output in response to user inputs at the one or more input devices.

It should be understood that the particular order in which the operations in FIGS. 12A-12C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 650, 700, 750, 800, 900, 1000, and 1100) are also applicable in an analogous manner to method 1200 described above with respect to FIGS. 12A-12C. For example, the contacts, user interface objects, tactile outputs, intensity thresholds, and focus selectors described above with reference to method 1200 optionally have one or more of the characteristics of the contacts, user interface objects, tactile outputs, intensity thresholds, and focus selectors described herein with reference to other methods described herein (e.g., methods 600, 650, 700, 750, 800, 900, 1000, and 1100). For brevity, these details are not repeated here.

The operations in the information processing methods described above are, optionally implemented by running one or more functional modules in information processing apparatus such as general purpose processors (e.g., as described above with respect to FIGS. 1A, 3A, and 3B) or application specific chips.

Figure 13:
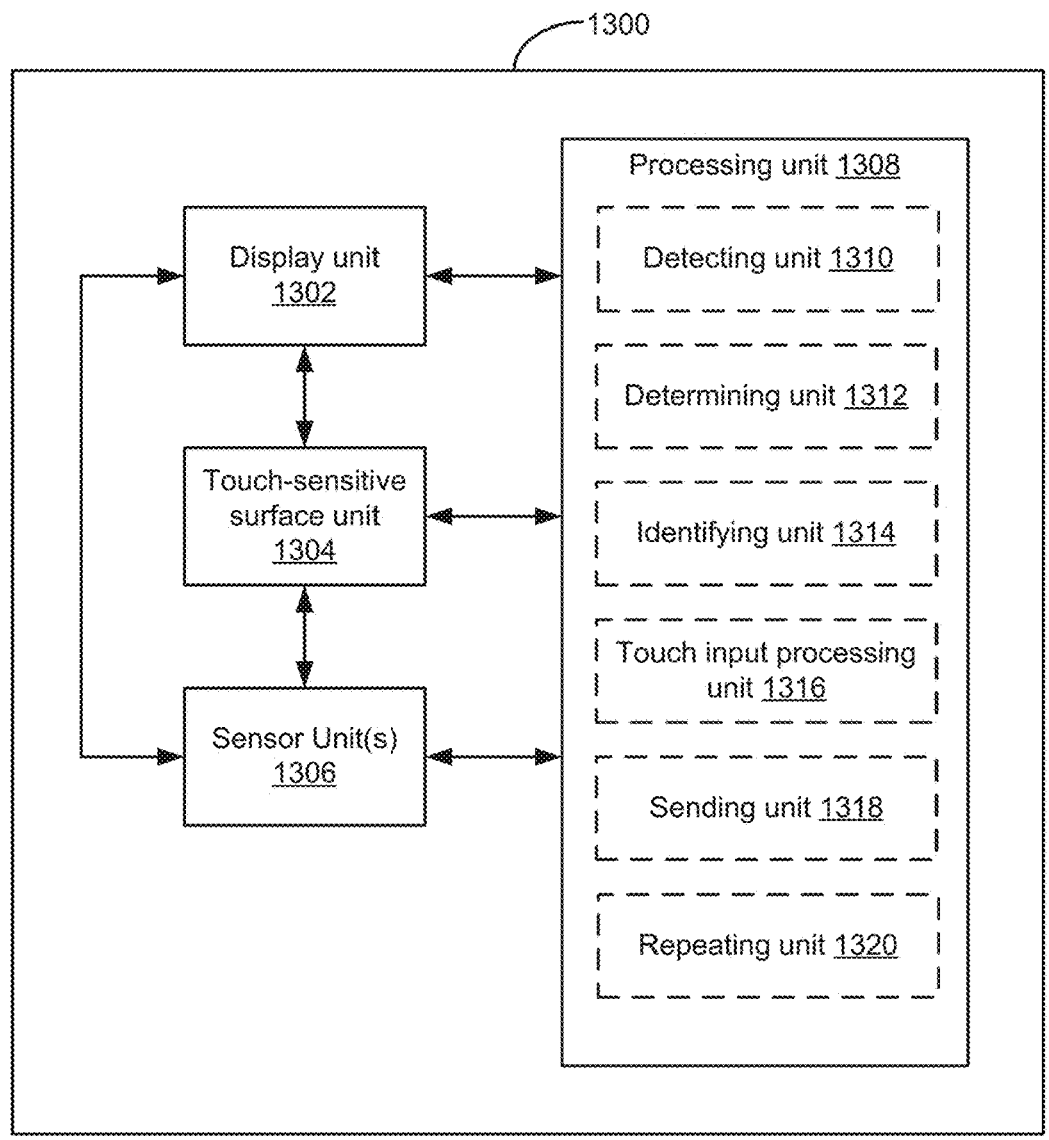
FIGS. 13-19 are functional block diagrams of an electronic device in accordance with some embodiments.

In accordance with some embodiments, FIG. 13 shows a functional block diagram of electronic device 1300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, electronic device 1300 includes touch-sensitive surface unit 1304 configured to receive contacts and one or more sensor units 1306 configured to detect intensity of contacts with the touch-sensitive surface unit 1304. Processing unit 1308 is coupled with the touch-sensitive surface unit 1304 and the one or more sensor units 1306. In some embodiments, electronic device 1300 includes display unit 1302 configured to display a user interface, and processing unit 1308 is coupled with display unit 1302. In some embodiments, processing unit 1308 includes: detecting unit 1310, determining unit 1312, identifying unit 1314, touch input processing unit 1316, sending unit 1318, and repeating unit 1320.

The processing unit 1308 configured to: detect a touch input on the touch-sensitive surface unit 1304 (e.g., with the detecting unit 1310 and/or the touch-sensitive surface unit 1304); in response to detecting the touch input on the touch-sensitive surface unit 1304, determine an intensity of the touch input on the touch-sensitive surface unit 1304 (e.g., with the determining unit 1312, the touch-sensitive surface unit 1304, and/or the sensor units 1306); and, in accordance with the intensity of the touch input on the touch-sensitive surface unit 1304 and one or more preselected intensity thresholds, determine an intensity stage of the touch input (e.g., with the determining unit 1312), wherein the intensity stage of the touch input is selected from a plurality of predefined intensity stages; and process the touch input based on the intensity stage of the touch input (e.g., with the touch input processing unit 1316).

In some embodiments, the electronic device 1300 stores a first software application, and the intensity stage of the touch input is determined by a contact intensity module that is distinct and separate from the first software application.

In some embodiments, the processing unit 1308 is configured to send to the first software application from the contact intensity module touch information that identifies the intensity stage of the touch input (e.g., with the sending unit 1318).

In some embodiments, the processing unit 1308 is configured to send information from the contact intensity module, the information indicating that the intensity of the touch input is available to the first software application (e.g., with the sending unit 1318).

In some embodiments, the processing unit 1308 is configured to repeat the operations of determining an intensity of the touch input, determining an intensity stage of the touch input, and sending touch information while the touch input is detected on the touch-sensitive surface unit 1304 (e.g., with the repeating unit 1320, the determining unit 1312, the sending unit 1318, and/or the touch-sensitive surface unit 1304).

In some embodiments, the processing unit 1308 is configured to determine one or more intensity-based progress values of the touch input based on an intensity range associated with the determined intensity stage (e.g., with the determining unit 1312); and send touch information to the first software application (e.g., with the sending unit 1318), wherein the touch information includes the one or more intensity-based progress values of the touch input and information identifying the intensity stage of the touch input.

In some embodiments, the one or more intensity-based progress values of the touch input include a transition progress value of the touch input.

In some embodiments, the one or more intensity-based progress values of the touch input include a stage progress value of the touch input.

In some embodiments, the processing unit 1308 is configured to, in response to detecting the touch input, determine a first intensity applied by the touch input on the touch-sensitive surface unit 1304 (e.g., with the determining unit 1312); in accordance with a determination that the first intensity applied by the touch input on the touch-sensitive surface unit 1304 does not satisfy a stage activation intensity threshold for a second intensity stage, determine that the touch input is in a first intensity stage that is distinct from the second intensity stage (e.g., with the determining unit 1312); subsequent to determining that the touch input is in the first intensity stage, determine a second intensity applied by the touch input on the touch-sensitive surface unit 1304 (e.g., with the determining unit 1312), wherein the second intensity is distinct from the first intensity; and, in accordance with a determination that the second intensity applied by the touch input on the touch-sensitive surface unit 1304 satisfies the stage activation intensity threshold for the second intensity stage, determine that the touch input is in the second intensity stage (e.g., with the determining unit 1312).

In some embodiments, the processing unit 1308 is configured to, subsequent to determining that the touch input is in the second intensity stage, determine a third intensity applied by the touch input on the touch-sensitive surface unit 1304 (e.g., with the determining unit 1312), wherein the third intensity is distinct from the second intensity; in accordance with a determination that the third intensity does not satisfy a stage release intensity threshold for the second intensity stage, distinct from the stage activation intensity threshold for the second intensity stage, determine that the touch input remains in the second intensity stage (e.g., with the determining unit 1312); subsequent to determining that the touch input remains in the second intensity stage, determine a fourth intensity applied by the touch input on the touch-sensitive surface unit 1304 (e.g., with the determining unit 1312), wherein the fourth intensity is distinct from the third intensity; and, in accordance with a determination that the fourth intensity satisfies the stage release intensity threshold for the second intensity stage, determine that the touch input is in the first intensity stage (e.g., with the determining unit 1312).

In some embodiments, the processing unit 1308 is configured to, subsequent to determining that the touch input remains in the second intensity stage, determine a third intensity applied by the touch input on the touch-sensitive surface unit 1304 (e.g., with the determining unit 1312), wherein the third intensity is distinct from the second intensity; and, in accordance with a determination that the third intensity satisfies a stage activation threshold for the third intensity stage, distinct from the stage activation intensity threshold for the second intensity stage, determine that the touch input is in the third intensity stage (e.g., with the determining unit 1312).

In some embodiments, the processing unit 1308 is configured to, subsequent to determining that the touch input is in the third intensity stage, determine a fourth intensity applied by the touch input on the touch-sensitive surface unit 1304 (e.g., with the determining unit 1312), wherein the fourth intensity is distinct from the third intensity; and, in accordance with a determination that the fourth intensity satisfies a stage release intensity threshold for the third intensity stage, distinct from the stage activation threshold for the third intensity stage, determine that the touch input is in the second intensity stage (e.g., with the determining unit 1312).

In some embodiments, the processing unit 1308 is configured to identify an intensity model identifier from a plurality of predefined intensity model identifiers (e.g., with the identifying unit 1314), wherein the intensity stage of the touch input is selected from a plurality of intensity stages that correspond to the identified intensity model identifier.

Figure 14:
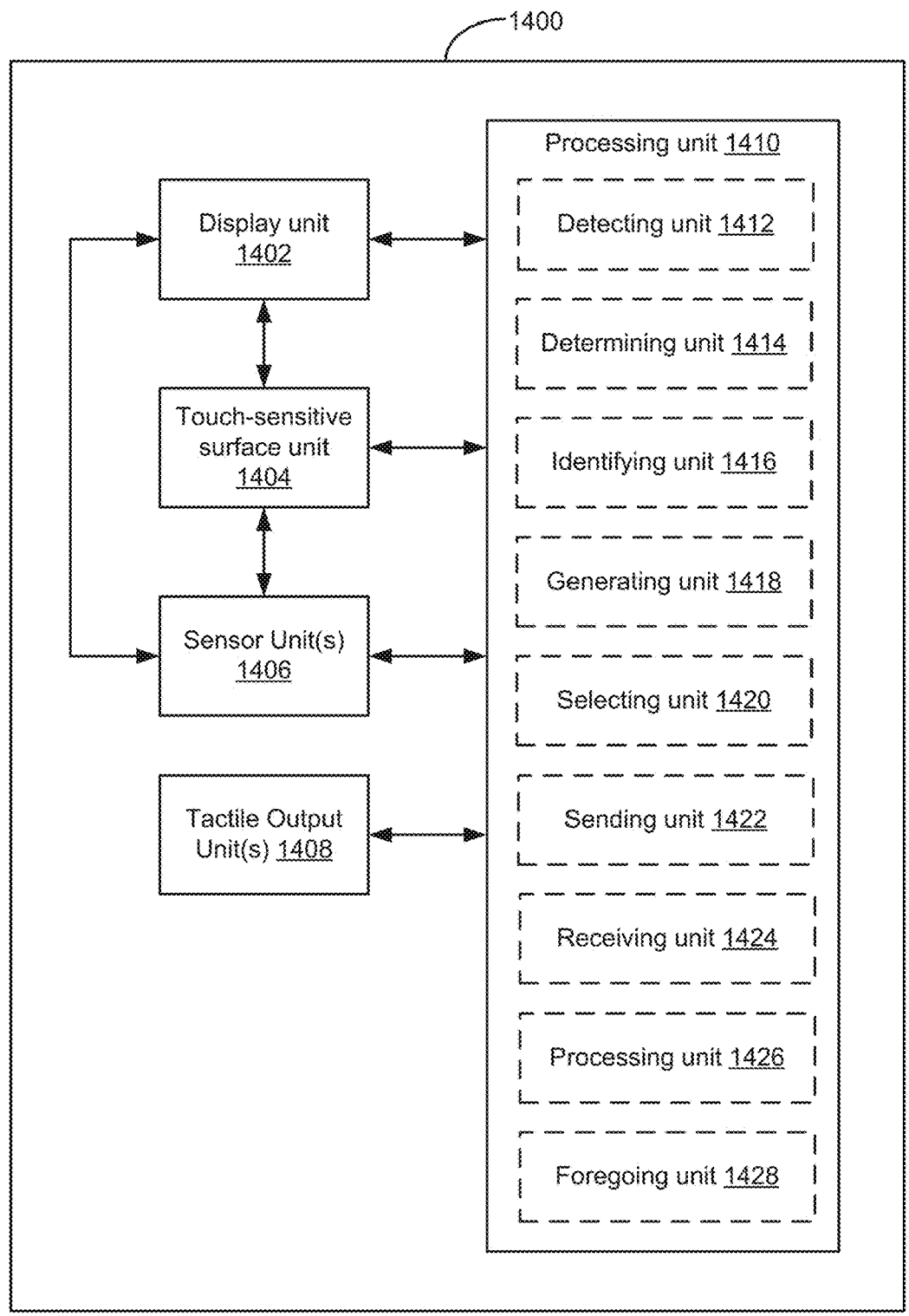

In accordance with some embodiments, FIG. 14 shows a functional block diagram of electronic device 1400 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, electronic device 1400 includes display unit 1402 configured to display a user interface, touch-sensitive surface unit 1404 configured to receive contacts, one or more sensor units 1406 configured to detect intensity of contacts with the touch-sensitive surface unit 1404, one or more tactile output units 1408; and processing unit 1410 coupled with display unit 1402, the touch-sensitive surface unit 1404, the one or more sensor units 1406, and the one or more tactile output units 1408. In some embodiments, the processing unit 1410 includes: detecting unit 1412, determining unit 1414, identifying unit 1416, generating unit 1418, selecting unit 1420, sending unit 1422, receiving unit 1424, processing unit 1426, and foregoing unit 1428.

The processing unit 1410 is configured to: detect a first touch input on the touch-sensitive surface unit 1404 (e.g., with the determining unit 1414 and/or the touch-sensitive surface unit 1404); in response to detecting the first touch input on the touch-sensitive surface unit 1404, determine a first intensity applied by the first touch input on the touch-sensitive surface unit 1404 (e.g., with the determining unit 1414, the touch-sensitive surface unit 1404, and/or the sensor units 1406); identify a first intensity model identifier from a plurality of predefined intensity model identifiers (e.g., with the identifying unit 1416); in accordance with the first intensity applied by the first touch input on the touch-sensitive surface unit 1404 and one or more thresholds associated with the first intensity model identifier, determine a first touch characterization parameter (e.g., with the determining unit 1414); and, subsequent to determining the first touch characterization parameter, send first touch information to a first software application (e.g., with the sending unit 1422), wherein the first touch information includes the first intensity model identifier and the first touch characterization parameter.

In some embodiments, the processing unit 1410 is configured to, in response to detecting the first touch input on the touch-sensitive surface unit 1404, generate a tactile output in accordance with the intensity applied by the first touch input on the touch-sensitive surface unit 1404 and the one or more thresholds associated with the first intensity model identifier (e.g., with the generating unit 1418 and/or the tactile output units 1408).

In some embodiments, the processing unit 1410 is configured to: receive one or more instructions from the first software application to generate a tactile output (e.g., with the receiving unit 1424); and, in response to receiving the one or more instructions from the software application, generate the tactile output in accordance with the one or more instructions from the software application (e.g., with the generating unit 1418 and/or the tactile output units 1408).

In some embodiments, the processing unit 1410 is configured to, while continuing to detect the first touch input on the touch-sensitive surface unit 1404: receive one or more instructions to use an intensity model that corresponds to a second intensity model identifier that is distinct from the first intensity model identifier (e.g., with the receiving unit 1424); and, subsequent to receiving the one or more instructions to use the intensity model that corresponds to the second intensity model identifier: determine a second intensity applied by the first touch input on the touch-sensitive surface unit 1404 (e.g., with the determining unit 1414, the touch-sensitive surface unit 1404, and/or the sensor units 1406); and process the first touch input based on the second intensity model identifier (e.g., with the processing unit 1426).

In some embodiments, the processing unit 1410 is configured to, while continuing to detect the first touch input on the touch-sensitive surface unit 1404: subsequent to processing the first touch input based on the second intensity model identifier, receive one or more instructions to use an intensity model that corresponds to a third intensity model identifier that is distinct from the first intensity model identifier and the second intensity model identifier (e.g., with the receiving unit 1424); and, subsequent to receiving the one or more instructions to use the intensity model that corresponds to the third intensity model identifier: determine a third intensity applied by the first touch input on the touch-sensitive surface unit 1404 (e.g., with the determining unit 1414, the touch-sensitive surface unit 1404, and/or the sensor units 1406); and process the first touch input based on the third intensity model identifier (e.g., with the processing unit 1426).

In some embodiments, the processing unit 1410 is configured to: determine that the first touch input has ceased to be detected on the touch-sensitive surface unit 1404 (e.g., with the determining unit 1414); and, subsequent to determining that the first touch input has ceased to be detected on the touch-sensitive surface unit 1404: detect a second touch input on the touch-sensitive surface unit 1404 that is separate from the first touch input (e.g., with the detecting unit 1412 and/or the touch-sensitive surface unit 1404); and process the second touch input based on the first intensity model identifier (e.g., with the processing unit 1426).

In some embodiments, processing the touch input based on the second intensity model identifier includes: in accordance with the second intensity applied by the touch input on the touch-sensitive surface unit 1404 and one or more thresholds associated with the second intensity model identifier, determining a second touch characterization parameter (e.g., with the determining unit 1414), wherein the second touch characterization parameter is distinct from the first touch characterization parameter; and, subsequent to determining the second touch characterization parameter, sending second touch information to the first software application (e.g., with the sending unit 1422), wherein the second touch information includes the second intensity model identifier and the second touch characterization parameter.

In some embodiments, processing the touch input based on the second intensity model identifier includes: foregoing generation of a tactile output in accordance with the second intensity failing to satisfying the one or more thresholds associated with the second intensity model identifier (e.g., with the foregoing unit 1428, the generating unit 1418, and/or the tactile output units 1408), wherein the electronic device is configured to generate a tactile output in accordance with the second intensity satisfying at least one of the one or more thresholds associated with the first intensity model identifier.

In some embodiments, the processing unit 1410 is configured to: subsequent to detecting the first touch input, receive one or more instructions to use an intensity model that corresponds to a second intensity model identifier that is distinct from the first intensity model identifier (e.g., with the receiving unit 1424); and, subsequent to receiving the one or more instructions to use the intensity model that corresponds to the second intensity model identifier: detect a second touch input on the touch-sensitive surface unit 1404 (e.g., with the detecting unit 142 and/or the touch-sensitive surface unit 1404); in response to detecting the second touch input on the touch-sensitive surface unit 1404, determine a second intensity applied by the second touch input on the touch-sensitive surface unit 1404 (e.g., with the determining unit 1414, the touch-sensitive surface unit 1404, and/or the sensor units 1406); and process the second touch input based on the second intensity model identifier (e.g., with the processing unit 1426).

In some embodiments, the processing unit 1410 is configured to send a stream of intensity events to the first software application (e.g., with the sending unit 1422), each intensity event corresponding to an intensity applied by the touch input at a corresponding time.

In some embodiments, the processing unit 1410 is configured to select a set of thresholds, from a plurality of sets of thresholds, in accordance with the identified intensity model identifier (e.g., with the selecting unit 1420), and determine the touch characterization parameter in accordance with the selected set of thresholds (e.g., with the determining unit 1414).

In some embodiments, the processing unit 1410 is configured to identify one or more intensity ranges, in accordance with the identified intensity model identifier (e.g., with the identifying unit 1416), and determine a touch characterization parameter in accordance with the one or more identified intensity ranges (e.g., with the determining unit 1414).

In some embodiments, identifying the first intensity model identifier includes identifying the first software application as corresponding to the touch input and identifying an intensity model identifier registered by the first software application as the first intensity model identifier (e.g., with the identifying unit 1416).

Figure 15:
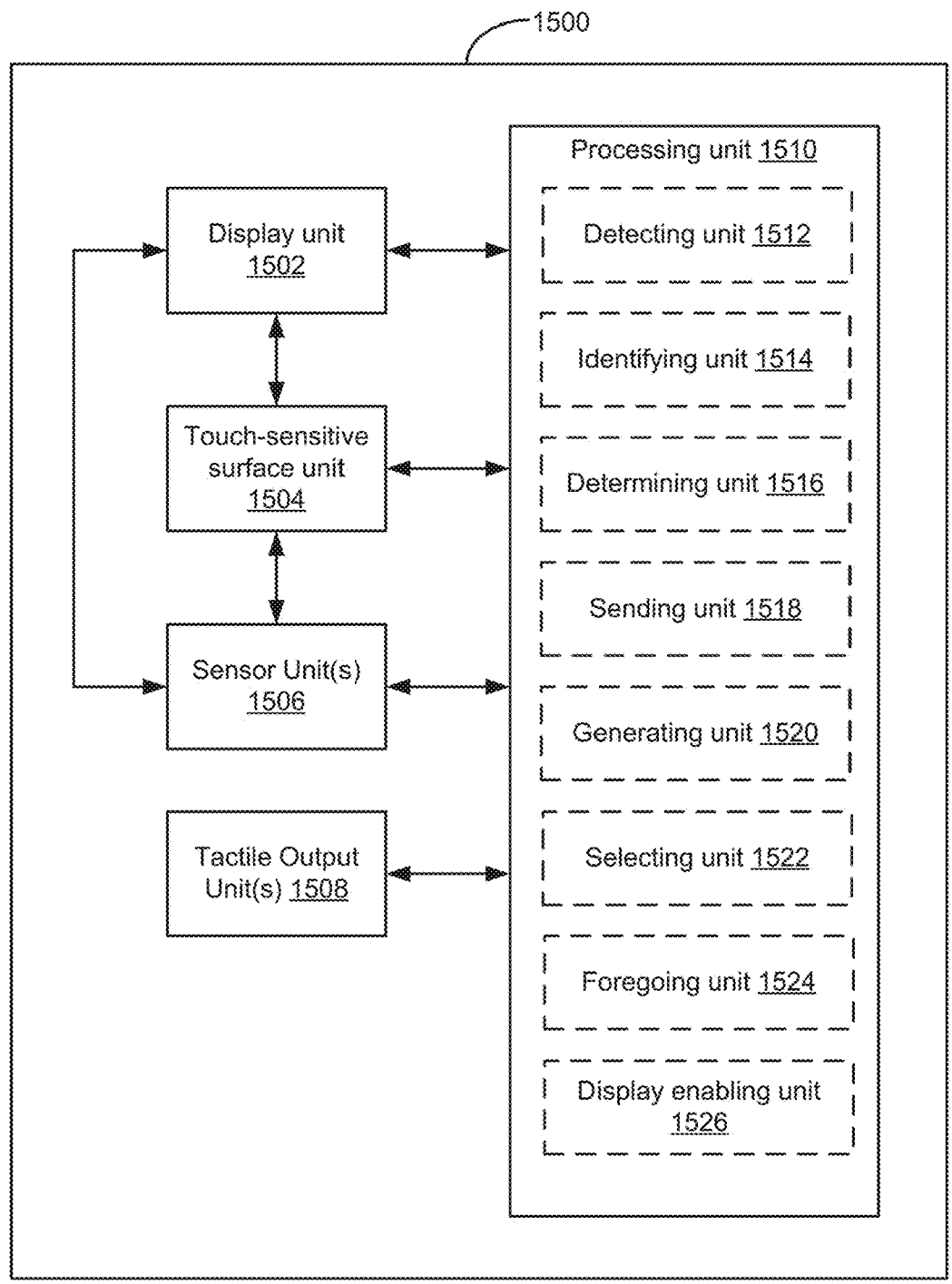

In accordance with some embodiments, FIG. 15 shows a functional block diagram of electronic device 1500 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, electronic device 1500 includes display unit 1502 configured to display a user interface, touch-sensitive surface unit 1504 configured to receive contacts, one or more sensor units 1506 configured to detect intensity of contacts with the touch-sensitive surface unit 1504, one or more tactile output units 1508; and processing unit 1510 coupled with display unit 1502, the touch-sensitive surface unit 1504, the one or more sensor units 1506, and the one or more tactile output units 1508. In some embodiments, the processing unit 1510 includes: detecting unit 1512, identifying unit 1514, determining unit 1516, sending unit 1518, generating unit 1520, selecting unit 1522, foregoing unit 1524, and display enabling unit 1526.

The processing unit 1510 is configured to: detect a first touch input on a first touch region of the touch-sensitive surface unit 1504 (e.g., with the detecting unit 1512 and/or the touch-sensitive surface unit 1504); identify a first intensity model identifier, associated with the first touch region of the touch-sensitive surface unit 1504, from a plurality of predefined intensity model identifiers (e.g., with the identifying unit 1514); in response to detecting the first touch input on the first touch region of the touch-sensitive surface unit 1504: determine a first intensity applied by the first touch input on the first touch region of the touch-sensitive surface unit 1504 (e.g., with the determining unit 1516, the touch-sensitive surface unit 1504, and/or the sensor units 1506); in accordance with the first intensity applied by the first touch input on the touch-sensitive surface unit 1504 and one or more thresholds associated with the first intensity model identifier, determine a first touch characterization parameter (e.g., with the determining unit 1516); and, subsequent to determining the first touch characterization parameter, send first touch information to the first software application (e.g., with the sending unit 1518), wherein the first touch information includes the first touch characterization parameter; detect a second touch input on a second touch region of the touch-sensitive surface unit 1504 (e.g., with the detecting unit 1512 and/or the touch-sensitive surface unit 1504), wherein the second touch region of the touch-sensitive surface unit 1504 is distinct from the first touch region of the touch-sensitive surface unit 1504; identify a second intensity model identifier, associated with the second touch region of the touch-sensitive surface unit 1504, from the plurality of predefined intensity model identifiers (e.g., with the identifying unit 1514); and, in response to detecting the second touch input on the second touch region of the touch-sensitive surface unit 1504: determine a second intensity applied by the second touch input on the second touch region of the touch-sensitive surface unit 1504 (e.g., with the determining unit 1516, the touch-sensitive surface unit 1504, and/or the sensor units 1506); in accordance with the second intensity applied by the second touch input on the touch-sensitive surface unit 1504 and one or more thresholds associated with the second intensity model identifier, determine a second touch characterization parameter (e.g., with the determining unit 1516); and, subsequent to determining the second touch characterization parameter, send second touch information to the first software application (e.g., with the sending unit 1518), wherein the second touch information includes the second touch characterization parameter.

In some embodiments, the processing unit 1510 is configured to, prior to detecting the first touch input, enable display of a user interface that includes a first display region and a second display region (e.g., with the display enabling unit 1526 and/or the display unit 1502), wherein the first display region corresponds to the first touch region and the second display region corresponds to the second touch region.

In some embodiments, the first display region corresponds to a user interface of the first software application and the second display region corresponds to a user interface of a second software application.

In some embodiments, the processing unit 1510 is configured to: in response to detecting the first touch input on the first touch region of the touch-sensitive surface unit 1504, generate a first tactile output in accordance with the first intensity applied by the first touch input on the touch-sensitive surface unit 1504 and the one or more thresholds associated with the first intensity model identifier (e.g., with the generating unit 1520 and/or the tactile output units 1508); and, in response to detecting the second touch input on the second touch region of the touch-sensitive surface unit 1504, generate a second tactile output in accordance with the second intensity applied by the second touch input on the touch-sensitive surface unit 1504 and the one or more thresholds associated with the second intensity model identifier (e.g., with the generating unit 1520 and/or the tactile output units 1508).

In some embodiments, at least a portion of the first touch region overlaps with at least a portion of the second touch region.

In some embodiments, the processing unit 1510 is configured to: detect a third touch input on an overlapping touch region, of the touch-sensitive surface unit 1504, that corresponds to an overlap of the first touch region and the second touch region (e.g., with the detecting unit 1512 and/or the touch-sensitive surface unit 1504); select an intensity model identifier between the first intensity model identifier and the second intensity model identifier for the overlapping touch region (e.g., with the selecting unit 1522); and, in response to detecting the third touch input on the overlapping touch region: determine a third intensity applied by the third touch input on the overlapping touch region of the touch-sensitive surface unit 1504 (e.g., with the determining unit 1516, the touch-sensitive surface unit 1504, and/or the sensor units 1506); in accordance with the third intensity applied by the third touch input on the overlapping touch region of the touch-sensitive surface unit 1504 and one or more thresholds associated with the selected intensity model identifier, determine a third touch characterization parameter (e.g., with the determining unit 1516); and, subsequent to determining the third touch characterization parameter, send third touch information to the first software application (e.g., with the sending unit 1518), wherein the third touch information includes the third touch characterization parameter.

In some embodiments, both the first intensity model identifier and the second intensity model identifier are associated with priorities applicable to the overlapping touch region, and the intensity model identifier is selected based on the priorities of the first intensity model identifier and the second intensity model identifier for the overlapping touch region.

In some embodiments, the processing unit 1510 is configured to forego determination of a touch characterization parameter in accordance with the third intensity and one or more thresholds associated with an intensity model identifier that has not been selected between the first intensity model identifier and the second intensity model identifier (e.g., with the foregoing unit 1524 and/or the determining unit 1516).

In some embodiments, the first intensity model identifier has been selected for the overlapping region (e.g., by the selecting unit 1518), and the processing unit 1510 is configured to: subsequent to detecting the third touch input, detect a fourth touch input on the overlapping region of the touch-sensitive surface unit 1504 (e.g., with the detecting unit 1512 and/or the touch-sensitive surface unit 1504); and select the second intensity model identifier for the overlapping touch region (e.g., with the selecting unit 1522); and, in response to detecting the fourth touch input on the overlapping touch region: determine a fourth intensity applied by the fourth touch input on the overlapping touch region of the touch-sensitive surface unit 1504 (e.g., with the determining unit 1516, the touch-sensitive surface unit 1504, and/or the sensor units 1506); in accordance with the fourth intensity applied by the fourth touch input on the overlapping touch region of the touch-sensitive surface unit 1504 and the one or more thresholds associated with the second intensity model identifier, determine a fourth touch characterization parameter (e.g., with the determining unit 1516); and, subsequent to determining the touch characterization parameter, send fourth touch information to the first software application (e.g., with the sending unit 1518), wherein the fourth touch information includes the fourth touch characterization parameter.

Figure 16:
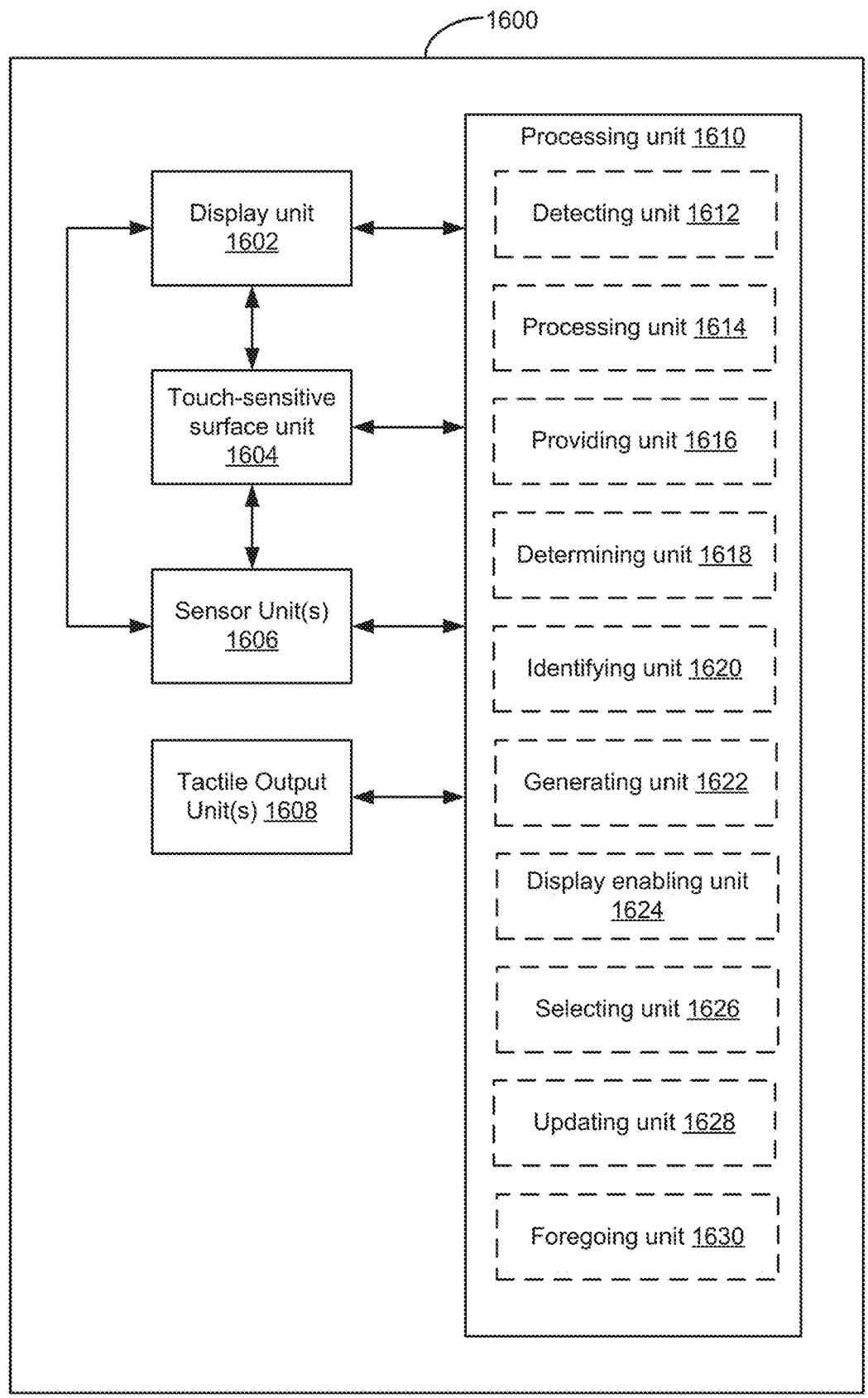

In accordance with some embodiments, FIG. 16 shows a functional block diagram of electronic device 1600 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, electronic device 1600 includes display unit 1602 configured to display a user interface, touch-sensitive surface unit 1604 configured to receive contacts, one or more sensor units 1606 configured to detect intensity of contacts with the touch-sensitive surface unit 1604, one or more tactile output units 1608; and processing unit 1610 coupled with display unit 1602, the touch-sensitive surface unit 1604, the one or more sensor units 1606, and the one or more tactile output units 1608. In some embodiments, the processing unit 1610 includes: detecting unit 1612, processing unit 1614, providing unit 1616, determining unit 1618, identifying unit 1620, generating unit 1622, display enabling unit 1624, selecting unit 1626, updating unit 1628, and foregoing unit 1630.

The processing unit 1610 is configured to: detect a touch input on the touch-sensitive surface unit 1604 (e.g., with the detecting unit 1612 and/or the touch-sensitive surface unit 1604); and, in response to detecting the touch input: in accordance with a determination that the touch input is at a location on the touch-sensitive surface unit 1604 that is associated with a first intensity model of a plurality of different intensity models, process the touch input in accordance with an intensity applied by the touch input on the touch-sensitive surface unit 1604 and the first intensity model (e.g., with the processing unit 1614); and, in accordance with a determination that the touch input is at a location on the touch-sensitive surface unit 1604 that is associated with a second intensity model different from the first intensity model, process the touch input in accordance with an intensity applied by the touch input on the touch-sensitive surface unit 1604 and the second intensity model (e.g., with the processing unit 1614).

In some embodiments, processing the touch input in accordance with an intensity applied by the touch input and the first intensity model includes providing contact intensity information to a user-interface application without generating a tactile output for the touch input (e.g., with the providing unit 1616); and processing the touch input in accordance with an intensity applied by the touch input and the second intensity model includes conditionally generating a tactile output for the touch input (e.g., with the generating unit 1622 and/or the tactile output units 1608).

In some embodiments, during the touch input, the electronic device 1600 detects application of a respective intensity on the touch-sensitive surface unit 1604 that is attributed to the touch input (e.g., with the detecting unit 1612, the touch-sensitive surface unit 1604, the determining unit 1618, and/or the sensor units 1606). Processing the touch input in accordance with an intensity applied by the touch input on the touch-sensitive surface unit 1604 and the first intensity model includes providing, to a user interface application, first touch input state information that indicates that the touch input has applied the respective intensity on the touch-sensitive surface unit 1604 without generating a tactile output for the touch input (e.g., with the providing unit 1616); and processing the touch input in accordance with an intensity applied by the touch input on the touch-sensitive surface unit 1604 and the second intensity model includes providing, to a user interface application, second touch input state information that indicates that the touch input has applied the respective intensity on the touch-sensitive surface unit 1604 (e.g., with the providing unit 1616) and generating a tactile output for the touch input (e.g., with the generating unit 1622 and/or the tactile output unit 1608).

In some embodiments, the first touch input state information includes a continuously variable representation of intensity of the touch input; and the second touch input state information includes an indication that the intensity of the touch input is within a range of values that correspond to activation of a user interface element that corresponds to the location on the touch-sensitive surface unit 1604 that is associated with the second intensity model.

In some embodiments, the processing unit 1610 is configured to: detect a first touch input on a first touch region of the touch-sensitive surface unit 1604 (e.g., with the detecting unit 1612 and/or the touch-sensitive surface unit 1604); identify a first intensity model identifier, associated with the first touch region of the touch-sensitive surface unit 1604, from a plurality of predefined intensity model identifiers (e.g., with the identifying unit 1620); in response to detecting the first touch input on the first touch region of the touch-sensitive surface unit 1604: determine a first intensity applied by the first touch input on the first touch region of the touch-sensitive surface unit 1604 (e.g., with the determining unit 1618, the touch-sensitive surface unit 1604, and/or the sensor units 1606); and, in accordance with the first intensity applied by the first touch input on the touch-sensitive surface unit 1604 and the first intensity model identifier: process the first touch input (e.g., with the processing unit 1614); and forego generation of a tactile output for the first touch input (e.g., with the foregoing unit 1630, the generating unit 1622, and/or the tactile output units 1608); detect a second touch input on a second touch region of the touch-sensitive surface unit 1604 (e.g., with the detecting unit 1612 and/or the touch-sensitive surface unit 1604), wherein the second touch region of the touch-sensitive surface unit 1604 is distinct from the first touch region of the touch-sensitive surface unit 1604; identify a second intensity model identifier, associated with the second touch region of the touch-sensitive surface unit 1604, from the plurality of predefined intensity model identifiers (e.g., with the identifying unit 1620); and, in response to detecting the second touch input on the second touch region of the touch-sensitive surface unit 1604: determine a second intensity applied by the second touch input on the second touch region of the touch-sensitive surface unit 1604 (e.g., with the determining unit 1618, the touch-sensitive surface unit 1604, and/or the sensor units 1606); and, in accordance with the second intensity applied by the second touch input on the touch-sensitive surface unit 1604 and the second intensity model identifier: process the second touch input (e.g., with the processing unit 1614); and conditionally generate a tactile output for the second touch input in accordance with the second touch input and one or more model parameters associated with the second intensity model identifier (e.g., with the generating unit 1622 and/or the tactile output units 1608).

In some embodiments, conditionally generating the tactile output for the second touch input includes foregoing generation of the tactile output for the second touch input in accordance with a determination that the second touch input fails to satisfy one or more criteria corresponding to the one or more model parameters associated with the second intensity model identifier (e.g., with the foregoing unit 1630, the generating unit 1622, and/or the tactile output units 1608).

In some embodiments, the first intensity model identifier indicates that no tactile output is to be generated for a touch input on the first touch region of the touch-sensitive surface unit 1604.

In some embodiments, the electronic device 1600 stores a first software application, and the first user input and the second user input are detected (e.g., with the detecting unit 1612 and/or the touch-sensitive surface unit 1604) while the electronic device 1600 displays a user interface of the first software application (e.g., with the display enabling unit 1624 and/or the display unit 1602).

In some embodiments, the user interface of the first software application includes a handwriting input tool region.

In some embodiments, the handwriting input tool region includes a plurality of selection regions, and at least a respective selection region of the one or more selection regions corresponds to the second touch region of the touch-sensitive surface unit 1604.

In some embodiments, the handwriting input tool region includes a handwriting input region, and the handwriting input region corresponds to the first touch region of the touch-sensitive surface unit 1604.

In some embodiments, the processing unit 1610 is configured to, in response to detecting the first touch input on the first touch region of the touch-sensitive surface unit 1604, enable display of one or more graphical elements in the handwriting input region in accordance with the first touch input (e.g., with the display enabling unit 1624 and/or the display unit 1602).

In some embodiments, the processing unit 1610 is configured to, in response to detecting the first touch input on the first touch region of the touch-sensitive surface unit 1604, enable display of a plurality of groups of characters in the plurality of selection regions (e.g., with the display enabling unit 1624 and/or the display unit 1602), wherein a respective group of characters is selected based on the one or more displayed graphical elements in the handwriting input region, and the respective group of characters is displayed in a respective selection region; and, in response to detecting the second user input on the second touch region of the touch-sensitive surface unit 1604 at a location that corresponds to the respective selection region, select the respective group of characters (e.g., with the selecting unit 1626).

In some embodiments, processing the first touch input detected on the first touch region of the touch-sensitive surface unit 1604 includes: determining that the first touch input has satisfied a drawing intensity threshold (e.g., with the determining unit 1618); and, in accordance with a determination that the first touch input has exceeded the drawing intensity threshold, enabling display of the one or more graphical elements in the handwriting input region in accordance with the first touch input (e.g., with the display enabling unit 1624 and/or the display unit 1602), wherein a first terminal region of a respective graphical element of the one or more graphical elements corresponds to a location where the first touch input has been determined to satisfy the drawing intensity threshold.

In some embodiments, processing the first touch input detected on the first touch region of the touch-sensitive surface unit 1604 includes: while continuing to detect the first touch input on the touch-sensitive surface unit 1604, continue to update the one or more graphical elements in the handwriting input region in accordance with the first touch input regardless of whether the first touch input has ceased to satisfy the drawing intensity threshold (e.g., with the updating unit 1628).

In some embodiments, processing the first touch input detected on the first touch region of the touch-sensitive surface unit 1604 includes: detecting that the first touch input has ceased to be detected on the touch-sensitive surface unit 1604 (e.g., with the detecting unit 1612 and/or the touch-sensitive surface unit 1604) and detecting that the first touch input has resumed contact with the touch-sensitive surface unit 1604 within a predefined time interval subsequent to the first touch input ceasing to be detected on the touch-sensitive surface unit 1604 (e.g., with the detecting unit 1612 and/or the touch-sensitive surface unit 1604); and, in response to the first touch input resuming contact with the touch-sensitive surface unit 1604 within the predefined time interval subsequent to the first touch input ceasing to be detected on the touch-sensitive surface unit 1604, updating the one or more graphical elements in the handwriting input region in accordance with the first touch input (e.g., with the updating unit 1628).

Figure 17:
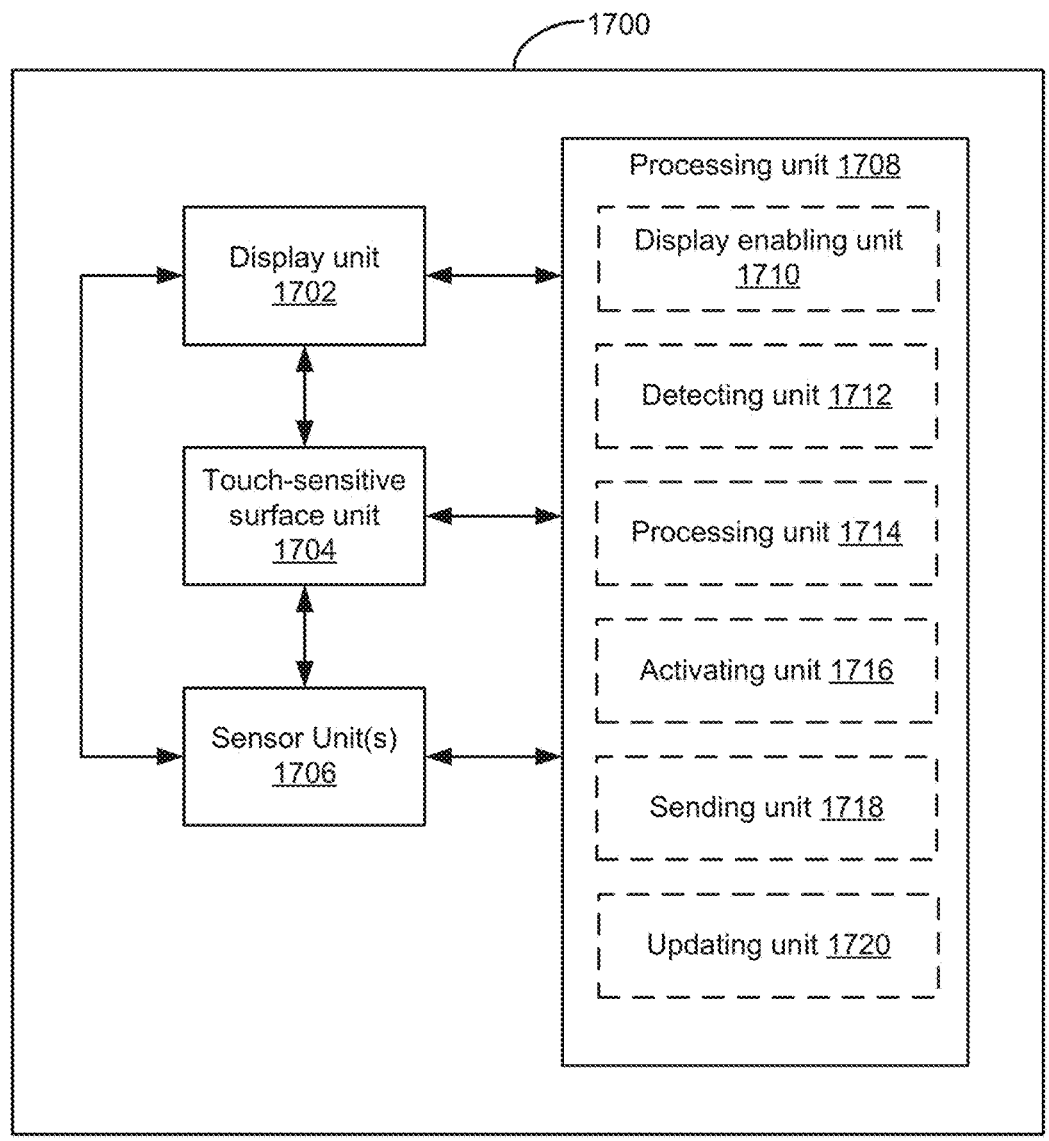

In accordance with some embodiments, FIG. 17 shows a functional block diagram of electronic device 1700 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, electronic device 1700 includes display unit 1702 configured to display a user interface, touch-sensitive surface unit 1704 configured to receive contacts, one or more sensor units 1706 configured to detect intensity of contacts with the touch-sensitive surface unit 1704; and processing unit 1708 coupled with display unit 1702, the touch-sensitive surface unit 1704 and the one or more sensor units 1706. In some embodiments, the processing unit 1708 includes: display enabling unit 1710, detecting unit 1712, processing unit 1714, activating unit 1716, sending unit 1718, and updating unit 1720.

The processing unit 1708 is configured to: enable display of a user interface that includes two or more display regions, including a first display region and a second display region (e.g., with the display enabling unit 1710 and/or the display unit 1702); and, while displaying the user interface: detect a first intensity applied by a touch input at a first location on the touch-sensitive surface unit 1704 that corresponds to the first display region (e.g., with the detecting unit 1712, the touch-sensitive surface unit 1704, and/or the sensor units 1706); detect a movement of the touch input across the touch-sensitive surface unit 1704 from the first location on the touch-sensitive surface unit 1704 to a second location on the touch-sensitive surface unit 1704 that corresponds to the second display region (e.g., with the detecting unit 1712 and/or the touch-sensitive surface unit 1704); after detecting the movement of the touch input from the first location on the touch-sensitive surface unit 1704 to the second location on the touch-sensitive surface unit 1704, detect a second intensity applied by the touch input at the second location on the touch-sensitive surface unit 1704 (e.g., with the detecting unit 1712, the touch-sensitive surface unit 1704, and/or the sensor units 1706); and, in response to detecting the second intensity applied by the touch input at the second location on the touch-sensitive surface unit 1704: in accordance with a determination that the first intensity does not satisfy a first intensity threshold, process the second intensity in accordance with one or more intensity thresholds associated with the second display region (e.g., with the processing unit 1714); and, in accordance with a determination that the first intensity satisfies the first intensity threshold, process the second intensity in accordance with one or more intensity thresholds associated with the first display region (e.g., with the processing unit 1714).

In some embodiments, the processing unit 1708 is configured to: send first touch information to the first software application in accordance with a determination that the first intensity satisfies a reporting intensity threshold that is distinct from the first intensity threshold, the first touch information including one or more touch parameters that correspond to the first intensity (e.g., with the sending unit 1718); and send second touch information to the first software application in accordance with a determination that the second intensity satisfies the reporting intensity threshold, the second touch information including one or more touch parameters that correspond to the second intensity (e.g., with the sending unit 1718).

In some embodiments, a first display region of the two or more display regions is associated with a first software element of the first software application and a second display region of the two or more display regions is associated with a second software element of the second software application.

In some embodiments, in accordance with the determination that the first intensity does not satisfy the first intensity threshold, the second touch information is sent to the second software element without sending the second touch information to the first software element (e.g., with the sending unit 1718).

In some embodiments, in accordance with the determination that the first intensity satisfies the first intensity threshold, the second touch information is sent to the first software element without sending the second touch information to the second software element (e.g., with the sending unit 1718).

In some embodiments, in accordance with the determination that the first intensity satisfies the reporting intensity threshold, the first touch information is sent to the first software element (e.g., with the sending unit 1718).

In some embodiments, the processing unit 1708 is configured to, in response to detecting the touch input, update the user interface in accordance with the first touch information using the first software application prior to the first intensity satisfying the first intensity threshold (e.g., with the updating unit 1720).

In some embodiments, the first intensity threshold is distinct from an activation intensity threshold.

In some embodiments, the one or more intensity thresholds associated with the first display region are different from the one or more intensity thresholds associated with the second display region.

In some embodiments, the one or more intensity thresholds associated with the first display region are the same as the one or more intensity thresholds associated with the second display region.

In some embodiments, the processing unit 1708 is configured to, in response to detecting the first intensity applied by the touch input, process the first intensity in accordance with the one or more intensity thresholds associated with the first display region (e.g., with the processing unit 1714).

In some embodiments, processing the first intensity in accordance with the one or more intensity thresholds associated with the first display region includes enabling display of an animation that corresponds to a change in intensity applied by the touch input from a prior intensity to the first intensity (e.g., with the display enabling unit 1710 and/or the display unit 1702).

In some embodiments, processing the second intensity in accordance with the one or more intensity thresholds associated with the first display region includes enabling display of an animation that corresponds to a change in intensity applied by the touch input on the touch-sensitive surface unit 1704 (e.g., with the display enabling unit 1710 and/or the display unit 1702).

In some embodiments, processing the second intensity in accordance with the one or more intensity thresholds associated with the second display region includes enabling display of an animation that corresponds to a change in intensity applied by the touch input on the touch-sensitive surface unit 1704 (e.g., with the display enabling unit 1710 and/or the display unit 1702).

In some embodiments, the processing unit 1708 is configured to, in response to detecting the movement of the touch input from the first location on the touch-sensitive surface unit 1704 to the second location on the touch-sensitive surface unit 1704, enable display of an animation that corresponds to a change in intensity applied by the touch input (e.g., with the display enabling unit 1710 and/or the display unit 1702).

In some embodiments, processing the second intensity in accordance with one or more intensity thresholds associated with the first display region includes activating a first control associated with the first display region (e.g., with the activating unit 1716).

In some embodiments, processing the second intensity in accordance with one or more intensity thresholds associated with the second display region includes activating a second control associated with the second display region (e.g., with the activating unit 1716).

Figure 18:
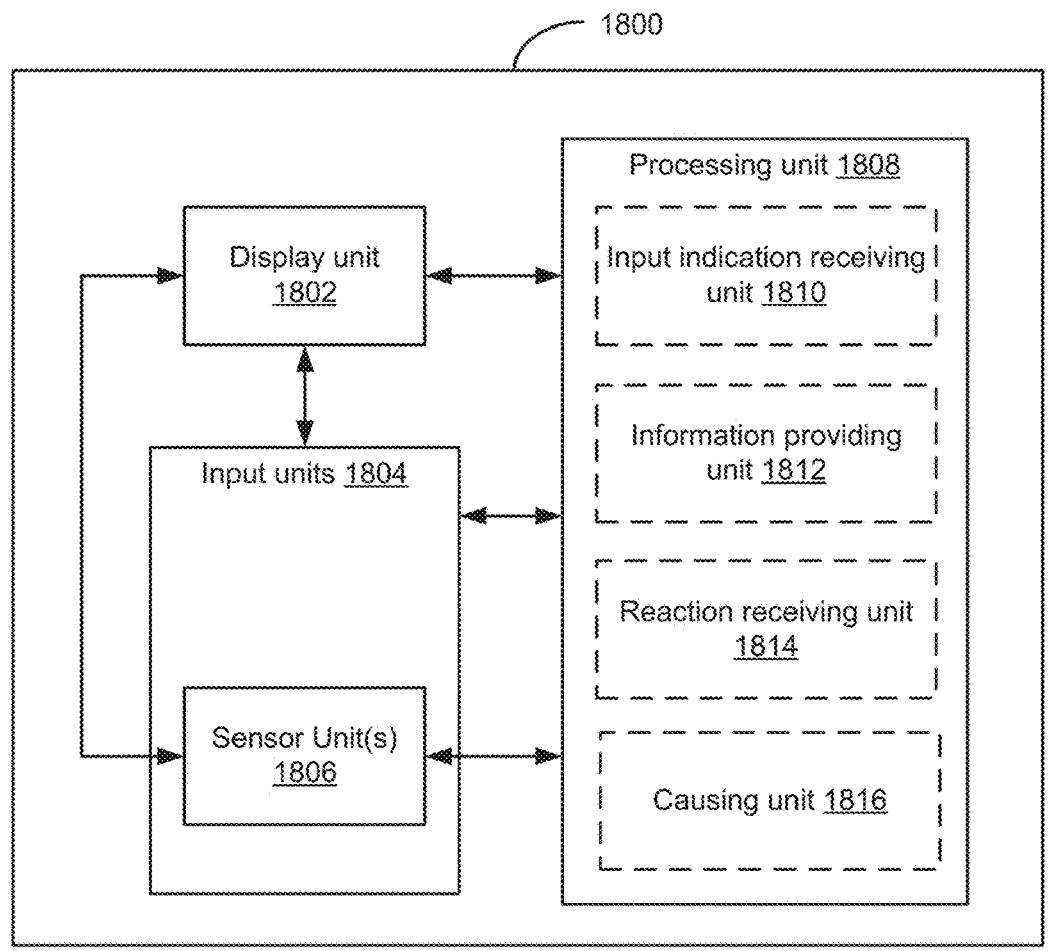

In accordance with some embodiments, FIG. 18 shows a functional block diagram of an electronic device 1800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, an electronic device 1800 includes a display unit 1802 configured to display a user interface for the electronic device, a plurality of input units 1804, including a first input unit that is configured to generate tactile outputs in response to inputs, and a second input unit that is configured to generate tactile outputs. In some embodiments, one or more of the input units 1804 includes one or more respective sensor unit(s) 1806. The electronic device 1800 further includes a processing unit 1808 coupled to the display unit 1802, the input units 1804, and the sensors 1806. In some embodiments, the processing unit 1808 includes an input indication receiving unit 1810 configured to receive an indication of an input detected by a respective input unit of the plurality of input units, and an information providing unit 1812 configured to provide, in response to receiving the indication of the input, information describing the input to an application running on the electronic device that enables the application to react to the input.

The processing unit 1808 further includes a reaction receiving unit 1814 configured to receive a reaction to the input from the application that indicates that a tactile output is to be generated in response to the input, and a causing unit 1816 configured to cause, in response to receiving the reaction to the input from the application, the generation of a respective tactile output. More specifically, in accordance with a determination (see operation 1114 of method 1100, FIGS. 11A-11C) that the reaction was triggered by the first input device, the causing unit 1816 causes the respective tactile output to be generated at the first input device based on the reaction to the input from the application; and in accordance with a determination (see operation 1116 of method 1100, FIGS. 11A-11C) that the reaction was triggered by the second input device, the causing unit 1816 causes the respective tactile output to be generated at the second input device based on the reaction to the input from the application.

In some embodiments, processing unit 1808 of electronic device 1800 is configured to cause the electronic device to perform any of the methods described above with reference to FIGS. 11A-11C.

Figure 19:
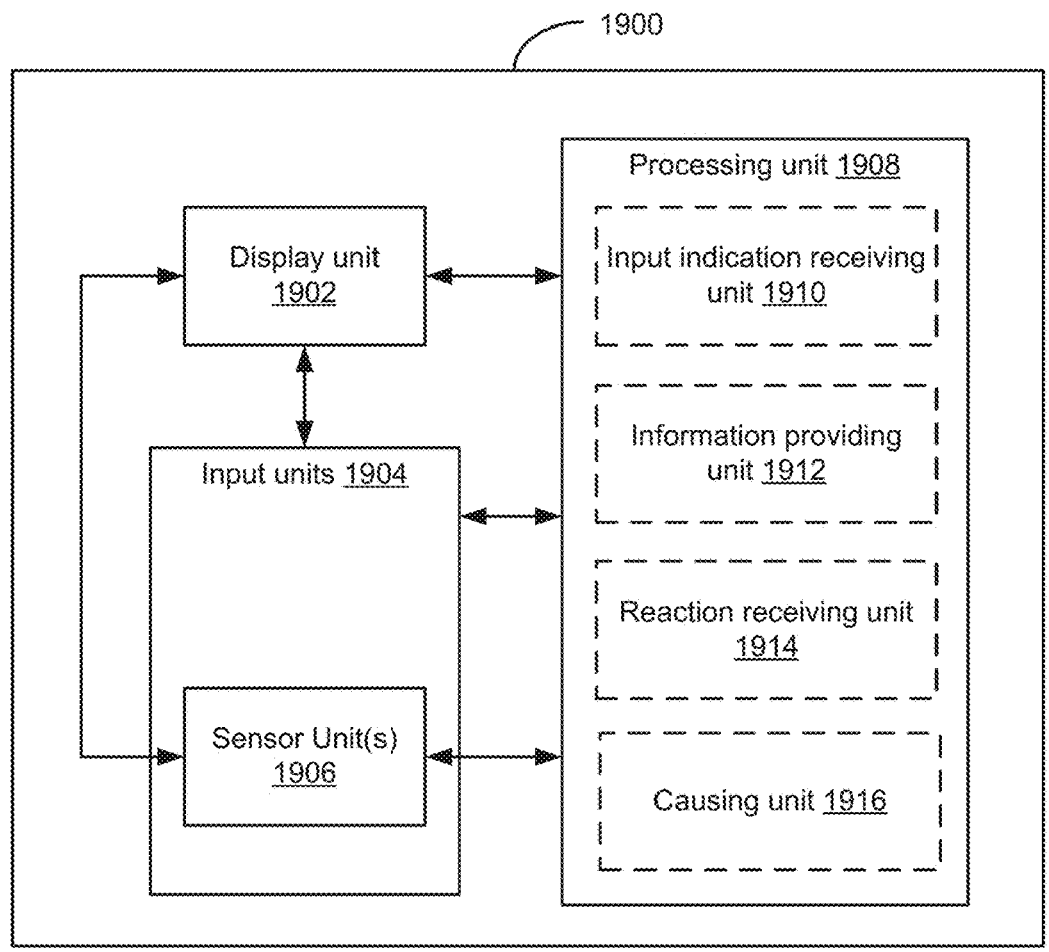

In accordance with some embodiments, FIG. 19 shows a functional block diagram of an electronic device 1900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 1900 includes a display unit 1902 configured to display a user interface for the electronic device, and one or more input units 1904 configured to generate tactile outputs in response to inputs. In some embodiments, one or more of the input units 1904 includes one or more respective sensor unit(s) 1906. The electronic device 1900 further includes a processing unit 1908 coupled to display unit 1902, input units 1904, and sensors 1906. In some embodiments, processing unit 1908 includes an input indication receiving unit 1910 configured to receive an indication of an input detected by a respective input unit of the plurality of input units, and an information providing unit 1912 configured to provide, in response to receiving the indication of the input, information describing the input to an application running on the electronic device that enables the application to react to the input.

The processing unit 1908 further includes a reaction receiving unit 1914 configured to receive a reaction to the input from the application that indicates that a tactile output is to be generated in response to the input, and a causing unit 1916 configured to cause, in response to receiving the reaction to the input from the application, the generation of a respective tactile output. More specifically, in accordance with a determination (see operation 1114 of method 1100, FIGS. 11A-11C) that the reaction was triggered by the first input device, the causing unit 1916 causes the respective tactile output to be generated at the first input device based on the reaction to the input from the application; and in accordance with a determination (see operation 1116 of method 1100, FIGS. 11A-11C) that the reaction was triggered by the second input device, the causing unit 1916 causes the respective tactile output to be generated at the second input device based on the reaction to the input from the application.

In some embodiments, processing unit 1908 of electronic device 1900 is configured to cause the electronic device to perform any of the methods described above with reference to FIGS. 11A-11C.

The operations described above with reference to FIGS. 6A-6D, 7A-7D, 8A-8C, 9A-9D, 10A-10D, 11A-11C, and 12A-12C are, optionally, implemented by components depicted in FIGS. 1A-1B and/or FIGS. 13-19. For example, as to the operations described above with reference to FIGS. 11A-11C, receiving an indication operation 1104, providing information describing the input operation 1106, receiving a reaction to the input from the application operation 1108, and causing the generation of a tactile output operation 1112 are, optionally, implemented by event sorter 170, event recognizer 180, and event handler 190 (FIG. 1B), or by processing unit 1808 (FIG. 18). Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application and/or accesses a tactile output generator 167 to generate a tactile output. Similarly, it would be clear to a person having ordinary skill in the art how other processes can be implemented based on the components depicted in FIGS. 1A-1B.

For another example, as to the operations described above with reference to FIGS. 12A-12C, receiving an indication operation 1204, providing information describing the input operation 1206, receiving a reaction to the input from the application operation 1208, and causing the performance of operations 1210 are, optionally, implemented by event sorter 170, event recognizer 180, and event handler 190 (FIG. 1B), or by processing unit 1908 (FIG. 19). Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application and/or accesses a tactile output generator 167 to generate a tactile output. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Appendix A

Exemplary Intensity Models

Stage Progression

In some embodiments, each stage of a fluid gesture includes three zones with specific rules governing the transition through the zones. These zones are "next," "activated," and "release." In some embodiments, a stage progresses through the zones in that order given the following rules:

1. Any stage can move to any deeper activated or next stage.
2. Any stage can move to any shallower activated or release stage provided the force is below the current stage release zone (and any shallower zone that is skipped)
3. Positive transitionProgress describes moving though a next zone.
4. Negative transitionProgress describes moving through a release zone.
5. When in neither a next or release zone, transitionProgress is 0.
6. stagePressure describes moving through the activated zone.
7. When the force is outside the activated zone of the current stage, transitionProgress shall be 0 when below the zone, or 1 when above the zone.
8. It is possible to be in both activated and next zones or, activated and release zones for the same stage. The gestureBehavior shall define if this case applies to it.

Figure 20A:
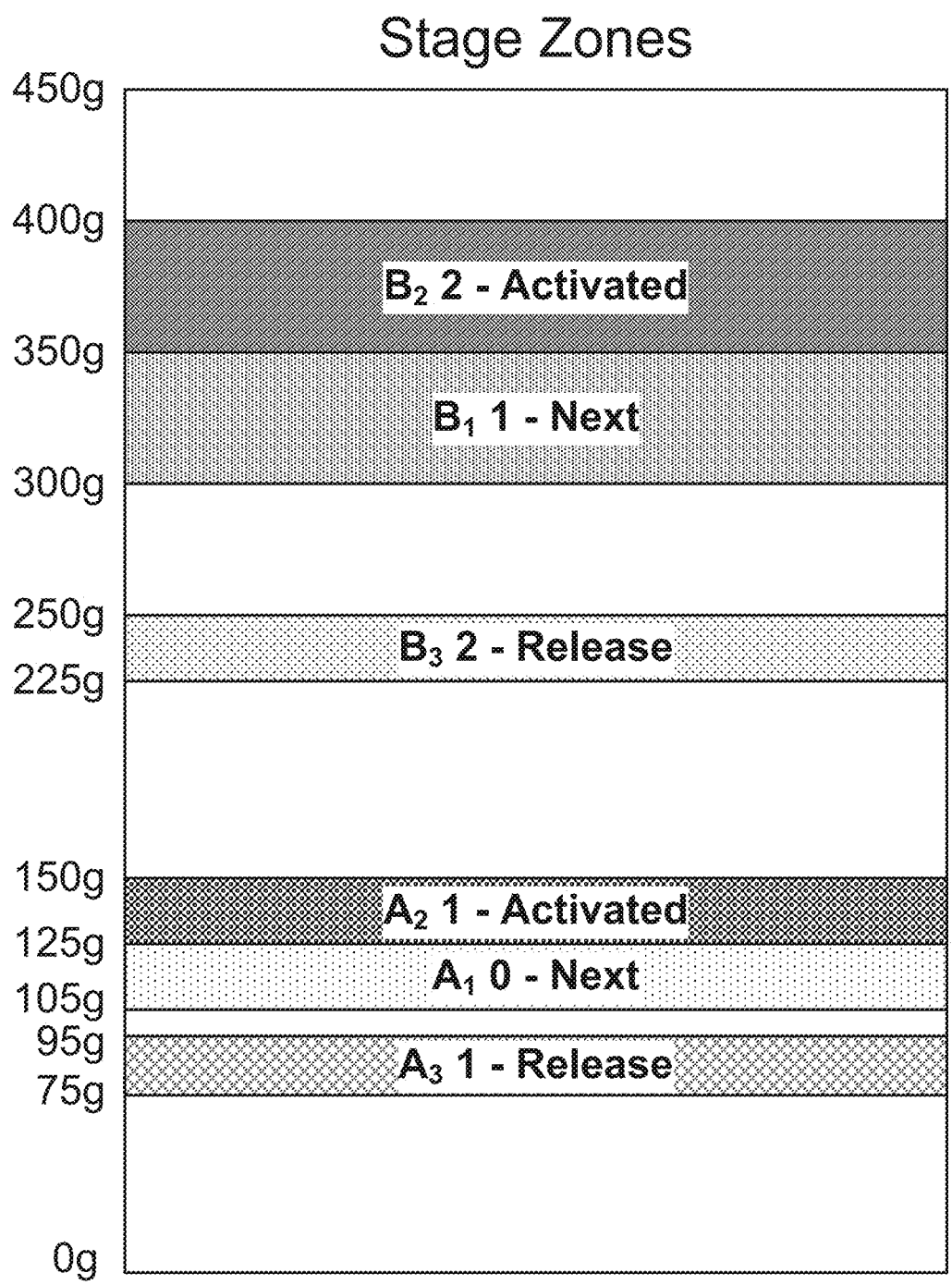
FIG. 20A illustrates stage zones for an exemplary gesture in accordance with some embodiments.

The chart in FIG. 20A shows the stage zones for a pulse gesture. The three zones A1, A2, and A3 show the related zones for stage 1. In some embodiments, zone A1 has a stage value of 0 because the gesture is transitioning from stage 0 to stage 1 and is therefore not latched to stage 1 yet.

Intensity Model Identifier: Force

Figure 20B:
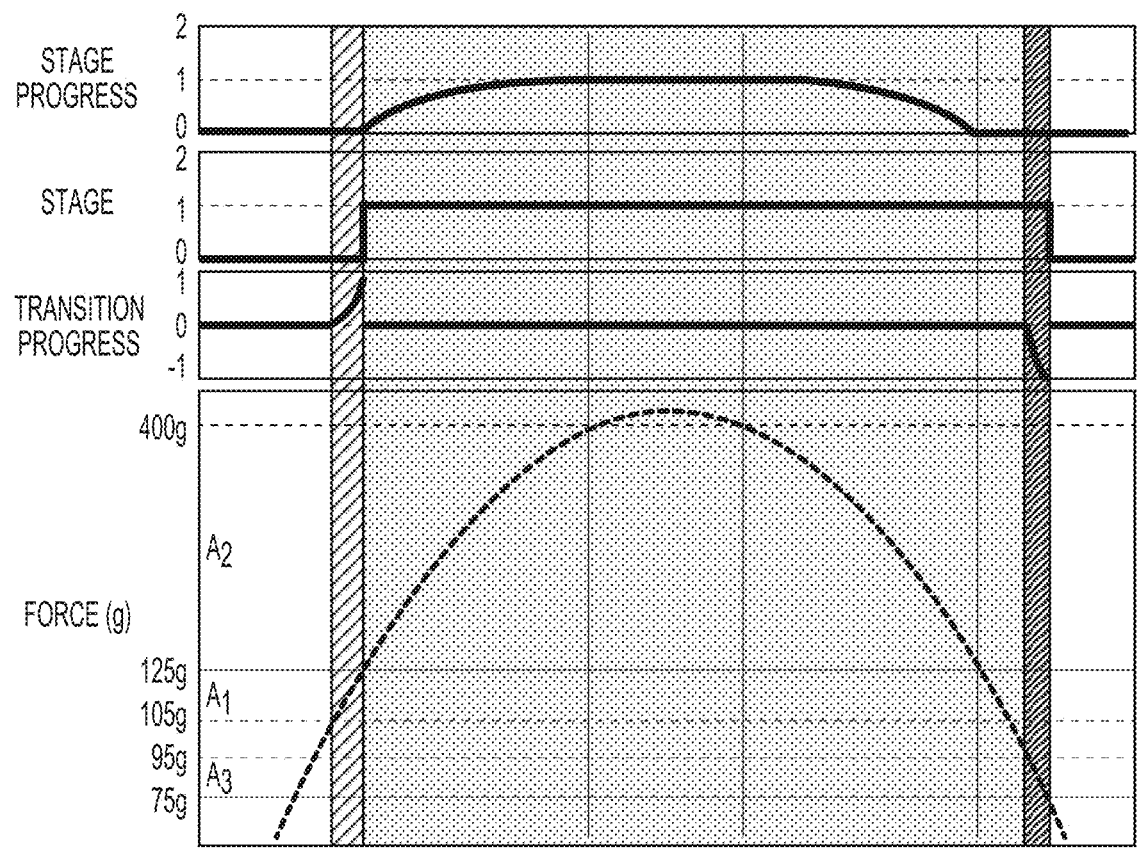
FIGS. 20B-20E illustrate exemplary intensity models in accordance with some embodiments.

FIG. 20B illustrates a basic one-stage intensity model (and a corresponding gesture). Once latched to stage 1, the progress value is immediately variable.

Intensity Model Identifier: Gas Pedal

Figure 20C:
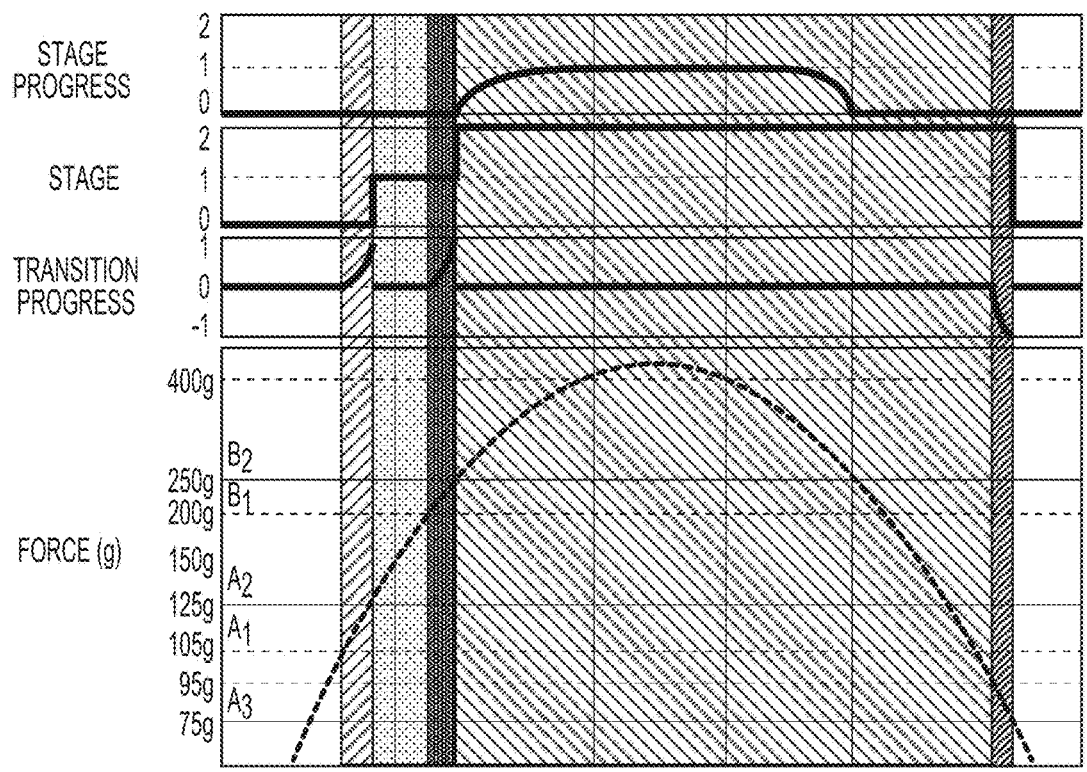
Figure 20C:
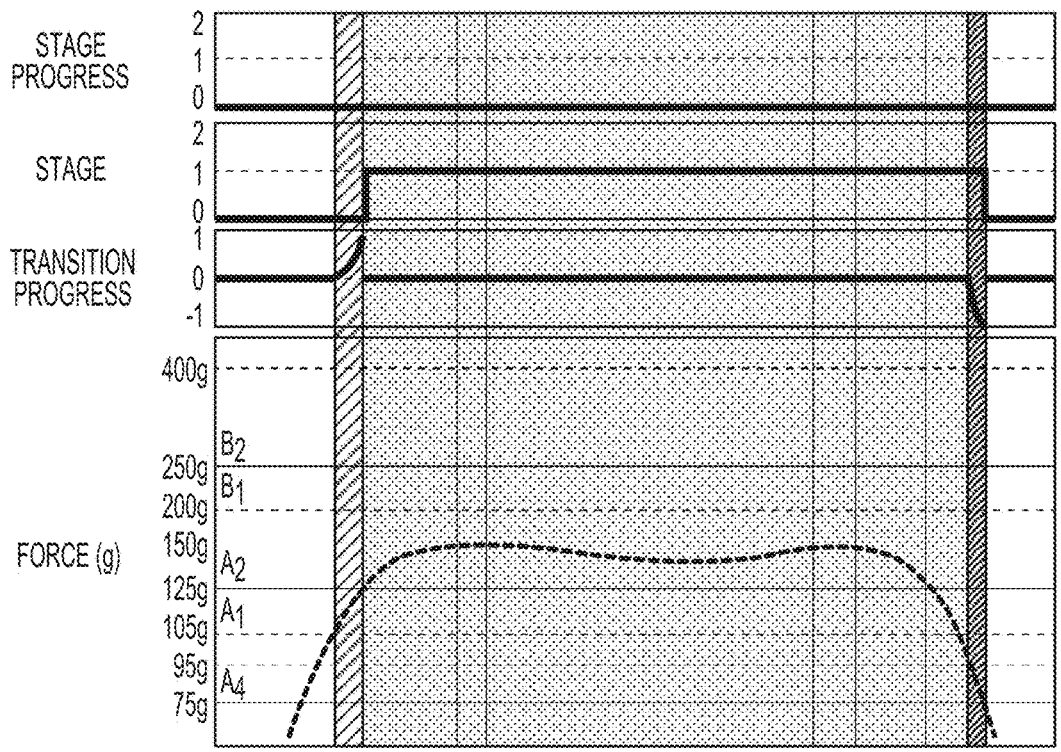

FIG. 20C illustrates a two-stage intensity model (and exemplary gestures) where there is a dead zone between the mouse down and the start of variable force. In some embodiments, the force band for the stage 1 activated progress is infinitely small.

Intensity Model Identifier: Deep Click

Figure 20D:
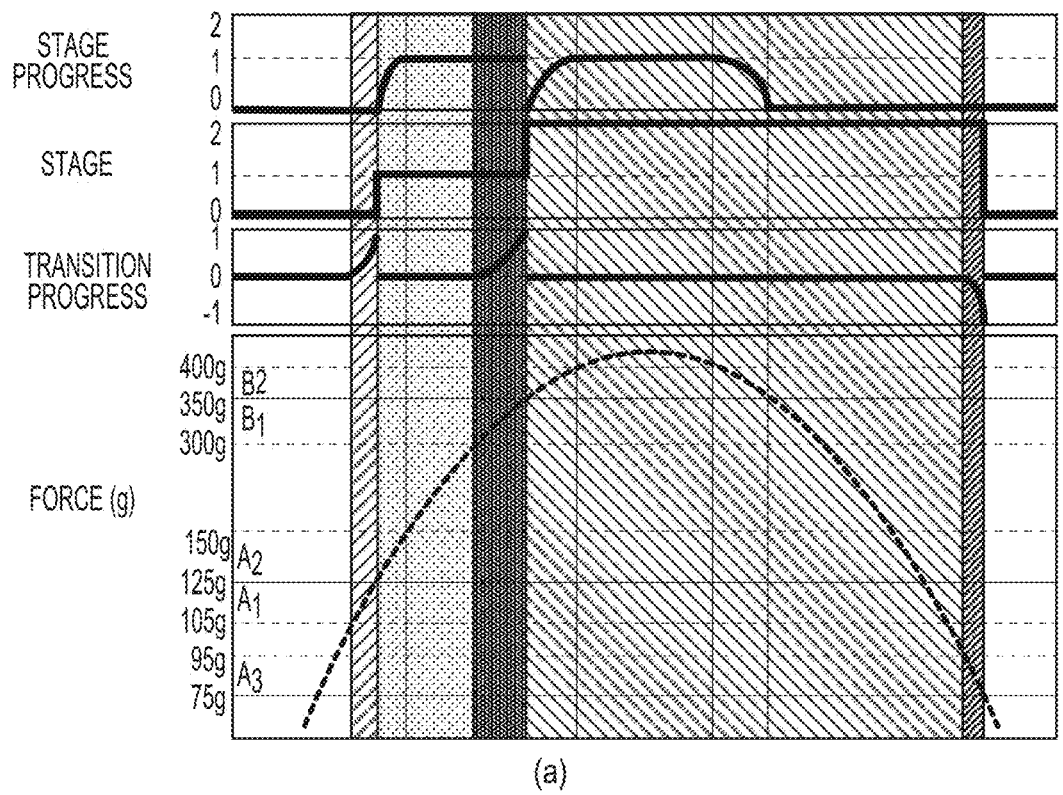
Figure 20D:
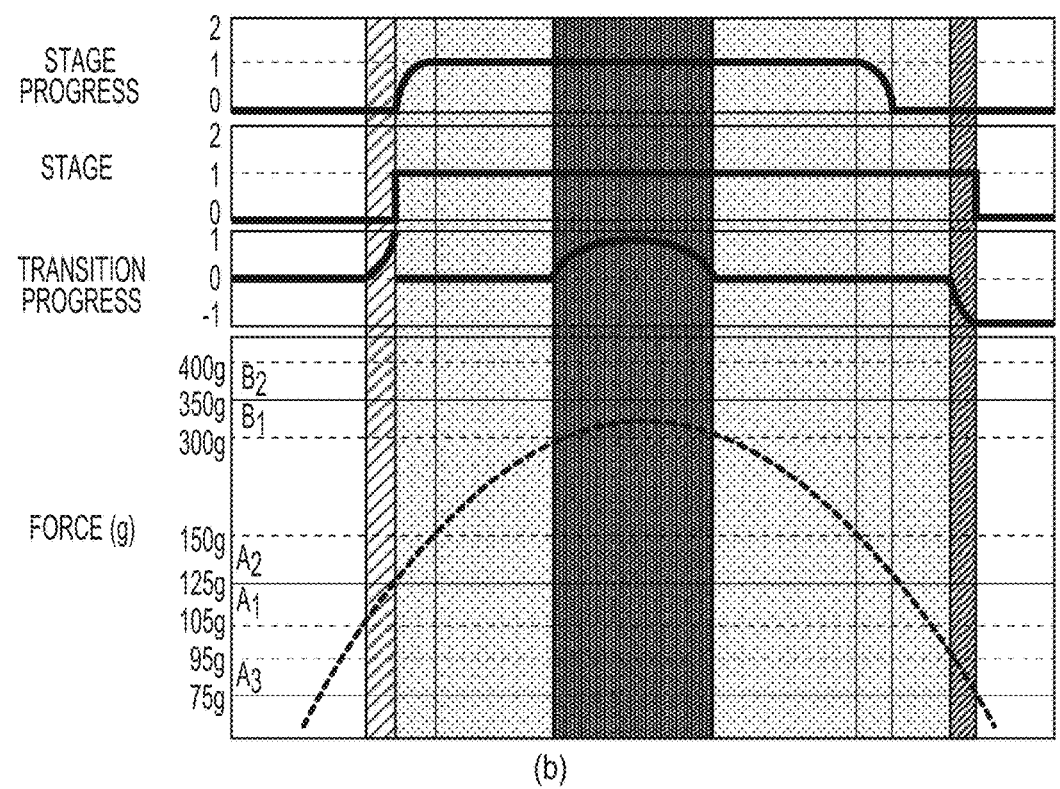

FIG. 20D illustrates a two-stage intensity model (and exemplary gestures) where the second stage is sometimes referred to as "deep." In some embodiments, this is similar to camera shutter button. Each stage is surrounded by bands where an animation is prescribed. Additionally, once a device (and/or a gesture input on the device) reaches a "deep" stage, the device (and/or the gesture input on the device) remains in the "deep" stage until the gesture input ends (e.g. release to take 0).

Intensity Model Identifier: Pulse

Figure 20E:
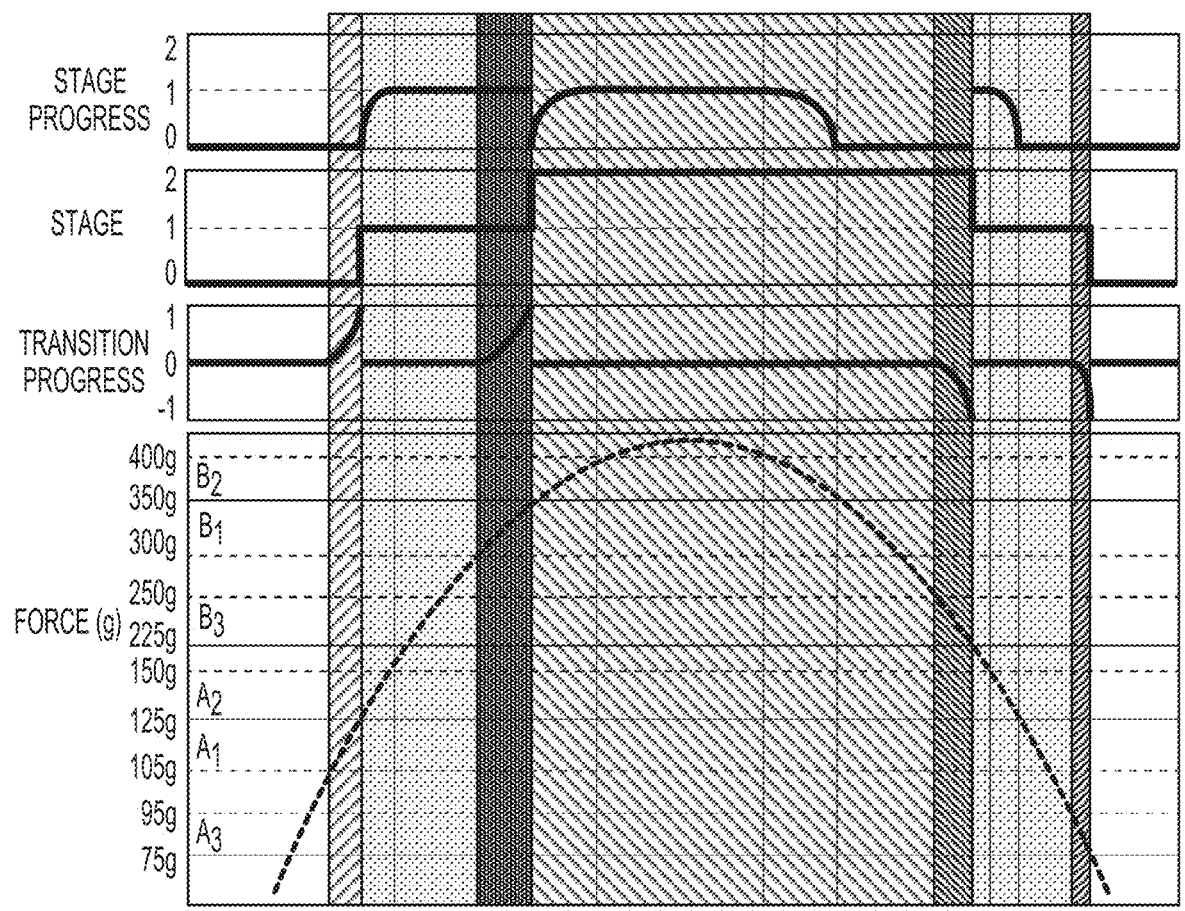

FIG. 20E illustrates a two-stage intensity model (and a corresponding gesture) where the second stage is sometimes referred to as "deep." This is similar to the deep gesture. However, it differs from the deep gesture in that the gesture input can toggle back and forth between the deep and normal stages.

Appendix B

Cocoa Application Framework

The Cocoa Application Framework (also referred to as the Application Kit, or AppKit) is one of the core Cocoa frameworks. It provides functionality and associated APIs for applications, including objects for graphical user interfaces (GUIs), event-handling mechanisms, application services, and drawing and image composition facilities.

Marking Updated APIs in Headers

New APIs in headers are marked with decorations that include references to "10_10_3":

NS_AVAILABLE_MAC(10_10_3), NS_AVAILABLE (10_10_3, <iOS Release>), NS_CLASS_AVAILABLE (10_10_3, <iOS Release>), NS_ENUM_AVAILABLE (10_10_3) or sometimes the construct:

if MAC_OS_X_VERSION_MAX_ALLOWED>= MAC_OS_X_VERSION_10_10_3
. . .
endif

Runtime Version Check

There are several ways to check for new features provided by the Cocoa frameworks at runtime. One is to look for a given new class or method dynamically, and not use it if not there. Another is to use the global variable NSAppKitVersionNumber (or, in Foundation, NSFoundationVersionNumber):

double NSAppKitVersionNumber;
define NSAppKitVersionNumber10_0 577
define NSAppKitVersionNumber10_1 620
define NSAppKitVersionNumber10_2 663
define NSAppKitVersionNumber10_3 743
define NSAppKitVersionNumber10_4 824
define NSAppKitVersionNumber10_5 949
define NSAppKitVersionNumber10_6 1038
define NSAppKitVersionNumber10_7 1138
define NSAppKitVersionNumber10_8 1187
define NSAppKitVersionNumber10_9 1265
define NSAppKitVersionNumber10_10 1343

One typical use of this is to floor( ) the value, and check against the values provided in NSApplication.h. For instance:

```
if (floor(NSAppKitVersionNumber) <= NSAppKitVersionNumber10_8) {
  /* On a 10.8.x or earlier system */
} else if (floor(NSAppKitVersionNumber) <=
NSAppKitVersionNumber10_9) {
  /* On a 10.9-10.9.x system */
```

```
} else {
  /* 10.10 or later system */
}
```

Special cases or situations for version checking are also discussed in the release notes as appropriate. For instance some individual headers may also declare the versions numbers for NSAppKitVersionNumber where some bug fix or functionality is available in a given update, for example:
define NSAppKitVersionWithSuchAndSuchBadBugFix 1138.42

Backward Compatibility

One backward compatibility mechanism that is occasionally used in the frameworks is to check for the version of the system an application was built against, and if an older system, modify the behavior to be more compatible. This is done in cases where bad incompatibility problems are predicted or discovered; and most of these are listed below in these notes.

Typically we detect where an application was built by looking at the version of the System, Cocoa, AppKit, or Foundation frameworks the application was linked against. Thus, as a result of relinking your application against the latest SDK, you might notice different behaviors, some of which might cause incompatibilities. In these cases because the application is being rebuilt, we expect you to address these issues at the same time as well. For this reason, if you are doing a small incremental update of your application to address a few bugs, it's usually best to continue building on the same build environment and libraries used originally.

In some cases, we provide defaults (preferences) settings which can be used to get the old or new behavior, independent of what system an application was built against. Often these preferences are provided for debugging purposes only; in some cases the preferences can be used to globally modify the behavior of an application by registering the values (do it somewhere very early, with -[NSUserDefaults registerDefaults:]).

Pressure Events

Some Apple trackpads have the ability to report pressure. Like the rotation and magnification gestures that came before it, the pressure gesture is reported as a new event type, NSEventTypePressure, and a new responder method -(void)pressureChangeWithEvent:(NSEvent *).

Note: The new NSEventTypePressure events are only available in 64 bit.

@property (readonly) NSEventPhase phase NS_AVAILABLE_MAC(10_7);

NSEventTypePressure is a fluid gesture. And like all fluid gestures, it has a phase that describes the sequence of the pressure gesture stream.

@property (readonly) NSInteger stage NS_AVAILABLE_MAC(10_10_3);

A pressure gesture can go through multiple stages.

Stage 0: The lowest stage. Generally this means the user is applying less pressure than what is required to get a mouse down. Effectively you only see one stage 0 pressure event per stream when the gesture ends.

Stage 1: Equivalent to a mouse down. NSEventTypePressure events are not posted until the user applies enough pressure that the trackpad will also issue a mouse down.

Stage 2: Equivalent to a force click. The user has applied significant additional pressure greater than what is needed for a mouse down. Stage 2 should generally be used as the trigger for an additional action. For example, lookup is performed when the pressure stream transitions to stage 2. Note: Generally, the trackpad will actuate as the gesture transitions across stages.

Note: It is possible for stage to increase or decrease multiple integer values per change. For example, a quick removal of the user's fingers while at stage 2 may cause stage to transition to 0 without a pressure event with stage 1.
@property (readonly) float pressure;

The pressure on the trackpad for the current stage. The range for this value is [0,1]. Each stage has a pressure curve appropriate for that stage. That is, pressure may change from [0,1] for stage 1. And likewise, [0,1] for stage 2.

Note: Pressure of only one stage should be used. Carefully consider the use case. If variable input is useful for all cases, then use the pressure during stage 1 as this is the most comfortable range for the user. If variable input is useful only in rare situations where the user input must not be ambiguous with a regular mouse click, then use stage 2. Though, generally, for such cases, use stage 2 to denote this input and ignore stage 2 pressure. Do not attempt to combine stage 1 and stage 2 pressure to get a larger range. Doing so will cause undue stress on the user's fingers.

Note: pressure is not appropriate for weight measurements.
@property (readonly) CGFloat stageTransition NS_AVAILABLE_MAC(10_10_3);

The animation value for stage transitions. Positive stageTransition describes approaching the next stage of the pressure gesture. Negative stageTransition describes approaching release of the current stage. For example, as the user approaches stage 2, stageTransition will increase towards 1. The moment the gesture transitions to stage 2, stageTransition immediately return to 0 and will decrease towards −1 as the user releases pressure on the trackpad until the gesture transitions to stage 1 again. Generally, only the positive stage transition values are animated.

Note: stageTransition doesn't match the pressure curve. There are bands where the pressure may change but the stageTransition remains at 0. stageTransition remains at 0 until the gesture is very near a stage transition.
@property (readonly) NSEventMask associatedEventsMask NS_AVAILABLE_MAC(10_10_3);

This property makes it possible to determine on the mouse down if pressure should be expected from the input device. Since pressure and mouse events are independent streams, you sometimes need to make a decision (for example, a starting pressure) immediately on mouse down.
Example:

```
if (event.associatedEventMask & NSEventMaskPressure) {
    self.pressure = 0; // Pressure events are coming!
} else if (event.subtype == NSTabletPointEventSubtype) {
    self.pressure = event.pressure; // tablets embed pressure in the mouse event.
} else {
    self.pressure = 1; // This device does not have pressure. Default to full pressure
}
```

Getting Pressure Events
There are 3 ways to get pressure events.
1. Override the NSResponder method:
-(void)pressureChangeWithEvent:(NSEvent *)event;
2. In a tracking loop, add NSEventMaskPressure to the eventMask.

```
NSEventMask eventMask = NSLeftMouseDraggedMask | NSLeftMouseUpMask | NSEventMaskPressure;
[self.window trackEventsMatchingMask:eventMask timeout:NSEventDurationForever mode:NSEventTrackingRunLoopMode handler: ^ (NSEvent *event, BOOL *stop) {
    if (event.type == NSEventTypePressure) {
        // yay, pressure!
    } else if (event.type == NSLeftMouseUpMask) {
        *stop == YES;
    }
}];
```
-OR-
```
NSEvent *event = [self.window nextEventMatchingMask:NSLeftMouseDraggedMask | NSLeftMouseUpMask | NSEventMaskPressure];
```

3. In a NSGestureRecognizer subclass by overriding the method:
-(void)pressureChangeWithEvent:(NSEvent *)event;
Spring Loaded Drag & Drop The Finder spring loading feature has been expanded and adopted in more places. All application windows will spring forward automatically. Tabs will activate themselves in response to spring loading while segmented controls and buttons can be configured to respond to spring loading.

Spring loading is triggered by hovering over a spring loading capable target. The length of the hover delay is controlled via the Accessibility Mouse & Trackpad system preference pane.

Using a pressure sensitive trackpad, the user can also trigger spring loading by pressing harder on the trackpad during a drag. This is akin to a nested click inside of a drag. During a drag, the user can press harder. The trackpad will actuate, arming the spring loading under the cursor. When the user relaxes just enough to release the nested click, the trackpad will actuate and trigger the spring loading without dropping the drag. Once the user triggers spring loading via a pressure sensitive trackpad, the hover feature is disabled until the user starts a new drag & drop operation.

Spring Loaded Controls
Segmented controls and buttons can be configured to send their action in response to the user dragging an item. Set springLoaded to YES and the user will be able to interact with the control via force clicking or hovering during a drag.
@property (getter=isSpringLoaded) BOOL springLoaded NS_AVAILABLE_MAC(10_10_3); // sends action on force-click or extended hover while dragging. Defaults to NO.
Spring Loaded Tab View Tab views and tab view controllers now change selection in response to force click or extended hover while the user is dragging an item.
Accelerator Buttons There are new button types for pressure sensitive trackpads, referred to as "accelerator" buttons. These act like continuous-mode push buttons in that applications generally respond to them while they are held down, and then stop when they are released. Their main feature is the ability to interpret variable pressure, allowing the user to directly control the speed of the related action by changing the pressure they apply. This is intended to be used for things like controlling the speed of fast forward and rewind for media playback, the advancement speed for week view in calendar, or the zoom speed in maps.

There are two types of accelerator buttons:
A "regular" type where fine-grained precision is desirable, and the range of values is a floating point number. Here the button's value is 0 when not pressed, and ranges from [1 . . . 2) when pressed.

A "multi-level" type with a configurable number of explicit levels (up to 5). These buttons also present a value of 0 when not pressed, but have an integer value from [1 . . . N] to indicate the discrete acceleration levels.

```
typedef NS_ENUM (NSUInteger, NSButtonType) {
   NSAcceleratorButton NS_ENUM_AVAILABLE_MAC (10_10_3)  = 8,
   NSMultiLevelAcceleratorButton NS_ENUM_AVAILABLE_MAC
   (10_10_3)  = 9,
}
@property NSInteger maxState NS_AVAILABLE_MAC (10_10_3); //
Configures the maximum allowed state for NSMultiLevelAcceleratorBut-
ton
buttons, allowed values range from [1, 5].
```

The new button types are variants of the standard NSMomentaryLightButton, and work with a variety of bezel styles. A simple call to setButtonType is all that's necessary to use them—this will properly configure relevant aspects of the button. Accelerator buttons behave differently than standard NSButtons in a variety of ways. Beyond the additional API above, here are the major behavioral distinctions:

Accelerator buttons do not automatically advance their state when clicked, but will change value and send action messages repeatedly while interacting with the user. On mouse up, they reset their value to 0 and send a final action message.

The value of a multi-level accelerator button can be explicitly set in order to suppress lower levels of the accelerated range. This is used, for example, when a video is already fast forwarding at 4x: we provide no acceleration messages or feedback until the 8x level is reached.

Accelerator buttons allow a greater range of values: [0,1.99999 . . . ] or [0,5] compared to the standard on/off/mixed for other buttons.

The floatValue and doubleValue are used to convey pressure levels for regular accelerator buttons.

Accelerator buttons do not support mixed state.

All accelerator buttons will carry a state of 0 when not pressed, or 1 when pressed/clicked normally. The state (and value) will rise above 1 when pressed harder. For fine grained control over speed, NSButtonTypeAccelerator exposes a doubleValue ranging from 1 when initially pressed to 1.999999 (or so) when fully pressed. This design allows the doubleValue and integerValue to "match", and avoids having to expose a separate property for the fractional part of the value.

An NSMultiLevelAcceleratorButton provides a configurable number of distinct pressure levels, with tactile feedback as the user reaches each one. Clients configure the number of discrete levels by changing the new maxState property. It is always 1 for other button types, but defaults to 2 for multi-level accelerator buttons. Values outside the range [2,5] will be pinned and cause a warning to be logged. Values above 1 will add additional levels to the button, with a light actuation, on capable hardware, when each one is reached. The control takes on these integer-valued states during interaction with the user, and sends an action message whenever they change. As an aside, note that the pressures needed to reach a given level remain the same, regardless of the maxState value. In other words, the pressure thresholds for the allowed levels are not evenly spread across the available pressure range.

Applications respond to accelerator buttons using the traditional action handlers. They read the control's state/integerValue or doubleValue, and configure the speed of the related operation to match. The application is responsible for translating the floating point [0,1.99999] or integer [0,5] values into an appropriate speed for their specific use case.

Accelerator Segmented Controls

Segmented controls can be configured for pressure sensitivity, which can be used to accelerate user interactions. For example, a −/+ zoom control may want to accelerate zooming the harder the user presses. A continuous control with a periodic interval may accelerate page turning, as the periodic interval is automatically adjusted based on pressure.

```
typedef NS_ENUM (NSUInteger, NSSegmentSwitchTracking) {
   NSSegmentSwitchTrackingMomentaryAccelerator
NS_ENUM_AVAILABLE_MAC (10_10_3) = 3, // accelerator behavior,
only selected while tracking
}
/* This message is valid only for
trackingMode=NSSegmentSwitchTrackingMomentaryAccelerator and
provides the double value for the selected segment.
*/
- (double) doubleValueForSelectedSegment NS_AVAILABLE_MAC
(10_10_3);
```

The control may have its tracking mode set to NSSegmentSwitchTrackingMomentaryAccelerator. doubleValueForSelectedSegment represents the value which the individual segment would return without any segment offset, as if it were a standalone accelerator button.

Accelerator Segmented Control Behaviors

Behavior of momentary accelerator segmented controls vary based on the state of their continuous flag and whether or not the hardware supports pressure sensitivity. Below is a description of the behavior in each configuration.

Continuous Momentary Accelerator, Non-Pressure Sensitive Trackpad:

Actions will be sent at the cell's periodic interval, starting after the cell's periodic delay. Upon mouse up a final action will be sent with selectedSegment=−1.

Continuous Momentary Accelerator, Pressure Sensitive Trackpad:

Actions will be sent at a periodic interval automatically adjusted based on pressure, starting after the cell's delay. Upon mouse up a final action will be sent with selectedSegment=−1. In this configuration the adjusted periodic interval is useful for accelerated page turning of content.

Non-Continuous Momentary Accelerator, Non-Pressure Sensitive Trackpad:

An initial action will be sent with doubleValueForSelectedSegment=1.0. Upon mouse up a final action will be sent with doubleValueForSelectedSegment=0.0 and selectedSegment=−1.

Non-Continuous Momentary Accelerator, Pressure Sensitive Trackpad:

Each time the pressure changes, an action will be sent with doubleValueForSelectedSegment=[1.0+pressure]. Upon mouse up a final action will be sent with doubleValueForSelectedSegment=0.0 and selectedSegment=−1. In this configuration the doubleValueForSelectedSegment is useful to accelerate actions such as zooming.

What is claimed is:

1. A method, comprising:
at an electronic device with a touch-sensitive surface, wherein the touch-sensitive surface includes one or more sensors to detect intensity of contacts with the touch-sensitive surface:
   detecting a touch input on the touch-sensitive surface;
   in response to detecting the touch input on the touch-sensitive surface, determining an intensity of the touch input on the touch-sensitive surface;
   in accordance with the intensity of the touch input on the touch-sensitive surface and one or more preselected intensity thresholds, determining an intensity stage of the touch input, wherein the intensity stage of the touch input is selected from a plurality of predefined intensity stages;
   determining one or more intensity-based progress values of the touch input based on an intensity range associated with the determined intensity stage;
   sending touch information to a first software application stored by the electronic device, wherein the touch information includes the one or more intensity-based progress values of the touch input and information identifying the intensity stage of the touch input; and
   processing the touch information, corresponding to the touch input, by the first software application based on the one or more intensity-based progress values of the touch input and the intensity stage of the touch input to produce output corresponding to the touch input.

2. The method of claim 1, wherein the intensity stage of the touch input is determined by a contact intensity module that is distinct and separate from the first software application.

3. The method of claim 2, including displaying a user interface, while displaying the user interface receiving the touch input, sending to the first software application from the contact intensity module touch information that identifies the intensity stage of the touch input, and updating the user interface in accordance with at least the intensity stage of the touch input.

4. The method of claim 3, including sending information from the contact intensity module, the information indicating that the intensity of the touch input is available to the first software application.

5. The method of claim 3, including:
while the touch input continues to be detected on the touch-sensitive surface, repeating the operations of determining an intensity of the touch input, determining an intensity stage of the touch input, and sending touch information.

6. The method of claim 3, including:
in response to detecting the touch input, determining a first intensity applied by the touch input on the touch-sensitive surface;
in accordance with a determination that the first intensity applied by the touch input on the touch-sensitive surface does not satisfy a stage activation intensity threshold for a second intensity stage, determining that the touch input is in a first intensity stage that is distinct from the second intensity stage;
subsequent to determining that the touch input is in the first intensity stage, determining a second intensity applied by the touch input on the touch-sensitive surface, wherein the second intensity is distinct from the first intensity; and
in accordance with a determination that the second intensity applied by the touch input on the touch-sensitive surface satisfies the stage activation intensity threshold for the second intensity stage, determining that the touch input is in the second intensity stage.

7. The method of claim 6, including:
subsequent to determining that the touch input is in the second intensity stage, determining a third intensity applied by the touch input on the touch-sensitive surface, wherein the third intensity is distinct from the second intensity;
in accordance with a determination that the third intensity does not satisfy a stage release intensity threshold for the second intensity stage, distinct from the stage activation intensity threshold for the second intensity stage, determining that the touch input remains in the second intensity stage;
subsequent to determining that the touch input remains in the second intensity stage, determining a fourth intensity applied by the touch input on the touch-sensitive surface, wherein the fourth intensity is distinct from the third intensity; and
in accordance with a determination that the fourth intensity satisfies the stage release intensity threshold for the second intensity stage, determining that the touch input is in the first intensity stage.

8. The method of claim 6, including:
subsequent to determining that the touch input remains in the second intensity stage, determining a third intensity applied by the touch input on the touch-sensitive surface, wherein the third intensity is distinct from the second intensity; and
in accordance with a determination that the third intensity satisfies a stage activation threshold for a third intensity stage, distinct from the stage activation intensity threshold for the second intensity stage, determining that the touch input is in the third intensity stage.

9. The method of claim 8, including:
subsequent to determining that the touch input is in the third intensity stage, determining a fourth intensity applied by the touch input on the touch-sensitive surface, wherein the fourth intensity is distinct from the third intensity; and
in accordance with a determination that the fourth intensity satisfies a stage release intensity threshold for the third intensity stage, distinct from the stage activation threshold for the third intensity stage, determining that the touch input is in the second intensity stage.

10. The method of claim 1, including:
identifying an intensity model identifier from a plurality of predefined intensity model identifiers, wherein the intensity stage of the touch input is selected from a plurality of intensity stages that correspond to the identified intensity model identifier.

11. The method of claim 1, wherein the one or more intensity-based progress values of the touch input include a transition progress value of the touch input or a stage progress value of the touch input.

12. The method of claim 1, wherein processing the touch information by the first software application includes updating a user interface.

13. An electronic device, comprising:
a touch-sensitive surface;
one or more sensors to detect intensity of contacts with the touch-sensitive surface;
one or more processors; and memory storing one or more programs, wherein the one or more programs are configured to be executed by the one or more processors, the one or more programs including instructions for:

detecting a touch input on the touch-sensitive surface;

in response to detecting the touch input on the touch-sensitive surface, determining an intensity of the touch input on the touch-sensitive surface;

in accordance with the intensity of the touch input on the touch-sensitive surface and one or more preselected intensity thresholds, determining an intensity stage of the touch input, wherein the intensity stage of the touch input is selected from a plurality of predefined intensity stages;

determining one or more intensity-based progress values of the touch input based on an intensity range associated with the determined intensity stage;

sending touch information to a first software application stored by the electronic device, wherein the touch information includes the one or more intensity-based progress values of the touch input and information identifying the intensity stage of the touch input; and processing the touch information, corresponding to the touch input, by the first software application based on the one or more intensity-based progress values of the touch input and the intensity stage of the touch input to produce output corresponding to the touch input.

14. The electronic device of claim 13, wherein the intensity stage of the touch input is determined by a contact intensity module that is distinct and separate from the first software application.

15. The electronic device of claim 14, wherein the one or more programs include instructions for: displaying a user interface, while displaying the user interface receiving the touch input, sending to the first software application from the contact intensity module touch information that identifies the intensity stage of the touch input, and updating the user interface in accordance with at least the intensity stage of the touch input.

16. The electronic device of claim 15, wherein the one or more programs include instructions for sending information from the contact intensity module, the information indicating that the intensity of the touch input is available to the first software application.

17. The electronic device of claim 15, wherein the one or more programs include instructions for:

while the touch input continues to be detected on the touch-sensitive surface, repeating the operations of determining an intensity of the touch input, determining an intensity stage of the touch input, and sending touch information.

18. The electronic device of claim 15, wherein the one or more programs include instructions for:

in response to detecting the touch input, determining a first intensity applied by the touch input on the touch-sensitive surface;

in accordance with a determination that the first intensity applied by the touch input on the touch-sensitive surface does not satisfy a stage activation intensity threshold for a second intensity stage, determining that the touch input is in a first intensity stage that is distinct from the second intensity stage;

subsequent to determining that the touch input is in the first intensity stage, determining a second intensity applied by the touch input on the touch-sensitive surface, wherein the second intensity is distinct from the first intensity; and in accordance with a determination that the second intensity applied by the touch input on the touch-sensitive surface satisfies the stage activation intensity threshold for the second intensity stage, determining that the touch input is in the second intensity stage.

19. The electronic device of claim 18, wherein the one or more programs include instructions for:

subsequent to determining that the touch input is in the second intensity stage, determining a third intensity applied by the touch input on the touch-sensitive surface, wherein the third intensity is distinct from the second intensity;

in accordance with a determination that the third intensity does not satisfy a stage release intensity threshold for the second intensity stage, distinct from the stage activation intensity threshold for the second intensity stage, determining that the touch input remains in the second intensity stage;

subsequent to determining that the touch input remains in the second intensity stage, determining a fourth intensity applied by the touch input on the touch-sensitive surface, wherein the fourth intensity is distinct from the third intensity; and in accordance with a determination that the fourth intensity satisfies the stage release intensity threshold for the second intensity stage, determining that the touch input is in the first intensity stage.

20. The electronic device of claim 18, wherein the one or more programs include instructions for:

subsequent to determining that the touch input remains in the second intensity stage, determining a third intensity applied by the touch input on the touch-sensitive surface, wherein the third intensity is distinct from the second intensity; and in accordance with a determination that the third intensity satisfies a stage activation threshold for a third intensity stage, distinct from the stage activation intensity threshold for the second intensity stage, determining that the touch input is in the third intensity stage.

21. The electronic device of claim 20, wherein the one or more programs include instructions for:

subsequent to determining that the touch input is in the third intensity stage, determining a fourth intensity applied by the touch input on the touch-sensitive surface, wherein the fourth intensity is distinct from the third intensity; and in accordance with a determination that the fourth intensity satisfies a stage release intensity threshold for the third intensity stage, distinct from the stage activation threshold for the third intensity stage, determining that the touch input is in the second intensity stage.

22. The electronic device of claim 13, wherein the one or more programs include instructions for:

identifying an intensity model identifier from a plurality of predefined intensity model identifiers, wherein the intensity stage of the touch input is selected from a plurality of intensity stages that correspond to the identified intensity model identifier.

23. The electronic device of claim 13, wherein the one or more intensity-based progress values of the touch input include a transition progress value of the touch input or a stage progress value of the touch input.

24. The electronic device of claim 13, wherein processing the touch information by the first software application includes updating a user interface.

25. A non-transitory computer readable storage medium storing one or more programs, the one or more programs including instructions, which, when executed by an electronic device with a touch-sensitive surface and one or more sensors to detect intensity of contacts with the touch-sensitive surface, cause the electronic device to:
  detect a touch input on the touch-sensitive surface;
  in response to detecting the touch input on the touch-sensitive surface, determine an intensity of the touch input on the touch-sensitive surface;
  in accordance with the intensity of the touch input on the touch-sensitive surface and one or more preselected intensity thresholds, determine an intensity stage of the touch input, wherein the intensity stage of the touch input is selected from a plurality of predefined intensity stages;
  determine one or more intensity-based progress values of the touch input based on an intensity range associated with the determined intensity stage;
  send touch information to a first software application stored by the electronic device, wherein the touch information includes the one or more intensity-based progress values of the touch input and information identifying the intensity stage of the touch input; and
  processing the touch information, corresponding to the touch input, by the first software application based on the one or more intensity-based progress values of the touch input and the intensity stage of the touch input to produce output corresponding to the touch input.

26. The non-transitory computer readable storage medium of claim 25, wherein the intensity stage of the touch input is determined by a contact intensity module that is distinct and separate from the first software application.

27. The non-transitory computer readable storage medium of claim 26, wherein the one or more programs include instructions, which, when executed by the electronic device, cause the electronic device to: display a user interface, while displaying the user interface receive the touch input, send to the first software application from the contact intensity module touch information that identifies the intensity stage of the touch input, and update the user interface in accordance with at least the intensity stage of the touch input.

28. The non-transitory computer readable storage medium of claim 27 wherein the one or more programs include instructions, which, when executed by the electronic device, cause the electronic device to: send information from the contact intensity module, the information indicating that the intensity of the touch input is available to the first software application.

29. The non-transitory computer readable storage medium of claim 27, wherein the one or more programs include instructions, which, when executed by the electronic device, cause the electronic device to: while the touch input continues to be detected on the touch-sensitive surface, repeat the operations of determining an intensity of the touch input, determining an intensity stage of the touch input, and sending touch information.

30. The non-transitory computer readable storage medium of claim 27, wherein the one or more programs include instructions, which, when executed by the electronic device, cause the electronic device:
  detect the touch input, in response to detecting the touch input, determine a first intensity applied by the touch input on the touch-sensitive surface;
  in accordance with a determination that the first intensity applied by the touch input on the touch-sensitive surface does not satisfy a stage activation intensity threshold for a second intensity stage, determine that the touch input is in a first intensity stage that is distinct from the second intensity stage;
  subsequent to determining that the touch input is in the first intensity stage, determine a second intensity applied by the touch input on the touch-sensitive surface, wherein the second intensity is distinct from the first intensity; and
  in accordance with a determination that the second intensity applied by the touch input on the touch-sensitive surface satisfies the stage activation intensity threshold for the second intensity stage, determine that the touch input is in the second intensity stage.

31. The non-transitory computer readable storage medium of claim 30, wherein the one or more programs include instructions, which, when executed by the electronic device, cause the electronic device to:
  subsequent to determining that the touch input is in the second intensity stage, determine a third intensity applied by the touch input on the touch-sensitive surface, wherein the third intensity is distinct from the second intensity;
  in accordance with a determination that the third intensity does not satisfy a stage release intensity threshold for the second intensity stage, distinct from the stage activation intensity threshold for the second intensity stage, determine that the touch input remains in the second intensity stage;
  subsequent to determining that the touch input remains in the second intensity stage, determine a fourth intensity applied by the touch input on the touch-sensitive surface, wherein the fourth intensity is distinct from the third intensity; and
  in accordance with a determination that the fourth intensity satisfies the stage release intensity threshold for the second intensity stage, determine that the touch input is in the first intensity stage.

32. The non-transitory computer readable storage medium of claim 30, wherein the one or more programs include instructions, which, when executed by the electronic device, cause the electronic device to:
  subsequent to determining that the touch input remains in the second intensity stage, determine a third intensity applied by the touch input on the touch-sensitive surface, wherein the third intensity is distinct from the second intensity; and
  in accordance with a determination that the third intensity satisfies a stage activation threshold for a third intensity stage, distinct from the stage activation intensity threshold for the second intensity stage, determine that the touch input is in the third intensity stage.

33. The non-transitory computer readable storage medium of claim 32, including:
  subsequent to determining that the touch input is in the third intensity stage, determine a fourth intensity applied by the touch input on the touch-sensitive surface, wherein the fourth intensity is distinct from the third intensity; and
  in accordance with a determination that the fourth intensity satisfies a stage release intensity threshold for the third intensity stage, distinct from the stage activation threshold for the third intensity stage, determine that the touch input is in the second intensity stage.

34. The non-transitory computer readable storage medium of claim 30, wherein the one or more programs include instructions, which, when executed by the electronic device, cause the electronic device to:
   identify an intensity model identifier from a plurality of predefined intensity model identifiers, wherein the intensity stage of the touch input is selected from a plurality of intensity stages that correspond to the identified intensity model identifier.

35. The non-transitory computer readable storage medium of claim 25, wherein the one or more intensity-based progress values of the touch input include a transition progress value of the touch input or a stage progress value of the touch input.

36. The non-transitory computer readable storage medium of claim 25, wherein processing the touch information by the first software application includes updating a user interface.

\* \* \* \* \*